(12) United States Patent
Branagan et al.

(10) Patent No.: US 10,465,260 B2
(45) Date of Patent: *Nov. 5, 2019

(54) EDGE FORMABILITY IN METALLIC ALLOYS

(71) Applicant: The NanoSteel Company, Inc., Providence, RI (US)

(72) Inventors: Daniel James Branagan, Idaho Falls, ID (US); Andrew E. Frerichs, Idaho Falls, ID (US); Brian E. Meacham, Idaho Falls, ID (US); Grant G. Justice, Idaho Falls, ID (US); Andrew T. Ball, Idaho Falls, ID (US); Jason K. Walleser, Idaho Falls, ID (US); Kurtis Clark, Idaho Falls, ID (US); Logan J. Tew, Idaho Falls, ID (US); Scott T. Anderson, Idaho Falls, ID (US); Scott Larish, Idaho Falls, ID (US); Sheng Cheng, Idaho Falls, ID (US); Taylor L. Giddens, Idaho Falls, ID (US); Alla V. Sergueeva, Idaho Falls, ID (US)

(73) Assignee: The NanoSteel Company, Inc., Providence, RI (US)

( * ) Notice: Subject to any disclaimer, the term of this patent is extended or adjusted under 35 U.S.C. 154(b) by 272 days.

This patent is subject to a terminal disclaimer.

(21) Appl. No.: 15/438,313

(22) Filed: Feb. 21, 2017

(65) Prior Publication Data

US 2017/0166988 A1    Jun. 15, 2017

Related U.S. Application Data

(63) Continuation-in-part of application No. 15/094,554, filed on Apr. 8, 2016.
    (Continued)

(51) Int. Cl.
| | | |
|---|---|---|
| *C21D 9/00* | (2006.01) | |
| *C21D 8/00* | (2006.01) | |
| *C21D 6/00* | (2006.01) | |
| *B22D 11/00* | (2006.01) | |
| *C22C 38/58* | (2006.01) | |
| *C22C 38/54* | (2006.01) | |
| *C22C 38/42* | (2006.01) | |
| *C22C 38/34* | (2006.01) | |
| *C22C 38/04* | (2006.01) | |
| *C22C 38/02* | (2006.01) | |
| *B23H 7/00* | (2006.01) | |
| *B23K 26/38* | (2014.01) | |

(Continued)

(52) U.S. Cl.
CPC ........... *C21D 9/0068* (2013.01); *B21D 28/26* (2013.01); *B22D 11/002* (2013.01); *B23H 7/00* (2013.01); *B23K 26/38* (2013.01); *B26F 3/004* (2013.01); *C21D 6/004* (2013.01); *C21D 6/005* (2013.01); *C21D 6/008* (2013.01); *C21D 8/005* (2013.01); *C21D 8/021* (2013.01); *C21D 8/0205* (2013.01); *C21D 8/0263* (2013.01); *C21D 8/0273* (2013.01); *C21D 9/0081* (2013.01); *C22C 38/002* (2013.01); *C22C 38/02* (2013.01); *C22C 38/04* (2013.01); *C22C 38/08* (2013.01); *C22C 38/16* (2013.01); *C22C 38/20* (2013.01); *C22C 38/32* (2013.01); *C22C 38/34* (2013.01); *C22C 38/38* (2013.01); *C22C 38/42* (2013.01); *C22C 38/54* (2013.01); *C22C 38/58* (2013.01); *B21D 28/00* (2013.01); *B23K 2101/006* (2018.08); *B23K 2103/05* (2018.08); *C21D 8/0226* (2013.01); *C21D 8/0236* (2013.01); *C21D 2201/03* (2013.01); *C21D 2261/00* (2013.01)

(58) Field of Classification Search
CPC .... C21D 8/0263; C21D 8/0236; C21D 8/021; C21D 8/0205; C21D 9/0081; C21D 8/0226; C22C 38/002; C22C 38/38; C22C 38/32; C22C 38/20; C22C 38/16; C22C 38/08; C22C 38/58; C22C 38/54; C22C 38/02; C22C 38/04; C22C 38/42; B21D 28/00
See application file for complete search history.

(56) References Cited

U.S. PATENT DOCUMENTS

| | | |
|---|---|---|
| 4,322,256 A | 3/1982 | Henning |
| 4,415,376 A | 11/1983 | Bramfitt et al. |

(Continued)

FOREIGN PATENT DOCUMENTS

| | | |
|---|---|---|
| EP | 1412548 | 10/2005 |
| WO | 2013018564 | 2/2013 |
| WO | 2013167572 | 11/2013 |

OTHER PUBLICATIONS

Narayanasanny et al., "Effect of mechanical and fractographic properties on hole expandability of various automobile steels during hole expansion test," Int J Adv Manuf Technol (2010) 47:365-380 (Year: 2010).*

(Continued)

*Primary Examiner* — Anthony J Zimmer
(74) *Attorney, Agent, or Firm* — Grossman, Tucker, Perreault & Pfleger, PLLC

(57) ABSTRACT

This disclosure is directed at methods for mechanical property improvement in a metallic alloy that has undergone one or more mechanical property losses as a consequence of forming an edge, such as in the formation of an internal hole or an external edge. Methods are disclosed that provide the ability to improve mechanical properties of metallic alloys that have been formed with one or more edges placed in the metallic alloy by a variety of methods which may otherwise serve as a limiting factor for industrial applications.

13 Claims, 88 Drawing Sheets

Related U.S. Application Data

(60) Provisional application No. 62/257,070, filed on Nov. 18, 2015, provisional application No. 62/146,048, filed on Apr. 10, 2015.

(51) Int. Cl.
*B21D 28/26* (2006.01)
*B26F 3/00* (2006.01)
*C21D 8/02* (2006.01)
*C22C 38/00* (2006.01)
*C22C 38/08* (2006.01)
*C22C 38/16* (2006.01)
*C22C 38/20* (2006.01)
*C22C 38/32* (2006.01)
*C22C 38/38* (2006.01)
*B23K 101/00* (2006.01)
*B23K 103/04* (2006.01)
*B21D 28/00* (2006.01)

(56) References Cited

U.S. PATENT DOCUMENTS

| | | | |
|---|---|---|---|
| 2008/0000555 A1* | 1/2008 | Nonaka | B21B 3/02 |
| | | | 148/328 |
| 2013/0136950 A1 | 5/2013 | Sun | |
| 2014/0190594 A1 | 7/2014 | Branagan et al. | |
| 2014/0230970 A1 | 8/2014 | Perlade et al. | |
| 2016/0303635 A1 | 10/2016 | Branagan et al. | |

OTHER PUBLICATIONS

International Search Report dated Jul. 29, 2016 issued in related International Patent Application No. PCT/US2016/026740.
Billur, E., and Altan, T., #634, "Challenges in Forming Advanced High Strength Steels (AHSS)," Proceedings of the Int. Conference on Developments in Sheet Metal Forming, Stuttgart, Germany. p. 285-304. (May 2-4, 2010). https://ercnsm.osu.edu/stamping-and-sheet-metal-forming/forming-ahss-and-stainless-steels.
Billur, E., and Altan, T., #664-1, "Three Generations of Advanced High-Strength Steels for Automotive Applications, Part I", Stamping Journal, Nov./Dec. 2013, p. 16-17. https://ercnsm.osu.edu/stamping-and-sheet-metal-forming/forming-ahss-and-stainless-steels.
Billur, E., Dykeman, J., and Altan, T., #664-2, "Three Generations of Advanced High-Strength Steels for Automotive Applications", Part II, Stamping Journal, Jan./Feb. 2014, p. 12-13. https://ercnsm.osu.edu/stamping-and-sheet-metal-forming/forming-ahss-and-stainless-steels.
Billur, E., and Altan, T., #664-3, "Three Generations of Advanced High-Strength Steels for Automotive Applications", Part III, Stamping Journal, Mar./Apr. 2014. https://ercnsm.osu.edu/stamping-and-sheet-metal-forming/forming-ahss-and-stainless-steels.
American Iron and Steel Institute, Profile 2013, 2013, 40 pages, Washington, DC.
E.Billur, M.S., et al., Challenges in Forming Advanced High Strength Steels, 2012, Proceedings of New Developments in Sheet Metal Forming, pp. 285-304.
International Search Report and Written Opinion, dated Apr. 9, 2018, Issued in PCT Patent Application No. PCT/US18/18751, 11 pages.
Taylor, M.D., Effect of Microstructure on the fracture response of advanced high strength steels, 2016, 13 pages.

* cited by examiner

EDGE FORMABILITY IN METALLIC ALLOYS

CROSS-REFERENCE TO RELATED APPLICATIONS

This application is a continuation-in-part of U.S. patent application Ser. No. 15/094,554 filed Apr. 8, 2016, which claims the benefit of U.S. Provisional Patent Application Ser. No. 62/146,048 filed on Apr. 10, 2015 and U.S. Provisional Patent Application Ser. No. 62/257,070 filed on Nov. 18, 2015, which is fully incorporated herein by reference.

FIELD OF INVENTION

This disclosure relates to methods for mechanical property improvement in a metallic alloy that has undergone one or more mechanical property losses as a consequence of shearing, such as in the formation of a sheared edge portion or a punched hole. More specifically, methods are disclosed that provide the ability to improve mechanical properties of metallic alloys that have been formed with one or more sheared edges which may otherwise serve as a limiting factor for industrial applications.

BACKGROUND

From ancient tools to modern skyscrapers and automobiles, steel has driven human innovation for hundreds of years. Abundant in the Earth's crust, iron and its associated alloys have provided humanity with solutions to many daunting developmental barriers. From humble beginnings, steel development has progressed considerably within the past two centuries, with new varieties of steel becoming available every few years. These steel alloys can be broken up into three classes based upon measured properties, in particular maximum tensile strain and tensile stress prior to failure. These three classes are: Low Strength Steels (LSS), High Strength Steels (HSS), and Advanced High Strength Steels (AHSS). Low Strength Steels (LSS) are generally classified as exhibiting ultimate tensile strengths less than 270 MPa and include such types as interstitial free and mild steels. High-Strength Steels (HSS) are classified as exhibiting ultimate tensile strengths from 270 to 700 MPa and include such types as high strength low alloy, high strength interstitial free and bake hardenable steels. Advanced High-Strength Steels (AHSS) steels are classified by ultimate tensile strengths greater than 700 MPa and include such types as Martensitic steels (MS), Dual Phase (DP) steels, Transformation Induced Plasticity (TRIP) steels, and Complex Phase (CP) steels. As the strength level increases the trend in maximum tensile elongation (ductility) of the steel is negative, with decreasing elongation at high ultimate tensile strengths. For example, tensile elongation of LSS, HSS and AHSS ranges from 25% to 55%, 10% to 45%, and 4% to 30%, respectively.

Production of steel continues to increase, with a current US production around 100 million tons per year with an estimated value of $75 billion. Steel utilization in vehicles is also high, with advanced high strength steels (AHSS) currently at 17% and forecast to grow by 300% in the coming years [American Iron and Steel Institute. (2013). Profile 2013. Washington, D.C.]. With current market trends and governmental regulations pushing towards higher efficiency in vehicles, AHSS are increasingly being pursued for their ability to provide high strength to mass ratio. The high strength of AHSS allows for a designer to reduce the thickness of a finished part while still maintaining comparable or improved mechanical properties. In reducing the thickness of a part, less mass is needed to attain the same or better mechanical properties for the vehicle thereby improving vehicle fuel efficiency. This allows the designer to improve the fuel efficiency of a vehicle while not compromising on safety.

One key attribute for next generation steels is formability. Formability is the ability of a material to be made into a particular geometry without cracking, rupturing or otherwise undergoing failure. High formability steel provides benefit to a part designer by allowing for the creation of more complex part geometries allowing for reduction in weight. Formability may be further broken into two distinct forms: edge formability and bulk formability. Edge formability is the ability for an edge to be formed into a certain shape. Edges on materials are created through a variety of methods in industrial processes, including but not limited to punching, shearing, piercing, stamping, perforating, cutting, or cropping. Furthermore, the devices used to create these edges are as diverse as the methods, including but not limited to various types of mechanical presses, hydraulic presses, and/or electromagnetic presses. Depending upon the application and material undergoing the operation, the range of speeds for edge creation is also widely varying, with speeds as low as 0.25 mm/s and as high as 3700 mm/s. The wide variety of edge forming methods, devices, and speeds results in a myriad of different edge conditions in use commercially today.

Edges, being free surfaces, are dominated by defects such as cracks or structural changes in the sheet resulting from the creation of the sheet edge. These defects adversely affect the edge formability during forming operations, leading to a decrease in effective ductility at the edge. Bulk formability on the other hand is dominated by the intrinsic ductility, structure, and associated stress state of the metal during the forming operation. Bulk formability is affected primarily by available deformation mechanisms such as dislocations, twinning, and phase transformations. Bulk formability is maximized when these available deformation mechanisms are saturated within the material, with improved bulk formability resulting from an increased number and availability of these mechanisms.

Edge formability can be measured through hole expansion measurements, whereby a hole is made in a sheet and that hole is expanded by means of a conical punch. Previous studies have shown that conventional AHSS materials suffer from reduced edge formability compared with other LSS and HSS when measured by hole expansion [M. S. Billur, T. Altan, "Challenges in forming advanced high strength steels", Proceedings of New Developments in Sheet Metal Forming, pp. 285-304, 2012]. For example, Dual Phase (DP) steels with ultimate tensile strength of 780 MPa achieve less than 20% hole expansion, whereas Interstitial Free steels (IF) with ultimate tensile strength of approximately 400 MPa achieve around 100% hole expansion ratio. This reduced edge formability complicates adoption of AHSS in automotive applications, despite possessing desirable bulk formability.

SUMMARY

A method for improving one or more mechanical properties in a metallic alloy that has undergone a mechanical property loss as a consequence of the formation of one or more sheared edges comprising:

a. supplying a metal alloy comprising at least 50 atomic % iron and at least four or more elements selected from Si, Mn, B, Cr, Ni, Cu or C and melting said alloy and cooling at a rate of ≤250 K/s or solidifying to a thickness of ≥2.0 mm up to 500 mm and forming an alloy having a $T_m$ and matrix grains of 2 μm to 10,000 μm;
b. heating said alloy to a temperature of ≥700° C. and below the $T_m$ of said alloy and at a strain rate of $10^{-6}$ to $10^4$ and reducing said thickness of said alloy and providing a first resulting alloy having an ultimate tensile strength of 921 MPa to 1413 MPa;
c. stressing said first resulting alloy and providing a second resulting alloy having an ultimate tensile strength of 1356 MPa to 1831 MPa and an elongation of 1.6% to 32.8%;
d. heating said second resulting alloy to a temperature below $T_m$ and forming a third resulting alloy having matrix grains of 0.5 μm to 50 μm and having an elongation ($E_1$);
e. shearing said alloy and forming one or more sheared edges wherein said alloy's elongation is reduced to a value of $E_2$ wherein $E_2=(0.57$ to $0.05)$ $(E_1)$
f. reheating said alloy with said one or more sheared edges wherein said alloy's reduced elongation observed in step (d) is restored to a level having an elongation $E_3=(0.48$ to $1.21)(E_1)$.

The present disclosure also relates to a method for improving the hole expansion ratio in a metallic alloy that had undergone a hole expansion ratio loss as a consequence of forming a hole with a sheared edge comprising:
a. supplying a metal alloy comprising at least 50 atomic % iron and at least four or more elements selected from Si, Mn, B, Cr, Ni, Cu or C and melting said alloy and cooling at a rate of ≤250 K/s or solidifying to a thickness of ≥2.0 mm up to 500 mm and forming an alloy having a $T_m$ and matrix grains of 2 μm to 10,000 μm;
b. heating said alloy to a temperature of 700° C. and below the $T_m$ of said alloy and at a strain rate of $10^{-6}$ to $10^4$ and reducing said thickness of said alloy and providing a first resulting alloy having an ultimate tensile strength of 921 MPa to 1413 MPa and an elongation of 12.0% to 77.7%;
c. stressing said first resulting alloy and providing a second resulting alloy having an ultimate tensile strength of 1356 MPa to 1831 MPa and an elongation of 1.6% to 32.8%;
d. heating said second resulting alloy to a temperature of at least 650° C. and below Tm and forming a third resulting alloy having matrix grains of 0.5 μm to 50 μm and forming a hole therein with shearing wherein said hole has a sheared edge and has a first hole expansion ratio ($HER_1$);
e. heating said alloy with said hole and associated $HER_1$ wherein said alloy indicates a second hole expansion ratio ($HER_2$) wherein $HER_2 \geq HER_1$.

The present invention also relates to method for improving the hole expansion ratio in a metallic alloy that had undergone a hole expansion ratio loss as a consequence of forming a hole with a sheared edge comprising:
a. supplying a metal alloy comprising at least 50 atomic % iron and at least four or more elements selected from Si, Mn, B, Cr, Ni, Cu or C and melting said alloy and cooling at a rate of ≤250 K/s or solidifying to a thickness of ≥2.0 mm up to 500 mm and forming an alloy having a Tm and matrix grains of 2 μm to 10,000 μm;
b. heating said alloy to a temperature of ≥700° C. and below the Tm of said alloy and at a strain rate of $10^{-6}$ to $10^4$ and reducing said thickness of said alloy and providing a first resulting alloy having an ultimate tensile strength of 921 MPa to 1413 MPa and an elongation of 12.0% to 77.7%;
c. stressing said first resulting alloy and providing a second resulting alloy having an ultimate tensile strength of 1356 MPa to 1831 MPa and an elongation of 1.6% to 32.8%;
d. heating said second resulting alloy to a temperature of at least 650° C. and below Tm and forming a third resulting alloy having matrix grains of 0.5 μm to 50 μm wherein said alloy is characterized as having a first hole expansion ratio ($HER_1$) of 30 to-130% for a hole formed therein without shearing;
e. forming a hole in said second resulting alloy wherein said hole is formed with shearing and indicates a second hole expansion ratio ($HER_2$) wherein $HER_2=(0.01$ to $0.30)(HER_1)$;
f. heating said alloy wherein $HER_2$ recovers to a value $HER_3=(0.60$ to $1.0)$ $HER_1$.

The present invention also relates to a method for punching one or more holes in a metallic alloy comprising:
a. supplying a metal alloy comprising at least 50 atomic % iron and at least four or more elements selected from Si, Mn, B, Cr, Ni, Cu or C and melting said alloy and cooling at a rate of ≤250 K/s or solidifying to a thickness of ≥2.0 mm up to 500 mm and forming an alloy having a Tm and matrix grains of 2 μm to 10,000 μm;
b. heating said alloy to a temperature of 700° C. and below the Tm of said alloy and at a strain rate of $10^{-6}$ to $10^4$ and reducing said thickness of said alloy and providing a first resulting alloy having an ultimate tensile strength of 921 MPa to 1413 MPa and an elongation of 12.0% to 77.7%;
c. stressing said first resulting alloy and providing a second resulting alloy having an ultimate tensile strength of 1356 MPa to 1831 MPa and an elongation of 1.6% to 32.8%;
d. heating said second resulting alloy to a temperature of at least 650° C. and below Tm and forming a third resulting alloy having matrix grains of 0.5 μm to 50 μm and having an elongation ($E_1$);
e. punching a hole in said alloy at a punch speed of greater than or equal to 10 mm/second wherein said punched hole indicates a hole expansion ratio of greater than or equal to 10%.

The present invention also relates to a method for expanding an edge in an alloy
a. supplying a metal alloy comprising at least 50 atomic % iron and at least four or more elements selected from Si, Mn, B, Cr, Ni, Cu or C and melting said alloy and cooling at a rate of ≤250 K/s or solidifying to a thickness of ≥2.0 mm up to 500 mm and forming an alloy having a Tm;
b. heating said alloy to a temperature of 700° C. and below the Tm of said alloy and at a strain rate of $10^{-6}$ to $10^4$ and reducing said thickness of said alloy and providing a first resulting alloy having an ultimate tensile strength of 921 MPa to 1413 MPa and an elongation of 12.0% to 77.7%;

c. stressing said first resulting alloy and providing a second resulting alloy having an ultimate tensile strength of 1356 MPa to 1831 MPa and an elongation of 1.6% to 32.8%;

d. heating said second resulting alloy to a temperature of below Tm and forming a third resulting alloy having an elongation of 6.6% to 86.7%;

e. forming an edge in said resulting alloy and expanding said edge at a speed of greater than or equal to 5 mm/min.

The present invention also relates to a method for expanding the edge of an alloy comprising:

supplying a metal alloy comprising at least 50 atomic % iron and at least four or more elements selected from Si, Mn, B, Cr, Ni, Cu or C, wherein said alloy has an ultimate tensile strength of 799 MPa to 1683 MPa and an elongation of 6.6 to 86.7%;

forming an edge in said alloy;

expanding said edge in said alloy at a speed of greater than or equal to 5 mm/min.

BRIEF DESCRIPTION OF THE DRAWINGS

The detailed description below may be better understood with reference to the accompanying FIG.s which are provided for illustrative purposes and are not to be considered as limiting any aspect of this invention.

DETAILED DESCRIPTION

Structures and Mechanisms

Figure 1A:
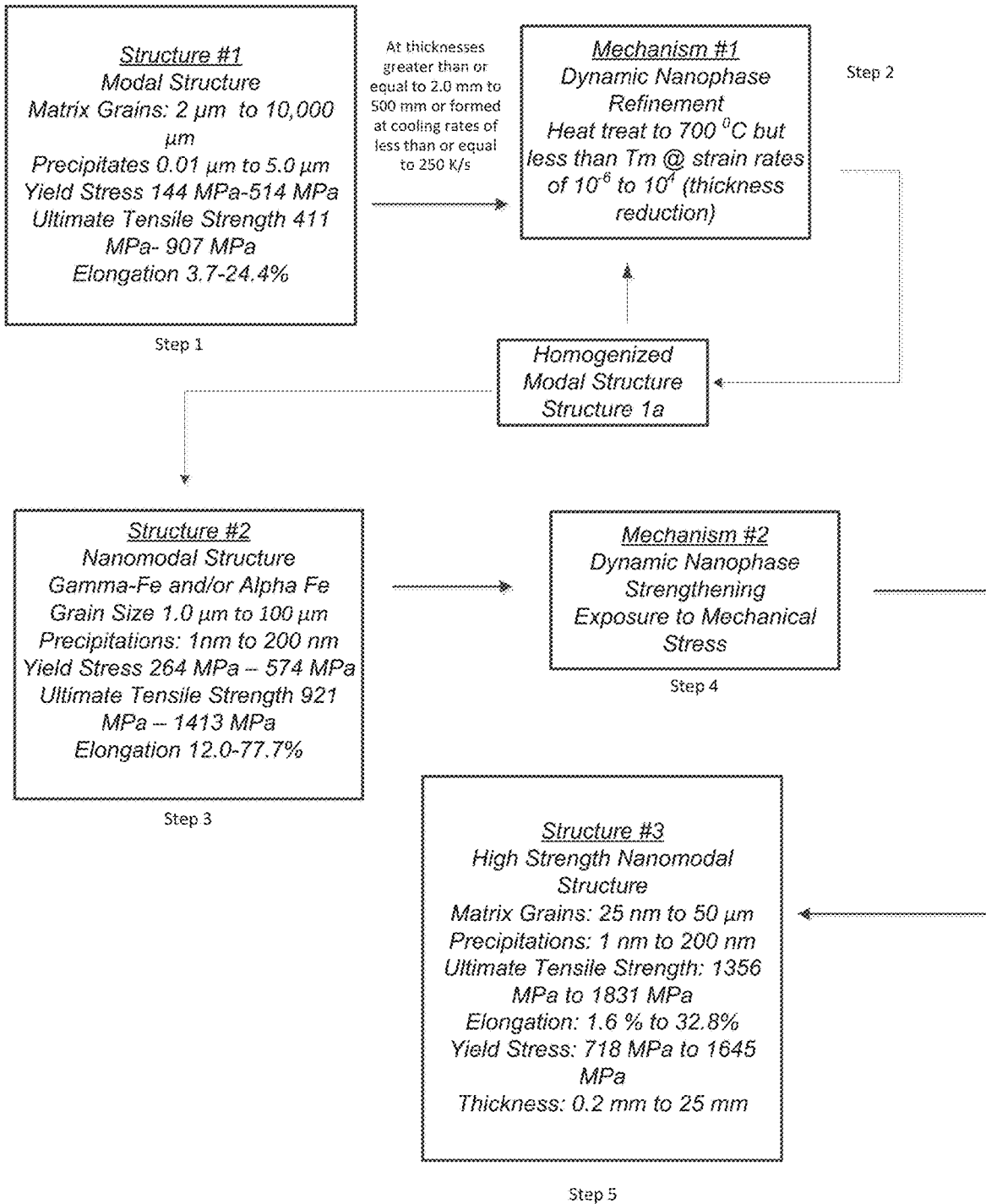
FIG. 1A Structural pathway for the formation of High Strength Nanomodal Structure and associated mechanisms.
Figure 1B:
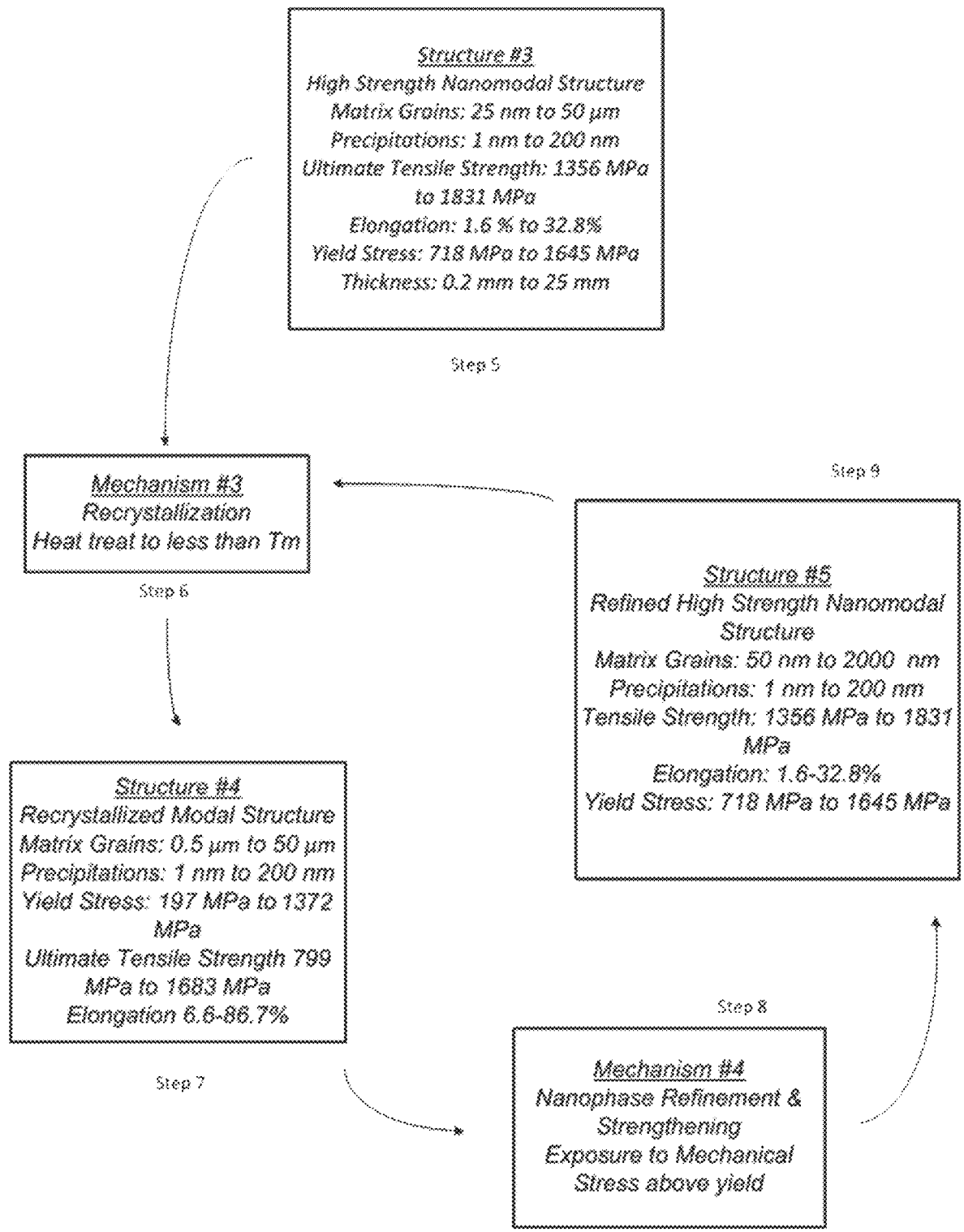
FIG. 1B Structural pathway for the formation of Recrystallized Modal Structure and Refined High Strength Nanomodal Structure and associated mechanisms.

The steel alloys herein undergo a unique pathway of structural formation through specific mechanisms as illustrated in FIG. 1A and FIG. 1B. Initial structure formation begins with melting the alloy and cooling and solidifying and forming an alloy with Modal Structure (Structure #1, FIG. 1A). The Modal Structure exhibits a primarily austenitic matrix (gamma-Fe) which may contain, depending on the specific alloy chemistry, ferrite grains (alpha-Fe), martensite, and precipitates including borides (if boron is present) and/or carbides (if carbon is present). The grain size of the Modal Structure will depend on alloy chemistry and the solidification conditions. For example, thicker as-cast structures (e.g. thickness of greater than or equal to 2.0 mm) result in relatively slower cooling rate (e.g. a cooling rate of less than or equal to 250 K/s) and relatively larger matrix grain size. Thickness may therefore preferably be in the range of 2.0 to 500 mm. The Modal Structure preferably exhibits an austenitic matrix (gamma-Fe) with grain size and/or dendrite length from 2 to 10,000 μm and precipitates at a size of 0.01 to 5.0 μm in laboratory casting. Matrix grain size and precipitate size might be larger, up to a factor of 10 at commercial production depending on alloy chemistry, starting casting thickness and specific processing parameters. Steel alloys herein with the Modal Structure, depending on starting thickness size and the specific alloy chemistry typically exhibits the following tensile properties, yield strength from 144 to 514 MPa, ultimate tensile strength in a range from 411 to 907 MPa, and total ductility from 3.7 to 24.4%.

Steel alloys herein with the Modal Structure (Structure #1, FIG. 1A) can be homogenized and refined through the Nanophase Refinement (Mechanism #1, FIG. 1A) by exposing the steel alloy to one or more cycles of heat and stress ultimately leading to formation of the Nanomodal Structure (Structure #2, FIG. 1A). More specifically, the Modal Structure, when formed at thickness of greater than or equal to 2.0 mm, or formed at a cooling rate of less than or equal to 250 K/s, is preferably heated to a temperature of 700° C. to a temperature below the solidus temperature ($T_m$) and at strain rates of $10^{-6}$ to $10^4$ with a thickness reduction. Transformation to Structure #2 occurs in a continuous fashion through the intermediate Homogenized Modal Structure (Structure #1a, FIG. 1A) as the steel alloy undergoes mechanical deformation during successive application of temperature and stress and thickness reduction such as what can be configured to occur during hot rolling.

The Nanomodal Structure (Structure #2, FIG. 1A) has a primary austenitic matrix (gamma-Fe) and, depending on chemistry, may additionally contain ferrite grains (alpha-Fe) and/or precipitates such as borides (if boron is present) and/or carbides (if carbon is present). Depending on starting grain size, the Nanomodal Structure typically exhibits a primary austenitic matrix (gamma-Fe) with grain size of 1.0 to 100 μm and/or precipitates at a size 1.0 to 200 nm in laboratory casting. Matrix grain size and precipitate size might be larger up to a factor of 5 at commercial production depending on alloy chemistry, starting casting thickness and specific processing parameters. Steel alloys herein with the Nanomodal Structure typically exhibit the following tensile properties, yield strength from 264 to 574 MPa, ultimate tensile strength in a range from 921 to 1413 MPa, and total ductility from 12.0 to 77.7%. Structure #2 is preferably formed at thickness of 1 mm to 500 mm.

When steel alloys herein with the Nanomodal Structure (Structure #2, FIG. 1A) are subjected to stress at ambient/near ambient temperature (e.g. 25° C. at +/−5° C.), the Dynamic Nanophase Strengthening Mechanism (Mechanism #2, FIG. 1A) is activated leading to formation of the High Strength Nanomodal Structure (Structure #3, FIG. 1A). Preferably, the stress is at a level above the alloy's respective yield strength in a range from 250 to 600 MPa depending on alloy chemistry. The High Strength Nanomodal structure typically exhibits a ferritic matrix (alpha-Fe) which, depending on alloy chemistry, may additionally contain austenite grains (gamma-Fe) and precipitate grains which may include borides (if boron is present) and/or carbides (if carbon is present). Note that the strengthening transformation occurs during strain under applied stress that defines Mechanism #2 as a dynamic process during which the metastable austenitic phase (gamma-Fe) transforms into ferrite (alpha-Fe) with precipitates. Note that depending on the starting chemistry, a fraction of the austenite will be stable and will not transform. Typically, as low as 5 volume percent and as high as 95 volume percent of the matrix will transform. The High Strength Nanomodal Structure typically exhibits a ferritic matrix (alpha-Fe) with matrix grain size of 25 nm to 50 μm and precipitate grains at a size of 1.0 to 200 nm in laboratory casting. Matrix grain size and precipitate size might be larger up to a factor of 2 at commercial production depending on alloy chemistry, starting casting thickness and specific processing parameters. Steel alloys herein with the High Strength Nanomodal Structure typically exhibits the following tensile properties, yield strength from 718 to 1645 MPa, ultimate tensile strength in a range from 1356 to 1831 MPa, and total ductility from 1.6 to 32.8%. Structure #3 is preferably formed at thickness of 0.2 to 25.0 mm.

The High Strength Nanomodal Structure (Structure #3, FIG. 1A and FIG. 1B) has a capability to undergo Recrystallization (Mechanism #3, FIG. 1B) when subjected to heating below the melting point of the alloy with transformation of ferrite grains back into austenite leading to formation of Recrystallized Modal Structure (Structure #4, FIG. 1B). Partial dissolution of nanoscale precipitates also takes place. Presence of borides and/or carbides is possible in the material depending on alloy chemistry. Preferred temperature ranges for a complete transformation occur from 650° C. up to the $T_m$ of the specific alloy. When recrystallized, the Structure #4 contains few dislocations or twins and stacking faults can be found in some recrystallized grains. Note that at lower temperatures from 400 to 650° C., recovery mechanisms may occur. The Recrystallized Modal Structure (Structure #4, FIG. 1B) typically exhibits a primary austenitic matrix (gamma-Fe) with grain size of 0.5 to 50 μm and precipitate grains at a size of 1.0 to 200 nm in laboratory casting. Matrix grain size and precipitate size might be larger up to a factor of 2 at commercial production depending on alloy chemistry, starting casting thickness and specific processing parameters. Steel alloys herein with the Recrystallized Modal Structure typically exhibit the following tensile properties: yield strength from 197 to 1372 MPa, ultimate tensile strength in a range from 799 to 1683 MPa, and total ductility from 10.6 to 86.7%.

Steel alloys herein with the Recrystallized Modal Structure (Structure #4, FIG. 1B) undergo Nanophase Refinement & Strengthening (Mechanism #4, FIG. 1B) upon stressing above yield at ambient/near ambient temperature (e.g. 25° C.+/−5° C.) that leads to formation of the Refined High Strength Nanomodal Structure (Structure #5, FIG. 1B). Preferably the stress to initiate Mechanism #4 is at a level above yield strength in a range 197 to 1372 MPa. Similar to Mechanism #2, Nanophase Refinement & Strengthening (Mechanism #4, FIG. 1B) is a dynamic process during which the metastable austenitic phase transforms into ferrite with precipitate resulting generally in further grain refinement as compared to Structure #3 for the same alloy. One characteristic feature of the Refined High Strength Nanomodal Structure (Structure #5, FIG. 1B) is that significant refinement occurs during phase transformation in the randomly distributed "pockets" of microstructure while other areas remain untransformed. Note that depending on the starting chemistry, a fraction of the austenite will be stable and the area containing the stabilized austenite will not transform. Typically, as low as 5 volume percent and as high as 95 volume percent of the matrix in the distributed "pockets" will transform. The presence of borides (if boron is present) and/or carbides (if carbon is present) is possible in the material depending on alloy chemistry. The untransformed part of the microstructure is represented by austenitic grains (gamma-Fe) with a size from 0.5 to 50 µm and additionally may contain distributed precipitates with size of 1 to 200 nm. These highly deformed austenitic grains contain a relatively large number of dislocations due to existing dislocation processes occurring during deformation resulting in high fraction of dislocations ($10^8$ to $10^{10}$ mm$^{-2}$). The transformed part of the microstructure during deformation is represented by refined ferrite grains (alpha-Fe) with additional precipitate through Nanophase Refinement & Strengthening (Mechanism #4, FIG. 1B). The size of refined grains of ferrite (alpha-Fe) varies from 50 to 2000 nm and size of precipitates is in a range from 1 to 200 nm in laboratory casting. Matrix grain size and precipitate size might be larger up to a factor of 2 at commercial production depending on alloy chemistry, starting casting thickness and specific processing parameters. The size of the "pockets" of transformed and highly refined microstructure typically varies from 0.5 to 20 µm. The volume fraction of the transformed vs untransformed areas in the microstructure can be varied by changing the alloy chemistry including austenite stability from typically a 95:5 ratio to 5:95, respectively. Steel alloys herein with the Refined High Strength Nanomodal Structure typically exhibit the following tensile properties: yield strength from 718 to 1645 MPa, ultimate tensile strength in a range from 1356 to 1831 MPa, and total ductility from 1.6 to 32.8%.

Steel alloys herein with the Refined High Strength Nanomodal Structure (Structure #5, FIG. 1B) may then be exposed to elevated temperatures leading back to formation of a Recrystallized Modal Structure (Structure #4, FIG. 1B). Typical temperature ranges for a complete transformation occur from 650° C. up to the $T_m$ of the specific alloy (as illustrated in FIG. 1B) while lower temperatures from 400° C. to temperatures less than 650° C., activate recovery mechanisms and may cause partial recrystallization. Stressing and heating may be repeated multiple times to achieve desired product geometry including but not limited to relatively thin gauges of the sheet, relatively small diameter of the tube or rod, complex shape of final part, etc. with targeted properties. Final thicknesses of the material may therefore fall in the range from 0.2 to 25 mm. Note that cubic precipitates may be present in the steel alloys herein at all stages with a Fm3m (#225) space group. Additional nanoscale precipitates may be formed as a result of deformation through Dynamic Nanophase Strengthening Mechanism (Mechanism #2) and/or Nanophase Refinement & Strengthening (Mechanism #4) that are represented by a dihexagonal pyramidal class hexagonal phase with a $P6_{3mc}$ space group (#186) and/or a ditrigonal dipyramidal class with a hexagonal P6bar2C space group (#190). The precipitate nature and volume fraction depends on the alloy composition and processing history. The size of nanoprecipitates can range from 1 nm to tens of nanometers, but in most cases below 20 nm. Volume fraction of precipitates is generally less than 20%.

Mechanisms During Sheet Production Through Slab Casting

Figure 2:
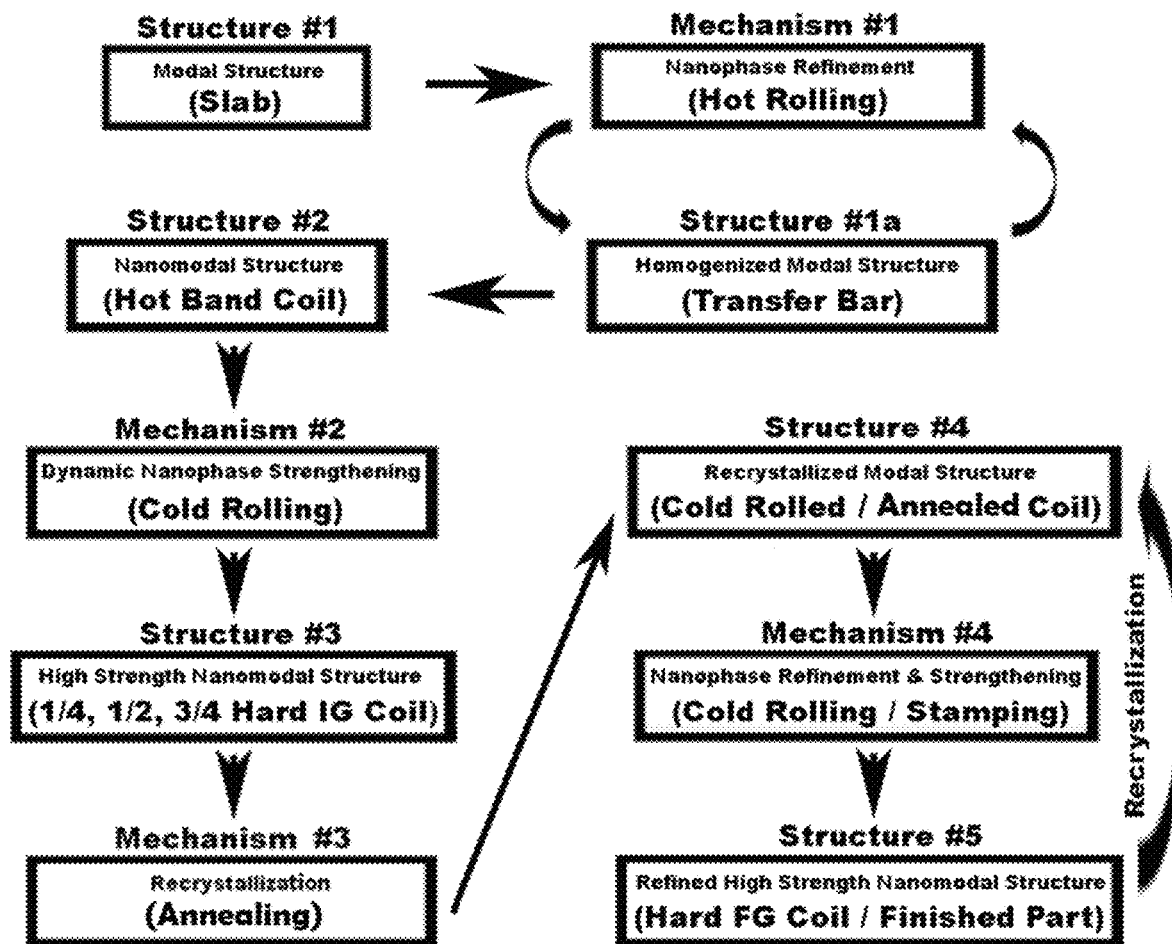
FIG. 2 Structural pathway toward developing Refined High Strength Nanomodal Structure which is tied to industrial processing steps.

The structures and enabling mechanisms for the steel alloys herein are applicable to commercial production using existing process flows. See FIG. 2. Steel slabs are commonly produced by continuous casting with a multitude of subsequent processing variations to get to the final product form which is commonly coils of sheet. A detailed structural evolution in steel alloys herein from casting to final product with respect to each step of slab processing into sheet product is illustrated in FIG. 2.

The formation of Modal Structure (Structure #1) in steel alloys herein occurs during alloy solidification. The Modal Structure may be preferably formed by heating the alloys herein at temperatures in the range of above their melting point and in a range of 1100° C. to 2000° C. and cooling below the melting temperature of the alloy, which corresponds to preferably cooling in the range of $1\times10^3$ to $1\times10^{-3}$ K/s. The as-cast thickness will be dependent on the production method with Thin Slab Casting typically in the range of 20 to 150 mm in thickness and Thick Slab Casting typically in the range of 150 to 500 mm in thickness. Accordingly, as cast thickness may fall in the range of 20 to 500 mm, and at all values therein, in 1 mm increments. Accordingly, as cast thickness may be 21 mm, 22 mm, 23 mm, etc., up to 500 mm.

Hot rolling of solidified slabs from the alloys is the next processing step with production either of transfer bars in the case of Thick Slab Casting or coils in the case of Thin Slab Casting. During this process, the Modal Structure transforms in a continuous fashion into a partial and then fully Homogenized Modal Structure (Structure #1a) through Nanophase Refinement (Mechanism #1). Once homogenization and resulting refinement is completed, the Nanomodal Structure (Structure #2) forms. The resulting hot band coils which are a product of the hot rolling process is typically in the range of 1 to 20 mm in thickness.

Cold rolling is a widely used method for sheet production that is utilized to achieve targeted thickness for particular applications. For AHSS, thinner gauges are usually targeted in the range of 0.4 to 2 mm. To achieve the finer gauge thicknesses, cold rolling can be applied through multiple passes with or without intermediate annealing between passes. Typical reduction per pass is 5 to 70% depending on the material properties and equipment capability. The number of passes before the intermediate annealing also depends on materials properties and level of strain hardening during cold deformation. For the steel alloys herein, the cold rolling will trigger Dynamic Nanophase Strengthening (Mechanism #2) leading to extensive strain hardening of the resultant sheet and to the formation of the High Strength Nanomodal Structure (Structure #3). The properties of the cold rolled sheet from alloys herein will depend on the alloy chemistry and can be controlled by the cold rolling reduction to yield a fully cold rolled (i.e. hard) product or can be done to yield a range of properties (i.e. ¼, ½, ¾ hard etc.). Depending on the specific process flow, especially starting thickness and the amount of hot rolling gauge reduction, often annealing is needed to recover the ductility of the material to allow for additional cold rolling gauge reduction. Intermediate coils can be annealed by utilizing conventional methods such as batch annealing or continuous annealing lines. The cold deformed High Strength Nanomodal Structure (Structure #3) for the steel alloys herein will undergo Recrystallization (Mechanism #3) during annealing leading to the formation of the Recrystallized Modal Structure (Structure #4). At this stage, the recrystallized coils can be a final product with advanced property combination depending on the alloy chemistry and targeted markets. In a case when even thinner gauges of the sheet are required, recrystallized coils can be subjected to further cold rolling to achieve targeted thickness that can be realized by one or multiple cycles of cold rolling/annealing. Additional cold deformation of the sheet from alloys herein with Recrystallized Modal Structure (Structure #4) leads to structural transformation into Refined High Strength Nanomodal Structure (Structure #5) through Nanophase Refinement and Strengthening (Mechanism #4). As a result, fully hard coils with final gauge and Refined High Strength Nanomodal Structure (Structure #5) can be formed or, in the case of annealing as a last step in the cycle, coils of the sheet with final gauge and Recrystallized Modal Structure (Structure #4) can also be produced. When coils of recrystallized sheet from alloys herein utilized for finished part production by any type of cold deformation such as cold stamping, hydroforming, roll forming etc., Refined High Strength Nanomodal Structure (Structure #5) will be present in the final product/parts. The final products may be in many different forms including sheet, plate, strips, pipes, and tubes and a myriad of complex parts made through various metalworking processes.

Mechanisms for Edge Formability

The cyclic nature of these phase transformations going from Recrystallized Modal Structure (Structure #4) to Refined High Strength Nanomodal Structure (Structure #5) and then back to Recrystallized Modal Structure (Structure #4) is one of the unique phenomenon and features of steel alloys herein. As described earlier, this cyclic feature is applicable during commercial manufacturing of the sheet, especially for AHSS where thinner gauge thicknesses are required (e.g. thickness in the range of 0.2 to 25 mm). Furthermore, these reversibility mechanisms are applicable for the widespread industrial usage of the steel alloys herein. While exhibiting exceptional combinations of bulk sheet formability as is demonstrated by the tensile and bend properties in this application for the steel alloys herein, the unique cycle feature of the phase transformations is enabling for edge formability, which can be a significant limiting factor for other AHSS. Table 1 below provides a summary of the structure and performance features through stressing and heating cycles available through Nanophase Refinement and Strengthening (Mechanism #4). How these structures and mechanisms can be harnessed to produce exceptional combinations of both bulk sheet and edge formability will be subsequently described herein.

TABLE 1

Structures and Performance Through Stressing/Heating Cycles

| | Mechanism | | |
|---|---|---|---|
| | | Structure #5 Refined High Strength Nanomodal Structure | |
| Property | Structure #4 Recrystallized Modal Structure | Untransformed | Transformed "pockets" |
| Structure Formation | Recrystallization occurring at elevated temperatures in cold worked material | Retained austenitic grains | Nanophase Refinement & Strengthening mechanism occurring through application of mechanical stress in distributed microstructural "pockets" |
| Transformations | Recrystallization of cold deformed iron matrix | Precipitation optional | Stress induced austenite transformation into ferrite and precipitates |
| Enabling Phases | Austenite, optionally ferrite, precipitates | Austenite, optionally precipitates | Ferrite, optionally austenite, precipitates |
| Matrix Grain Size | 0.5 to 50 μm | 0.5 to 50 μm | 50 to 2000 nm |
| Precipitate Size | 1 to 200 nm | 1 to 200 nm | 1 to 200 nm |
| Tensile Response | Actual with properties achieved based on formation of the structure and fraction of transformation | Actual with properties achieved based on formation of the structure and fraction of transformation | |
| Yield Strength | 197 to 1372 MPa | 718 to 1645 MPa | |
| Ultimate Tensile Strength | 799 to 1683 MPa | 1356 to 1831 MPa | |
| Total Elongation | 6.6 to 86.7% | 1.6 to 32.8% | |

Main Body

The chemical composition of the alloys herein is shown in Table 2 which provides the preferred atomic ratios utilized.

TABLE 2

Alloy Chemical Composition

| Alloy | Fe | Cr | Ni | Mn | Cu | B | Si | C |
|---|---|---|---|---|---|---|---|---|
| Alloy 1 | 75.75 | 2.63 | 1.19 | 13.86 | 0.65 | 0.00 | 5.13 | 0.79 |
| Alloy 2 | 73.99 | 2.63 | 1.19 | 13.18 | 1.55 | 1.54 | 5.13 | 0.79 |
| Alloy 3 | 77.03 | 2.63 | 3.79 | 9.98 | 0.65 | 0.00 | 5.13 | 0.79 |
| Alloy 4 | 78.03 | 2.63 | 5.79 | 6.98 | 0.65 | 0.00 | 5.13 | 0.79 |
| Alloy 5 | 79.03 | 2.63 | 7.79 | 3.98 | 0.65 | 0.00 | 5.13 | 0.79 |
| Alloy 6 | 78.53 | 2.63 | 3.79 | 8.48 | 0.65 | 0.00 | 5.13 | 0.79 |
| Alloy 7 | 79.53 | 2.63 | 5.79 | 5.48 | 0.65 | 0.00 | 5.13 | 0.79 |
| Alloy 8 | 80.53 | 2.63 | 7.79 | 2.48 | 0.65 | 0.00 | 5.13 | 0.79 |
| Alloy 9 | 74.75 | 2.63 | 1.19 | 14.86 | 0.65 | 0.00 | 5.13 | 0.79 |
| Alloy 10 | 75.25 | 2.63 | 1.69 | 13.86 | 0.65 | 0.00 | 5.13 | 0.79 |
| Alloy 11 | 74.25 | 2.63 | 1.69 | 14.86 | 0.65 | 0.00 | 5.13 | 0.79 |
| Alloy 12 | 73.75 | 2.63 | 1.19 | 15.86 | 0.65 | 0.00 | 5.13 | 0.79 |
| Alloy 13 | 77.75 | 2.63 | 1.19 | 11.86 | 0.65 | 0.00 | 5.13 | 0.79 |
| Alloy 14 | 74.75 | 2.63 | 2.19 | 13.86 | 0.65 | 0.00 | 5.13 | 0.79 |
| Alloy 15 | 73.75 | 2.63 | 3.19 | 13.86 | 0.65 | 0.00 | 5.13 | 0.79 |
| Alloy 16 | 74.11 | 2.63 | 2.19 | 13.86 | 1.29 | 0.00 | 5.13 | 0.79 |
| Alloy 17 | 72.11 | 2.63 | 2.19 | 15.86 | 1.29 | 0.00 | 5.13 | 0.79 |
| Alloy 18 | 78.25 | 2.63 | 0.69 | 11.86 | 0.65 | 0.00 | 5.13 | 0.79 |
| Alloy 19 | 74.25 | 2.63 | 1.19 | 14.86 | 1.15 | 0.00 | 5.13 | 0.79 |
| Alloy 20 | 74.82 | 2.63 | 1.50 | 14.17 | 0.96 | 0.00 | 5.13 | 0.79 |
| Alloy 21 | 75.75 | 1.63 | 1.19 | 14.86 | 0.65 | 0.00 | 5.13 | 0.79 |
| Alloy 22 | 77.75 | 2.63 | 1.19 | 13.86 | 0.65 | 0.00 | 3.13 | 0.79 |
| Alloy 23 | 76.54 | 2.63 | 1.19 | 13.86 | 0.65 | 0.00 | 5.13 | 0.00 |
| Alloy 24 | 67.36 | 10.70 | 1.25 | 10.56 | 1.00 | 5.00 | 4.13 | 0.00 |
| Alloy 25 | 71.92 | 5.45 | 2.10 | 8.92 | 1.50 | 6.09 | 4.02 | 0.00 |
| Alloy 26 | 61.30 | 18.90 | 6.80 | 0.90 | 0.00 | 5.50 | 6.60 | 0.00 |
| Alloy 27 | 71.62 | 4.95 | 4.10 | 6.55 | 2.00 | 3.76 | 7.02 | 0.00 |
| Alloy 28 | 62.88 | 16.00 | 3.19 | 11.36 | 0.65 | 0.00 | 5.13 | 0.79 |
| Alloy 29 | 72.50 | 2.63 | 0.00 | 15.86 | 1.55 | 1.54 | 5.13 | 0.79 |
| Alloy 30 | 80.19 | 0.00 | 0.95 | 13.28 | 1.66 | 2.25 | 0.88 | 0.79 |

TABLE 2-continued

Alloy Chemical Composition

| Alloy | Fe | Cr | Ni | Mn | Cu | B | Si | C |
|---|---|---|---|---|---|---|---|---|
| Alloy 31 | 77.65 | 0.67 | 0.08 | 13.09 | 1.09 | 0.97 | 2.73 | 3.72 |
| Alloy 32 | 78.54 | 2.63 | 1.19 | 13.86 | 0.65 | 0.00 | 3.13 | 0.00 |
| Alloy 33 | 83.14 | 1.63 | 8.68 | 0.00 | 1.00 | 4.76 | 0.00 | 0.79 |
| Alloy 34 | 75.30 | 2.63 | 1.34 | 14.01 | 0.80 | 0.00 | 5.13 | 0.79 |
| Alloy 35 | 74.85 | 2.63 | 1.49 | 14.16 | 0.95 | 0.00 | 5.13 | 0.79 |

As can be seen from the above, the alloys herein are iron based metal alloys, having greater than or equal to 50 at. % Fe. More preferably, the alloys herein can be described as comprising, consisting essentially of, or consisting of the following elements at the indicated atomic percent: Fe (61.30 to 83.14 at. %); Si (0 to 7.02 at. %); Mn (0 to 15.86 at. %); B (0 to 6.09 at. %); Cr (0 to 18.90 at. %); Ni (0 to 8.68 at. %); Cu (0 to 2.00 at. %); C (0 to 3.72 at. %). In addition, it can be appreciated that the alloys herein are such that they comprise Fe and at least four or more, or five or more, or six or more elements selected from Si, Mn, B, Cr, Ni, Cu or C. Most preferably, the alloys herein are such that they comprise, consist essentially of, or consist of Fe at a level of 50 at. % or greater along with Si, Mn, B, Cr, Ni, Cu and C.

Alloy Laboratory Processing

Laboratory processing of the alloys in Table 2 was done to model each step of industrial production but on a much smaller scale. Key steps in this process include the following: casting, tunnel furnace heating, hot rolling, cold rolling, and annealing.

Casting

Figure 3:
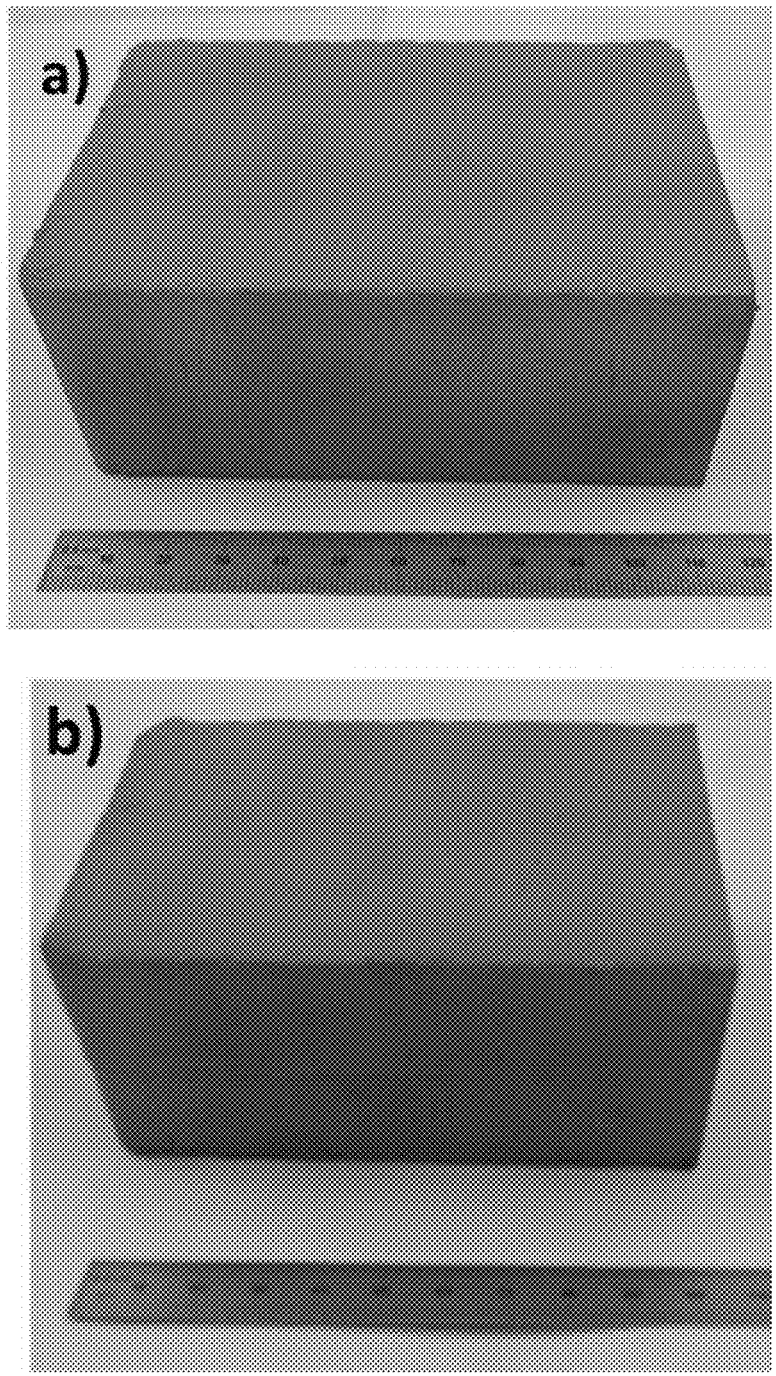
FIG. 3 Images of laboratory cast 50 mm slabs from: a) Alloy 9 and b) Alloy 12.

Alloys were weighed out into charges ranging from 3,000 to 3,400 grams using commercially available ferroadditive powders with known chemistry and impurity content according to the atomic ratios in Table 2. Charges were loaded into a zirconia coated silica crucibles which was placed into an Indutherm VTC800V vacuum tilt casting machine. The machine then evacuated the casting and melting chambers and backfilled with argon to atmospheric pressure several times prior to casting to prevent oxidation of the melt. The melt was heated with a 14 kHz RF induction coil until fully molten, approximately 5.25 to 6.5 minutes depending on the alloy composition and charge mass. After the last solids were observed to melt it was allowed to heat for an additional 30 to 45 seconds to provide superheat and ensure melt homogeneity. The casting machine then evacuated the melting and casting chambers, tilted the crucible and poured the melt into a 50 mm thick, 75 to 80 mm wide, and 125 mm deep channel in a water cooled copper die. The melt was allowed to cool under vacuum for 200 seconds before the chamber was filled with argon to atmospheric pressure. Example pictures of laboratory cast slabs from two different alloys are shown in FIG. 3.

Tunnel Furnace Heating

Prior to hot rolling, laboratory slabs were loaded into a Lucifer EHS3GT-B18 furnace to heat. The furnace set point varies between 1100° C. to 1250° C. depending on alloy melting point. The slabs were allowed to soak for 40 minutes prior to hot rolling to ensure they reach the target temperature. Between hot rolling passes the slabs are returned to the furnace for 4 minutes to allow the slabs to reheat.

Hot Rolling

Figure 4:
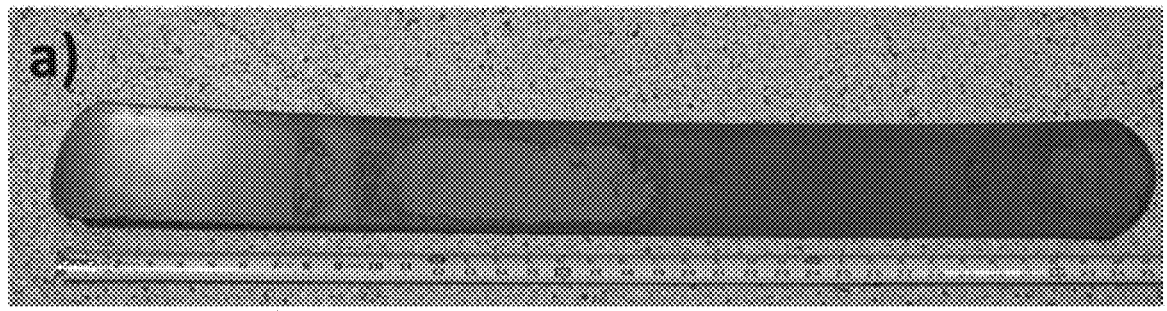
FIG. 4 Images of hot rolled sheet after laboratory casting from: a) Alloy 9 and b) Alloy 12.
Figure 4:
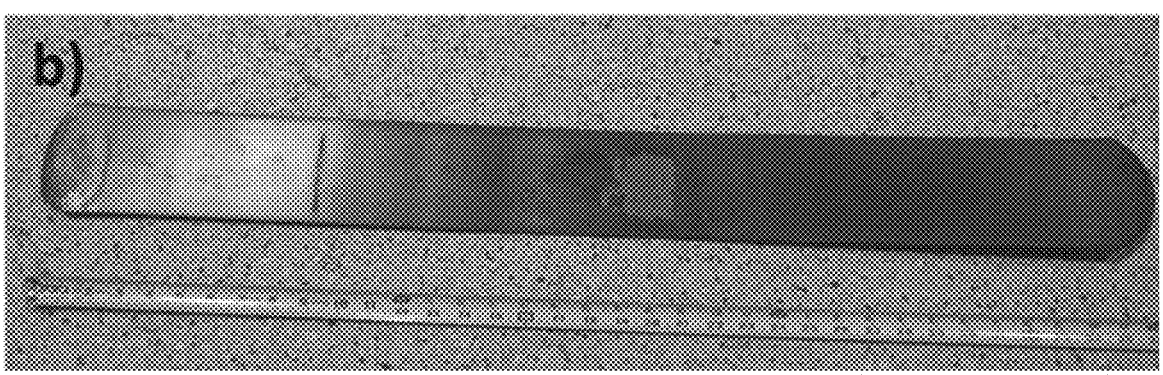

Pre-heated slabs were pushed out of the tunnel furnace into a Fenn Model 061 2 high rolling mill. The 50 mm slabs were preferably hot rolled for 5 to 8 passes though the mill before being allowed to air cool. After the initial passes each slab had been reduced between 80 to 85% to a final thickness of between 7.5 and 10 mm. After cooling each resultant sheet was sectioned and the bottom 190 mm was hot rolled for an additional 3 to 4 passes through the mill, further reducing the plate between 72 to 84% to a final thickness of between 1.6 and 2.1 mm. Example pictures of laboratory cast slabs from two different alloys after hot rolling are shown in FIG. 4.

Cold Rolling

Figure 5:
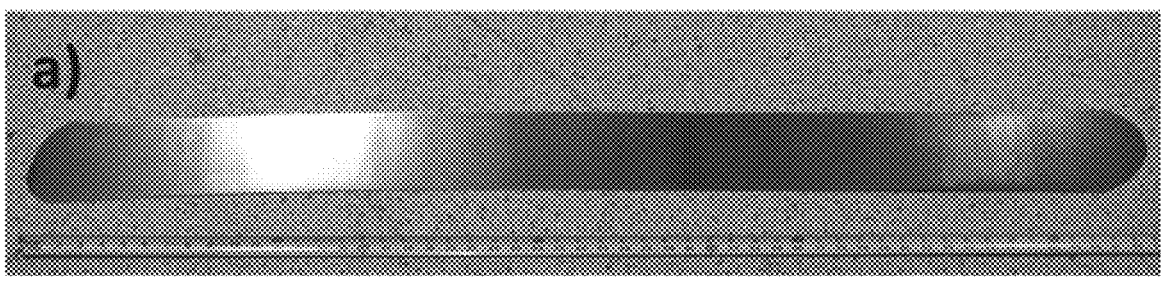
FIG. 5 Images of cold rolled sheet after laboratory casting and hot rolling from: a) Alloy 9 and b) Alloy 12.
Figure 5:
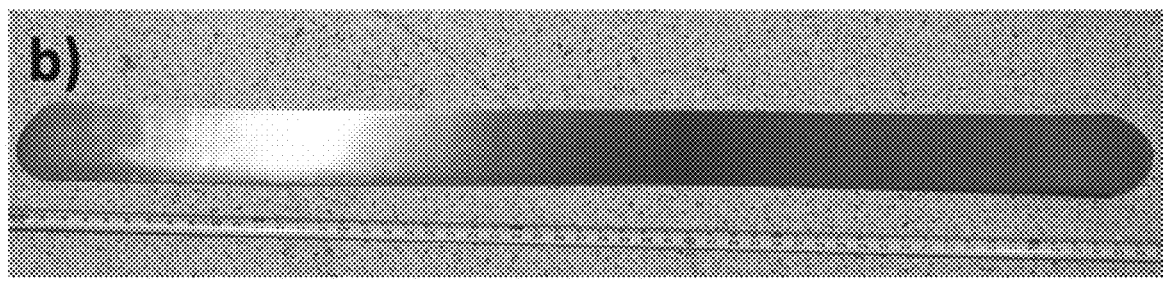

After hot rolling resultant sheets were media blasted with aluminum oxide to remove the mill scale and were then cold rolled on a Fenn Model 061 2 high rolling mill. Cold rolling takes multiple passes to reduce the thickness of the sheet to a targeted thickness of typically 1.2 mm. Hot rolled sheets were fed into the mill at steadily decreasing roll gaps until the minimum gap is reached. If the material has not yet hit the gauge target, additional passes at the minimum gap were used until 1.2 mm thickness was achieved. A large number of passes were applied due to limitations of laboratory mill capability. Example pictures of cold rolled sheets from two different alloys are shown in FIG. 5.

Annealing

After cold rolling, tensile specimens were cut from the cold rolled sheet via wire electrical discharge machining (EDM). These specimens were then annealed with different parameters listed in Table 3. Annealing 1a, 1b, 2b were conducted in a Lucifer 7HT-K12 box furnace. Annealing 2a and 3 was conducted in a Camco Model G-ATM-12FL furnace. Specimens which were air normalized were removed from the furnace at the end of the cycle and allowed to cool to room temperature in air. For the furnace cooled specimens, at the end of the annealing the furnace was shut off to allow the sample to cool with the furnace. Note that the heat treatments were selected for demonstration but were not intended to be limiting in scope. High temperature treatments up to just below the melting points for each alloy are possible.

TABLE 3

Annealing Parameters

| Annealing | Heating | Temperature | Dwell | Cooling | Atmosphere |
|---|---|---|---|---|---|
| 1a | Preheated Furnace | 850° C. | 5 min | Air Normalized | Air + Argon |
| 1b | Preheated Furnace | 850° C. | 10 min | Air Normalized | Air + Argon |
| 2a | 20° C./hr | 850° C. | 360 min | 45° C./hr to 500° C. then Furnace Cool | Hydrogen + Argon |
| 2b | 20° C./hr | 850° C. | 360 min | 45° C./hr to 500° C. then Air Normalized | Air + Argon |
| 3 | 20° C./hr | 1200° C. | 120 min | Furnace Cool | Hydrogen + Argon |

Alloy Properties

Thermal analysis of the alloys herein was performed on as-solidified cast slabs using a Netzsch Pegasus 404 Differential Scanning calorimeter (DSC). Samples of alloys were loaded into alumina crucibles which were then loaded into the DSC. The DSC then evacuated the chamber and backfilled with argon to atmospheric pressure. A constant purge of argon was then started, and a zirconium getter was installed in the gas flow path to further reduce the amount of oxygen in the system. The samples were heated until completely molten, cooled until completely solidified, then reheated at 10° C./min through melting. Measurements of the solidus, liquidus, and peak temperatures were taken from the second melting in order to ensure a representative measurement of the material in an equilibrium state. In the alloys listed in Table 2, melting occurs in one or multiple stages with initial melting from ~1111° C. depending on alloy chemistry and final melting temperature up to ~1476° C. (Table 4). Variations in melting behavior reflect complex phase formation at solidification of the alloys depending on their chemistry.

TABLE 4

Differential Thermal Analysis Data for Melting Behavior

| Alloy | Solidus Temperature (° C.) | Liquidus Temperature (° C.) | Melting Peak #1 (° C.) | Melting Peak #2 (° C.) | Melting Peak #3 (° C.) |
|---|---|---|---|---|---|
| Alloy 1 | 1390 | 1448 | 1439 | | |
| Alloy 2 | 1157 | 1410 | 1177 | 1401 | |
| Alloy 3 | 1411 | 1454 | 1451 | | |
| Alloy 4 | 1400 | 1460 | 1455 | | |
| Alloy 5 | 1415 | 1467 | 1464 | | |
| Alloy 6 | 1416 | 1462 | 1458 | | |
| Alloy 7 | 1421 | 1467 | 1464 | | |
| Alloy 8 | 1417 | 1469 | 1467 | | |
| Alloy 9 | 1385 | 1446 | 1441 | | |
| Alloy 10 | 1383 | 1442 | 1437 | | |
| Alloy 11 | 1384 | 1445 | 1442 | | |
| Alloy 12 | 1385 | 1443 | 1435 | | |
| Alloy 13 | 1401 | 1459 | 1451 | | |
| Alloy 14 | 1385 | 1445 | 1442 | | |
| Alloy 15 | 1386 | 1448 | 1441 | | |
| Alloy 16 | 1384 | 1439 | 1435 | | |
| Alloy 17 | 1376 | 1442 | 1435 | | |
| Alloy 18 | 1395 | 1456 | 1431 | 1449 | 1453 |
| Alloy 19 | 1385 | 1437 | 1432 | | |
| Alloy 20 | 1374 | 1439 | 1436 | | |
| Alloy 21 | 1391 | 1442 | 1438 | | |
| Alloy 22 | 1408 | 1461 | 1458 | | |
| Alloy 23 | 1403 | 1452 | 1434 | 1448 | |
| Alloy 24 | 1219 | 1349 | 1246 | 1314 | 1336 |
| Alloy 25 | 1186 | 1335 | 1212 | 1319 | |
| Alloy 26 | 1246 | 1327 | 1268 | 1317 | |
| Alloy 27 | 1179 | 1355 | 1202 | 1344 | |
| Alloy 28 | 1158 | 1402 | 1176 | 1396 | |
| Alloy 29 | 1159 | 1448 | 1168 | 1439 | |
| Alloy 30 | 1111 | 1403 | 1120 | 1397 | |
| Alloy 31 | 1436 | 1475 | 1464 | | |
| Alloy 32 | 1436 | 1476 | 1464 | | |
| Alloy 33 | 1153 | 1418 | 1178 | 1411 | |
| Alloy 34 | 1397 | 1448 | 1445 | | |
| Alloy 35 | 1394 | 1444 | 1441 | | |

The density of the alloys was measured on 9 mm thick sections of hot rolled material using the Archimedes method in a specially constructed balance allowing weighing in both air and distilled water. The density of each alloy is tabulated in Table 5 and was found to be in the range from 7.57 to 7.89 g/cm³. The accuracy of this technique is ±0.01 g/cm³.

TABLE 5

Density of Alloys

| Alloy | Density (g/cm³) |
|---|---|
| Alloy 1 | 7.78 |
| Alloy 2 | 7.74 |
| Alloy 3 | 7.82 |
| Alloy 4 | 7.84 |
| Alloy 5 | 7.76 |
| Alloy 6 | 7.83 |
| Alloy 7 | 7.79 |

TABLE 5-continued

Density of Alloys

| Alloy | Density (g/cm³) |
|---|---|
| Alloy 8 | 7.71 |
| Alloy 9 | 7.77 |
| Alloy 10 | 7.78 |
| Alloy 11 | 7.77 |
| Alloy 12 | 7.77 |
| Alloy 13 | 7.80 |
| Alloy 14 | 7.78 |
| Alloy 15 | 7.79 |
| Alloy 16 | 7.79 |
| Alloy 17 | 7.77 |
| Alloy 18 | 7.79 |
| Alloy 19 | 7.77 |
| Alloy 20 | 7.78 |
| Alloy 21 | 7.78 |
| Alloy 22 | 7.87 |
| Alloy 23 | 7.81 |
| Alloy 24 | 7.67 |
| Alloy 25 | 7.71 |
| Alloy 26 | 7.57 |
| Alloy 27 | 7.67 |
| Alloy 28 | 7.73 |
| Alloy 29 | 7.89 |
| Alloy 30 | 7.78 |
| Alloy 31 | 7.89 |
| Alloy 32 | 7.89 |
| Alloy 33 | 7.78 |
| Alloy 34 | 7.77 |
| Alloy 35 | 7.78 |

Tensile properties were measured on an Instron 3369 mechanical testing frame using Instron's Bluehill control software. All tests were conducted at room temperature, with the bottom grip fixed and the top grip set to travel upwards at a rate of 0.012 mm/s. Strain data was collected using Instron's Advanced Video Extensometer. Tensile properties of the alloys listed in Table 2 after annealing with parameters listed in Table 3 are shown below in Table 6 to Table 10. The ultimate tensile strength values may vary from 799 to 1683 MPa with tensile elongation from 6.6 to 86.7%. The yield strength is in a range from 197 to 978 MPa. The mechanical characteristic values in the steel alloys herein will depend on alloy chemistry and processing conditions. The variation in heat treatment additionally illustrates the property variations possible through processing a particular alloy chemistry.

TABLE 6

Tensile Data for Selected Alloys after Heat Treatment 1a

| Alloy | Yield Strength (MPa) | Ultimate Tensile Strength (MPa) | Tensile Elongation (%) |
|---|---|---|---|
| Alloy 1 | 443 | 1212 | 51.1 |
| | 458 | 1231 | 57.9 |
| | 422 | 1200 | 51.9 |
| Alloy 2 | 484 | 1278 | 48.3 |
| | 485 | 1264 | 45.5 |
| | 479 | 1261 | 48.7 |
| Alloy 3 | 458 | 1359 | 43.9 |
| | 428 | 1358 | 43.7 |
| | 462 | 1373 | 44.0 |
| Alloy 4 | 367 | 1389 | 36.4 |
| | 374 | 1403 | 39.1 |
| | 364 | 1396 | 32.1 |
| Alloy 5 | 510 | 1550 | 16.5 |
| | 786 | 1547 | 18.1 |
| | 555 | 1552 | 16.2 |

TABLE 6-continued

Tensile Data for Selected Alloys after Heat Treatment 1a

| Alloy | Yield Strength (MPa) | Ultimate Tensile Strength (MPa) | Tensile Elongation (%) |
|---|---|---|---|
| Alloy 6 | 418 | 1486 | 34.3 |
|  | 419 | 1475 | 35.2 |
|  | 430 | 1490 | 37.3 |
| Alloy 7 | 468 | 1548 | 20.2 |
|  | 481 | 1567 | 20.3 |
|  | 482 | 1545 | 19.3 |
| Alloy 8 | 851 | 1664 | 13.6 |
|  | 848 | 1683 | 14.0 |
|  | 859 | 1652 | 12.9 |
| Alloy 9 | 490 | 1184 | 58.0 |
|  | 496 | 1166 | 59.1 |
|  | 493 | 1144 | 56.6 |
| Alloy 10 | 472 | 1216 | 60.5 |
|  | 481 | 1242 | 58.7 |
|  | 470 | 1203 | 55.9 |
| Alloy 11 | 496 | 1158 | 65.7 |
|  | 498 | 1155 | 58.2 |
|  | 509 | 1154 | 68.3 |
| Alloy 12 | 504 | 1084 | 48.3 |
|  | 515 | 1105 | 70.8 |
|  | 518 | 1106 | 66.9 |
| Alloy 13 | 478 | 1440 | 41.4 |
|  | 486 | 1441 | 40.7 |
|  | 455 | 1424 | 42.0 |
| Alloy 22 | 455 | 1239 | 48.1 |
|  | 466 | 1227 | 55.4 |
|  | 460 | 1237 | 57.9 |
| Alloy 23 | 419 | 1019 | 48.4 |
|  | 434 | 1071 | 48.7 |
|  | 439 | 1084 | 47.5 |
| Alloy 28 | 583 | 932 | 61.5 |
|  | 594 | 937 | 60.8 |
|  | 577 | 930 | 61.0 |
| Alloy 29 | 481 | 1116 | 60.0 |
|  | 481 | 1132 | 55.4 |
|  | 486 | 1122 | 56.8 |
| Alloy 30 | 349 | 1271 | 42.7 |
|  | 346 | 1240 | 36.2 |
|  | 340 | 1246 | 42.6 |
| Alloy 31 | 467 | 1003 | 36.0 |
|  | 473 | 996 | 29.9 |
|  | 459 | 988 | 29.5 |
| Alloy 32 | 402 | 1087 | 44.2 |
|  | 409 | 1061 | 46.1 |
|  | 420 | 1101 | 44.1 |

TABLE 7

Tensile Data for Selected Alloys after Heat Treatment 1b

| Alloy | Yield Strength (MPa) | Ultimate Tensile Strength (MPa) | Tensile Elongation (%) |
|---|---|---|---|
| Alloy 1 | 487 | 1239 | 57.5 |
|  | 466 | 1269 | 52.5 |
|  | 488 | 1260 | 55.8 |
| Alloy 2 | 438 | 1232 | 49.7 |
|  | 431 | 1228 | 49.8 |
|  | 431 | 1231 | 49.4 |
| Alloy 9 | 522 | 1172 | 62.6 |
|  | 466 | 1170 | 61.9 |
|  | 462 | 1168 | 61.3 |
| Alloy 12 | 471 | 1115 | 63.3 |
|  | 458 | 1102 | 69.3 |
|  | 454 | 1118 | 69.1 |
| Alloy 13 | 452 | 1408 | 40.5 |
|  | 435 | 1416 | 42.5 |
|  | 432 | 1396 | 46.0 |

TABLE 7-continued

Tensile Data for Selected Alloys after Heat Treatment 1b

| Alloy | Yield Strength (MPa) | Ultimate Tensile Strength (MPa) | Tensile Elongation (%) |
|---|---|---|---|
| Alloy 14 | 448 | 1132 | 64.4 |
|  | 443 | 1151 | 60.7 |
|  | 436 | 1180 | 54.3 |
| Alloy 15 | 444 | 1077 | 66.9 |
|  | 438 | 1072 | 65.3 |
|  | 423 | 1075 | 70.5 |
| Alloy 16 | 433 | 1084 | 67.5 |
|  | 432 | 1072 | 66.8 |
|  | 423 | 1071 | 67.8 |
| Alloy 17 | 420 | 946 | 74.6 |
|  | 421 | 939 | 77.0 |
|  | 425 | 961 | 74.9 |
| Alloy 19 | 496 | 1124 | 67.4 |
|  | 434 | 1118 | 64.8 |
|  | 435 | 1117 | 67.4 |
| Alloy 20 | 434 | 1154 | 58.3 |
|  | 457 | 1188 | 54.9 |
|  | 448 | 1187 | 60.5 |
| Alloy 21 | 421 | 1201 | 54.3 |
|  | 427 | 1185 | 59.9 |
|  | 431 | 1191 | 47.8 |
| Alloy 24 | 554 | 1151 | 23.5 |
|  | 538 | 1142 | 24.3 |
|  | 562 | 1151 | 24.3 |
| Alloy 25 | 500 | 1274 | 16.0 |
|  | 502 | 1271 | 15.8 |
|  | 483 | 1280 | 16.3 |
| Alloy 26 | 697 | 1215 | 20.6 |
|  | 723 | 1187 | 21.3 |
|  | 719 | 1197 | 21.5 |
| Alloy 27 | 538 | 1385 | 20.6 |
|  | 574 | 1397 | 20.9 |
|  | 544 | 1388 | 21.8 |
| Alloy 33 | 978 | 1592 | 6.6 |
|  | 896 | 1596 | 7.2 |
|  | 953 | 1619 | 7.5 |
| Alloy 34 | 467 | 1227 | 56.7 |
|  | 476 | 1232 | 52.7 |
|  | 462 | 1217 | 51.6 |
| Alloy 35 | 439 | 1166 | 56.3 |
|  | 438 | 1166 | 59.0 |
|  | 440 | 1177 | 58.3 |

TABLE 8

Tensile Data for Selected Alloys after Heat Treatment 2a

| Alloy | Yield Strength (MPa) | Ultimate Tensile Strength (MPa) | Tensile Elongation (%) |
|---|---|---|---|
| Alloy 2 | 367 | 1174 | 46.2 |
|  | 369 | 1193 | 45.1 |
|  | 367 | 1179 | 50.2 |
| Alloy 30 | 391 | 1118 | 55.7 |
|  | 389 | 1116 | 60.5 |
|  | 401 | 1113 | 59.5 |
| Alloy 32 | 413 | 878 | 17.6 |
|  | 399 | 925 | 20.5 |
|  | 384 | 962 | 21.0 |
| Alloy 31 | 301 | 1133 | 37.4 |
|  | 281 | 1125 | 38.7 |
|  | 287 | 1122 | 39.0 |

TABLE 9

Tensile Data for Selected Alloys after Heat Treatment 2b

| Alloy | Yield Strength (MPa) | Ultimate Tensile Strength (MPa) | Tensile Elongation (%) |
|---|---|---|---|
| Alloy 1 | 396 | 1093 | 31.2 |
|  | 383 | 1070 | 30.4 |
|  | 393 | 1145 | 34.7 |
| Alloy 2 | 378 | 1233 | 49.4 |
|  | 381 | 1227 | 48.3 |
|  | 366 | 1242 | 47.7 |
| Alloy 3 | 388 | 1371 | 41.3 |
|  | 389 | 1388 | 42.6 |
| Alloy 4 | 335 | 1338 | 21.7 |
|  | 342 | 1432 | 30.1 |
|  | 342 | 1150 | 17.3 |
| Alloy 5 | 568 | 1593 | 15.2 |
|  | 595 | 1596 | 13.1 |
|  | 735 | 1605 | 14.6 |
| Alloy 6 | 399 | 1283 | 17.5 |
|  | 355 | 1483 | 24.8 |
|  | 386 | 1471 | 23.8 |
| Alloy 7 | 605 | 1622 | 16.3 |
|  | 639 | 1586 | 15.2 |
| Alloy 8 | 595 | 1585 | 13.6 |
|  | 743 | 1623 | 14.1 |
|  | 791 | 1554 | 13.9 |
| Alloy 9 | 381 | 1125 | 53.3 |
|  | 430 | 1111 | 44.8 |
|  | 369 | 1144 | 51.1 |
| Alloy 10 | 362 | 1104 | 37.8 |
|  | 369 | 1156 | 43.5 |
| Alloy 11 | 397 | 1103 | 52.4 |
|  | 390 | 1086 | 50.9 |
|  | 402 | 1115 | 50.4 |
| Alloy 12 | 358 | 1055 | 64.7 |
|  | 360 | 1067 | 64.4 |
|  | 354 | 1060 | 62.9 |
| Alloy 13 | 362 | 982 | 17.3 |
|  | 368 | 961 | 16.3 |
|  | 370 | 989 | 17.0 |
| Alloy 14 | 385 | 1165 | 59.0 |
|  | 396 | 1156 | 55.5 |
|  | 437 | 1155 | 57.9 |
| Alloy 15 | 357 | 1056 | 70.3 |
|  | 354 | 1046 | 68.2 |
|  | 358 | 1060 | 70.7 |
| Alloy 16 | 375 | 1094 | 67.6 |
|  | 384 | 1080 | 63.4 |
|  | 326 | 1054 | 65.2 |
| Alloy 17 | 368 | 960 | 77.2 |
|  | 370 | 955 | 77.9 |
|  | 358 | 951 | 75.9 |
| Alloy 18 | 326 | 1136 | 17.3 |
|  | 338 | 1192 | 19.1 |
|  | 327 | 1202 | 18.5 |
| Alloy 19 | 386 | 1134 | 64.5 |
|  | 378 | 1100 | 60.5 |
|  | 438 | 1093 | 52.5 |
| Alloy 20 | 386 | 1172 | 56.2 |
|  | 392 | 1129 | 42.0 |
|  | 397 | 1186 | 57.8 |
| Alloy 21 | 363 | 1141 | 49.0 |
| Alloy 22 | 335 | 1191 | 45.7 |
|  | 322 | 1189 | 41.5 |
|  | 348 | 1168 | 34.5 |
| Alloy 23 | 398 | 1077 | 44.3 |
|  | 367 | 1068 | 44.8 |
| Alloy 24 | 476 | 1149 | 28.0 |
|  | 482 | 1154 | 25.9 |
|  | 495 | 1145 | 26.2 |
| Alloy 25 | 452 | 1299 | 16.0 |
|  | 454 | 1287 | 15.8 |
|  | 441 | 1278 | 15.1 |
| Alloy 26 | 619 | 1196 | 26.6 |
|  | 615 | 1189 | 26.2 |
|  | 647 | 1193 | 26.1 |
| Alloy 27 | 459 | 1417 | 17.3 |
|  | 461 | 1410 | 16.8 |
|  | 457 | 1410 | 17.1 |
| Alloy 28 | 507 | 879 | 52.3 |
|  | 498 | 874 | 42.5 |
|  | 493 | 880 | 44.7 |
| Alloy 32 | 256 | 1035 | 42.3 |
|  | 257 | 1004 | 42.1 |
|  | 257 | 1049 | 34.8 |
| Alloy 33 | 830 | 1494 | 8.4 |
|  | 862 | 1521 | 8.1 |
|  | 877 | 1519 | 8.8 |
| Alloy 34 | 388 | 1178 | 59.8 |
|  | 384 | 1197 | 57.7 |
|  | 370 | 1177 | 59.1 |
| Alloy 35 | 367 | 1167 | 58.5 |
|  | 369 | 1167 | 58.4 |
|  | 375 | 1161 | 59.7 |

TABLE 10

Tensile Data for Selected Alloys after Heat Treatment 3

| Alloy | Yield Strength (MPa) | Ultimate Tensile Strength (MPa) | Tensile Elongation (%) |
|---|---|---|---|
| Alloy 1 | 238 | 1142 | 47.6 |
|  | 233 | 1117 | 46.3 |
|  | 239 | 1145 | 53.0 |
| Alloy 3 | 266 | 1338 | 38.5 |
|  | N/A | 1301 | 37.7 |
|  | N/A | 1291 | 35.6 |
| Alloy 4 | N/A | 1353 | 27.7 |
|  | N/A | 1337 | 26.1 |
|  | N/A | 1369 | 29.0 |
| Alloy 5 | 511 | 1462 | 12.5 |
|  | 558 | 1399 | 10.6 |
| Alloy 6 | 311 | 1465 | 24.6 |
|  | 308 | 1467 | 21.8 |
|  | 308 | 1460 | 25.0 |
| Alloy 7 | 727 | 1502 | 12.5 |
|  | 639 | 1474 | 11.3 |
|  | 685 | 1520 | 12.4 |
| Alloy 8 | 700 | 1384 | 12.3 |
|  | 750 | 1431 | 13.3 |
| Alloy 9 | 234 | 1087 | 55.0 |
|  | 240 | 1070 | 56.4 |
|  | 242 | 1049 | 58.3 |
| Alloy 10 | 229 | 1073 | 50.6 |
|  | 228 | 1082 | 56.5 |
|  | 229 | 1077 | 54.2 |
| Alloy 11 | 232 | 1038 | 63.8 |
|  | 232 | 1009 | 62.4 |
| Alloy 12 | 228 | 999 | 66.1 |
|  | 229 | 979 | 65.6 |
|  | 228 | 992 | 57.5 |
|  | 222 | 963 | 66.2 |
| Alloy 13 | 277 | 1338 | 37.3 |
|  | 261 | 1352 | 35.9 |
|  | 272 | 1353 | 34.9 |
| Alloy 14 | 228 | 1074 | 58.5 |
|  | 239 | 1077 | 54.1 |
|  | 230 | 1068 | 49.1 |
| Alloy 15 | 206 | 991 | 60.9 |
|  | 208 | 1024 | 58.9 |
| Alloy 16 | 199 | 1006 | 57.7 |
|  | 242 | 987 | 53.4 |
|  | 208 | 995 | 57.0 |

TABLE 10-continued

Tensile Data for Selected Alloys after Heat Treatment 3

| Alloy | Yield Strength (MPa) | Ultimate Tensile Strength (MPa) | Tensile Elongation (%) |
|---|---|---|---|
| Alloy 17 | 222 | 844 | 72.6 |
|  | 197 | 867 | 64.9 |
|  | 213 | 869 | 66.5 |
| Alloy 18 | 288 | 1415 | 32.6 |
|  | 300 | 1415 | 32.1 |
|  | 297 | 1421 | 29.6 |
| Alloy 19 | 225 | 1032 | 58.5 |
|  | 213 | 1019 | 61.1 |
|  | 214 | 1017 | 58.4 |
| Alloy 20 | 233 | 1111 | 57.3 |
|  | 227 | 1071 | 53.0 |
|  | 230 | 1091 | 49.4 |
| Alloy 21 | 238 | 1073 | 50.6 |
|  | 228 | 1069 | 56.5 |
|  | 246 | 1110 | 52.0 |
| Alloy 22 | 217 | 1157 | 47.0 |
|  | 236 | 1154 | 46.8 |
|  | 218 | 1154 | 47.7 |
| Alloy 23 | 208 | 979 | 45.4 |
|  | 204 | 984 | 43.4 |
|  | 204 | 972 | 38.9 |
| Alloy 28 | 277 | 811 | 86.7 |
|  | 279 | 802 | 86.0 |
|  | 277 | 799 | 82.0 |
| Alloy 32 | 203 | 958 | 33.3 |
|  | 206 | 966 | 39.5 |
|  | 210 | 979 | 36.3 |
| Alloy 34 | 216 | 1109 | 52.8 |
|  | 230 | 1144 | 55.9 |
|  | 231 | 1123 | 52.3 |
| Alloy 35 | 230 | 1104 | 51.7 |
|  | 231 | 1087 | 59.0 |
|  | 220 | 1084 | 54.4 |

CASE EXAMPLES

Case Example #1: Structural Development Pathway in Alloy 1

A laboratory slab with thickness of 50 mm was cast from Alloy 1 that was then laboratory processed by hot rolling, cold rolling and annealing at 850° C. for 5 min as described in Main Body section of current application. Microstructure of the alloy was examined at each step of processing by SEM, TEM and x-ray analysis.

For SEM study, the cross section of the slab samples was ground on SiC abrasive papers with reduced grit size, and then polished progressively with diamond media paste down to 1 μm. The final polishing was done with 0.02 μm grit $SiO_2$ solution. Microstructures were examined by SEM using an EVO-MA10 scanning electron microscope manufactured by Carl Zeiss SMT Inc. To prepare TEM specimens, the samples were first cut by EDM, and then thinned by grinding with pads of reduced grit size every time. Further thinning to make foils of 60 to 70 μm thickness was done by polishing with 9 μm, 3 μm and 1 μm diamond suspension solution respectively. Discs of 3 mm in diameter were punched from the foils and the final polishing was completed with electropolishing using a twin-jet polisher. The chemical solution used was a 30% nitric acid mixed in methanol base. In case of insufficient thin area for TEM observation, the TEM specimens may be ion-milled using a Gatan Precision Ion Polishing System (PIPS). The ion-milling usually is done at 4.5 keV, and the inclination angle is reduced from 4° to 2° to open up the thin area. The TEM studies were done using a JEOL 2100 high-resolution microscope operated at 200 kV. X-ray diffraction was done using a PANalytical X'Pert MPD diffractometer with a Cu Kα x-ray tube and operated at 45 kV with a filament current of 40 mA. Scans were run with a step size of 0.01° and from 25° to 95° two-theta with silicon incorporated to adjust for instrument zero angle shift. The resulting scans were then subsequently analyzed using Rietveld analysis using Siroquant software.

Figure 6:
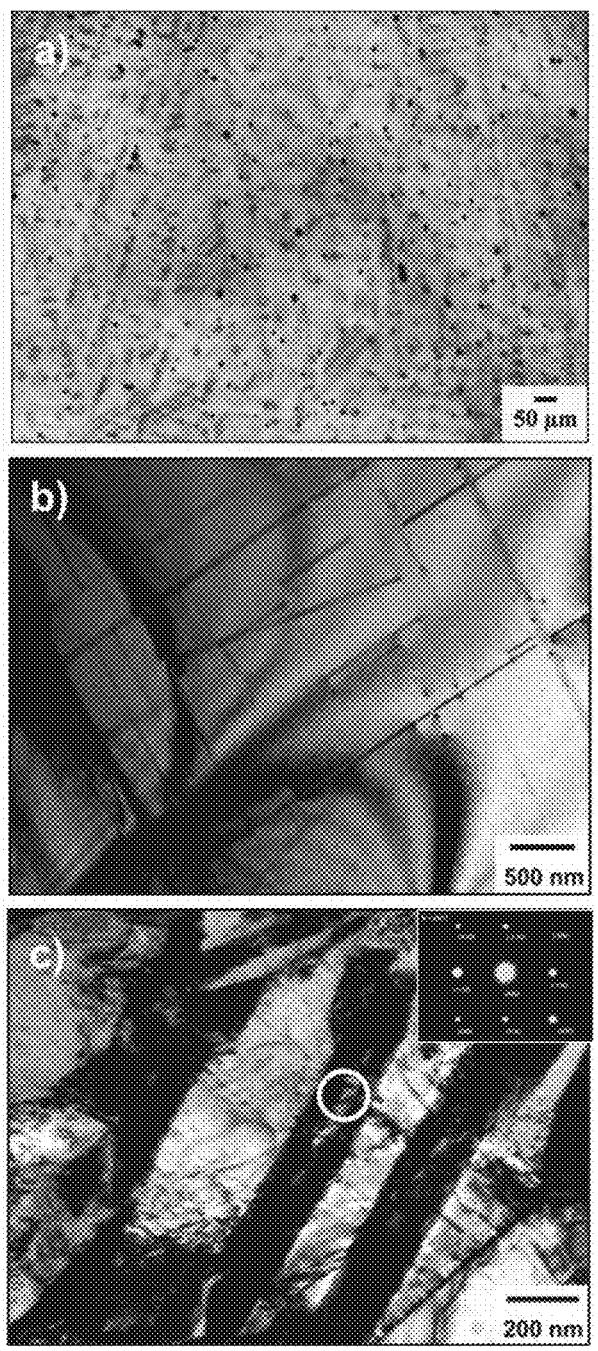
FIG. 6 Microstructure of solidified Alloy 1 cast at 50 mm thickness: a) Backscattered SEM micrograph showing the dendritic nature of the Modal Structure in the as-cast state, b) Bright-field TEM micrograph showing the details in the matrix grains, c) Bright-field TEM with selected electron diffraction exhibiting the ferrite phase in the Modal Structure.
Figure 7:
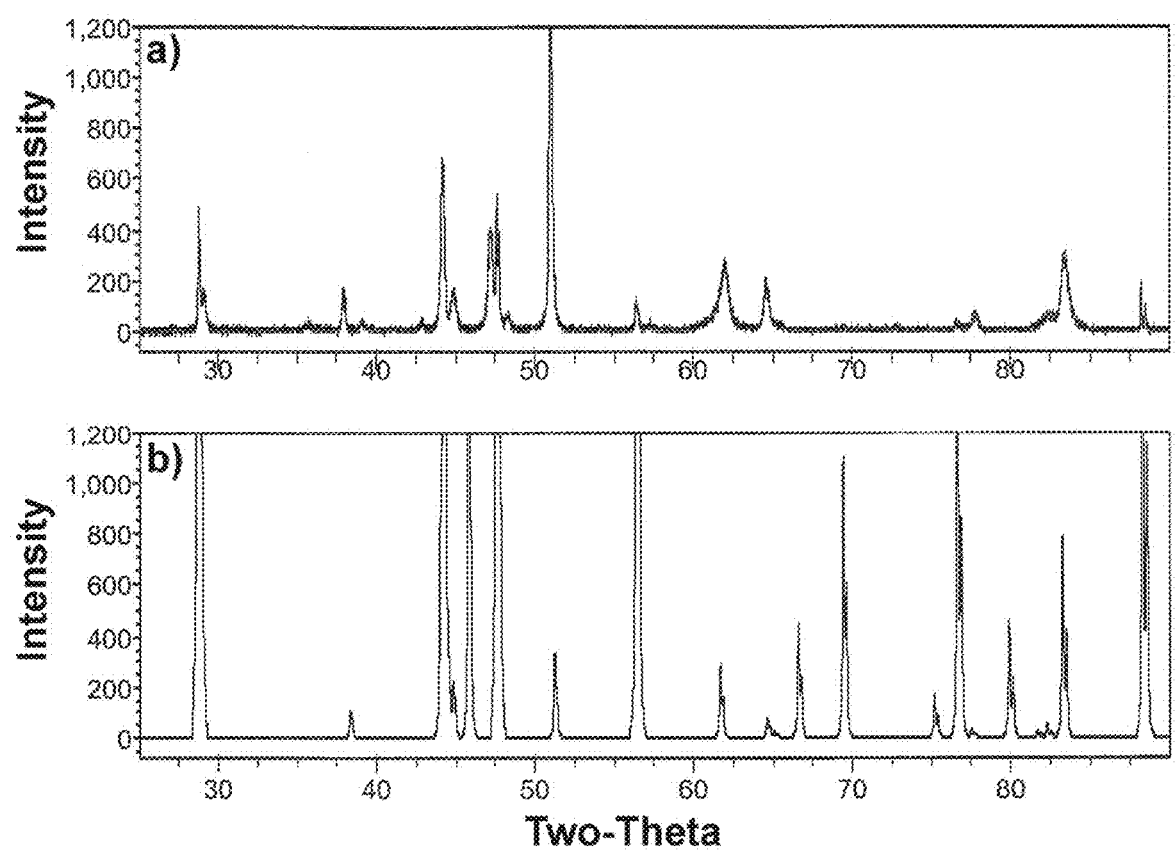
FIG. 7 X-ray diffraction pattern for the Modal Structure in Alloy 1 alloy after solidification: a) Experimental data, b) Rietveld refinement analysis.

Modal Structure was formed in the Alloy 1 slab with 50 mm thickness after solidification. The Modal Structure (Structure #1) is represented by a dendritic structure that is composed of several phases. In FIG. 6a, the backscattered SEM image shows the dendritic arms that are shown in dark contrast while the matrix phase is in bright contrast. Note that small casting pores are found as exhibited (black holes) in the SEM micrograph. TEM studies show that the matrix phase is primarily austenite (gamma-Fe) with stacking faults (FIG. 6b). The presence of stacking faults indicates a face-centered-cubic structure (austenite). TEM also suggests that other phases could be formed in the Modal Structure. As shown in FIG. 6c, a dark phase is found that identified as a ferrite phase with body-centered cubic structure (alpha-Fe) according to selected electron diffraction pattern. X-ray diffraction analysis shows that the Modal Structure of the Alloy 1 contains austenite, ferrite, iron manganese compound and some martensite (FIG. 7). Generally, austenite is the dominant phase in the Alloy 1 Modal Structure, but other factors such as the cooling rate during commercial production may influence the formation of secondary phases such as martensite with varying volume fraction.

TABLE 11

X-ray Diffraction Data for Alloy 1 After Solidification (Modal Structure)

| Phases Identified | Phase Details |
|---|---|
| γ - Fe | Structure: Cubic |
|  | Space group #: 225 (Fm3m) |
|  | LP: a = 3.583 Å |
| α - Fe | Structure: Cubic |
|  | Space group #: 229 (Im3m) |
|  | LP: a = 2.876 Å |
| Martensite | Structure: Tetragonal |
|  | Space group #: 139 (I4/mmm) |
|  | LP: a = 2.898 Å |
|  | c = 3.018 Å |
| Iron manganese compound | Structure: Cubic |
|  | Space group #: 225 (Fm3m) |
|  | LP: a = 4.093 Å |

Figure 8:
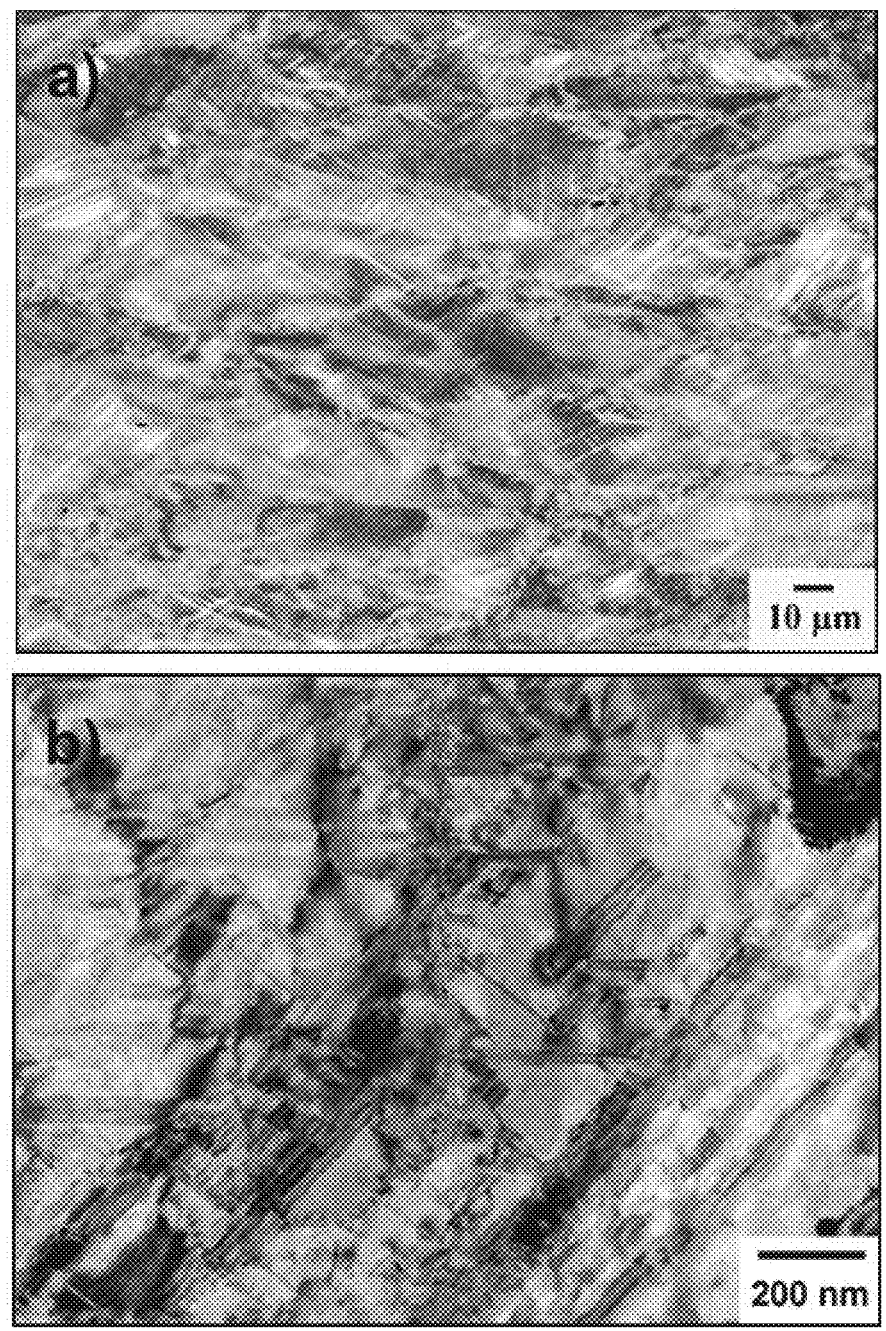
FIG. 8 Microstructure of Alloy 1 after hot rolling to 1.7 mm thickness: a) Backscattered SEM micrograph showing the homogenized and refined Nanomodal Structure, b) Bright-field TEM micrograph showing the details in the matrix grains.
Figure 9:
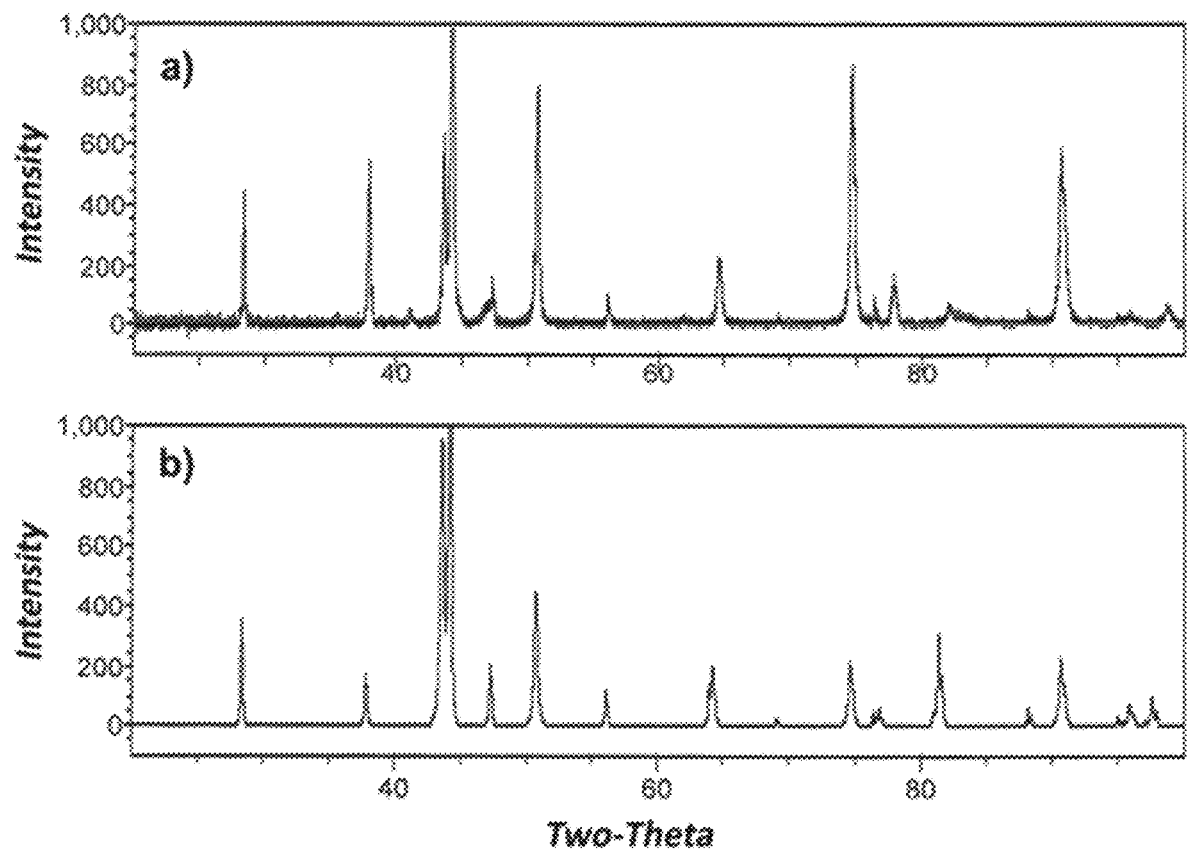
FIG. 9 X-ray diffraction pattern for the Nanomodal Structure in Alloy 1 after hot rolling: a) Experimental data, b) Rietveld refinement analysis.

Deformation of the Alloy 1 with the Modal Structure (Structure #1, FIG. 1A) at elevated temperature induces homogenization and refinement of Modal Structure. Hot rolling was applied in this case but other processes including but not limited to hot pressing, hot forging, hot extrusion can achieve the similar effect. During hot rolling, the dendrites in the Modal Structure are broken up and refined, leading initially to the Homogenized Modal Structure (Structure #1a, FIG. 1A) formation. The refinement during the hot rolling occurs through the Nanophase Refinement (Mechanism #1, FIG. 1A) along with dynamic recrystallization. The Homogenized Modal Structure can be progressively refined by applying the hot rolling repetitively, leading to the Nanomodal Structure (Structure #2, FIG. 1A) formation. FIG. 8a shows the backscattered SEM micrograph of Alloy 1 after being hot rolled from 50 mm to ~1.7 mm at 1250° C. It can be seen that blocks of tens of microns in size are resulted from the dynamic recrystallization during the hot rolling, and the interior of the grains is relatively smooth indicating less amount of defects. TEM further reveals that sub-grains of less than several hundred nanometers in size are formed, as shown in FIG. 8b. X-ray diffraction analysis shows that the Nanomodal Structure of the Alloy 1 after hot rolling contains mainly austenite, with other phases such as ferrite and the iron manganese compound as shown in FIG. 9 and Table 12.

TABLE 12

X-ray Diffraction Data for Alloy 1 After Hot Rolling (Nanomodal Structure)

| Phases Identified | Phase Details |
| --- | --- |
| γ - Fe | Structure: Cubic<br>Space group #: 225 (Fm3m)<br>LP: a = 3.595 Å |
| α - Fe | Structure: Cubic<br>Space group #: 229 (Im3m)<br>LP: a = 2.896 Å |
| Iron manganese compound | Structure: Cubic<br>Space group #: 225 (Fm3m)<br>LP: a = 4.113 Å |

Figure 10:
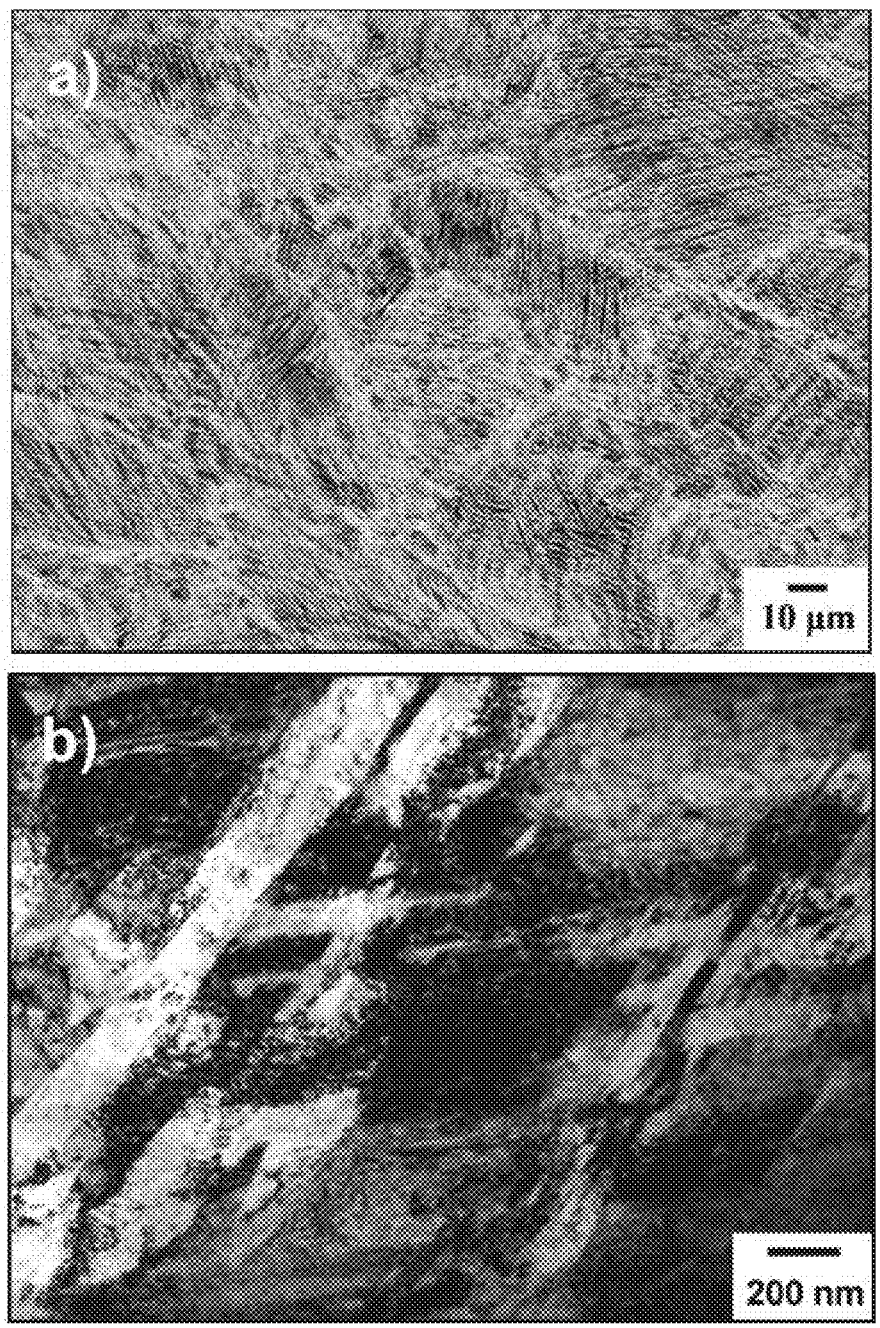
FIG. 10 Microstructure of Alloy 1 after cold rolling to 1.2 mm thickness: a) Backscattered SEM micrograph showing the High Strength Nanomodal Structure after cold rolling, b) Bright-field TEM micrograph showing the details in the matrix grains.
Figure 11:
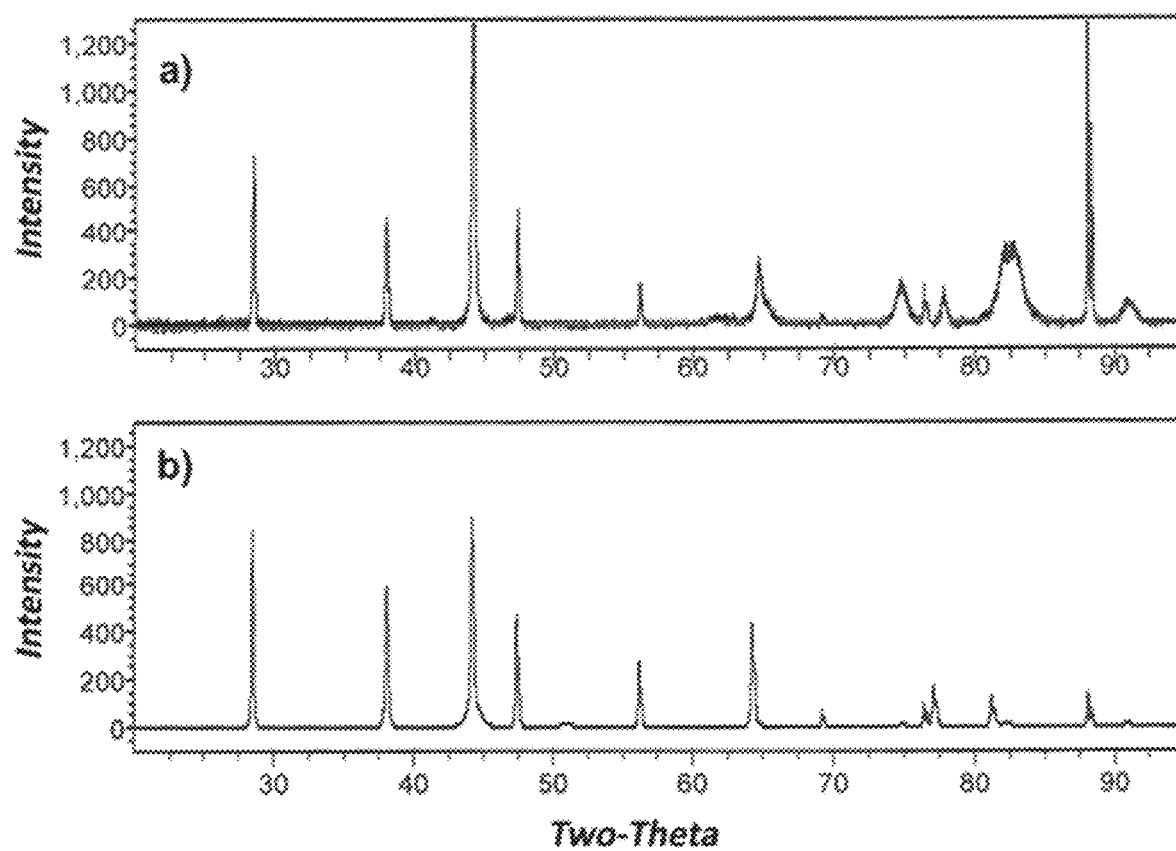
FIG. 11 X-ray diffraction pattern for the High Strength Nanomodal Structure in Alloy 1 after cold rolling: a) Experimental data, b) Rietveld refinement analysis.

Further deformation at ambient temperature (i.e., cold deformation) of the Alloy 1 with the Nanomodal Structure causes transformation into High Strength Nanomodal Structure (Structure #3, FIG. 1A) through the Dynamic Nanophase Strengthening (Mechanism #2, FIG. 1A). The cold deformation can be achieved by cold rolling and, tensile deformation, or other type of deformation such as punching, extrusion, stamping, etc. During the cold deformation, depending on alloy chemistries, a large portion of austenite in the Nanomodal Structure is transformed to ferrite with grain refinement. FIG. 10a shows the backscattered SEM micrograph of cold rolled Alloy 1. Compared to the smooth grains in the Nanomodal Structure after hot rolling, the cold deformed grains are rough indicating severe plastic deformation within the grains. Depending on alloy chemistry, deformation twins can be produced in some alloys especially by cold rolling, as displayed in FIG. 10a. FIG. 10b shows the TEM micrograph of the microstructure in cold rolled Alloy 1. It can be seen that in addition to dislocations generated by the deformation, refined grains due to phase transformation can also be found. The banded structure is related to the deformation twins caused by the cold rolling, corresponding to these in FIG. 10a. X-ray diffraction shows that the High Strength Nanomodal Structure of the Alloy 1 after cold rolling contains a significant amount of ferrite phase in addition to the retained austenite and the iron manganese compound as shown in FIG. 11 and Table.

TABLE 13

X-ray Diffraction Data for Alloy 1 after Cold Rolling (High Strength Nanomodal Structure)

| Phases Identified | Phase Details |
| --- | --- |
| γ - Fe | Structure: Cubic<br>Space group #: 225 (Fm3m)<br>LP: a = 3.588 Å |
| α - Fe | Structure: Cubic<br>Space group #: 229 (Im3m)<br>LP: a = 2.871 Å |
| Iron manganese compound | Structure: Cubic<br>Space group #: 225 (Fm3m)<br>LP: a = 4.102 Å |

Figure 12:
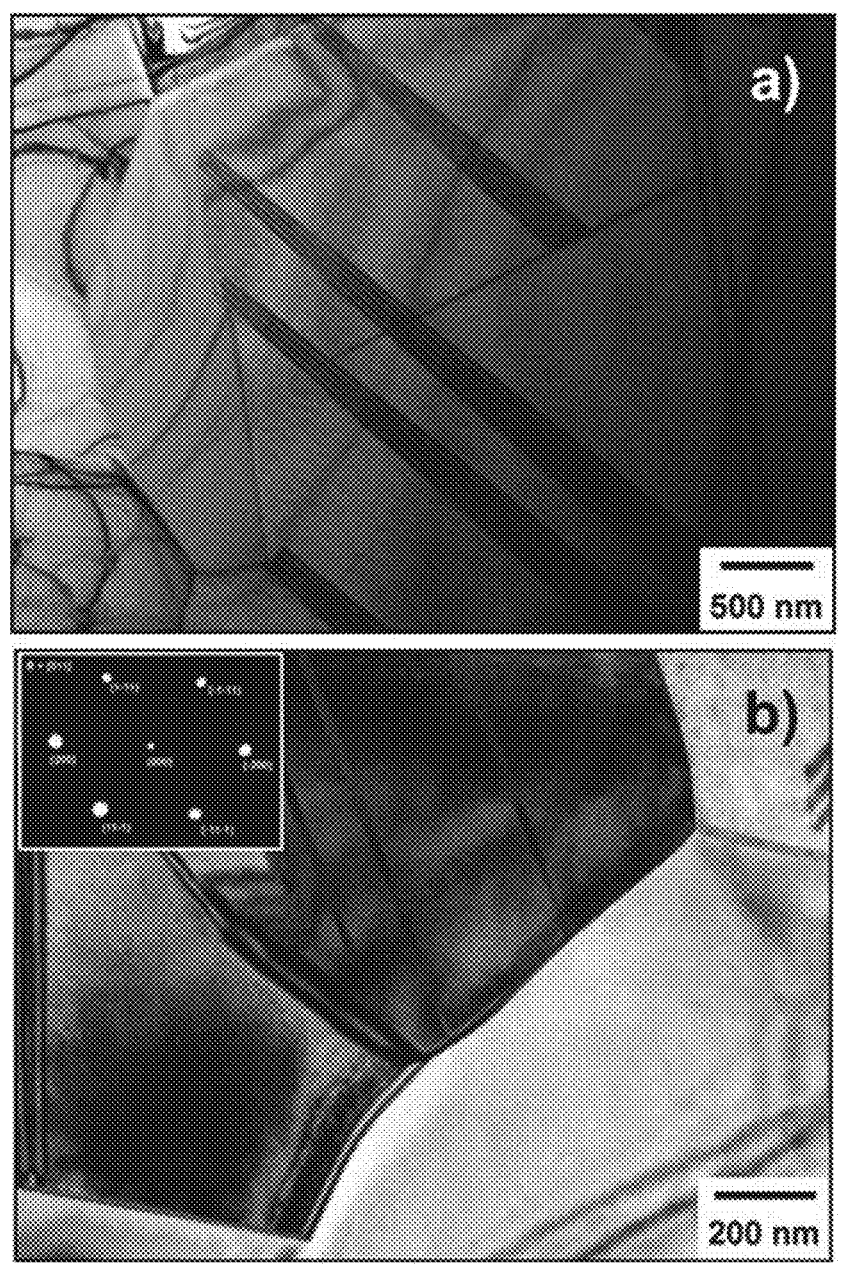
FIG. 12 Bright-field TEM micrographs of microstructure in Alloy 1 after hot rolling, cold rolling and annealing at 850° C. for 5 min exhibiting the Recrystallized Modal Structure: a) Low magnification image, b) High magnification image with selected electron diffraction pattern showing crystal structure of austenite phase.
Figure 13:
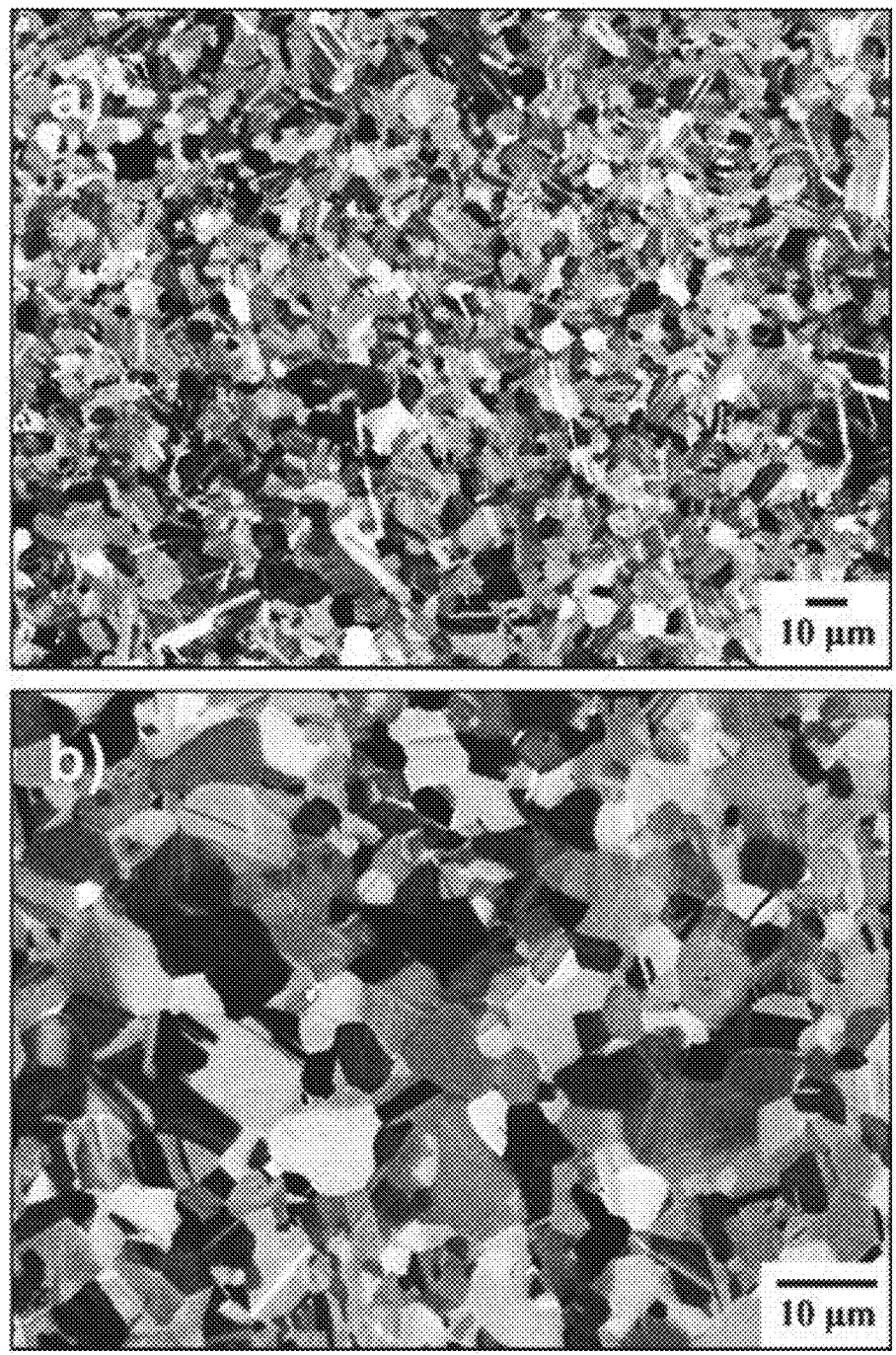
FIG. 13 Backscattered SEM micrographs of microstructure in Alloy 1 after hot rolling, cold rolling and annealing at 850° C. for 5 min exhibiting the Recrystallized Modal Structure: a) Low magnification image, b) High magnification image.
Figure 14:
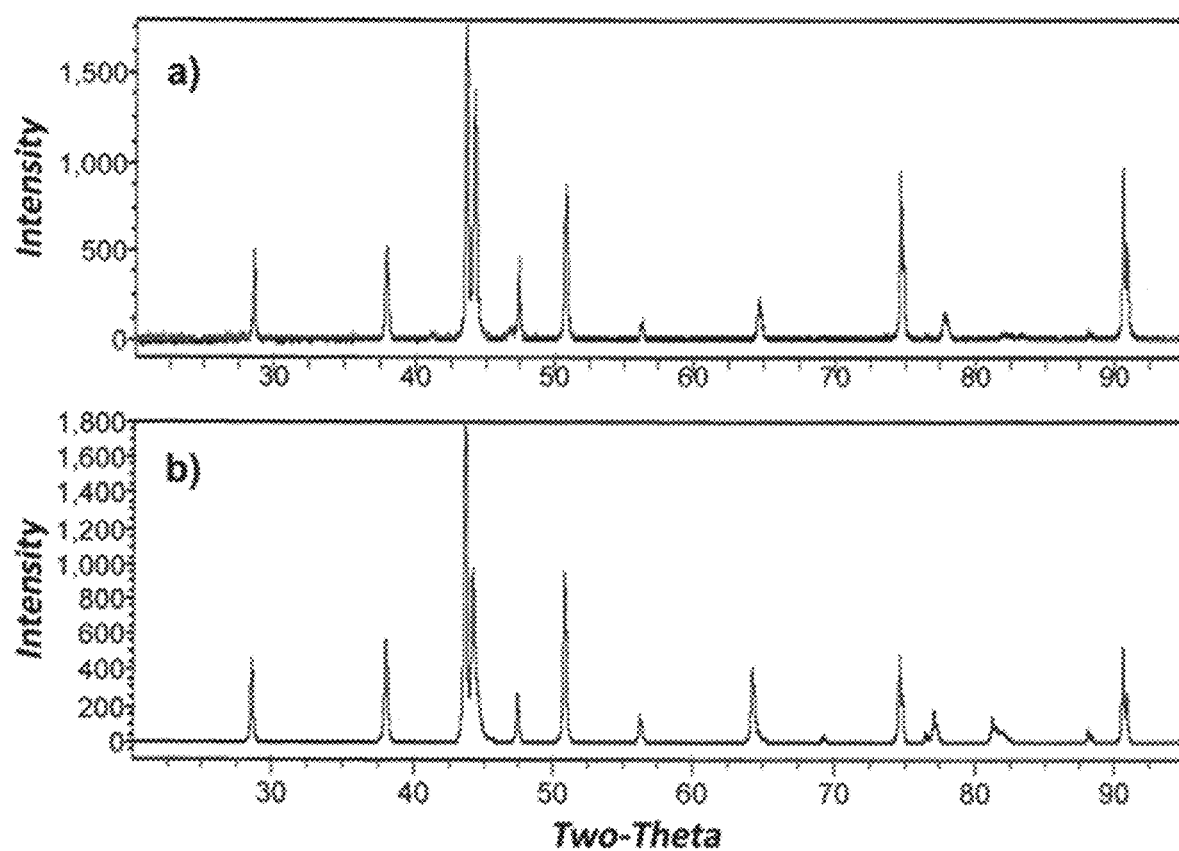
FIG. 14 X-ray diffraction pattern for the Recrystallized Modal Structure in Alloy 1 after annealing: a) Experimental data, b) Rietveld refinement analysis.

Recrystallization occurs upon heat treatment of the cold deformed Alloy 1 with High Strength Nanomodal Structure (Structure #3, FIGS. 1A and 1B) that transforms into Recrystallized Modal Structure (Structure #4, FIG. 1B). The TEM images of the Alloy 1 after annealing are shown in, FIG. 12. As it can be seen, equiaxed grains with sharp and straight boundaries are present in the structure and the grains are free of dislocations, which is characteristic feature of recrystallization. Depending on the annealing temperature, the size of recrystallized grains can range from 0.5 to 50 μm. In addition, as shown in electron diffraction shows that austenite is the dominant phase after recrystallization. Annealing twins are occasionally found in the grains, but stacking faults are most often seen. The formation of stacking faults shown in the TEM image is typical for face-centered-cubic crystal structure of austenite. Backscattered SEM micrographs in FIG. 13 show the equiaxed recrystallized grains with the size of less than 10 μm, consistent with TEM. The different contrast of grains (dark or bright) seen on SEM images suggests that the crystal orientation of the grains is random, since the contrast in this case is mainly originated from the grain orientation. As a result, any texture formed by the previous cold deformation is eliminated. X-ray diffraction shows that the Recrystallized Modal Structure of the Alloy 1 after annealing contains primarily austenite phase, with a small amount of ferrite and the iron manganese compound as shown in FIG. 14 and Table 14.

TABLE 14

X-ray Diffraction Data for Alloy 1 After Annealing (Recrystallized Modal Structure)

| Phases Identified | Phase Details |
| --- | --- |
| γ - Fe | Structure: Cubic<br>Space group #: 225 (Fm3m)<br>LP: a = 3.597 Å |
| α - Fe | Structure: Cubic<br>Space group #: 229 (Im3m)<br>LP: a = 2.884 Å |
| Iron manganese compound | Structure: Cubic<br>Space group #: 225 (Fm3m)<br>LP: a = 4.103 Å |

Figure 15:
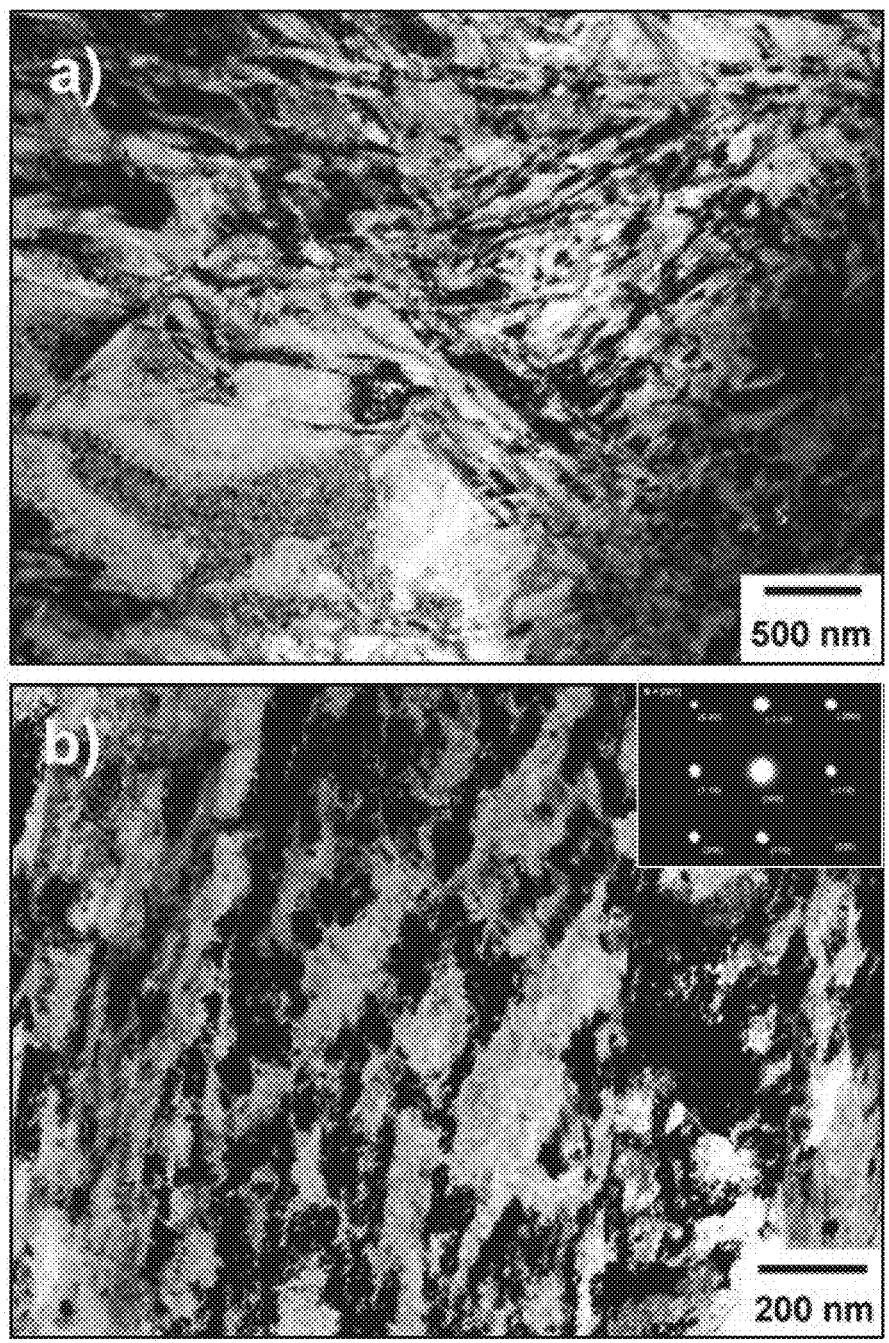
FIG. 15 Bright-field TEM micrographs of microstructure in Alloy 1 showing Refined High Strength Nanomodal Structure (Mixed Microconstituent Structure) formed after tensile deformation: a) Large grains of untransformed structure and transformed "pockets" with refined grains; b) Refined structure within a "pocket".
Figure 16:
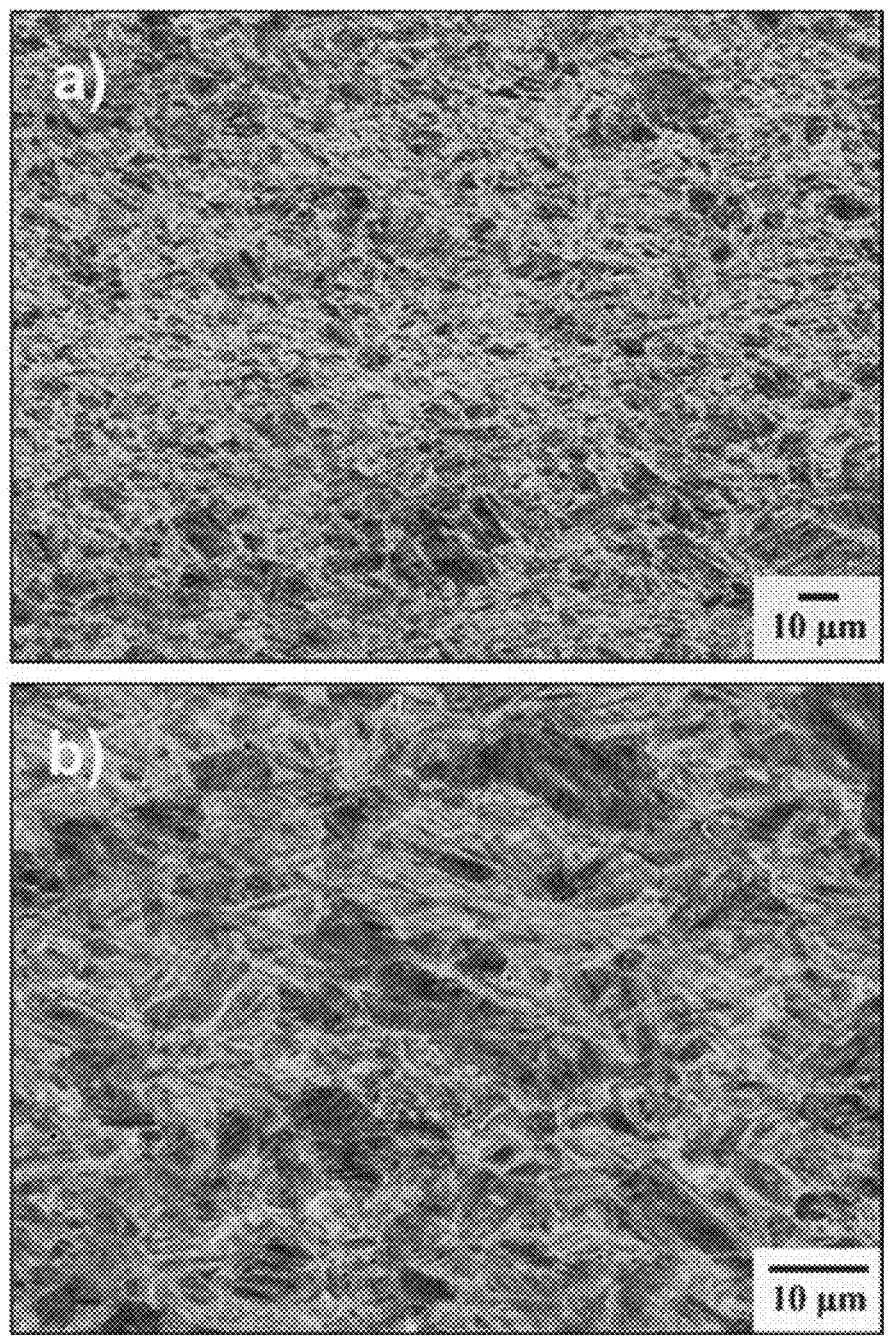
FIG. 16 Backscattered SEM micrographs of microstructure in Alloy 1 showing Refined High Strength Nanomodal Structure (Mixed Microconstituent Structure): a) Low magnification image, b) High magnification image.
Figure 17:
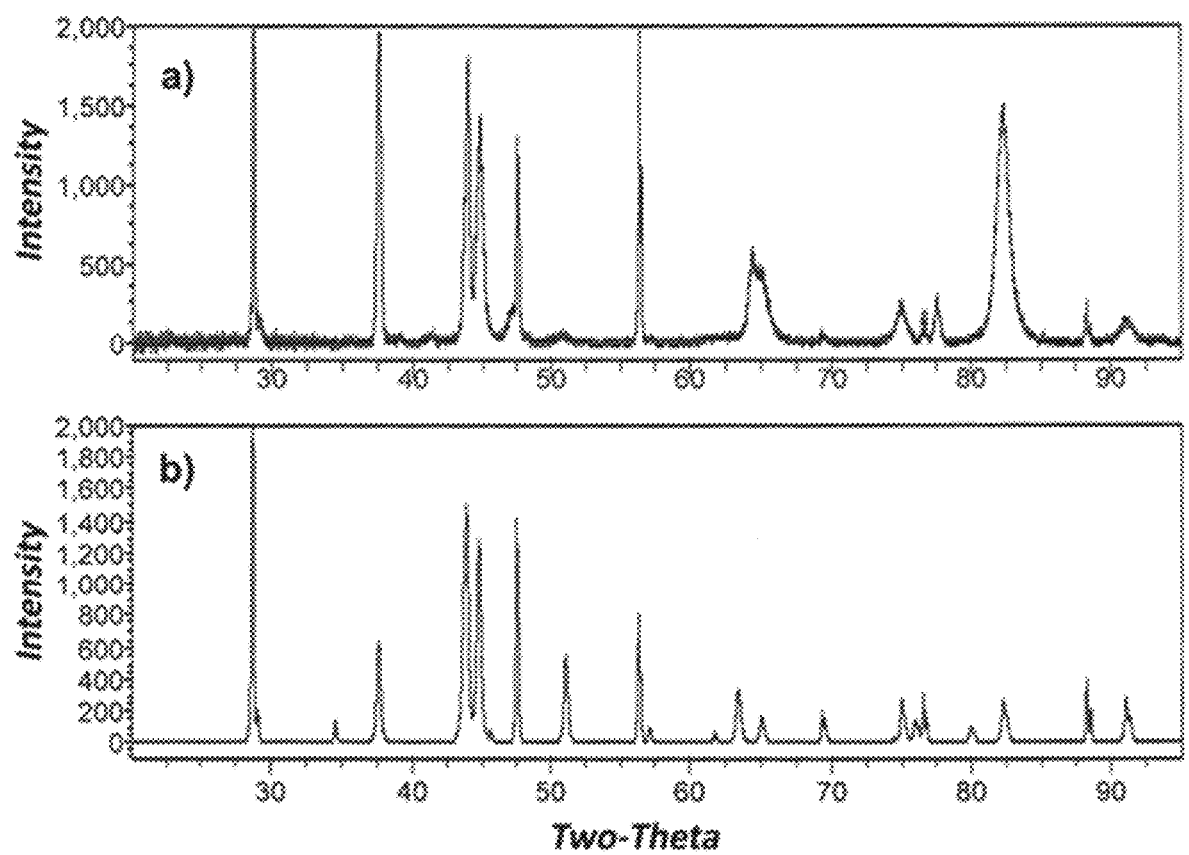
FIG. 17 X-ray diffraction pattern for Refined High Strength Nanomodal Structure in Alloy 1 after cold deformation: a) Experimental data, b) Rietveld refinement analysis.

When the Alloy 1 with Recrystallized Modal Structure (Structure #4, FIG. 1B) is subjected to deformation at ambient temperature, Nanophase Refinement & Strengthening (Mechanism #4, FIG. 1B) is activated leading to formation of the Refined High Strength Nanomodal Structure (Structure #5, FIG. 1B). In this case, deformation was a result of tensile testing and gage section of the tensile sample after testing was analyzed. FIG. 15 shows the bright-field TEM micrographs of the microstructure in the deformed Alloy 1. Compared to the matrix grains that were initially almost dislocation-free in the Recrystallized Modal Structure after annealing, the application of stress generates a high density of dislocations within the matrix grains. At the end of tensile deformation (with a tensile elongation greater than 50%), accumulation of large number of dislocations is observed in the matrix grains. As shown in FIG. 15a, in some areas (for example the area at the lower part of the FIG. 15a), dislocations form a cell structure and the matrix remains austenitic. In other areas, where the dislocation density is sufficiently high, transformation is induced from austenite to ferrite (for example the upper and right part of the FIG. 15a) that results in substantial structure refinement. FIG. 15b shows local "pocket" of the transformed refined microstructure and selected area electron diffraction pattern corresponds to ferrite. Structural transformation into Refined High Strength Nanomodal Structure (Structure #5, FIG. 1B) in the randomly distributed "pockets" is a characteristic feature of the steel alloys herein. FIG. 16 shows the backscattered SEM images of the Refined High Strength Nanomodal Structure. Compared to the Recrystallized Modal Structure, the boundaries of matrix grains become less apparent, and the matrix is obviously deformed. Although the details of deformed grains cannot be revealed by SEM, the change caused by the deformation is enormous compared to the Recrystallized Modal Structure that was demonstrated in TEM images. X-ray diffraction shows that the Refined High Strength Nanomodal Structure of the Alloy 1 after tensile deformation contains a significant amount of ferrite and austenite phases. Very broad peaks of ferrite phase (alpha-Fe) are seen in the XRD pattern, suggesting significant refinement of the phase. The iron manganese compound is also present. Additionally, a hexagonal phase with space group #186 ($P6_{3mc}$) was identified in the gage section of the tensile sample as shown in FIG. 17 and Table 15.

TABLE 15

X-ray Diffraction Data for Alloy 1 After Tensile Deformation
(Refined High Strength Nanomodal Structure)

| Phases Identified | Phase Details |
| --- | --- |
| γ - Fe | Structure: Cubic<br>Space group #: 225 (Fm3m)<br>LP: a = 3.586 Å |
| α - Fe | Structure: Cubic<br>Space group #: 229 (Im3m)<br>LP: a = 2.873 Å |
| Iron manganese compound | Structure: Cubic<br>Space group #: 225 (Fm3m)<br>LP: a = 4.159 Å |
| Hexagonal phase 1 | Structure: Hexagonal<br>Space group #: 186 (P6₃mc)<br>LP: a = 3.013 Å,<br>c = 6.183 Å |

This Case Example demonstrates that alloys listed in Table 2 including Alloy 1 exhibit a structural development pathway with novel enabling mechanisms illustrated in FIGS. 1A and 1B leading to unique microstructures with nanoscale features.

Case Example #2 Structural Development Pathway in Alloy 2

Laboratory slab with thickness of 50 mm was cast from Alloy 2 that was then laboratory processed by hot rolling, cold rolling and annealing at 850° C. for 10 min as described in Main Body section of current application. Microstructure of the alloy was examined at each step of processing by SEM, TEM and x-ray analysis.

For SEM study, the cross section of the slab samples was ground on SiC abrasive papers with reduced grit size, and then polished progressively with diamond media paste down to 1 μm. The final polishing was done with 0.02 μm grit $SiO_2$ solution. Microstructures were examined by SEM using an EVO-MA10 scanning electron microscope manufactured by Carl Zeiss SMT Inc. To prepare TEM specimens, the samples were first cut with EDM, and then thinned by grinding with pads of reduced grit size every time. Further thinning to make foils to ~60 μm thickness was done by polishing with 9 μm, 3 μm and 1 μm diamond suspension solution respectively. Discs of 3 mm in diameter were punched from the foils and the final polishing was fulfilled with electropolishing using a twin-jet polisher. The chemical solution used was a 30% nitric acid mixed in methanol base. In case of insufficient thin area for TEM observation, the TEM specimens may be ion-milled using a Gatan Precision Ion Polishing System (PIPS). The ion-milling usually is done at 4.5 keV, and the inclination angle is reduced from 4° to 2° to open up the thin area. The TEM studies were done using a JEOL 2100 high-resolution microscope operated at 200 kV. X-ray diffraction was done using a Panalytical X'Pert MPD diffractometer with a Cu Kα x-ray tube and operated at 45 kV with a filament current of 40 mA. Scans were run with a step size of 0.01° and from 25° to 95° two-theta with silicon incorporated to adjust for instrument zero angle shift. The resulting scans were then subsequently analyzed using Rietveld analysis using Siroquant software.

Figure 18:
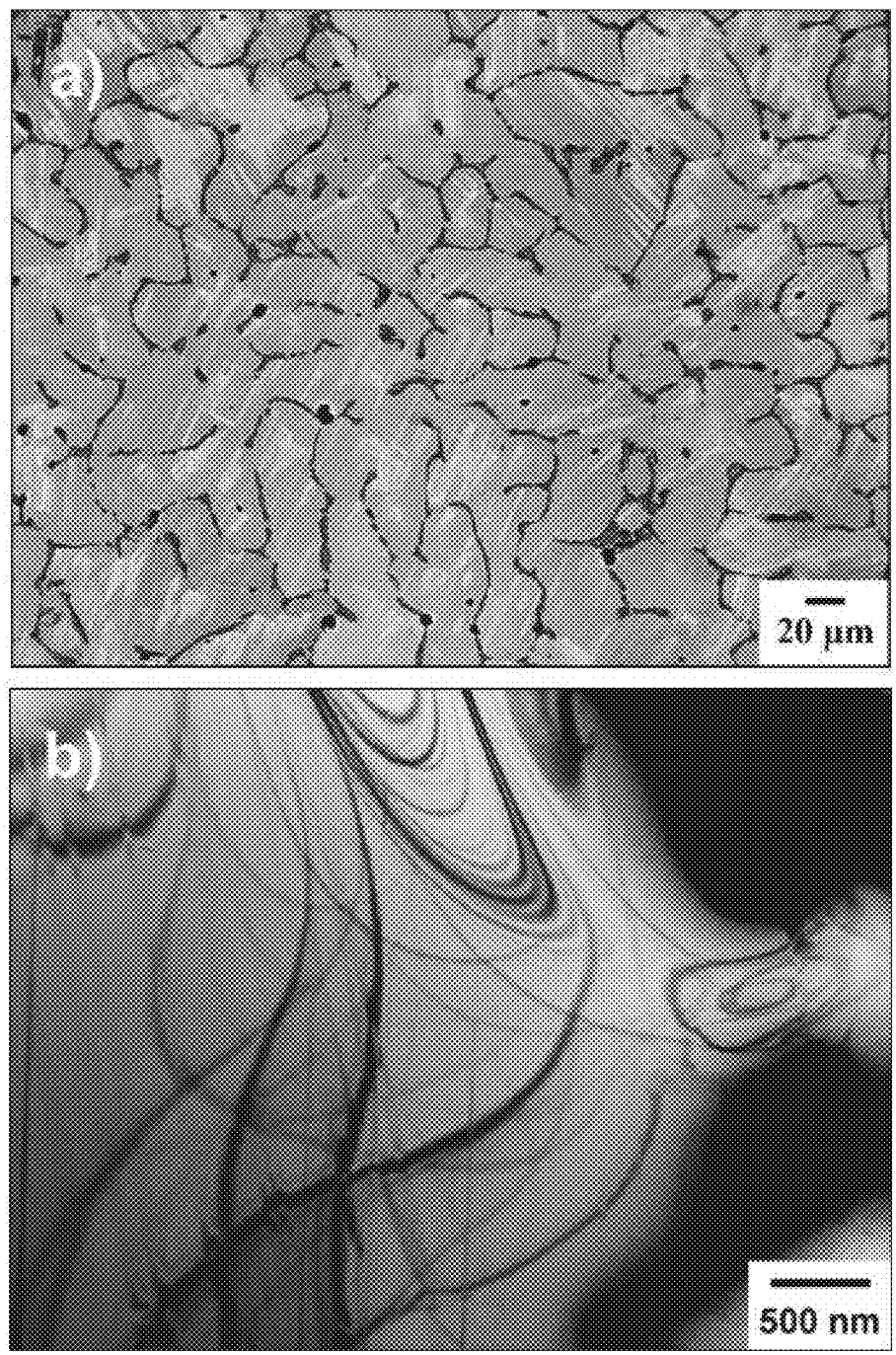
FIG. 18 Microstructure of solidified Alloy 2 cast at 50 mm thickness: a) Backscattered SEM micrograph showing the dendritic nature of the Modal Structure in the as-cast state, b) Bright-field TEM micrograph showing the details in the matrix grains.
Figure 19:
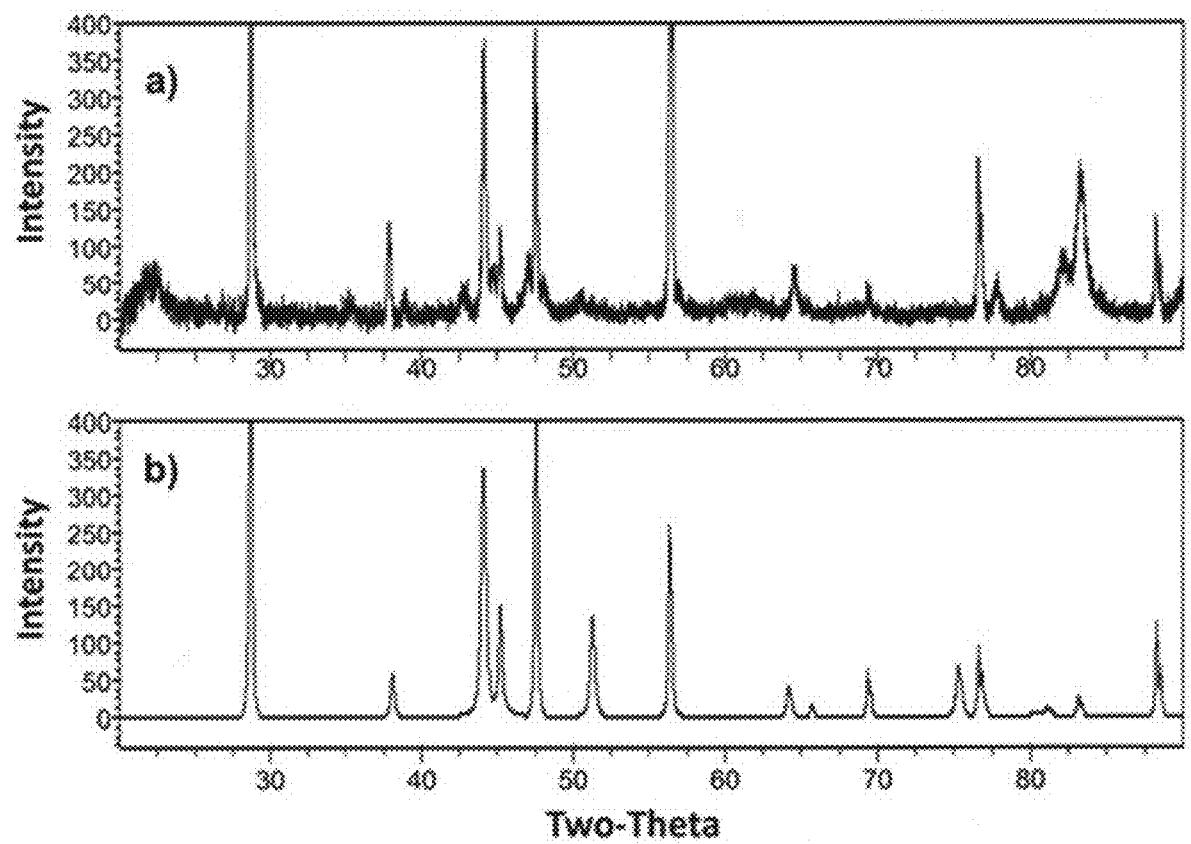
FIG. 19 X-ray diffraction pattern for the Modal Structure in Alloy 2 after solidification: a) Experimental data, b) Rietveld refinement analysis.

Modal Structure (Structure #1, FIG. 1A) is formed in Alloy 2 slab cast at 50 mm thick, which is characterized by dendritic structure. Due to the presence of a boride phase ($M_2B$), the dendritic structure is more evident than in Alloy 1 where borides are absent. FIG. 18a shows the backscattered SEM of Modal Structure that exhibits a dendritic matrix (in bright contrast) with borides at the boundary (in dark contrast). TEM studies show that the matrix phase is composed of austenite (gamma-Fe) with stacking faults (FIG. 18b). Similar to Alloy 1, the presence of stacking faults indicates the matrix phase is austenite. Also shown in TEM is the boride phase that appears dark in. FIG. 18b at the boundary of austenite matrix phase. X-ray diffraction analysis data in. FIG. 19 and Table 16 shows that the Modal Structure contains austenite, $M_2B$, ferrite, and iron manganese compound. Similar to Alloy 1, austenite is the dominant phase in the Alloy 2 Modal Structure, but other phases may be present depending on alloy chemistry.

TABLE 16

X-ray Diffraction Data for Alloy 2 After Solidification
(Modal Structure)

| Phases Identified | Phase Details |
| --- | --- |
| γ - Fe | Structure: Cubic<br>Space group #: 225 (Fm3m)<br>LP: a = 3.577 Å |
| α - Fe | Structure: Cubic<br>Space group #: 229 (Im3m)<br>LP: a = 2.850 Å |
| $M_2B$ | Structure: Tetragonal<br>Space group #: 140 (I4/mcm)<br>LP: a = 5.115 Å,<br>c = 4.226 Å |
| Iron manganese compound | Structure: Cubic<br>Space group #: 225 (Fm3m)<br>LP: a = 4.116 Å |

Figure 20:
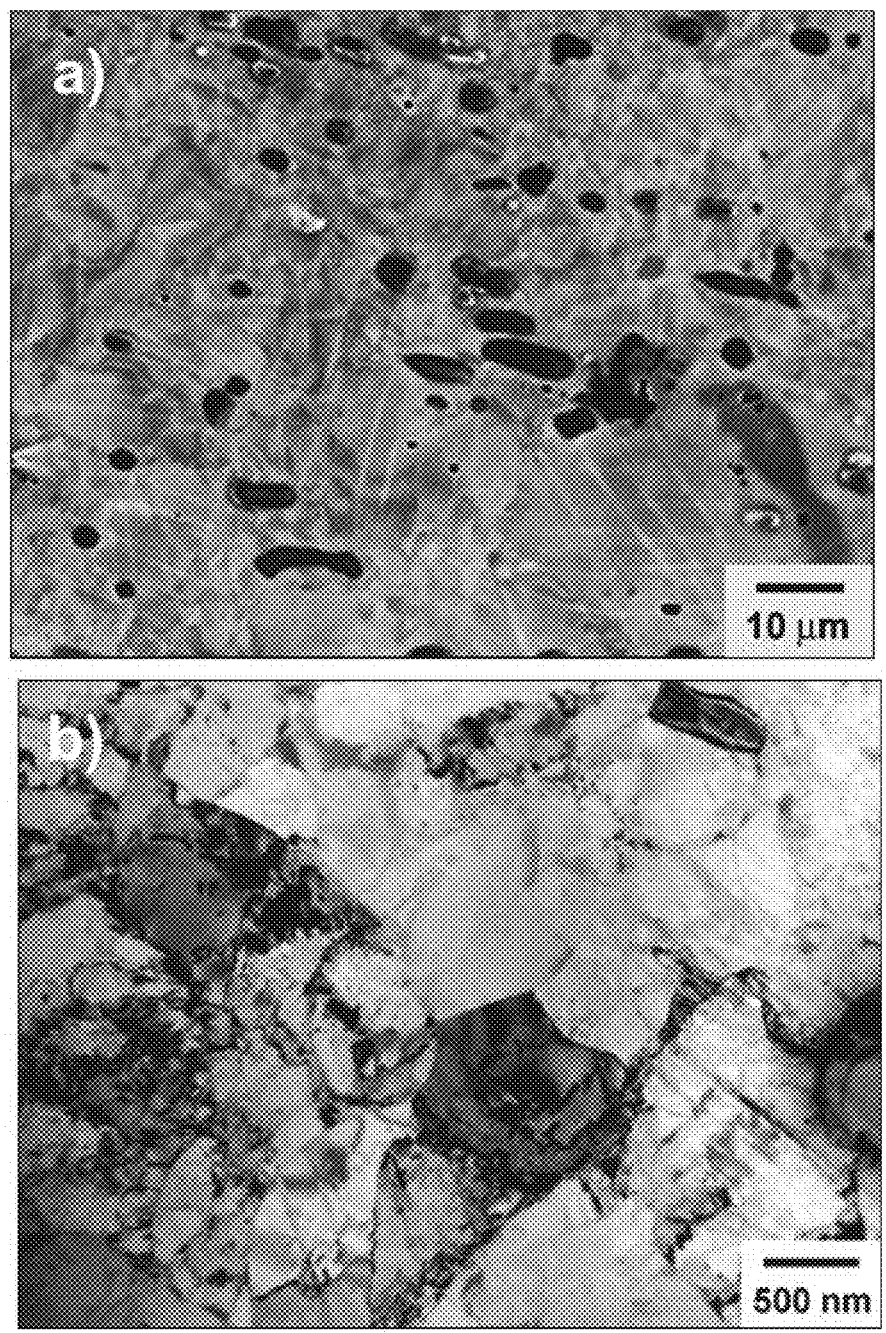
FIG. 20 Microstructure of Alloy 2 after hot rolling to 1.7 mm thickness: a) Backscattered SEM micrograph showing the homogenized and refined Nanomodal Structure, b) Bright-field TEM micrograph showing the details in the matrix grains.
Figure 21:
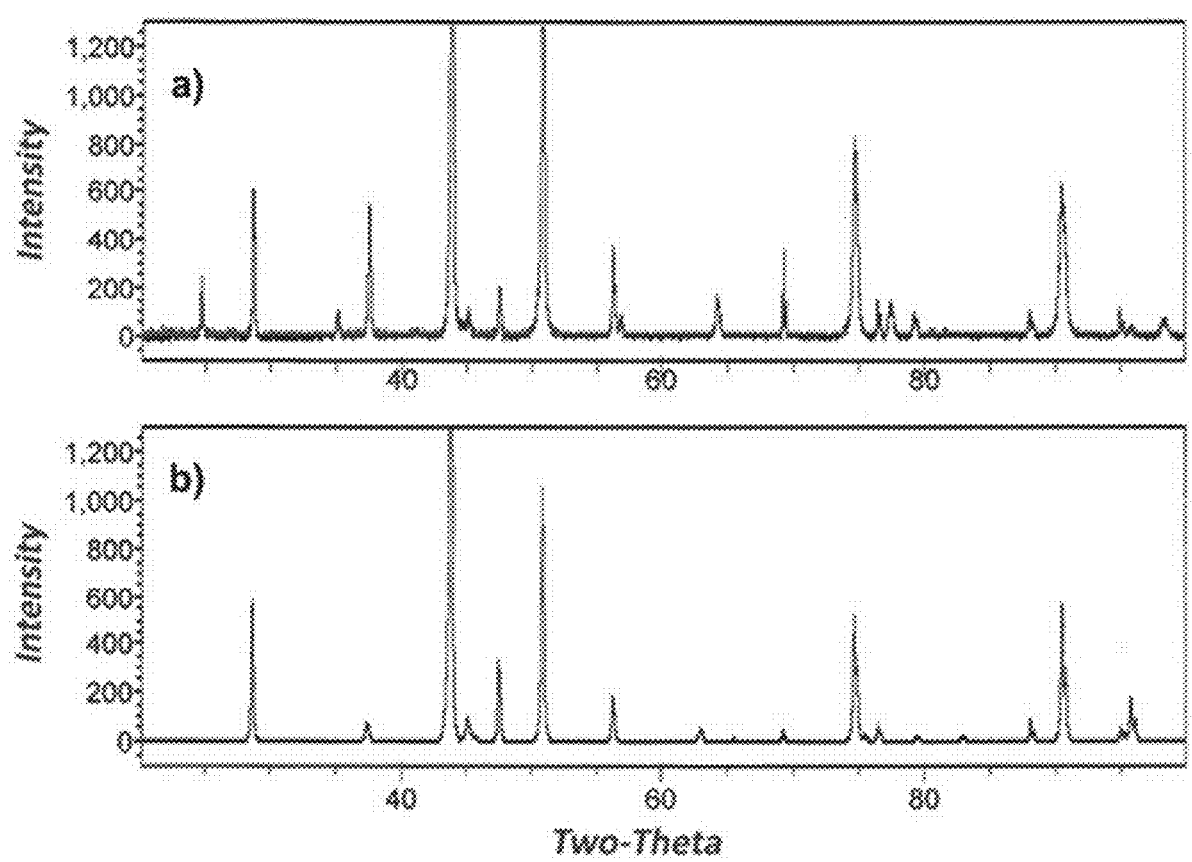
FIG. 21 X-ray diffraction pattern for the Nanomodal Structure in Alloy 2 after hot rolling: a) Experimental data, b) Rietveld refinement analysis.

Following the flowchart in FIG. 1A, deformation of the Alloy 2 with the Modal Structure (Structure #1, FIG. 1A) at elevated temperature induces homogenization and refinement of Modal Structure. Hot rolling was applied in this case but other processes including but not limited to hot pressing, hot forging, hot extrusion can achieve a similar effect. During the hot rolling, the dendrites in the Modal Structure are broken up and refined, leading initially to the Homogenized Modal Structure (Structure #1a, FIG. 1A) formation. The refinement during the hot rolling occurs through the Nanophase Refinement (Mechanism #1, FIG. 1A) along with dynamic recrystallization. The Homogenized Modal Structure can be progressively refined by applying the hot rolling repetitively, leading to the Nanomodal Structure (Structure #2, FIG. 1A) formation. FIG. 20a shows the backscattered SEM micrograph of hot rolled Alloy 2. Similar to Alloy 1, the dendritic Modal Structure is homogenized while the boride phase is randomly distributed in the matrix. TEM shows that the matrix phase is partially recrystallized as a result of dynamic recrystallization during hot rolling, as shown in FIG. 20b. The matrix grains are on the order of 500 nm, which is finer than in Alloy 1 due to the pinning effect of borides. X-ray diffraction analysis shows that the Nanomodal Structure of Alloy 2 after hot rolling contains mainly austenite phase and $M_2B$, with other phases such as ferrite and iron manganese compound as shown in FIG. 21 and Table 17.

TABLE 17

X-ray Diffraction Data for Alloy 2 After Hot Rolling (Nanomodal Structure)

| Phases Identified | Phase Details |
|---|---|
| $\gamma$ - Fe | Structure: Cubic<br>Space group #: 225 (Fm3m)<br>LP: a = 3.598 Å |
| $\alpha$ - Fe | Structure: Cubic<br>Space group #: 229 (Im3m)<br>LP: a = 2.853 Å |
| $M_2B$ | Structure: Tetragonal<br>Space group #: 140 (I4/mcm)<br>LP: a = 5.123 Å,<br>c = 4.182 Å |
| Iron manganese compound | Structure: Cubic<br>Space group #: 225 (Fm3m)<br>LP: a = 4.180 Å |

Figure 22:
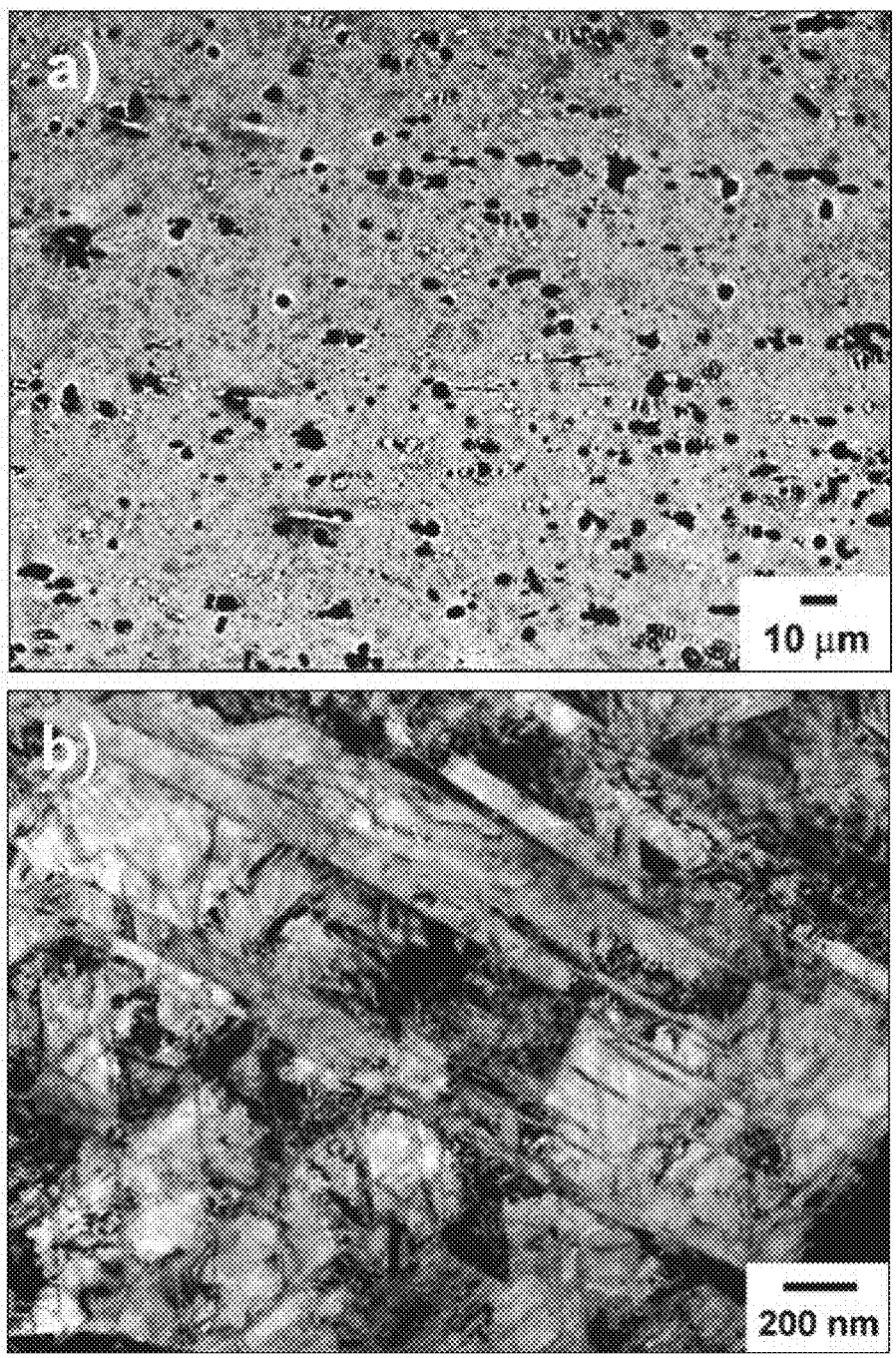
FIG. 22 Microstructure of Alloy 2 after cold rolling to 1.2 mm thickness: a) Backscattered SEM micrograph showing the High Strength Nanomodal Structure after cold rolling, b) Bright-field TEM micrograph showing the details in the matrix grains.
Figure 23:
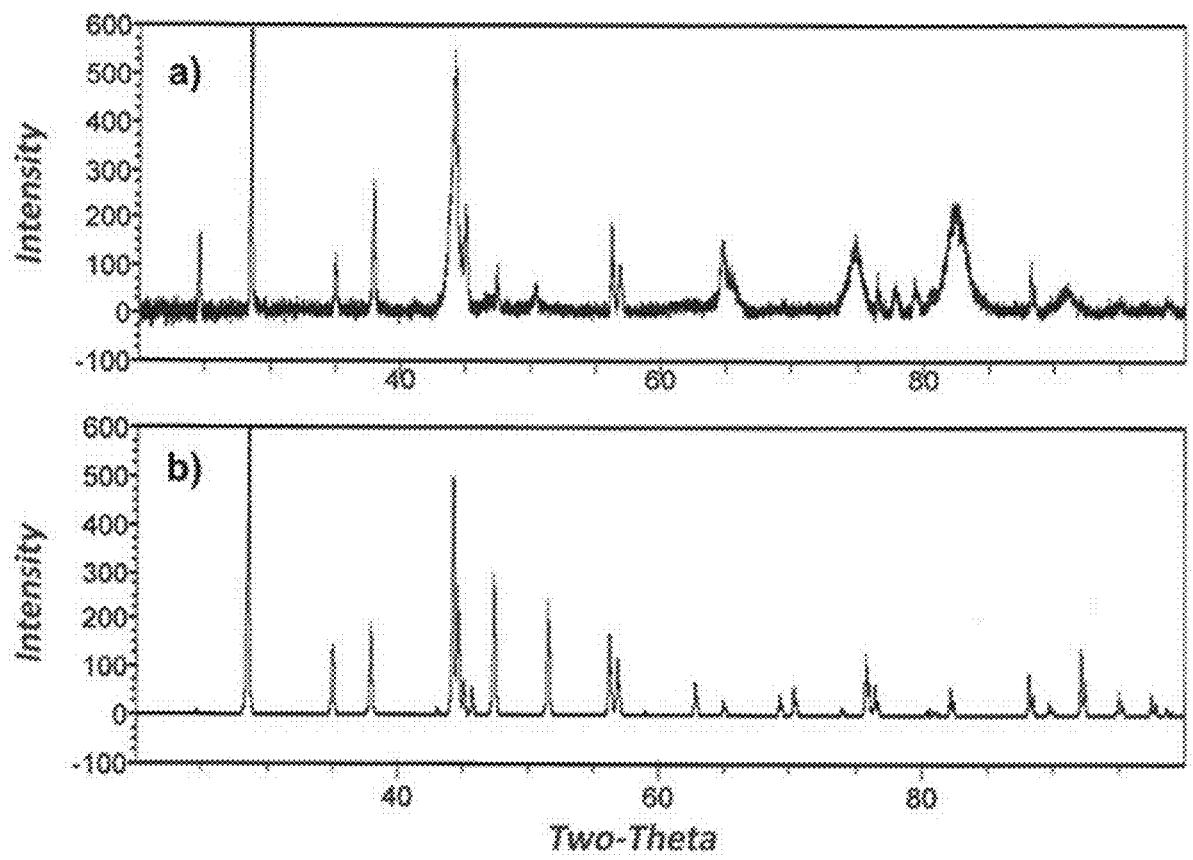
FIG. 23 X-ray diffraction pattern for the High Strength Nanomodal Structure in Alloy 2 after cold rolling: a) Experimental data, b) Rietveld refinement analysis.

Deformation of the Alloy 2 with the Nanomodal Structure but at ambient temperature (i.e., cold deformation) leads to formation of High Strength Nanomodal Structure (Structure #3, FIG. 1A) through the Dynamic Nanophase Strengthening (Mechanism #2, FIG. 1A). The cold deformation can be achieved by cold rolling, tensile deformation, or other type of deformation such as punching, extrusion, stamping, etc. Similarly in Alloy 2 during cold deformation, a great portion of austenite in the Nanomodal Structure is transformed to ferrite with grain refinement. FIG. 22a shows the backscattered SEM micrograph of the microstructure in the cold rolled Alloy 2. Deformation is concentrated in the matrix phase around the boride phase. FIG. 22b shows the TEM micrograph of the cold rolled Alloy 2. Refined grains can be found due to the phase transformation. Although deformation twins are less evident in SEM image, TEM shows that they are generated after the cold rolling, similar to Alloy 1. X-ray diffraction shows that the High Strength Nanomodal Structure of the Alloy 2 after cold rolling contains a significant amount of ferrite phase in addition to the $M_2B$, retained austenite and a new hexagonal phase with space group #186 ($P6_{3mc}$) as shown in FIG. 23 and Table 18.

TABLE 18

X-ray Diffraction Data for Alloy 2 After Cold Rolling (High Strength Nanomodal Structure)

| Phases Identified | Phase Details |
|---|---|
| $\gamma$ - Fe | Structure: Cubic<br>Space group #: 225 (Fm3m)<br>LP: a = 3.551 Å |
| $\alpha$ - Fe | Structure: Cubic<br>Space group #: 229 (Im3m)<br>LP: a = 2.874 Å |

TABLE 18-continued

X-ray Diffraction Data for Alloy 2 After Cold Rolling (High Strength Nanomodal Structure)

| Phases Identified | Phase Details |
|---|---|
| $M_2B$ | Structure: Tetragonal<br>Space group #: 140 (I4/mcm)<br>LP: a = 5.125 Å,<br>c = 4.203 Å |
| Hexagonal phase | Structure: Hexagonal<br>Space group #: 186 ($P6_3mc$)<br>LP: a = 2.962 Å,<br>c = 6.272 Å |

Figure 24:
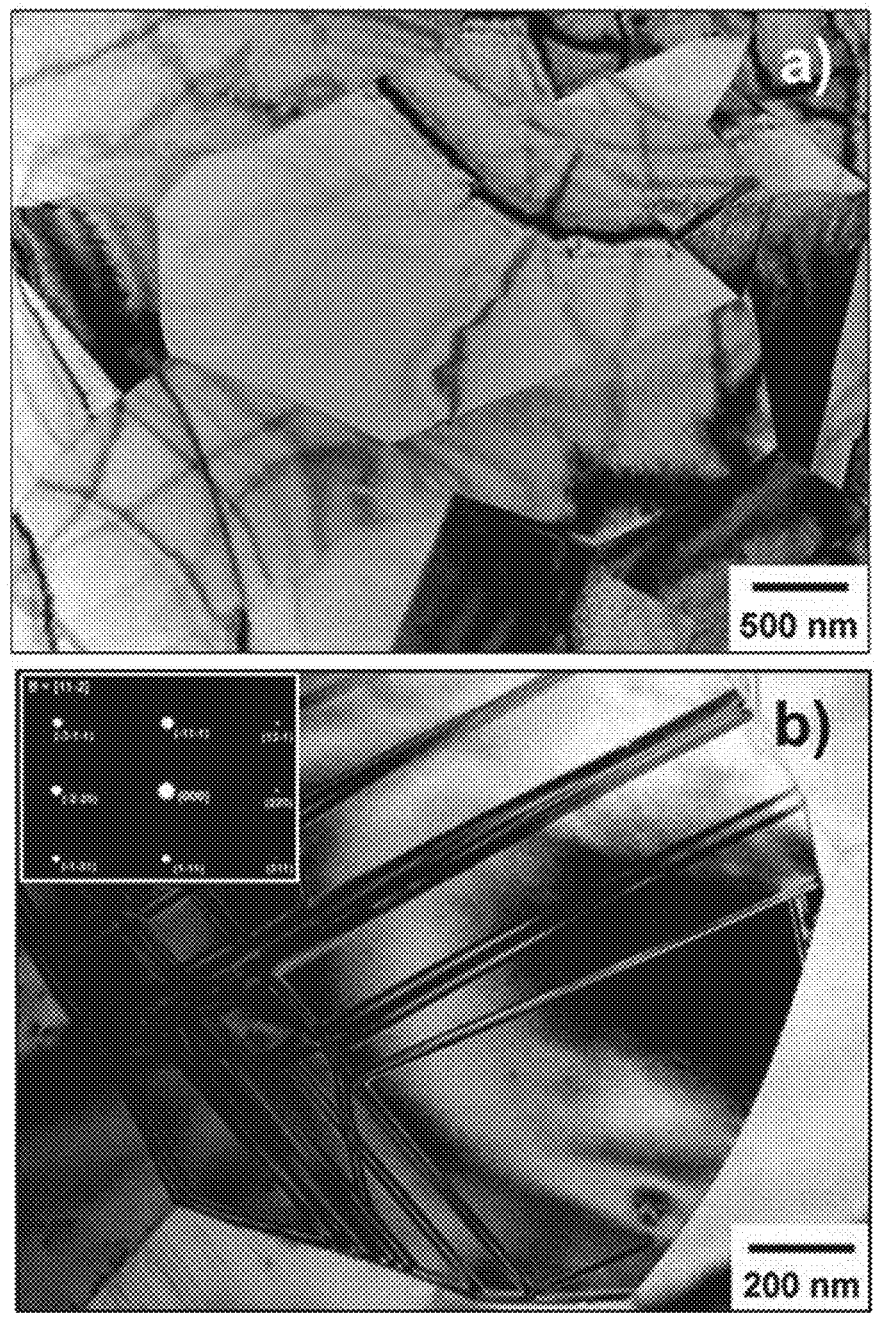
FIG. 24 Bright-field TEM micrographs of microstructure in Alloy 2 after hot rolling, cold rolling and annealing at 850° C. for 10 min exhibiting the Recrystallized Modal Structure: a) Low magnification image, b) High magnification image with selected electron diffraction pattern showing crystal structure of austenite phase.
Figure 25:
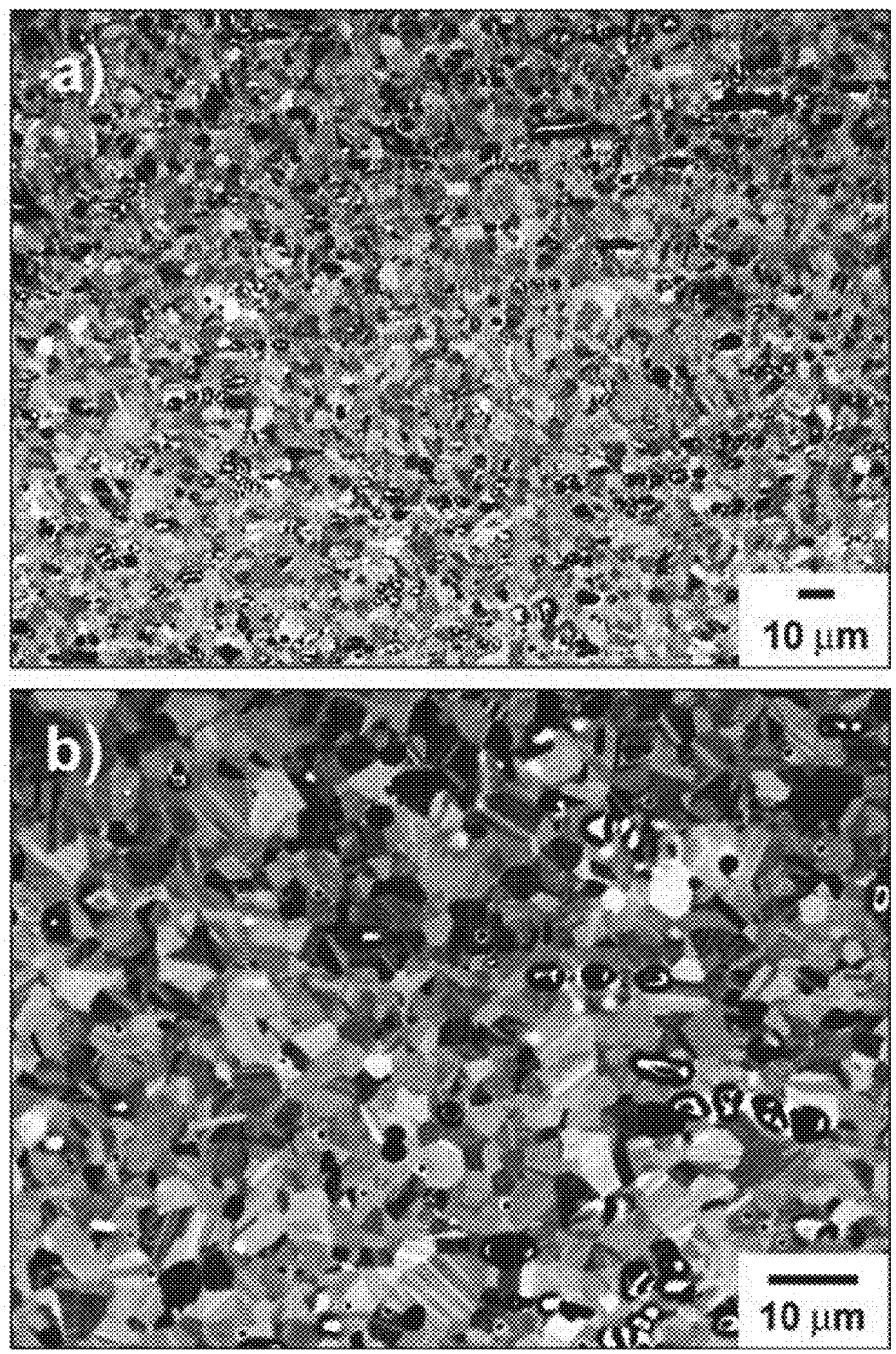
FIG. 25 Backscattered SEM micrographs of microstructure in Alloy 2 after hot rolling, cold rolling and annealing at 850° C. for 10 min exhibiting the Recrystallized Modal Structure: a) Low magnification image, b) High magnification image.
Figure 26:
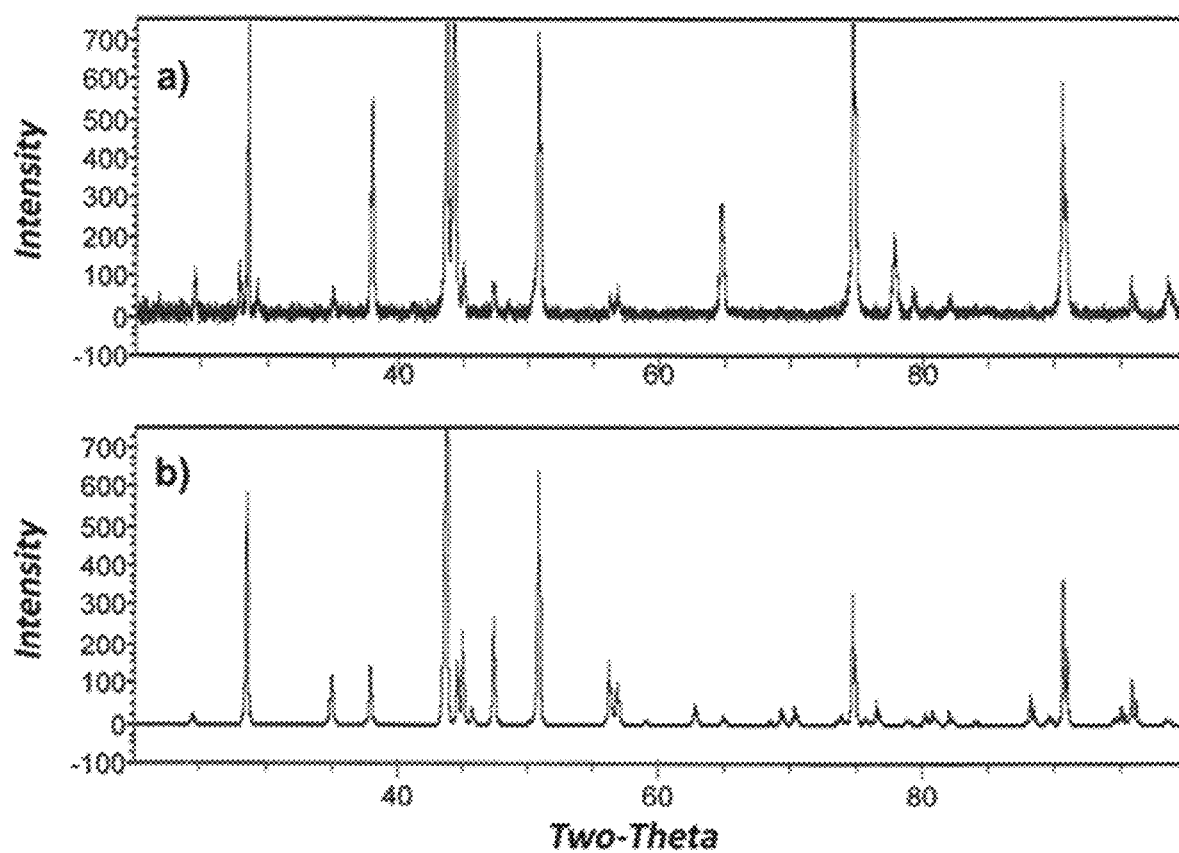
FIG. 26 X-ray diffraction pattern for the Recrystallized Modal Structure in Alloy 2 after annealing: a) Experimental data, b) Rietveld refinement analysis.

Recrystallization occurs upon annealing of the cold deformed Alloy 2 with High Strength Nanomodal Structure (Structure #3, FIGS. 1A and 1B) that transforms into Recrystallized Modal Structure (Structure #4, FIG. 1B). The recrystallized microstructure of the Alloy 2 after annealing is shown by TEM images in FIG. 24. As it can be seen, equiaxed grains with sharp and straight boundaries are present in the structure and the grains are free of dislocations, which is a characteristic feature of recrystallization. The size of recrystallized grains is generally less than 5 μm due to the pinning effect of boride phase, but larger grains are possible at higher annealing temperatures. Moreover, electron diffraction shows that austenite is the dominant phase after recrystallization and stacking faults are present in the austenite, as shown in FIG. 24b. The formation of stacking faults also indicates formation of face-centered-cubic austenite phase. Backscattered SEM micrographs in FIG. 25 show the equiaxed recrystallized grains with the size of less than 5 μm, with boride phase randomly distributed. The different contrast of grains (dark or bright) seen on SEM images suggests that the crystal orientation of the grains is random, since the contrast in this case is mainly originated from the grain orientation. As a result, any texture formed by the previous cold deformation is eliminated. X-ray diffraction shows that the Recrystallized Modal Structure of the Alloy 2 after annealing contains primarily austenite phase, with $M_2B$, a small amount of ferrite, and a hexagonal phase with space group #186 ($P6_{3mc}$) as shown in FIG. 26 and Table 19.

TABLE 19

X-ray Diffraction Data for Alloy 2 After Annealing (Recrystallized Modal Structure)

| Phases Identified | Phase Details |
|---|---|
| $\gamma$ - Fe | Structure: Cubic<br>Space group #: 225 (Fm3m)<br>LP: a = 3.597 Å |
| $\alpha$ - Fe | Structure: Cubic<br>Space group #: 229 (Im3m)<br>LP: a = 2.878 Å |
| $M_2B$ | Structure: Tetragonal<br>Space group #: 140 (I4/mcm)<br>LP: a = 5.153 Å,<br>c = 4.170 Å |
| Hexagonal phase | Structure: Hexagonal<br>Space group #: 186 ($P6_{3mc}$)<br>LP: a = 2.965 Å,<br>c = 6.270 Å |

Figure 27:
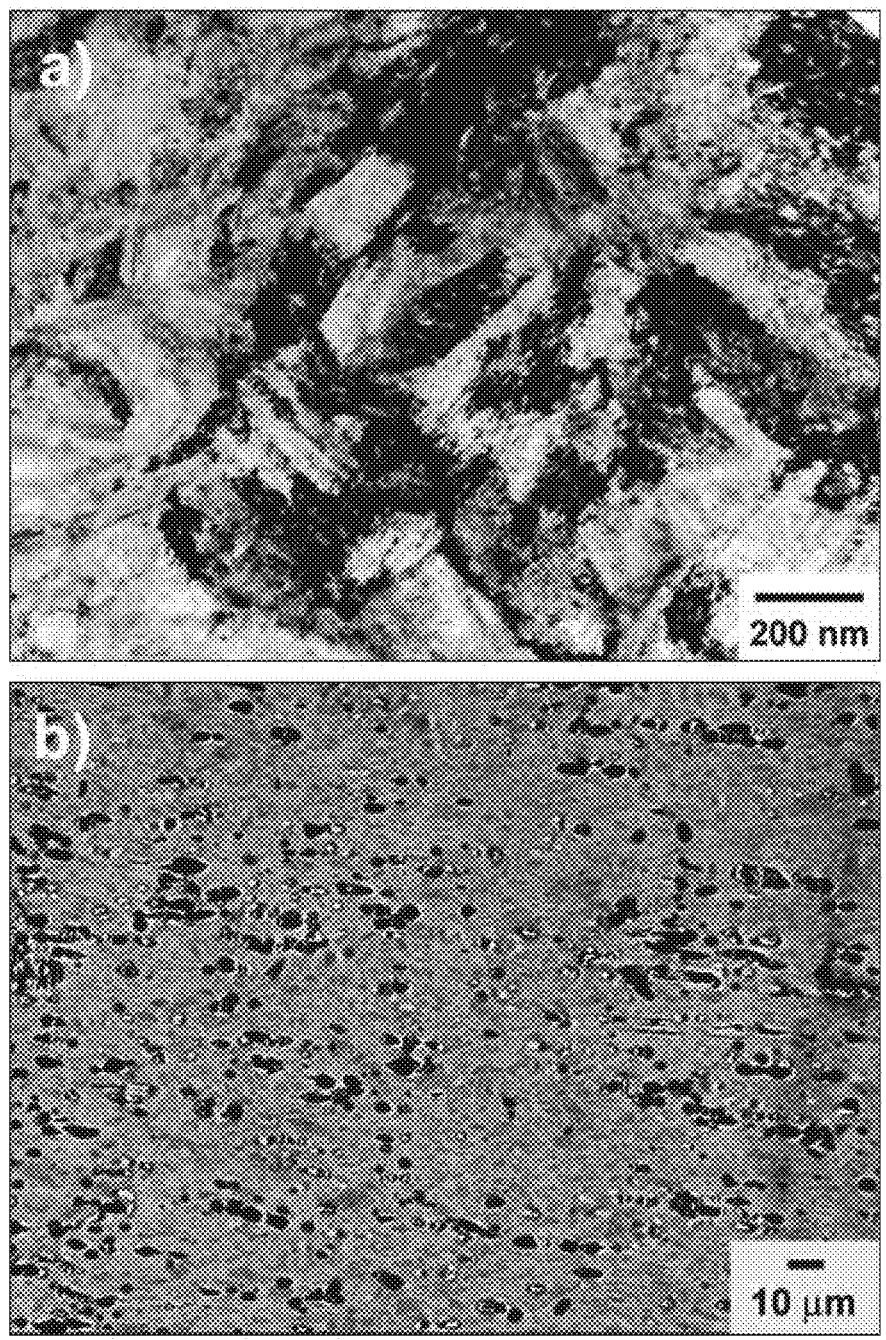
FIG. 27 Microstructure in Alloy 2 showing Refined High Strength Nanomodal Structure (Mixed Microconstituent Structure) formed after tensile deformation: a) Bright-field TEM micrographs of transformed "pockets" with refined grains; b) Back-scattered SEM micrograph of the microstructure.
Figure 28:
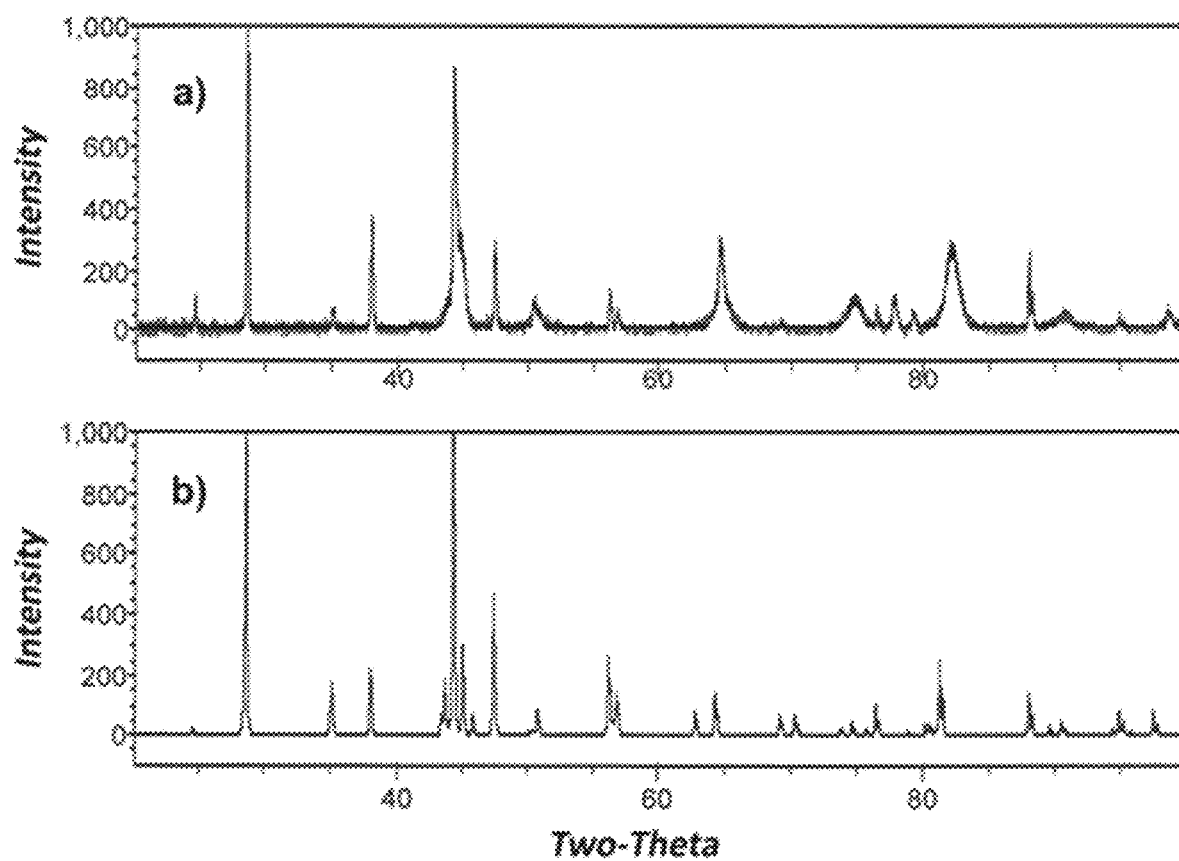
FIG. 28 X-ray diffraction pattern for Refined High Strength Nanomodal Structure in Alloy 2 after cold deformation: a) Experimental data, b) Rietveld refinement analysis.

Deformation of Recrystallized Modal Structure (Structure #4, FIG. 1B) leads to formation of the Refined High Strength Nanomodal Structure (Structure #5, FIG. 1B) through Nanophase Refinement & Strengthening (Mechanism #4, FIG. 1B). In this case, deformation was a result of tensile testing and the gage section of the tensile sample after testing was analyzed. FIG. 27 shows the micrographs of microstructure in the deformed Alloy 2. Similar to Alloy 1, the initially dislocation-free matrix grains in the Recrystallized Modal Structure after annealing are filled with a high density of dislocations upon the application of stress, and the accumulation of dislocations in some grains activates the phase transformation from austenite to ferrite, leading to substantial refinement. As shown in FIG. 27a, refined grains of 100 to 300 nm in size are shown in a local "pocket" where transformation occurred from austenite to ferrite. Structural transformation into Refined High Strength Nanomodal Structure (Structure #5, FIG. 1B) in the "pockets" of matrix grains is a characteristic feature of the steel alloys herein. FIG. 27b shows the backscattered SEM images of the Refined High Strength Nanomodal Structure. Similarly, the boundaries of matrix grains become less apparent after the matrix is deformed. X-ray diffraction shows that a significant amount of austenite transformed to ferrite although the four phases remain as in the Recrystallized Modal Structure. The transformation resulted in formation of Refined High Strength Nanomodal Structure of the Alloy 2 after tensile deformation. Very broad peaks of ferrite phase ($\alpha$-Fe) are seen in the XRD pattern, suggesting significant refinement of the phase. As in Alloy 1, a new hexagonal phase with space group #186 ($P6_{3mc}$) was identified in the gage section of the tensile sample as shown in FIG. 28 and Table 20.

TABLE 20

X-ray Diffraction Data for Alloy 2 After Tensile Deformation (Refined High Strength Nanomodal Structure)

| Phases Identified | Phase Details |
| --- | --- |
| $\gamma$ - Fe | Structure: Cubic<br>Space group #: 225 (Fm3m)<br>LP: a = 3.597 Å |
| $\alpha$ - Fe | Structure: Cubic<br>Space group #: 229 (Im3m)<br>LP: a = 2.898 Å |
| $M_2B$ | Structure: Tetragonal<br>Space group #: 140 (I4/mcm)<br>LP: a = 5.149 Å,<br>c = 4.181 Å |
| Hexagonal phase | Structure: Hexagonal<br>Space group #: 186 ($P6_{3mc}$)<br>LP: a = 2.961 Å,<br>c = 6.271 Å |

This Case Example demonstrates that alloys listed in Table 2 including Alloy 2 exhibit a structural development pathway with the mechanisms illustrated in FIGS. 1A and 1B leading to unique microstructures with nanoscale features.

Case Example #3 Tensile Properties at Each Step of Processing

Slabs with thickness of 50 mm were laboratory cast from the alloys listed in Table 21 according to the atomic ratios provided in Table 2 and laboratory processed by hot rolling, cold rolling and annealing at 850° C. for 10 min as described in Main Body section of current application. Tensile properties were measured at each step of processing on an Instron 3369 mechanical testing frame using Instron's Bluehill control software. All tests were conducted at room temperature, with the bottom grip fixed and the top grip set to travel upwards at a rate of 0.012 mm/s. Strain data was collected using Instron's Advanced Video Extensometer.

Alloys were weighed out into charges ranging from 3,000 to 3,400 grams using commercially available ferroadditive powders with known chemistry and impurity content according to the atomic ratios in Table 2. Charges were loaded into zirconia coated silica crucibles which were placed into an Indutherm VTC800V vacuum tilt casting machine. The machine then evacuated the casting and melting chambers and backfilled with argon to atmospheric pressure several times prior to casting to prevent oxidation of the melt. The melt was heated with a 14 kHz RF induction coil until fully molten, approximately 5.25 to 6.5 minutes depending on the alloy composition and charge mass. After the last solids were observed to melt it was allowed to heat for an additional 30 to 45 seconds to provide superheat and ensure melt homogeneity. The casting machine then evacuated the melting and casting chambers and tilted the crucible and poured the melt into a 50 mm thick, 75 to 80 mm wide, and 125 mm deep channel in a water cooled copper die. The melt was allowed to cool under vacuum for 200 seconds before the chamber was filled with argon to atmospheric pressure. Tensile specimens were cut from as-cast slabs by wire EDM and tested in tension. Results of tensile testing are shown in Table 21. As it can be seen, ultimate tensile strength of the alloys herein in as-cast condition varies from 411 to 907 MPa. The tensile elongation varies from 3.7 to 24.4%. Yield strength is measured in a range from 144 to 514 MPa.

Prior to hot rolling, laboratory cast slabs were loaded into a Lucifer EHS3GT-B18 furnace to heat. The furnace set point varies between 1000° C. to 1250° C. depending on alloy melting point. The slabs were allowed to soak for 40 minutes prior to hot rolling to ensure they reach the target temperature. Between hot rolling passes the slabs are returned to the furnace for 4 minutes to allow the slabs to reheat. Pre-heated slabs were pushed out of the tunnel furnace into a Fenn Model 061 2 high rolling mill. The 50 mm casts are hot rolled for 5 to 8 passes through the mill before being allowed to air cool defined as first campaign of hot rolling. After this campaign the slab thickness was reduced between 80.4 to 87.4%. After cooling, the resultant sheet samples were sectioned to 190 mm in length. These sections were hot rolled for an additional 3 passes through the mill with reduction between 73.1 to 79.9% to a final thickness of between 2.1 and 1.6 mm. Detailed information on hot rolling conditions for each alloy herein is provided in Table 22. Tensile specimens were cut from hot rolled sheets by wire EDM and tested in tension. Results of tensile testing are shown in Table 22. After hot rolling, ultimate tensile strength of the alloys herein varies from 921 to 1413 MPa. The tensile elongation varies from 12.0 to 77.7%. Yield strength is measured in a range from 264 to 574 MPa. See, Structure 2 in FIG. 1A.

After hot rolling, resultant sheets were media blasted with aluminum oxide to remove the mill scale and were then cold rolled on a Fenn Model 061 2 high rolling mill. Cold rolling takes multiple passes to reduce the thickness of the sheet to targeted thickness, generally 1.2 mm. Hot rolled sheets were fed into the mill at steadily decreasing roll gaps until the minimum gap is reached. If the material has not yet hit the gauge target, additional passes at the minimum gap were used until the targeted thickness was reached. Cold rolling conditions with the number of passes for each alloy herein are listed in Table 23. Tensile specimens were cut from cold rolled sheets by wire EDM and tested in tension. Results of tensile testing are shown in Table 23. Cold rolling leads to significant strengthening with ultimate tensile strength in the range from 1356 to 1831 MPa. The tensile elongation of the alloys herein in cold rolled state varies from 1.6 to 32.1%. Yield strength is measured in a range from 793 to 1645 MPa. It is anticipated that higher ultimate tensile strength and yield strength can be achieved in alloys herein by larger cold rolling reduction (>40%) that in our case is limited by laboratory mill capability. With more rolling force, it is anticipated that ultimate tensile strength could be increased to at least 2000 MPa and yield strength to at least 1800 MPa.

Tensile specimens were cut from cold rolled sheet samples by wire EDM and annealed at 850° C. for 10 min in a Lucifer 7HT-K12 box furnace. Samples were removed from the furnace at the end of the cycle and allowed to cool to room temperature in air. Results of tensile testing are shown in Table 24. As it can be seen, recrystallization during annealing of the alloys herein results in property combinations with ultimate tensile strength in the range from 939 to 1424 MPa and tensile elongation from 15.8 to 77.0%. Yield strength is measured in a range from 420 to 574 MPa.

Figure 29:
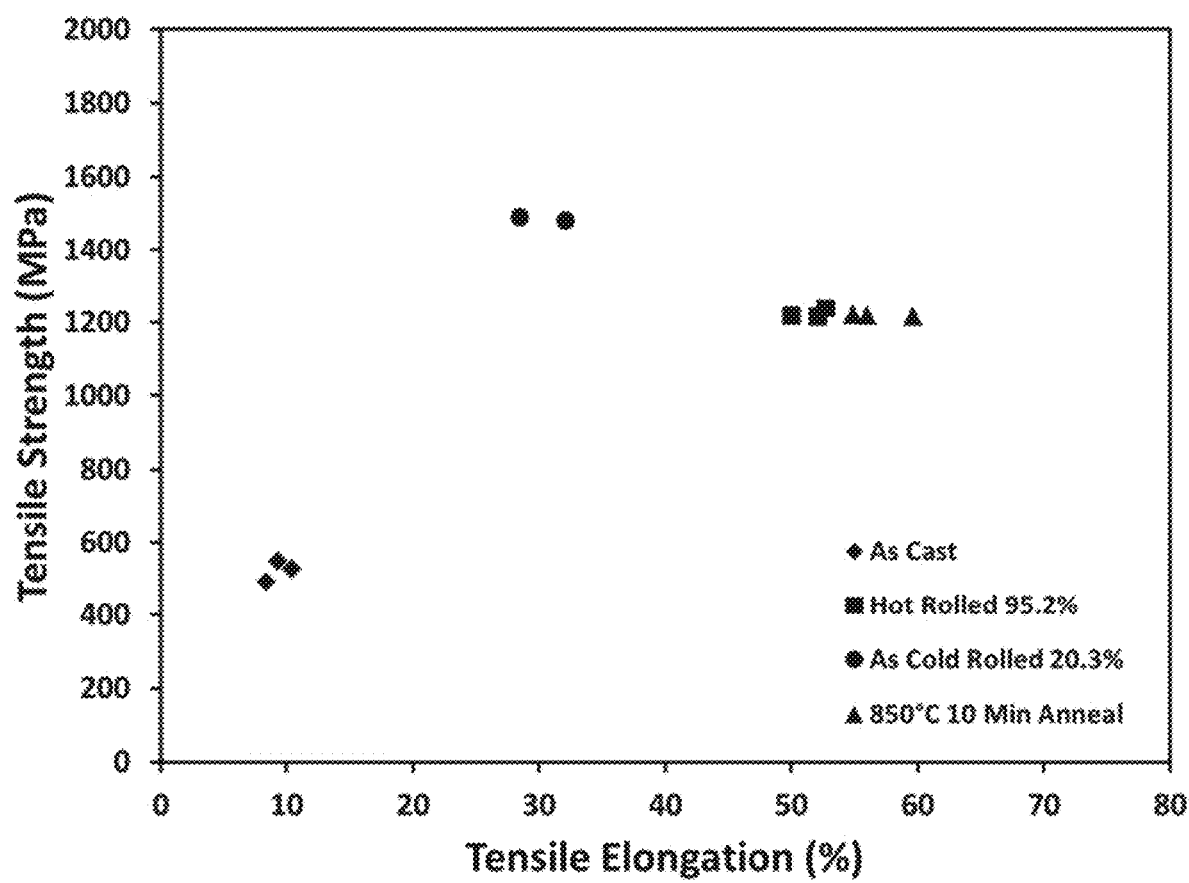
FIG. 29 Tensile properties of Alloy 1 at various stages of laboratory processing.
Figure 30:
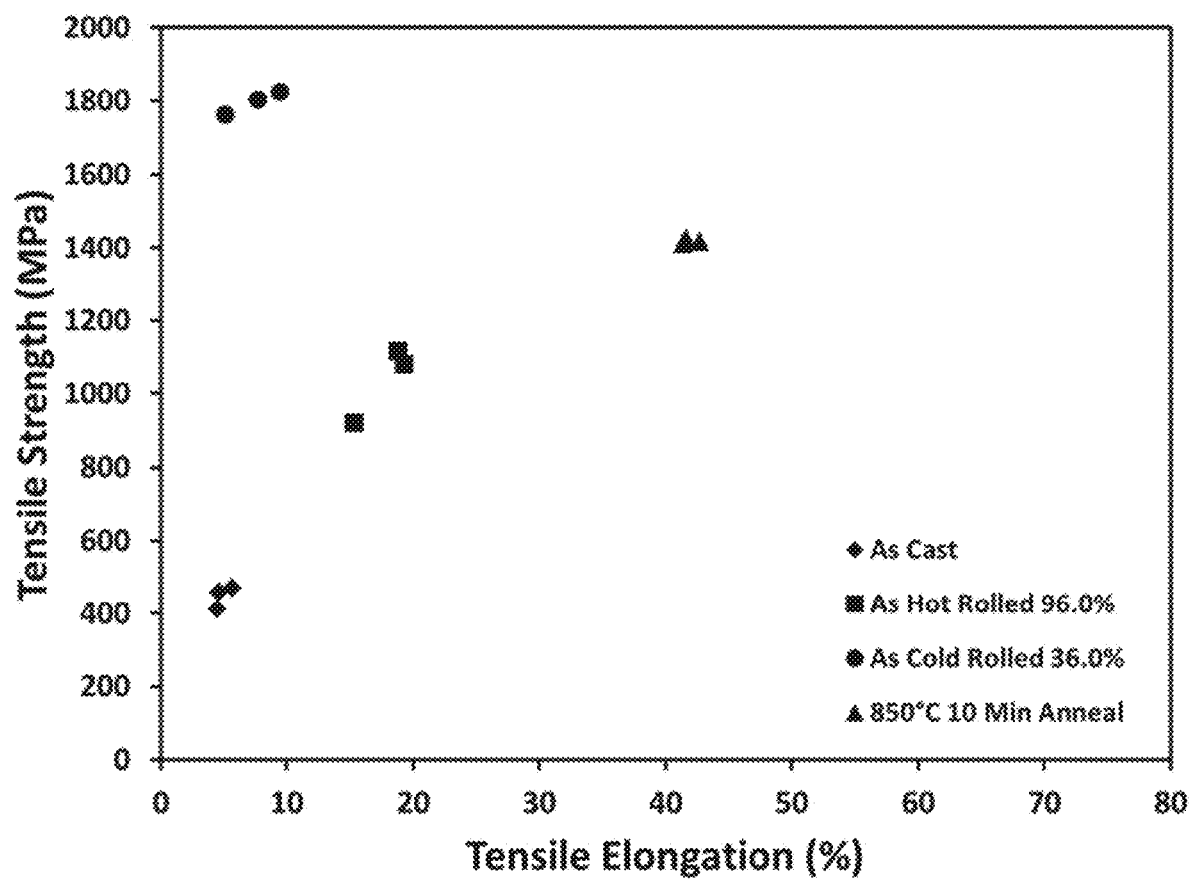
FIG. 30 Tensile results for Alloy 13 at various stages of laboratory processing.
Figure 31:
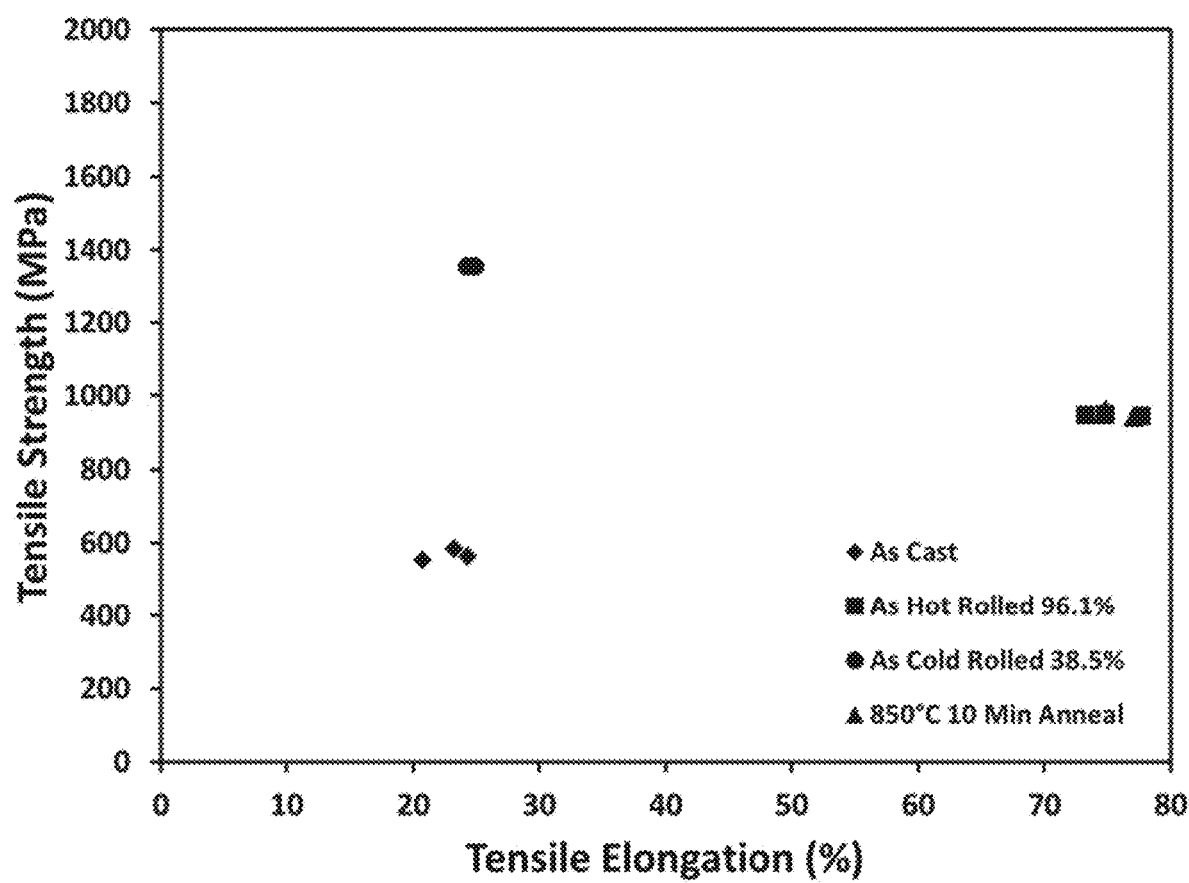
FIG. 31 Tensile results for Alloy 17 at various stages of laboratory processing.

FIG. 29 to FIG. 31 represent plotted data at each processing step for Alloy 1, Alloy 13, and Alloy 17, respectively.

TABLE 21

Tensile Properties of Alloys in As-Cast State

| Alloy | Yield Strength (MPa) | Ultimate Tensile Strength (MPa) | Tensile Elongation (%) |
|---|---|---|---|
| Alloy 1 | 289 | 527 | 10.4 |
|  | 288 | 548 | 9.3 |
|  | 260 | 494 | 8.4 |
| Alloy 2 | 244 | 539 | 10.4 |
|  | 251 | 592 | 11.6 |
|  | 249 | 602 | 13.1 |
| Alloy 13 | 144 | 459 | 4.6 |
|  | 156 | 411 | 4.5 |
|  | 163 | 471 | 5.7 |
| Alloy 17 | 223 | 562 | 24.4 |
|  | 234 | 554 | 20.7 |
|  | 235 | 585 | 23.3 |
| Alloy 24 | 396 | 765 | 8.3 |
|  | 362 | 662 | 5.7 |
|  | 404 | 704 | 7.0 |
| Alloy 25 | 282 | 668 | 5.1 |
|  | 329 | 753 | 5.0 |
|  | 288 | 731 | 5.5 |
| Alloy 25 | 471 | 788 | 4.1 |
|  | 514 | 907 | 6.0 |
|  | 483 | 815 | 3.7 |
| Alloy 27 | 277 | 771 | 3.7 |
|  | 278 | 900 | 4.9 |
|  | 267 | 798 | 4.5 |
| Alloy 34 | 152 | 572 | 11.1 |
|  | 168 | 519 | 11.6 |
|  | 187 | 545 | 12.9 |
| Alloy 35 | 164 | 566 | 15.9 |
|  | 172 | 618 | 16.6 |
|  | 162 | 569 | 16.4 |

TABLE 22

Tensile Properties of Alloys in Hot Rolled State

| Alloy | Condition | First Campaign Reduction | Second Campaign Reduction | Yield Strength (MPa) | Ultimate Tensile Strength (MPa) | Tensile Elongation (%) |
|---|---|---|---|---|---|---|
| Alloy 1 | Hot Rolled 95.2% | 80.5%, 6 Passes | 75.1%, 3 Passes | 273 | 1217 | 50.0 |
|  |  |  |  | 264 | 1216 | 52.1 |
|  |  |  |  | 285 | 1238 | 52.7 |
| Alloy 2 | Hot Rolled 96.6% | 87.4%, 7 Passes | 73.1%, 3 Passes | 480 | 1236 | 45.3 |
|  |  |  |  | 454 | 1277 | 41.9 |
|  |  |  |  | 459 | 1219 | 48.2 |
| Alloy 13 | Hot Rolled 96.0% | 81.1%, 6 Passes | 79.8%, 3 Passes | 287 | 1116 | 18.8 |
|  |  |  |  | 274 | 921 | 15.3 |
|  |  |  |  | 293 | 1081 | 19.3 |
| Alloy 17 | Hot Rolled 96.1% | 81.2%, 6 Passes | 79.1%, 3 Passes | 392 | 947 | 73.3 |
|  |  |  |  | 363 | 949 | 74.8 |
|  |  |  |  | 383 | 944 | 77.7 |
| Alloy 24 | Hot Rolled, 96.2% | 81.1%, 6 Passes | 79.9%, 3 Passes | 519 | 1176 | 21.4 |
|  |  |  |  | 521 | 1088 | 18.2 |
|  |  |  |  | 508 | 1086 | 17.9 |
| Alloy 25 | Hot Rolled 96.1% | 81.0%, 6 Passes | 79.4%, 3 Passes | 502 | 1105 | 12.4 |
|  |  |  |  | 524 | 1100 | 12.3 |
|  |  |  |  | 574 | 1077 | 12.0 |
| Alloy 27 | Hot Rolled, 95.9% | 80.4%, 6 Passes | 78.9%, 3 Passes | 508 | 1401 | 20.9 |
|  |  |  |  | 534 | 1405 | 22.4 |
|  |  |  |  | 529 | 1413 | 19.7 |
| Alloy 34 | Hot Rolled, 96.2% | 80.7%, 6 Passes | 80.1%, 3 Passes | 346 | 1188 | 56.5 |
|  |  |  |  | 323 | 1248 | 58.7 |
|  |  |  |  | 303 | 1230 | 53.4 |
| Alloy 35 | Hot Rolled, 96.1% | 80.8%, 6 Passes | 79.9%, 3 Passes | 327 | 1178 | 63.3 |
|  |  |  |  | 317 | 1170 | 61.2 |
|  |  |  |  | 305 | 1215 | 59.6 |

TABLE 23

Tensile Properties of Alloys in Cold Rolled State

| Alloy | Condition | Yield Strength (MPa) | Ultimate Tensile Strength (MPa) | Tensile Elongation (%) |
|---|---|---|---|---|
| Alloy 1 | Cold Rolled 20.3%, 4 Passes | 798 | 1492 | 28.5 |
|  |  | 793 | 1482 | 32.1 |
|  | Cold Rolled 39.6%, 29 Passes | 1109 | 1712 | 21.4 |
|  |  | 1142 | 1726 | 23.0 |
|  |  | 1203 | 1729 | 21.2 |
| Alloy 2 | Cold Rolled 28.5%, 5 Passes | 966 | 1613 | 13.4 |
|  |  | 998 | 1615 | 15.4 |
|  |  | 1053 | 1611 | 20.6 |
|  | Cold Rolled 39.1%, 19 passes | 1122 | 1735 | 20.3 |
|  |  | 1270 | 1744 | 18.3 |
| Alloy 13 | Cold Rolled 36.0%, 24 Passes | 1511 | 1824 | 9.5 |
|  |  | 1424 | 1803 | 7.7 |
|  |  | 1361 | 1763 | 5.1 |
| Alloy 17 | Cold Rolled 38.5%, 8 Passes | 1020 | 1357 | 24.2 |
|  |  | 1007 | 1356 | 24.9 |
|  |  | 1071 | 1357 | 24.9 |
| Alloy 24 | Cold Rolled 38.2%, 23 Passes | 1363 | 1584 | 1.9 |
|  |  | 1295 | 1601 | 2.5 |
|  |  | 1299 | 1599 | 3.0 |
| Alloy 25 | Cold Rolled 38.0%, 42 Passes | 1619 | 1761 | 1.9 |
|  |  | 1634 | 1741 | 1.7 |
|  |  | 1540 | 1749 | 1.6 |
| Alloy 27 | Cold Rolled 39.4%, 40 Passes | 1632 | 1802 | 2.7 |
|  |  | 1431 | 1804 | 4.1 |
|  |  | 1645 | 1831 | 4.1 |
| Alloy 34 | Cold Rolled 35.%, 14 Passes | 1099 | 1640 | 14.7 |
|  |  | 840 | 1636 | 17.5 |
|  |  | 1021 | 1661 | 18.5 |
| Alloy 35 | Cold Rolled 35.5%, 12 Passes | 996 | 1617 | 23.8 |
|  |  | 1012 | 1614 | 24.5 |
|  |  | 1020 | 1616 | 23.3 |

TABLE 24

Tensile Properties of Alloys in Annealed State

| Alloy | Yield Strength (MPa) | Ultimate Tensile Strength (MPa) | Tensile Elongation (%) |
|---|---|---|---|
| Alloy 1 | 436 | 1221 | 54.9 |
|  | 443 | 1217 | 56.0 |
|  | 431 | 1216 | 59.7 |
| Alloy 2 | 438 | 1232 | 49.7 |
|  | 431 | 1228 | 49.8 |
|  | 431 | 1231 | 49.4 |
|  | 484 | 1278 | 48.3 |
|  | 485 | 1264 | 45.5 |
|  | 479 | 1261 | 48.7 |
| Alloy 13 | 441 | 1424 | 41.7 |
|  | 440 | 1412 | 41.4 |
|  | 429 | 1417 | 42.7 |
| Alloy 17 | 420 | 946 | 74.6 |
|  | 421 | 939 | 77.0 |
|  | 425 | 961 | 74.9 |
| Alloy 24 | 554 | 1151 | 23.5 |
|  | 538 | 1142 | 24.3 |
|  | 562 | 1151 | 24.3 |
| Alloy 25 | 500 | 1274 | 16.0 |
|  | 502 | 1271 | 15.8 |
|  | 483 | 1280 | 16.3 |
| Alloy 27 | 538 | 1385 | 20.6 |
|  | 574 | 1397 | 20.9 |
|  | 544 | 1388 | 21.8 |
| Alloy 27 | 467 | 1227 | 56.7 |
|  | 476 | 1232 | 52.7 |
|  | 462 | 1217 | 51.6 |
| Alloy 27 | 439 | 1166 | 56.3 |
|  | 438 | 1166 | 59.0 |
|  | 440 | 1177 | 58.3 |

This Case Example demonstrates that due to the unique mechanisms and structural pathway shown in FIGS. 1A and 1B, the structures and resulting properties in steel alloys herein can vary widely leading to the development of 3$^{rd}$ Generation AHSS.

Case Example #4 Cyclic Reversibility During Cold Rolling and Recrystallization Slabs with thickness of 50 mm were laboratory cast from Alloy 1 and Alloy 2 according to the atomic ratios provided in Table 2 and hot rolled into sheets with final thickness of 2.31 mm for Alloy 1 sheet and 2.35 mm for Alloy 2 sheet. Casting and hot rolling procedures are described in Main Body section of current application. Resultant hot rolled sheet from each alloy was used for demonstration of cyclic structure/property reversibility through cold rolling/annealing cycles.

Hot rolled sheet from each alloy was subjected to three cycles of cold rolling and annealing. Sheet thicknesses before and after hot rolling and cold rolling reduction at each cycle are listed in Table 25. Annealing at 850° C. for 10 min was applied after each cold rolling. Tensile specimens were cut from the sheet in the initial hot rolled state and at each step of the cycling. Tensile properties were measured on an Instron 3369 mechanical testing frame using Instron's Bluehill control software. All tests were conducted at room temperature, with the bottom grip fixed and the top grip set to travel upwards at a rate of 0.012 mm/s. Strain data was collected using Instron's Advanced Video Extensometer.

Figure 32:
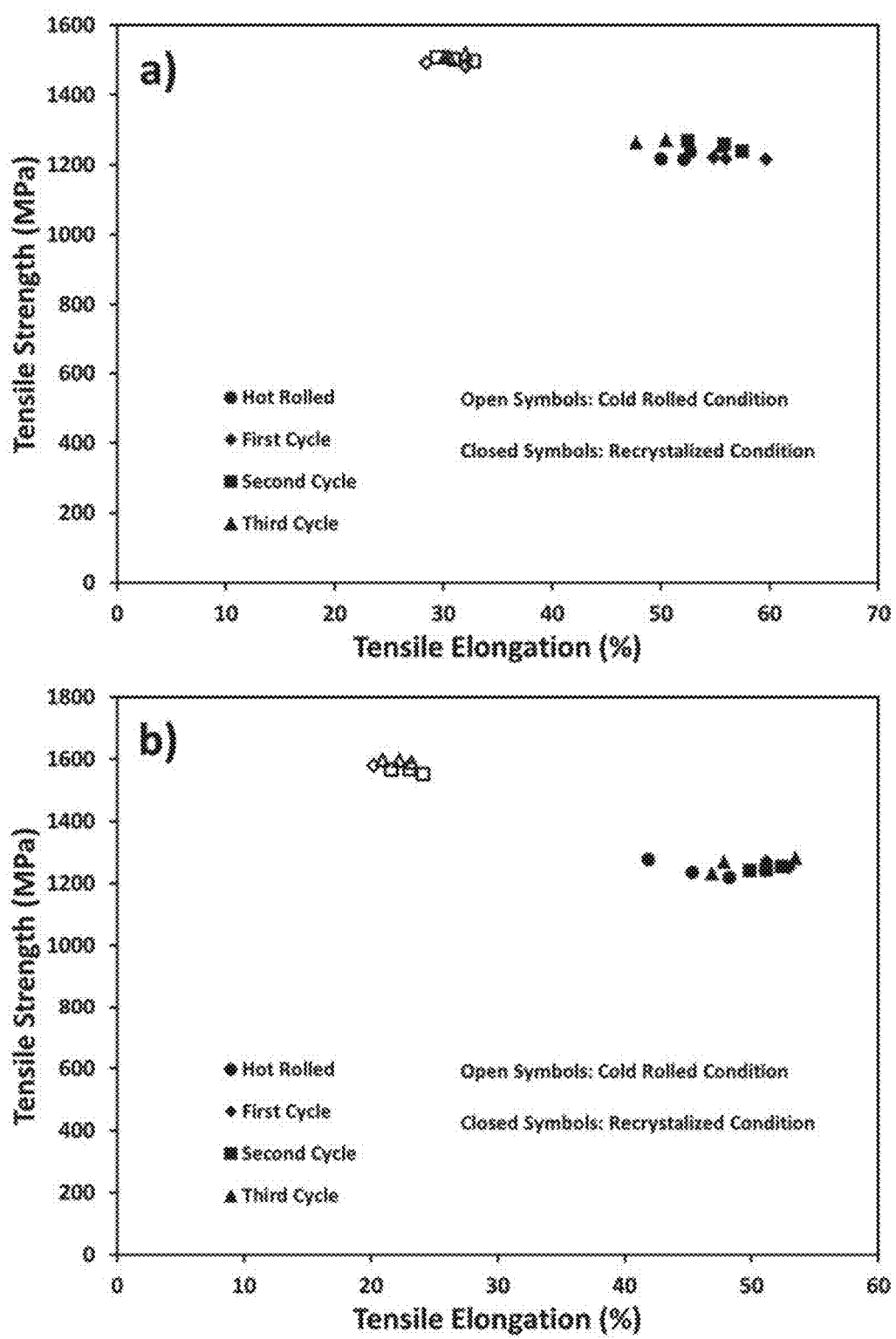
FIG. 32 Tensile properties of the sheet in hot rolled state and after each step of cold rolling/annealing cycles demonstrating full property reversibility at each cycle in: a) Alloy, b) Alloy 2.

The results of tensile testing are plotted in FIG. 32 for Alloy 1 and Alloy 2 showing that cold rolling results in significant strengthening of both alloys at each cycle with average ultimate tensile strength of 1500 MPa in Alloy 1 and 1580 MPa in Alloy 2. Both cold rolled alloys show a loss in ductility as compared to the hot rolled state. However, annealing after cold rolling at each cycle results in tensile property recovery to the same level with high ductility.

Tensile properties for each tested sample are listed in Table 26 and Table 27 for Alloy 1 and Alloy 2, respectively. As it can be seen, Alloy 1 has ultimate tensile strength from 1216 to 1238 MPa in hot rolled state with ductility from 50.0 to 52.7% and yield strength from 264 to 285 MPa. In cold rolled state, the ultimate tensile strength was measured in the range from 1482 to 1517 MPa at each cycle. Ductility was found consistently in the range from 28.5 to 32.8% with significantly higher yield strength of 718 to 830 MPa as compared to that in hot rolled condition. Annealing at each cycle resulted in restoration of the ductility to the range from 47.7 to 59.7% with ultimate tensile strength from 1216 to 1270 MPa. Yield strength after cold rolling and annealing is lower than that after cold rolling and was measured in the range from 431 to 515 MPa that is however higher than that in initial hot rolled condition.

Similar results with property reversibility between cold rolled and annealed material through cycling were observed for Alloy 2 (FIG. 32b). In initial hot rolled state, Alloy 2 has ultimate tensile strength from 1219 to 1277 MPa with ductility from 41.9 to 48.2% and yield strength from 454 to 480 MPa. Cold rolling at each cycle results in the material strengthening to the ultimate tensile strength from 1553 to 1598 MPa with ductility reduction to the range from 20.3 to 24.1%. Yield strength was measured from 912 to 1126 MPa. After annealing at each cycle, Alloy 2 has ultimate tensile strength from 1231 to 1281 MPa with ductility from 46.9 to 53.5%. Yield strength in Alloy 2 after cold rolling and annealing at each cycle is similar to that in hot rolled condition and varies from 454 to 521 MPa.

TABLE 25

Sample Thickness and Cycle Reduction at Cold Rolling Steps

| Alloy | Rolling Cycle | Initial Thickness (mm) | Final Thickness (mm) | Cycle Reduction (%) |
|---|---|---|---|---|
| Alloy 1 | 1 | 2.35 | 1.74 | 26.0 |
|  | 2 | 1.74 | 1.32 | 24.1 |
|  | 3 | 1.32 | 1.02 | 22.7 |
| Alloy 2 | 1 | 2.31 | 1.85 | 19.9 |
|  | 2 | 1.85 | 1.51 | 18.4 |
|  | 3 | 1.51 | 1.22 | 19.2 |

TABLE 26

Tensile Properties of Alloy 1 Through Cold Rolling/Annealing Cycles

| | | 1st Cycle | | 2nd Cycle | | 3rd Cycle | |
|---|---|---|---|---|---|---|---|
| Property | Hot Rolled | Cold Rolled | Annealed | Cold Rolled | Annealed | Cold Rolled | Annealed |
| Ultimate Tensile Strength (MPa) | 1217 | 1492 | 1221 | 1497 | 1239 | 1517 | 1270 |
| | 1216 | 1482 | 1217 | 1507 | 1269 | 1507 | 1262 |
| | 1238 | * | 1216 | 1503 | 1260 | 1507 | 1253 |
| Yield Strength (MPa) | 273 | 798 | 436 | 775 | 487 | 820 | 508 |
| | 264 | 793 | 443 | 718 | 466 | 796 | 501 |
| | 285 | * | 431 | 830 | 488 | 809 | 515 |
| Tensile Elongation (%) | 50.0 | 28.5 | 54.9 | 32.8 | 57.5 | 32.1 | 50.5 |
| | 52.1 | 32.1 | 56.0 | 29.4 | 52.5 | 30.2 | 47.7 |
| | 52.7 | * | 59.7 | 30.9 | 55.8 | 30.5 | 55.5 |

* Specimens slipped in the grips/data is not available

TABLE 27

Tensile Properties of Alloy 2 Through Cold Rolling/Annealing Cycles

| | | 1st Cycle | | 2nd Cycle | | 3rd Cycle | |
|---|---|---|---|---|---|---|---|
| Property | Hot Rolled | Cold Rolled | Annealed | Cold Rolled | Annealed | Cold Rolled | Annealed |
| Ultimate Tensile Strength (MPa) | 1236 | 1579 | 1250 | 1553 | 1243 | 1596 | 1231 |
| | 1277 | * | 1270 | 1568 | 1255 | 1589 | 1281 |
| | 1219 | * | 1240 | 1566 | 1242 | 1598 | 1269 |
| Yield Strength (Mpa) | 480 | 1126 | 466 | 983 | 481 | 1006 | 475 |
| | 454 | * | 468 | 969 | 521 | 978 | 507 |
| | 459 | * | 454 | 912 | 497 | 1011 | 518 |
| Tensile Elongation (%) | 45.3 | 20.3 | 53.0 | 24.1 | 51.1 | 22.3 | 46.9 |
| | 41.9 | * | 51.2 | 23.1 | 52.3 | 23.2 | 53.5 |
| | 48.2 | * | 51.1 | 21.6 | 49.9 | 21.0 | 47.9 |

* Specimens slipped in the grips/data is not available

This Case Example demonstrates that the High Strength Nanomodal Structure (Structure #3, FIG. 1A) that forms in the alloys listed in Table 2 after cold rolling can be recrystallized by applying an anneal to produce a Recrystallized Modal Structure (Structure #4, FIG. 1B). This structure can be further deformed through cold rolling or other cold deformation approaches to undergo Nanophase Refinement and Strengthening (Mechanism #4, FIG. 1B) leading to formation of the Refined High Strength Nanomodal Structure (Structure #5, FIG. 1B). The Refined High Strength Nanomodal Structure (Structure #5, FIG. 1B) can in turn be recrystallized and the process can be started over with full structure/property reversibility through multiple cycles. The ability for the mechanisms to be reversible enables the production of finer gauges which are important for weight reduction when using AHSS as well as property recovery after any damage caused by deformation.

Case Example #5 Bending Ability

Slabs with thickness of 50 mm were laboratory cast from selected alloys listed in Table 28 according to the atomic ratios provided in Table 2 and laboratory processed by hot rolling, cold rolling and annealing at 850° C. for 10 min as described in Main Body section of current application. Resultant sheet from each alloy with final thickness of ~1.2 mm and Recrystallized Modal Structure (Structure #4, FIG. 1B) was used to evaluate bending response of alloys herein.

Bend tests were performed using an Instron 5984 tensile test platform with an Instron W-6810 guided bend test fixture according to specifications outlined in the ISO 7438 International Standard Metallic materials—Bend test (International Organization for Standardization, 2005). Test specimens were cut by wire EDM to a dimension of 20 mm×55 mm×sheet thickness. No special edge preparation was done to the samples. Bend tests were performed using an Instron 5984 tensile test platform with an Instron W-6810 guided bend test fixture. Bend tests were performed according to specifications outlined in the ISO 7438 International Standard Metallic materials—Bend test (International Organization for Standardization, 2005).

Figure 33:
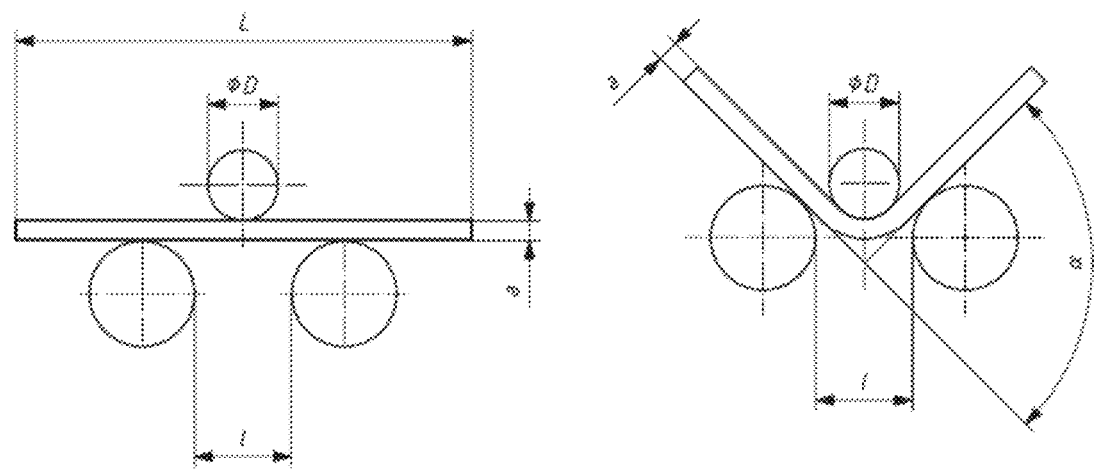
FIG. 33 A bend test schematic showing a bending device with two supports and a former (International Organization for Standardization, 2005).

The test was performed by placing the test specimen on the fixture supports and pushing with a former as shown in FIG. 33.

The distance between supports, l, was fixed according to ISO 7438 during the test at:

$$l = (D + 3a) \pm \frac{a}{2} \quad \text{Equation 1}$$

Prior to bending, the specimens were lubricated on both sides with 3 in 1 oil to reduce friction with the test fixture. This test was performed with a 1 mm diameter former. The former was pushed downward in the middle of the supports to different angles up to 180° or until a crack appeared. The bending force was applied slowly to permit free plastic flow of the material. The displacement rate was calculated based on the span gap of each test in order to have a constant angular rate and applied accordingly.

Absence of cracks visible without the use of magnifying aids was considered evidence that the test piece withstood the bend test. If a crack was detected, the bend angle was measured manually with a digital protractor at the bottom of the bend. The test specimen was then removed from the fixture and examined for cracking on the outside of the bend radius. The onset of cracking could not be conclusively determined from the force-displacement curves and was instead easily determined by direct observation with illumination from a flashlight.

Figure 34:
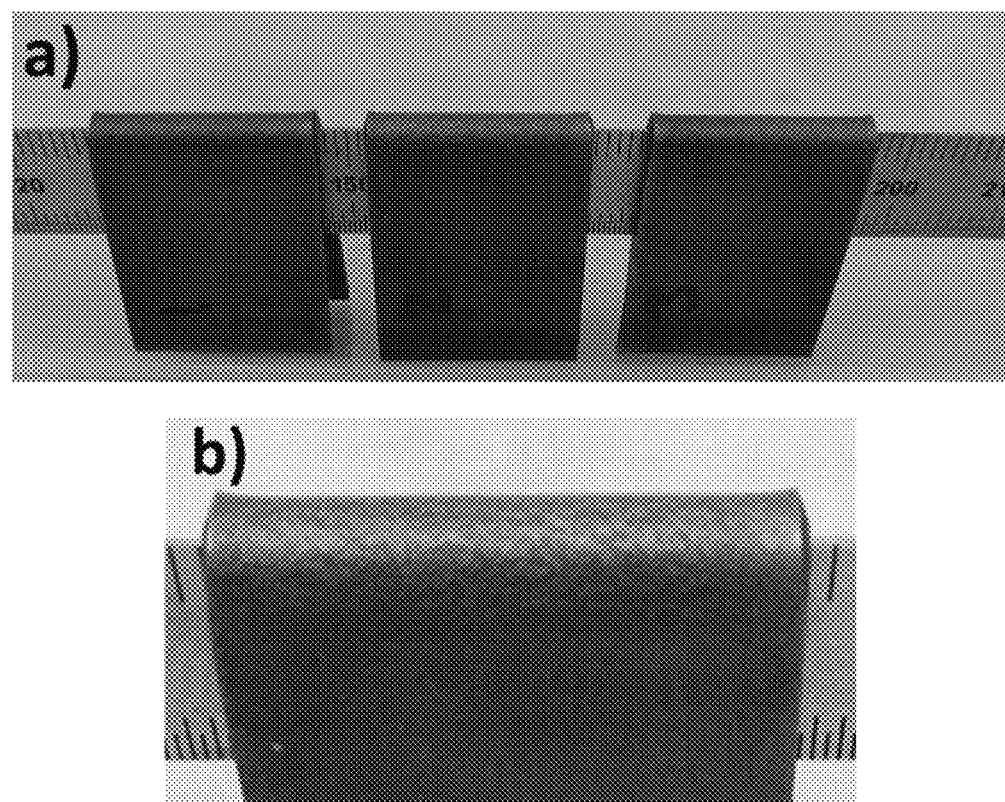
FIG. 34 Images of bend testing samples from Alloy 1 tested to 180°: a) Picture of a full set of samples tested to 180° without cracking, and b) A close-up view of the bend of a tested sample.

Results of the bending response of the alloys herein are listed in Table 28 including initial sheet thickness, former radius to sheet thickness ratio (r/t) and maximum bend angle before cracking. All alloys listed in the Table 28 did not show cracks at 90° bend angle. The majority of the alloys herein have capability to be bent at 180° angle without cracking. Example of the samples from Alloy 1 after bend testing to 180° is shown in FIG. 34.

TABLE 7

Bend Test Results for Selected Alloys

| Alloy | Former Diameter (mm) | Thickness (mm) | r/t | Maximum Bend Angle (°) |
|---|---|---|---|---|
| Alloy 1 | 0.95 | 1.185 | 0.401 | 180 |
|  |  | 1.200 | 0.396 | 180 |
|  |  | 1.213 | 0.392 | 180 |
|  |  | 1.223 | 0.388 | 180 |
|  |  | 1.181 | 0.402 | 180 |
|  |  | 1.187 | 0.400 | 180 |
|  |  | 1.189 | 0.399 | 180 |
|  |  | 1.206 | 0.394 | 180 |
| Alloy 2 | 0.95 | 1.225 | 0.388 | 180 |
|  |  | 1.230 | 0.386 | 180 |
|  |  | 1.215 | 0.391 | 180 |
|  |  | 1.215 | 0.391 | 180 |
|  |  | 1.215 | 0.391 | 180 |
|  |  | 1.224 | 0.388 | 180 |
|  |  | 1.208 | 0.393 | 180 |
|  |  | 1.208 | 0.393 | 180 |
| Alloy 3 | 0.95 | 1.212 | 0.392 | 180 |
|  |  | 1.186 | 0.401 | 180 |
|  |  | 1.201 | 0.396 | 180 |
| Alloy 4 | 0.95 | 1.227 | 0.387 | 180 |
|  |  | 1.185 | 0.401 | 180 |
|  |  | 1.187 | 0.400 | 180 |
| Alloy 5 | 0.95 | 1.199 | 0.396 | 110 |
|  |  | 1.196 | 0.397 | 90 |
| Alloy 6 | 0.95 | 1.259 | 0.377 | 160 |
|  |  | 1.202 | 0.395 | 165 |
|  |  | 1.206 | 0.394 | 142 |
| Alloy 7 | 0.95 | 1.237 | 0.384 | 104 |
|  |  | 1.236 | 0.384 | 90 |
| Alloy 9 | 0.95 | 1.278 | 0.372 | 180 |
|  |  | 1.197 | 0.397 | 180 |
|  |  | 1.191 | 0.399 | 180 |
| Alloy 10 | 0.95 | 1.226 | 0.387 | 180 |
|  |  | 1.208 | 0.393 | 100 |
|  |  | 1.208 | 0.393 | 180 |
|  |  | 1.205 | 0.394 | 180 |
| Alloy 11 | 0.95 | 1.240 | 0.383 | 180 |
|  |  | 1.214 | 0.391 | 180 |
|  |  | 1.205 | 0.394 | 180 |
| Alloy 12 | 0.95 | 1.244 | 0.382 | 180 |
|  |  | 1.215 | 0.391 | 180 |
|  |  | 1.205 | 0.394 | 180 |
| Alloy 13 | 0.95 | 1.222 | 0.389 | 180 |
|  |  | 1.191 | 0.399 | 180 |
|  |  | 1.188 | 0.400 | 180 |

TABLE 7-continued

Bend Test Results for Selected Alloys

| Alloy | Former Diameter (mm) | Thickness (mm) | r/t | Maximum Bend Angle (°) |
|---|---|---|---|---|
| Alloy 14 | 0.95 | 1.239 | 0.383 | 180 |
|  |  | 1.220 | 0.389 | 180 |
|  |  | 1.214 | 0.391 | 180 |
| Alloy 15 | 0.95 | 1.247 | 0.381 | 180 |
|  |  | 1.224 | 0.388 | 180 |
|  |  | 1.224 | 0.388 | 180 |
| Alloy 16 | 0.95 | 1.244 | 0.382 | 180 |
|  |  | 1.224 | 0.388 | 180 |
|  |  | 1.199 | 0.396 | 180 |
| Alloy 17 | 0.95 | 1.233 | 0.385 | 180 |
|  |  | 1.213 | 0.392 | 180 |
|  |  | 1.203 | 0.395 | 180 |
| Alloy 18 | 0.95 | 1.222 | 0.389 | 160 |
|  |  | 1.218 | 0.390 | 135 |
| Alloy 19 | 0.95 | 1.266 | 0.375 | 180 |
|  |  | 1.243 | 0.382 | 180 |
|  |  | 1.242 | 0.382 | 180 |
| Alloy 20 | 0.95 | 1.242 | 0.382 | 180 |
|  |  | 1.222 | 0.389 | 180 |
|  |  | 1.220 | 0.389 | 180 |
| Alloy 21 | 0.95 | 1.255 | 0.378 | 180 |
|  |  | 1.228 | 0.387 | 180 |
|  |  | 1.229 | 0.386 | 180 |
| Alloy 22 | 0.95 | 1.240 | 0.383 | 180 |
|  |  | 1.190 | 0.399 | 180 |
|  |  | 1.190 | 0.399 | 180 |
| Alloy 23 | 0.95 | 1.190 | 0.399 | 180 |
|  |  | 1.199 | 0.396 | 180 |
|  |  | 1.193 | 0.398 | 180 |
| Alloy 28 | 0.95 | 1.222 | 0.389 | 180 |
|  |  | 1.206 | 0.394 | 180 |
|  |  | 1.204 | 0.395 | 180 |
| Alloy 29 | 0.95 | 1.219 | 0.390 | 180 |
|  |  | 1.217 | 0.390 | 180 |
|  |  | 1.206 | 0.394 | 180 |
| Alloy 30 | 0.95 | 1.215 | 0.391 | 180 |
|  |  | 1.212 | 0.392 | 175 |
|  |  | 1.200 | 0.396 | 180 |
| Alloy 31 | 0.95 | 1.211 | 0.392 | 150 |
|  |  | 1.209 | 0.393 | 131 |
| Alloy 32 | 0.95 | 1.222 | 0.389 | 180 |
|  |  | 1.221 | 0.389 | 180 |
|  |  | 1.210 | 0.393 | 180 |

In order to be made into complex parts for automobile and other uses, an AHSS needs to exhibit both bulk sheet formability and edge sheet formability. This Case Example demonstrates good bulk sheet formability of the alloys in Table 2 through bend testing.

Case Example #6 Punched Edge vs EDM Cut Tensile Properties

Slabs with thickness of 50 mm were laboratory cast from selected alloys listed in Table 2 according to the atomic ratios provided in Table 2 and laboratory processed by hot rolling, cold rolling and annealing at 850° C. for 10 min as described herein. Resultant sheet from each alloy with final thickness of 1.2 mm and Recrystallized Modal Structure (Structure #4, FIG. 1B) were used to evaluate the effect of edge damage on alloy properties by cutting tensile specimens by wire electrical discharge machining (wire-EDM) (which represents the control situation or relative lack of shearing and formation of an edge without a compromise in mechanical properties) and by punching (to identify a mechanical property loss due to shearing). It should be appreciated that shearing (imposition of a stress coplanar with a material cross-section) may occur herein by a number of processing options, such as piercing, perforating, cutting or cropping (cutting off of an end of a given metal part).

Figure 35:
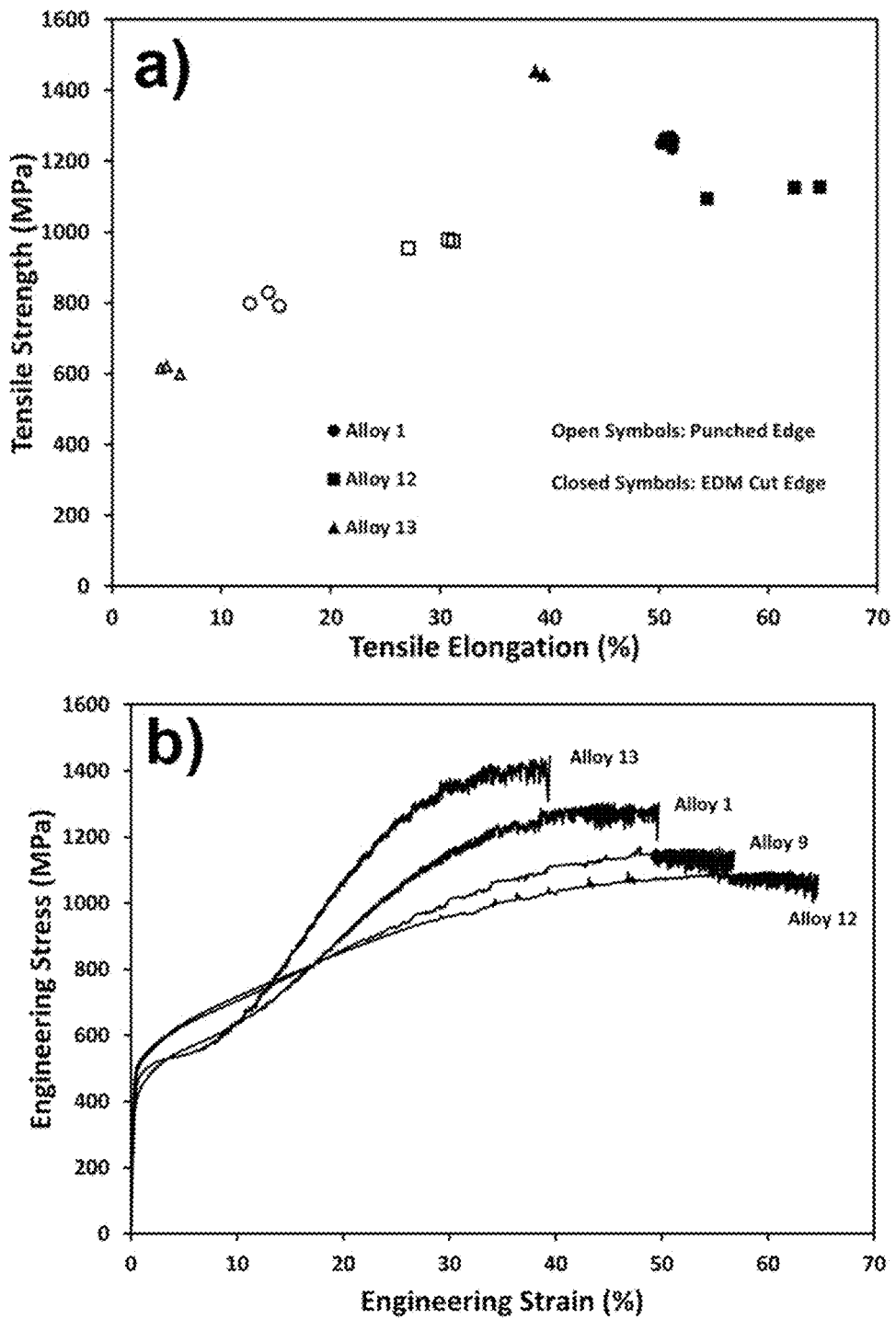
FIG. 35 a) Tensile test results of the punched and EDM cut specimens from selected alloys demonstrating property decrease due to punched edge damage, b) Tensile curves of the selected alloys for EDM cut specimens.

Tensile specimens in the ASTM E8 geometry were prepared using both wire EDM cutting and punching. Tensile properties were measured on an Instron 5984 mechanical testing frame using Instron's Bluehill control software. All tests were conducted at room temperature, with the bottom grip fixed and the top grip set to travel upwards at a rate of 0.012 mm/s. Strain data was collected using Instron's Advanced Video Extensometer. Tensile data is shown in Table 29 and illustrated in FIG. 35a for selected alloys. Decrease in properties is observed for all alloys tested but the level of this decrease varies significantly depending on alloy chemistry. Table 30 summarizes a comparison of ductility in punched samples as compared to that in the wire EDM cut samples. In FIG. 35b corresponding tensile curves are shown for the selected alloy demonstrating mechanical behavior as a function of austenite stability. For selected alloys herein, austenite stability is highest in Alloy 12 that shows high ductility and lowest in Alloy 13 that shows high strength. Correspondingly, Alloy 12 demonstrated lowest loss in ductility in punched specimens vs EDM cut (29.7% vs 60.5%, Table 30) while Alloy 13 demonstrated highest loss in ductility in punched specimens vs EDM cut (5.2% vs 39.1%, Table 30). High edge damage occurs in punched specimens from alloy with lower austenite stability.

TABLE 8

Tensile Properties of Punched vs EDM Cut Specimens from Selected Alloys

| Alloy | Cutting Method | Yield Strength (MPa) | Ultimate Tensile Strength (MPa) | Tensile Elongation (%) |
|---|---|---|---|---|
| Alloy 1 | EDM Cut | 392 | 1310 | 46.7 |
| | | 397 | 1318 | 45.1 |
| | | 400 | 1304 | 49.7 |
| | Punched | 431 | 699 | 9.3 |
| | | 430 | 680 | 8.1 |
| | | 422 | 656 | 6.9 |
| Alloy 2 | EDM Cut | 434 | 1213 | 46.4 |
| | | 452 | 1207 | 46.8 |
| | | 444 | 1199 | 49.1 |
| | Punched | 491 | 823 | 14.4 |
| | | 518 | 792 | 11.3 |
| | | 508 | 796 | 11.9 |
| Alloy 9 | EDM Cut | 468 | 1166 | 56.1 |
| | | 480 | 1177 | 52.4 |
| | | 475 | 1169 | 56.9 |
| | Punched | 508 | 1018 | 29.2 |
| | | 507 | 1007 | 28.6 |
| | | 490 | 945 | 23.3 |
| Alloy 11 | EDM Cut | 474 | 1115 | 64.4 |
| | | 464 | 1165 | 62.5 |
| | | 495 | 1127 | 62.7 |
| | Punched | 503 | 924 | 24.6 |
| | | 508 | 964 | 28.0 |
| | | 490 | 921 | 25.7 |
| Alloy 12 | EDM Cut | 481 | 1094 | 54.4 |
| | | 479 | 1128 | 64.7 |
| | | 495 | 1126 | 62.4 |
| | Punched | 521 | 954 | 27.1 |
| | | 468 | 978 | 30.7 |
| | | 506 | 975 | 31.2 |
| Alloy 13 | EDM Cut | 454 | 1444 | 39.5 |
| | | 450 | 1455 | 38.7 |
| | Punched | 486 | 620 | 5.0 |
| | | 469 | 599 | 6.3 |
| | | 483 | 616 | 4.5 |

TABLE 8-continued

Tensile Properties of Punched vs EDM Cut Specimens from Selected Alloys

| Alloy | Cutting Method | Yield Strength (MPa) | Ultimate Tensile Strength (MPa) | Tensile Elongation (%) |
|---|---|---|---|---|
| Alloy 14 | EDM Cut | 484 | 1170 | 58.7 |
| | | 489 | 1182 | 61.2 |
| | | 468 | 1188 | 59.0 |
| | Punched | 536 | 846 | 17.0 |
| | | 480 | 816 | 18.4 |
| | | 563 | 870 | 17.5 |
| Alloy 18 | EDM Cut | 445 | 1505 | 37.8 |
| | | 422 | 1494 | 37.5 |
| | Punched | 478 | 579 | 2.4 |
| | | 469 | 561 | 2.6 |
| | | 463 | 582 | 2.9 |
| Alloy 21 | EDM Cut | 464 | 1210 | 57.6 |
| | | 499 | 1244 | 49.0 |
| | | 516 | 1220 | 54.5 |
| | Punched | 527 | 801 | 11.3 |
| | | 511 | 806 | 12.6 |
| | | 545 | 860 | 15.2 |
| Alloy 24 | EDM Cut | 440 | 1166 | 31.0 |
| | | 443 | 1167 | 32.0 |
| | | 455 | 1176 | 31.0 |
| | Punched | 496 | 696 | 5.0 |
| | | 463 | 688 | 5.0 |
| | | 440 | 684 | 4.0 |
| Alloy 25 | EDM Cut | 474 | 1183 | 15.8 |
| | | 470 | 1204 | 17.0 |
| | | 485 | 1223 | 17.4 |
| | Punched | 503 | 589 | 2.1 |
| | | 517 | 579 | 0.8 |
| | | 497 | 583 | 2.1 |
| Alloy 26 | EDM Cut | 735 | 1133 | 20.8 |
| | | 742 | 1109 | 19.0 |
| | Punched | 722 | 898 | 3.4 |
| | | 747 | 894 | 2.9 |
| | | 764 | 894 | 3.1 |
| Alloy 27 | EDM Cut | 537 | 1329 | 19.3 |
| | | 513 | 1323 | 21.4 |
| | | 480 | 1341 | 20.8 |
| | Punched | 563 | 624 | 4.3 |
| | | 568 | 614 | 3.3 |
| | | 539 | 637 | 4.3 |
| Alloy 34 | EDM Cut | 460 | 1209 | 54.7 |
| | | 441 | 1199 | 54.1 |
| | | 475 | 1216 | 52.9 |
| | Punched | 489 | 828 | 15.4 |
| | | 486 | 811 | 14.6 |
| | | 499 | 813 | 14.8 |
| Alloy 35 | EDM Cut | 431 | 1196 | 50.6 |
| | | 437 | 1186 | 52.0 |
| | | 420 | 1172 | 54.7 |
| | Punched | 471 | 826 | 19.9 |
| | | 452 | 828 | 19.7 |
| | | 482 | 854 | 19.7 |

TABLE 9

Tensile Elongation in Specimens with Different Cutting Methods

| Alloy | Average Tensile Elongation (%) | | Loss In Tensile Elongation (E2/E1) | |
|---|---|---|---|---|
| | EDM Cut (E1) | Punched (E2) | Min | Max |
| Alloy 1 | 47.2 | 8.1 | 0.14 | 0.21 |
| Alloy 2 | 47.4 | 12.5 | 0.23 | 0.31 |
| Alloy 9 | 55.1 | 27.0 | 0.41 | 0.56 |
| Alloy 11 | 63.2 | 26.1 | 0.38 | 0.45 |
| Alloy 12 | 60.5 | 29.7 | 0.42 | 0.57 |
| Alloy 13 | 39.1 | 5.2 | 0.11 | 0.16 |
| Alloy 14 | 59.7 | 17.7 | 0.28 | 0.31 |
| Alloy 18 | 37.6 | 2.6 | 0.06 | 0.08 |

TABLE 9-continued

Tensile Elongation in Specimens with Different Cutting Methods

| Alloy | Average Tensile Elongation (%) | | Loss In Tensile Elongation (E2/E1) | |
|---|---|---|---|---|
| | EDM Cut (E1) | Punched (E2) | Min | Max |
| Alloy 21 | 53.7 | 13.0 | 0.20 | 0.31 |
| Alloy 24 | 31.3 | 4.7 | 0.13 | 0.16 |
| Alloy 25 | 16.7 | 1.7 | 0.05 | 0.13 |
| Alloy 26 | 31.3 | 4.7 | 0.14 | 0.18 |
| Alloy 27 | 20.5 | 4.0 | 0.15 | 0.22 |
| Alloy 34 | 53.9 | 14.9 | 0.27 | 0.29 |
| Alloy 35 | 52.4 | 19.8 | 0.36 | 0.39 |

As can be seen from Table 30, EDM cutting is considered to be representative of the optimal mechanical properties of the identified alloys, without a sheared edge, and which were processed to the point of assuming Structure #4 (Recrystallized Modal Structure). Accordingly, samples having a sheared edge due to punching indicate a significant drop in ductility as reflected by tensile elongation measurements of the punched samples having the ASTM E8 geometry. For Alloy 1, tensile elongation is initially 47.2% and then drops to 8.1%, a drop itself of 82.8%%. The drop in ductility from the punched to the EDM cut (E2/E1) varies from 0.57 to 0.05.

Figure 36:
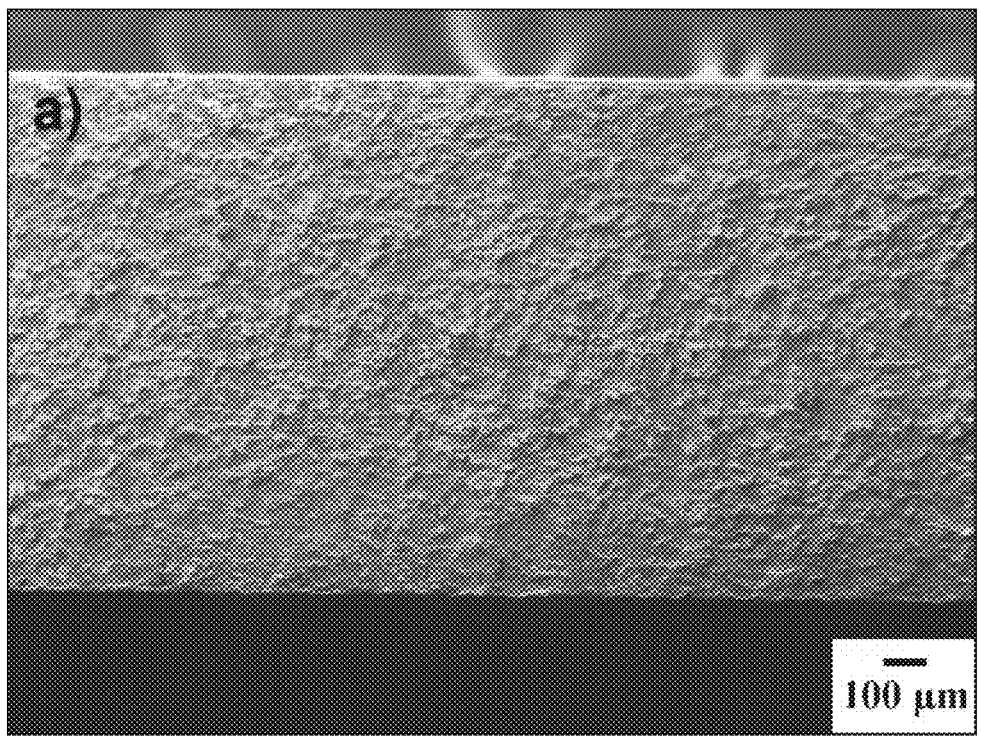
FIG. 36 SEM images of the specimen edges in Alloy 1 after a) EDM cutting and b) Punching.
Figure 36:
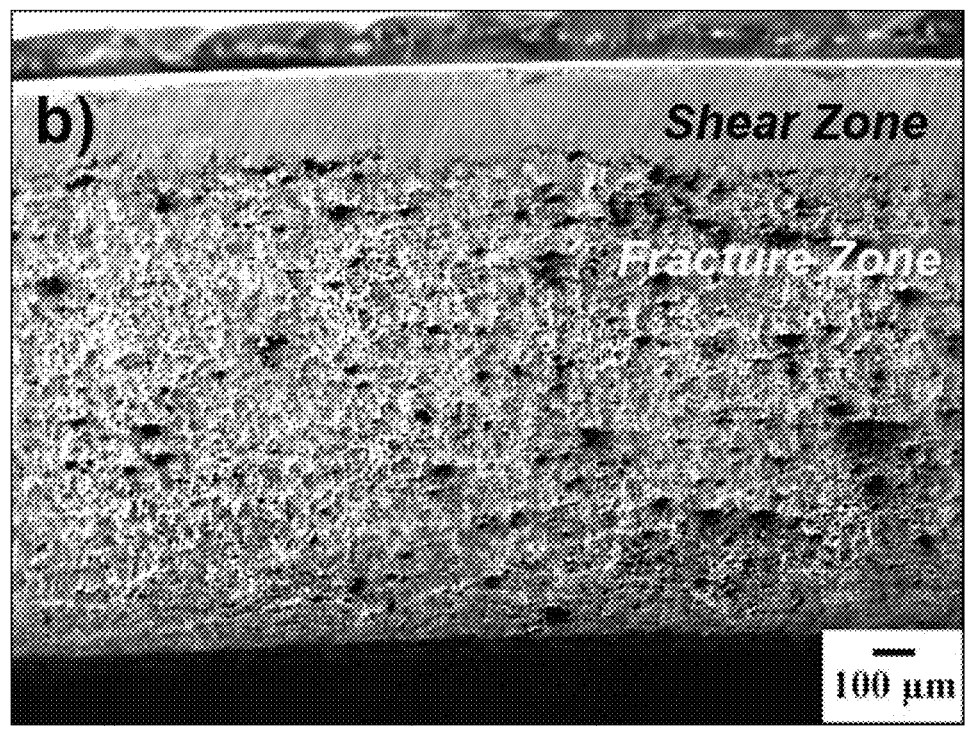
Figure 37:
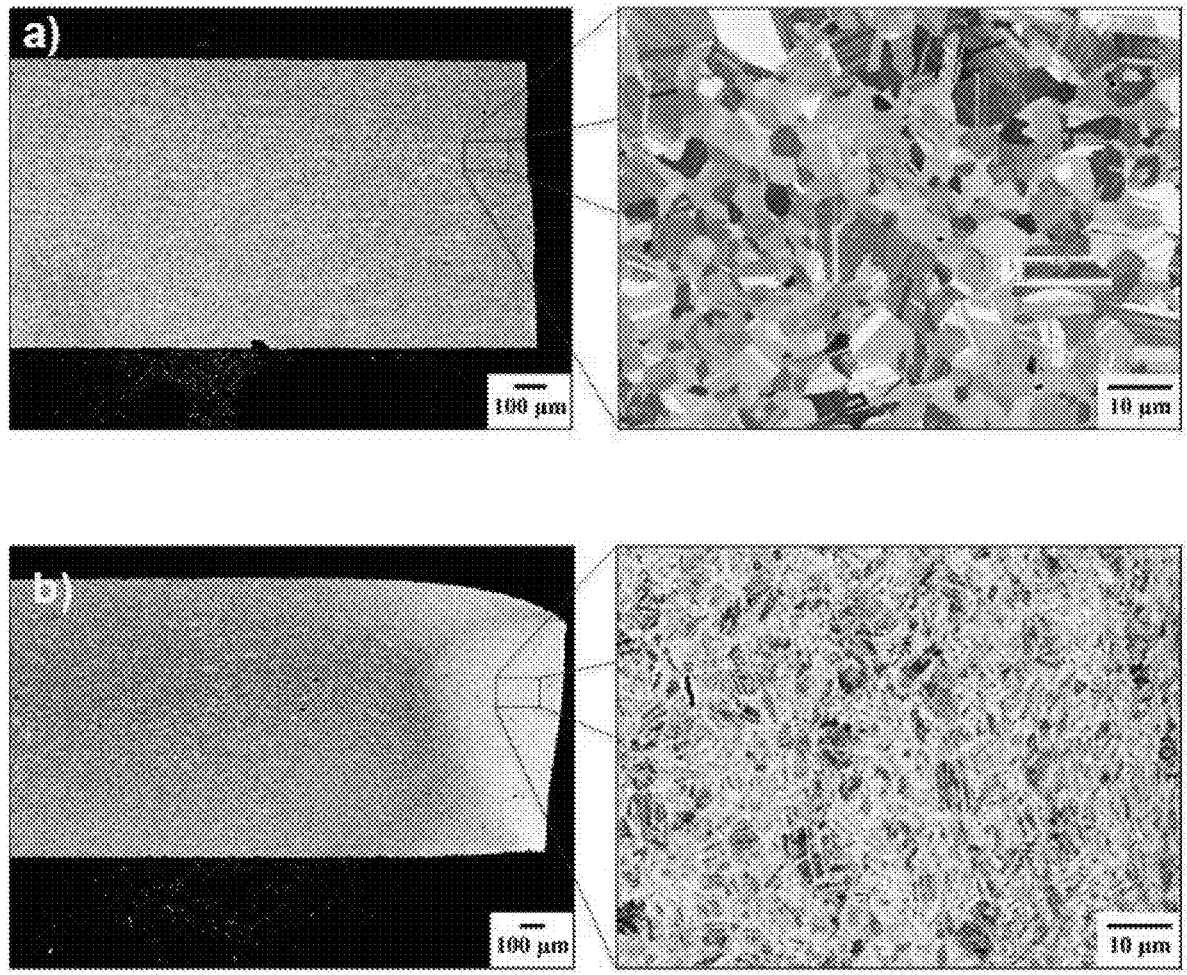
FIG. 37 SEM images of the microstructure near the edge in Alloy 1: a) EDM cut specimens and b) Punched specimens.

The edge status after punching and EDM cutting was analyzed by SEM using an EVO-MA10 scanning electron microscope manufactured by Carl Zeiss SMT Inc. The typical appearance of the specimen edge after EDM cutting is shown for Alloy 1 in FIG. 36a. The EDM cutting method minimizes the damage of a cut edge allowing the tensile properties of the material to be measured without any deleterious edge effects. In wire-EDM cutting, material is removed from the edge by a series of rapidly recurring current discharges/sparks and by this route an edge is formed without substantial deformation or edge damage. The appearance of the sheared edge after punching is shown in FIG. 36b. A significant damage of the edge occurs in a fracture zone that undergoes severe deformation during punching leading to structural transformation in the shear affected zone into a Refined High Strength Nanomodal Structure (FIG. 37b) with limited ductility while Recrystallized Modal Structure was observed near EDM cut edge (FIG. 37a).

This Case Example demonstrates that in a case of wire-EDM cutting tensile properties are measured at relative higher level as compared to that after punching. In contrast to EDM cutting, punching of the tensile specimens creates a significant edge damage which results in tensile property decrease. Relative excessive plastic deformation of the sheet alloys herein during punching leads to structural transformation to a Refined High Strength Nanomodal Structure (Structure #5, FIG. 1B) with reduced ductility leading to premature cracking at the edge and relatively lower properties (e.g. reduction in elongation and tensile strength). The magnitude of this drop in tensile properties has also been observed to depend on the alloy chemistry in correlation with austenite stability.

Case Example #7 Punched Edge vs EDM Cut Tensile Properties and Recovery

Slabs with thickness of 50 mm were laboratory cast from selected alloys listed in Table 31 according to the atomic ratios provided in Table 2 and laboratory processed by hot rolling, cold rolling and annealing at 850° C. for 10 min as described herein. Resultant sheet from each alloy with final thickness of 1.2 mm and Recrystallized Modal Structure (Structure #4, FIG. 1B) was used to demonstrate edge damage recovery by annealing of punched tensile specimens. In the broad context of the present invention, annealing may be achieved by various methods, including but not limited to furnace heat treatment, induction heat treatment and/or laser heat treatment.

Figure 38:
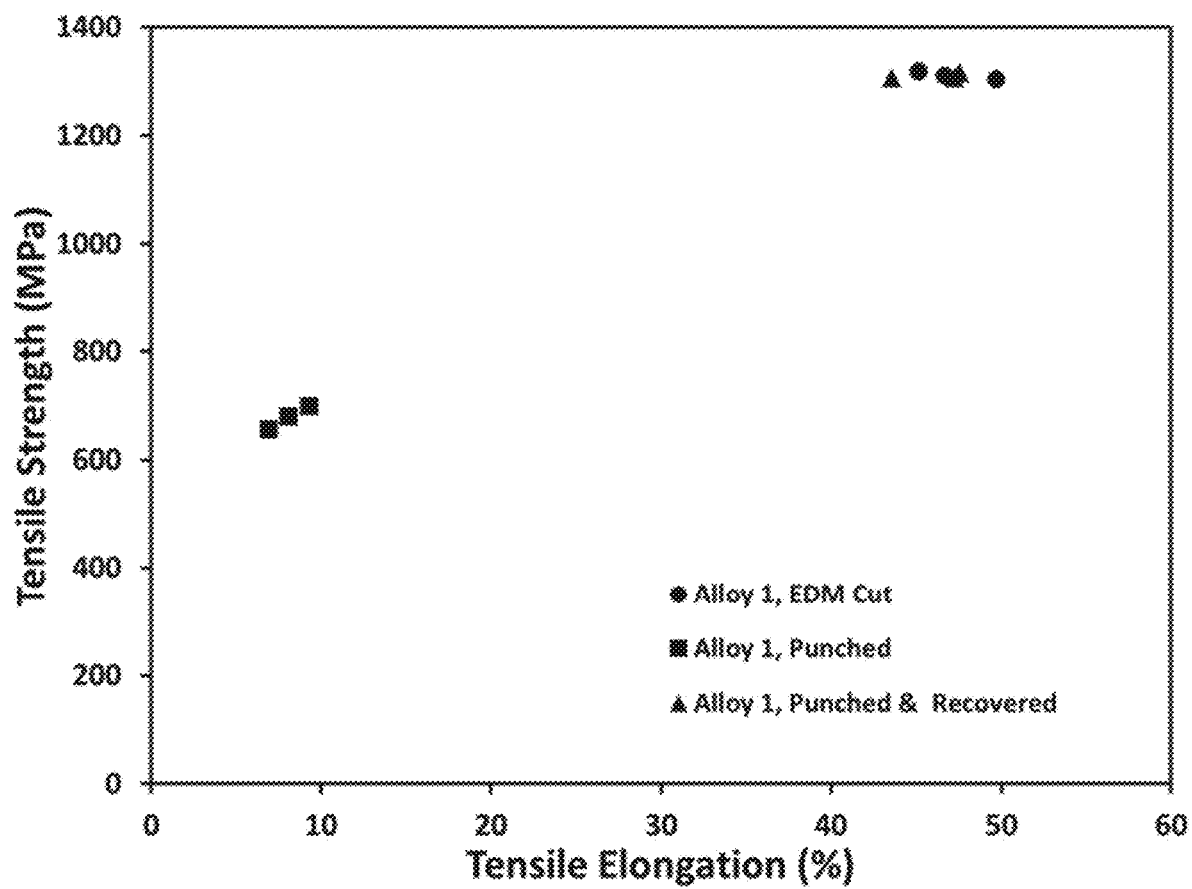
FIG. 38 Tensile test results for punched specimens from Alloy 1 before and after annealing demonstrating full property recovery from edge damage by annealing. Data for EDM cut specimens for the same alloy are shown for reference.

Tensile specimens in the ASTM E8 geometry were prepared using both wire EDM cutting and punching. Part of punched tensile specimens was then put through a recovery anneal of 850° C. for 10 minutes, followed by an air cool, to confirm the ability to recover properties lost by punching and shearing damage. Tensile properties were measured on an Instron 5984 mechanical testing frame using Instron's Bluehill control software. All tests were conducted at room temperature, with the bottom grip fixed and the top grip set to travel upwards at a rate of 0.012 mm/s. Strain data was collected using Instron's Advanced Video Extensometer. Tensile testing results are provided in Table 31 and illustrated in FIG. 38 for selected alloys showing a substantial mechanical property recovery in punched samples after annealing.

Figure 39:
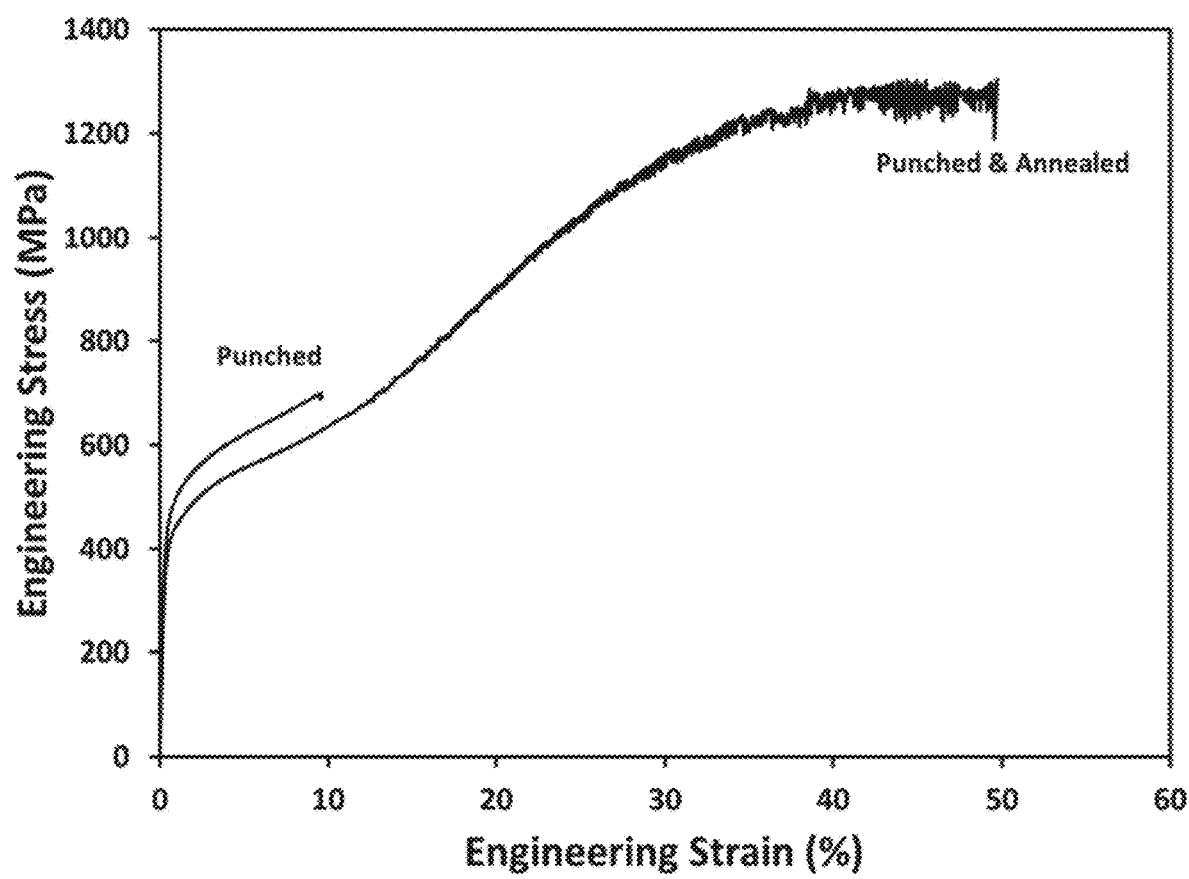
FIG. 39 Example tensile stress-strain curves for punched specimens from Alloy 1 with and without annealing.

For example, in the case of Alloy 1 indicated, when EDM cut into a tensile testing sample, a tensile elongation average value is about 47.2%. As noted above, when punched and therefore containing a sheared edge, the tensile testing of the sample with such edge indicated a significant drop in such elongation values, i.e. an average value of only about 8.1% due to Mechanism #4 and formation of Refined High Strength Nanomodal Structure (Structure #5, FIG. 1B), which while present largely at the edge section where shearing occurred, is nonetheless reflected in the bulk property measurements in tensile testing. However, upon annealing, which is representative of Mechanism #3 in FIG. 1B and conversion to Structure #4 (Recrystallized Modal Structure, FIG. 1B), the tensile elongation properties are restored. In the case of Alloy 1, the tensile elongation are brought back to an average value of about 46.2%. Example tensile stress-strain curves for punched specimens from Alloy 1 with and without annealing are shown in FIG. 39. In Table 32, a summary of the average tensile properties and the average lost and gained in tensile elongation is provided. Note that the individual losses and gains are a larger spread than the average losses. Accordingly, in the context of the present disclosure, the alloys herein, having an initial value of tensile elongation ($E_1$) when sheared, may indicate a drop in elongation properties to a value of $E_2$, wherein $E_2=(0.0.57$ to $0.05)(E_1)$. Then, upon application of Mechanism #3, which is preferably accomplished by heating/annealing at a temperature range of 450° C. up to the $T_m$ depending on alloy chemistry, the value of $E_2$ is recovered to an elongation value $E_3=(0.48$ to $1.21)(E_1)$.

TABLE 10

Tensile Properties of Punched and Annealed Specimens from Selected Alloys

| Alloy | Cutting Method | Yield Strength (MPa) | Ultimate Tensile Strength (MPa) | Tensile Elongation (%) |
|---|---|---|---|---|
| Alloy 1 | EDM Cut | 392 | 1310 | 46.7 |
| | | 397 | 1318 | 45.1 |
| | | 400 | 1304 | 49.7 |

TABLE 10-continued

Tensile Properties of Punched and Annealed Specimens from Selected Alloys

| Alloy | Cutting Method | Yield Strength (MPa) | Ultimate Tensile Strength (MPa) | Tensile Elongation (%) |
|---|---|---|---|---|
| | Punched | 431 | 699 | 9.3 |
| | | 430 | 680 | 8.1 |
| | | 422 | 656 | 6.9 |
| | Punched & Annealed | 364 | 1305 | 43.6 |
| | | 364 | 1315 | 47.6 |
| | | 370 | 1305 | 47.3 |
| Alloy 2 | EDM Cut | 434 | 1213 | 46.4 |
| | | 452 | 1207 | 46.8 |
| | | 444 | 1199 | 49.1 |
| | Punched | 491 | 823 | 14.4 |
| | | 518 | 792 | 11.3 |
| | | 508 | 796 | 11.9 |
| | Punched & Annealed | 432 | 1205 | 50.4 |
| | | 426 | 1191 | 50.7 |
| | | 438 | 1188 | 49.3 |
| Alloy 9 | EDM Cut | 468 | 1166 | 56.1 |
| | | 480 | 1177 | 52.4 |
| | | 475 | 1169 | 56.9 |
| | Punched | 508 | 1018 | 29.2 |
| | | 507 | 1007 | 28.6 |
| | | 490 | 945 | 23.3 |
| | Punched & Annealed | 411 | 1166 | 59.0 |
| | | 409 | 1174 | 52.7 |
| | | 418 | 1181 | 55.6 |
| Alloy 11 | EDM Cut | 474 | 1115 | 64.4 |
| | | 464 | 1165 | 62.5 |
| | | 495 | 1127 | 62.7 |
| | Punched | 503 | 924 | 24.6 |
| | | 508 | 964 | 28.0 |
| | | 490 | 921 | 25.7 |
| | Punched & Annealed | 425 | 1128 | 64.5 |
| | | 429 | 1117 | 57.1 |
| | | 423 | 1140 | 54.3 |
| Alloy 12 | EDM Cut | 481 | 1094 | 54.4 |
| | | 479 | 1128 | 64.7 |
| | | 495 | 1126 | 62.4 |
| | Punched | 521 | 954 | 27.1 |
| | | 468 | 978 | 30.7 |
| | | 506 | 975 | 31.2 |
| | Punched & Annealed | 419 | 1086 | 65.7 |
| | | 423 | 1085 | 63.0 |
| | | 415 | 1100 | 53.8 |
| Alloy 13 | EDM Cut | 454 | 1444 | 39.5 |
| | | 450 | 1455 | 38.7 |
| | Punched | 486 | 620 | 5.0 |
| | | 469 | 599 | 6.3 |
| | | 483 | 616 | 4.5 |
| | Punched & Annealed | 397 | 1432 | 41.4 |
| | | 397 | 1437 | 37.4 |
| | | 404 | 1439 | 40.3 |
| Alloy 14 | EDM Cut | 484 | 1170 | 58.7 |
| | | 489 | 1182 | 61.2 |
| | | 468 | 1188 | 59.0 |
| | Punched | 536 | 846 | 17.0 |
| | | 480 | 816 | 18.4 |
| | | 563 | 870 | 17.5 |
| | Punched & Annealed | 423 | 1163 | 58.3 |
| | | 412 | 1168 | 55.9 |
| | | 415 | 1177 | 51.5 |
| Alloy 18 | EDM Cut | 445 | 1505 | 37.8 |
| | | 422 | 1494 | 37.5 |
| | Punched | 478 | 579 | 2.4 |
| | | 469 | 561 | 2.6 |
| | | 463 | 582 | 2.9 |
| | Punched & Annealed | 398 | 1506 | 36.3 |
| | | 400 | 1502 | 40.3 |
| | | 392 | 1518 | 35.4 |
| Alloy 21 | EDM Cut | 464 | 1210 | 57.6 |
| | | 499 | 1244 | 49.0 |
| | | 516 | 1220 | 54.5 |
| | Punched | 527 | 801 | 11.3 |
| | | 511 | 806 | 12.6 |
| | | 545 | 860 | 15.2 |
| | Punched & Annealed | 409 | 1195 | 47.7 |
| | | 418 | 1214 | 53.8 |
| | | 403 | 1194 | 51.8 |
| Alloy 24 | EDM Cut | 440 | 1166 | 31.0 |
| | | 443 | 1167 | 32.0 |
| | | 455 | 1176 | 31.0 |
| | Punched | 496 | 696 | 5.0 |
| | | 463 | 688 | 5.0 |
| | | 440 | 684 | 4.0 |
| | Punched & Annealed | 559 | 1100 | 22.3 |
| | | 581 | 1113 | 22.0 |
| | | 561 | 1100 | 22.3 |
| Alloy 25 | EDM Cut | 474 | 1183 | 15.8 |
| | | 470 | 1204 | 17.0 |
| | | 485 | 1223 | 17.4 |
| | Punched | 503 | 589 | 2.1 |
| | | 517 | 579 | 0.8 |
| | | 497 | 583 | 2.1 |
| | Punched & Annealed | 457 | 1143 | 15.4 |
| | | 477 | 1159 | 14.6 |
| | | 423 | 1178 | 16.3 |
| Alloy 26 | EDM Cut | 735 | 1133 | 20.8 |
| | | 742 | 1109 | 19.0 |
| | Punched | 722 | 898 | 3.4 |
| | | 747 | 894 | 2.9 |
| | | 764 | 894 | 3.1 |
| | Punched & Annealed | 715 | 1112 | 18.8 |
| | | 713 | 1098 | 17.8 |
| | | 709 | 931 | 10.0 |
| Alloy 27 | EDM Cut | 537 | 1329 | 19.3 |
| | | 513 | 1323 | 21.4 |
| | | 480 | 1341 | 20.8 |
| | Punched | 563 | 624 | 4.3 |
| | | 568 | 614 | 3.3 |
| | | 539 | 637 | 4.3 |
| | Punched & Annealed | 505 | 1324 | 19.7 |
| | | 514 | 1325 | 20.0 |
| | | 539 | 1325 | 19.4 |
| Alloy 29 | EDM Cut | 460 | 1209 | 54.7 |
| | | 441 | 1199 | 54.1 |
| | | 475 | 1216 | 52.9 |
| | Punched | 489 | 828 | 15.4 |
| | | 486 | 811 | 14.6 |
| | | 499 | 813 | 14.8 |
| | Punched & Annealed | 410 | 1204 | 53.9 |
| | | 410 | 1220 | 53.2 |
| | | 408 | 1214 | 52.3 |
| Alloy 32 | EDM Cut | 431 | 1196 | 50.6 |
| | | 437 | 1186 | 52.0 |
| | | 420 | 1172 | 54.7 |
| | Punched | 471 | 826 | 19.9 |
| | | 452 | 828 | 19.7 |
| | | 482 | 854 | 19.7 |
| | Punched & Annealed | 406 | 1169 | 58.1 |
| | | 403 | 1170 | 51.4 |
| | | 405 | 1176 | 57.7 |

TABLE 32

Summary of Tensile Properties; Loss (E2/E1) and Gain (E3/E1)

| Alloy | Loss In Tensile Elongation (E2/E1) | | Gain in Tensile Elongation (E3/E1) | |
|---|---|---|---|---|
| | Min | Max | Min | Max |
| Alloy 1 | 0.14 | 0.21 | 0.88 | 1.06 |
| Alloy 2 | 0.23 | 0.31 | 1.00 | 1.09 |
| Alloy 9 | 0.41 | 0.56 | 0.93 | 1.13 |
| Alloy 11 | 0.38 | 0.45 | 0.84 | 1.03 |

TABLE 32-continued

Summary of Tensile Properties; Loss (E2/E1) and Gain (E3/E1)

| Alloy | Loss In Tensile Elongation (E2/E1) | | Gain in Tensile Elongation (E3/E1) | |
|---|---|---|---|---|
| | Min | Max | Min | Max |
| Alloy 12 | 0.42 | 0.57 | 0.83 | 1.21 |
| Alloy 13 | 0.11 | 0.16 | 0.95 | 1.07 |
| Alloy 14 | 0.28 | 0.31 | 0.84 | 0.99 |
| Alloy 18 | 0.06 | 0.08 | 0.94 | 1.07 |
| Alloy 21 | 0.20 | 0.31 | 0.83 | 1.10 |
| Alloy 24 | 0.13 | 0.16 | 0.69 | 0.72 |
| Alloy 25 | 0.05 | 0.13 | 0.89 | 1.03 |
| Alloy 26 | 0.14 | 0.18 | 0.48 | 0.99 |
| Alloy 27 | 0.15 | 0.22 | 0.91 | 1.04 |
| Alloy 29 | 0.27 | 0.29 | 0.97 | 1.02 |
| Alloy 32 | 0.36 | 0.39 | 0.94 | 1.15 |

Punching of tensile specimens results in edge damage and lowering the tensile properties of the material. Plastic deformation of the sheet alloys herein during punching leads to structural transformation to a Refined High Strength Nanomodal Structure (Structure #5, FIG. 1B) with reduced ductility leading to premature cracking at the edge and relatively lower properties (e.g. reduction in elongation and tensile strength). This Case Example demonstrates that due to the unique structural reversibility, the edge damage in the alloys listed in Table 2 is substantially recoverable by annealing leading back to Recrystallized Modal Structure (Structure #4, FIG. 1B) formation with full or partial property restoration that depends on alloy chemistry and processing. For example, as exemplified by Alloy 1, punching and shearing and creating a sheared edge is observed to reduce tensile strength from an average of about 1310 MPa (an EDM cut sample without a sheared/damaged edge) to an average value of 678 MPa, a drop of between 45 to 50%. Upon annealing, tensile strength recovers to an average value of about 1308 MPa, which is in the range of greater than or equal to 95% of the original value of 1310 MPa. Similarly, tensile elongation is initially at an average of about 47.1%, dropping to an average value of 8.1%, a decrease of up to about 80 to 85%, and upon annealing and undergoing what is shown in FIG. 1B as Mechanism #3, tensile elongation recovers to an average value of 46.1%, a recovery of greater than or equal to 90% of the value of the elongation value of 47.1%.

Case Example #8 Temperature Effect on Recovery and Recrystallization

Figure 40:
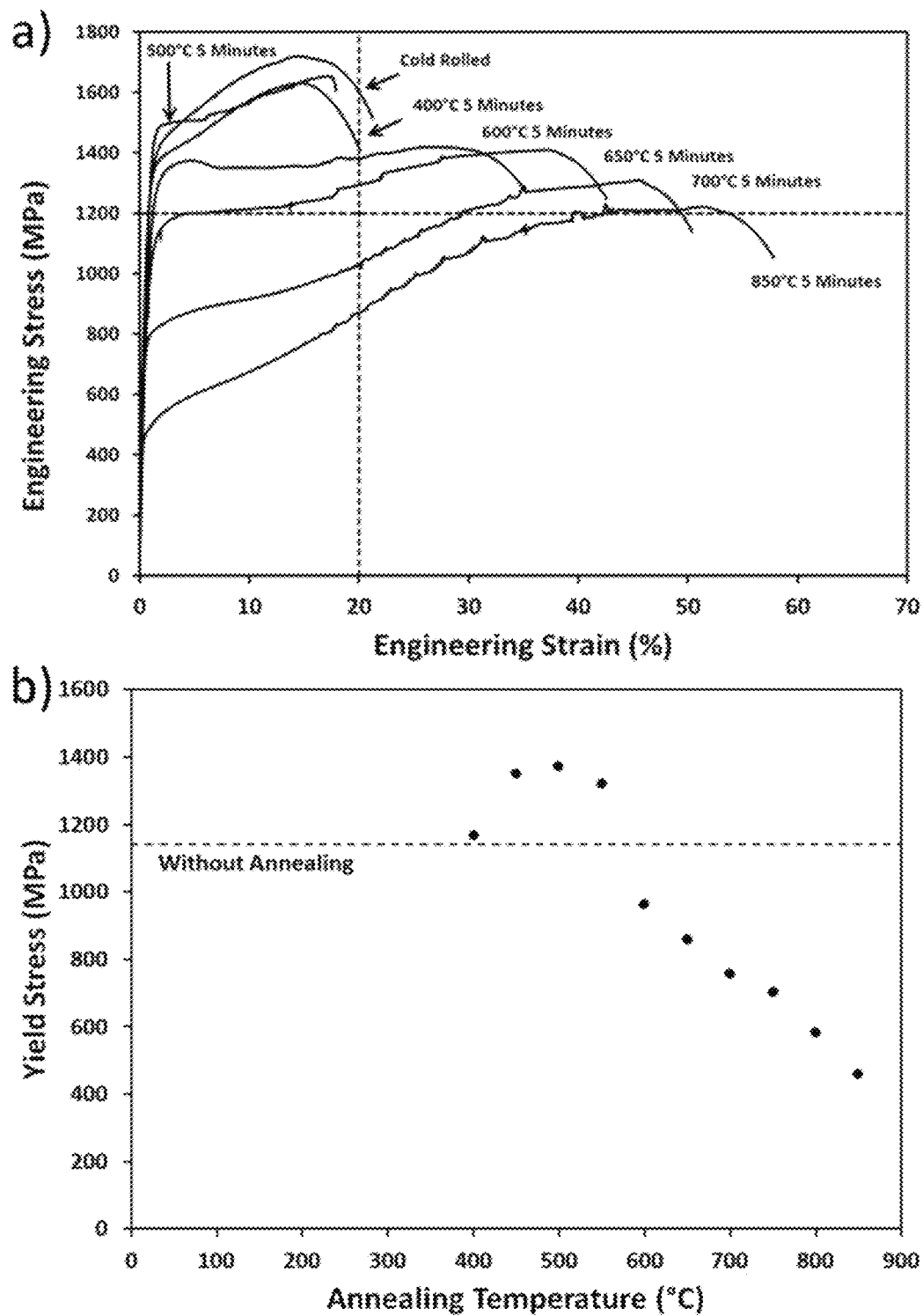
FIG. 40 Tensile stress-strain curves illustrating the response of cold rolled Alloy 1 to recovery temperatures in the range between 400° C. and 850° C.; a) Tensile curves, b) Yield strength.

Slabs with thickness of 50 mm were laboratory cast from Alloy 1 and laboratory processed by hot rolling down to thickness of 2 mm and cold rolling with reduction of approximately 40%. Tensile specimens in the ASTM E8 geometry were prepared by wire EDM cut from cold rolled sheet. Part of tensile specimens was annealed for 10 minutes at different temperatures in a range from 450 to 850° C., followed by an air cool. Tensile properties were measured on an Instron 5984 mechanical testing frame using Instron's Bluehill control software. All tests were conducted at room temperature, with the bottom grip fixed and the top grip set to travel upwards at a rate of 0.012 mm/s. Strain data was collected using Instron's Advanced Video Extensometer. Tensile testing results are shown in FIG. 40 demonstrating a transition in deformation behavior depending on annealing temperature. During the process of cold rolling, the Dynamic Nanophase Strengthening (Mechanism #2, FIG. 1A) or the Nanophase Refinement & Strengthening (Mechanism #4, FIG. 1B) occurs which involves, once the yield strength is exceeded with increasing strain, the continuous transformation of austenite to ferrite plus one or more types of nanoscale hexagonal phases. Concurrent with this transformation, deformation by dislocation mechanisms also occurs in the matrix grains prior to and after transformation. The result is the change in the microstructure from the Nanomodal Structure (Structure #2, FIG. 1A) to the High Strength Nanomodal Structure (Structure #3, FIG. 1A) or from the Recrystallized Modal Structure (Structure #4, FIG. 1B) to the Refined High Strength Nanomodal Structure (Structure #5, FIG. 1B). The structure and property changes occurring during cold deformation can be reversed at various degrees by annealing depending on annealing parameters as seen in the tensile curves of FIG. 40A. In FIG. 40B, the corresponding yield strength from the tensile curves are provided as a function of the heat treatment temperature. The yield strength after cold rolling with no anneal is measured at 1141 MPa. As shown, depending on how the material is annealed which may include partial and full recovery and partial and full recrystallization the yield strength can be varied widely from 1372 MPa at the 500° C. anneal down to 458 MPa at the 850° C. anneal.

Figure 41:
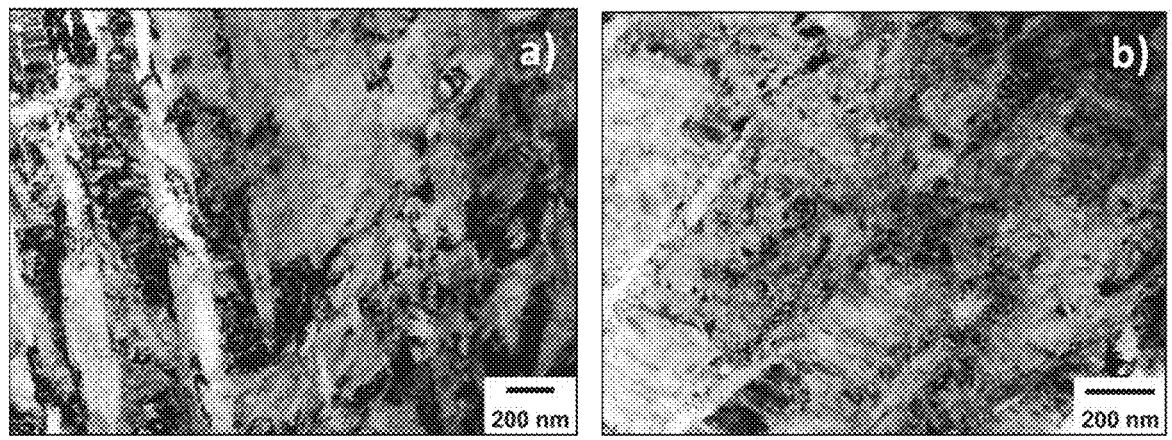
FIG. 41 Bright-field TEM images of cold rolled ALLOY 1 samples exhibiting the highly deformed and textured High Strength Nanomodal Structure: a) Lower magnification image, b) Higher magnification image.
Figure 42:
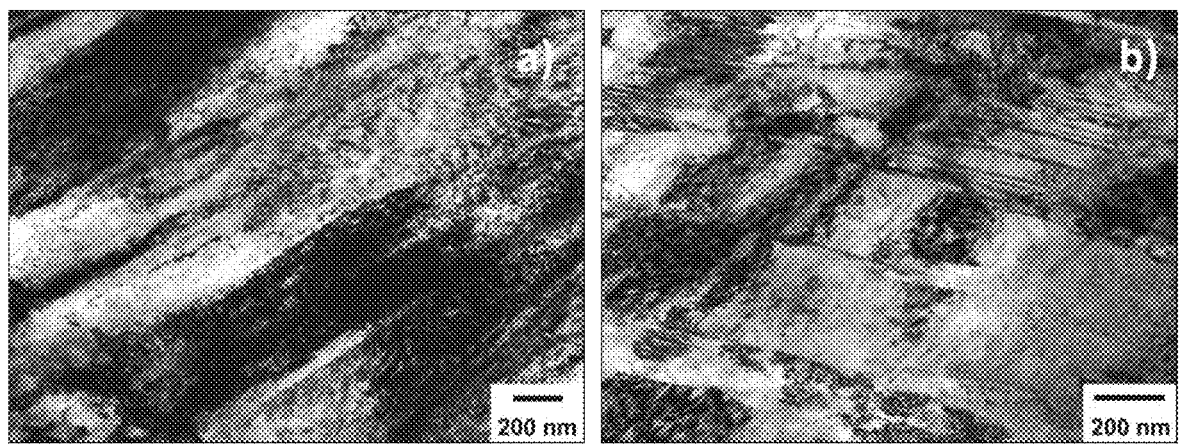
FIG. 42 Bright-field TEM images of ALLOY 1 samples annealed at 450° C. 10 min exhibiting the highly deformed and textured High Strength Nanomodal Structure with no recrystallization occurred: a) Lower magnification image, b) Higher magnification image.
Figure 43:
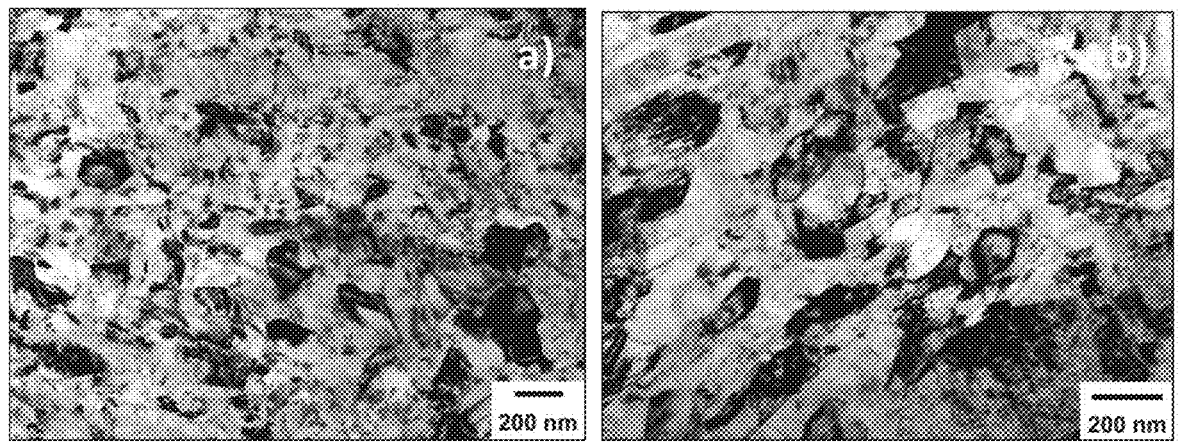
FIG. 43 Bright-field TEM images of ALLOY 1 samples annealed at 600° C. 10 min exhibiting nanoscale grains signaling the beginning of recrystallization: a) Lower magnification image, b) Higher magnification image.
Figure 44:
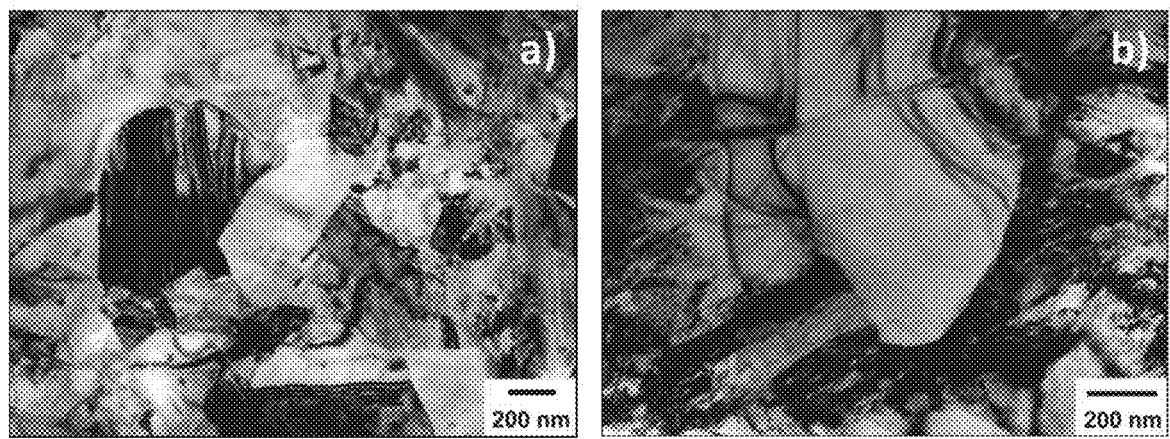
FIG. 44 Bright-field TEM images of ALLOY 1 samples annealed at 650° C. 10 min exhibiting larger grains indicating the higher extent of recrystallization: a) Lower magnification image, b) Higher magnification image.
Figure 45:
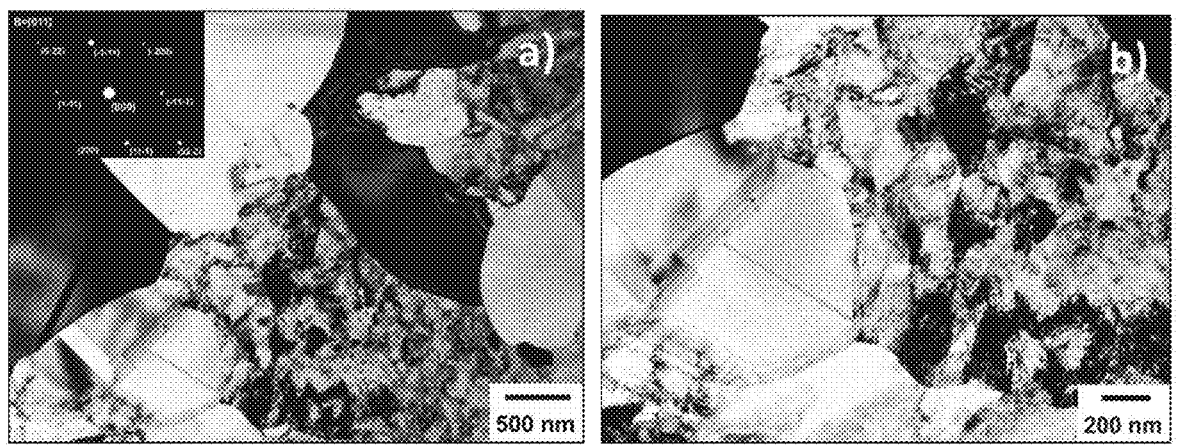
FIG. 45 Bright-field TEM images of ALLOY 1 samples annealed at 700° C. 10 min exhibiting recrystallized grains with a small fraction of untransformed area, and electron diffraction shows the recrystallized grains are austenite: a) Lower magnification image, b) Higher magnification image.

To show the microstructural recovery in accordance to the tensile property upon annealing, TEM studies were conducted on selected samples that were annealed at different temperatures. For comparison, cold rolled sheet was included as a baseline herein. Laboratory cast Alloy 1 slab of 50 mm thick was used, and the slab was hot rolled at 1250° C. by two-step of 80.8% and 78.3% to approx. 2 mm thick, then cold rolled by 37% to sheet of 1.2 mm thick. The cold rolled sheet was annealed at 450° C., 600° C., 650° C. and 700° C. respectively for 10 minutes. FIG. 41 shows the microstructure of as-cold rolled Alloy 1 sample. It can be seen that typical High Strength Nanomodal Structure is formed after cold rolling, in which high density of dislocations are generated along with the presence of strong texture. Annealing at 450° C. for 10 min does not lead to recrystallization and formation of the High Strength Nanomodal Structure, as the microstructure remains similar to that of the cold rolled structure and the rolling texture remains unchanged (FIG. 42). When the cold rolled sample is annealed at 600° C. for 10 min, TEM analysis shows very small isolated grains, a sign of the beginning of recrystallization. As shown in FIG. 43, isolated grains of 100 nm or so are produced after the annealing, while areas of deformed structure with dislocation networks are also present. Annealing at 650° C. for 10 min shows larger recrystallized grains suggesting the progress of recrystallization. Although the fraction of deformed area is reduced, the deformed structure continues to be seen, as shown in FIG. 44. Annealing at 700° C. 10 min shows larger and cleaner recrystallized grains, as displayed by FIG. 45. Selected electron diffraction shows that these recrystallized grains are of the austenite phase. The area of deformed structure is smaller compared to the samples annealed at lower temperature. Survey over the entire sample suggests that approx. 10% to 20% area is occupied by the deformed structure. The progress of recrystallization revealed by TEM in the samples annealed at lower temperature to higher temperature corresponds excellently to the change of tensile properties shown in FIG. 40. These low temperature annealed samples (such as below 600° C.) maintain predominantly the High Strength Nanomodal Structure, leading to the reduced ductility. The recrystallized sample (such as at 700° C.) recovers majority of the elongation, compared to the fully recrystallized sample at 850° C. The annealing in between these temperatures partially recovers the ductility.

Figure 46:
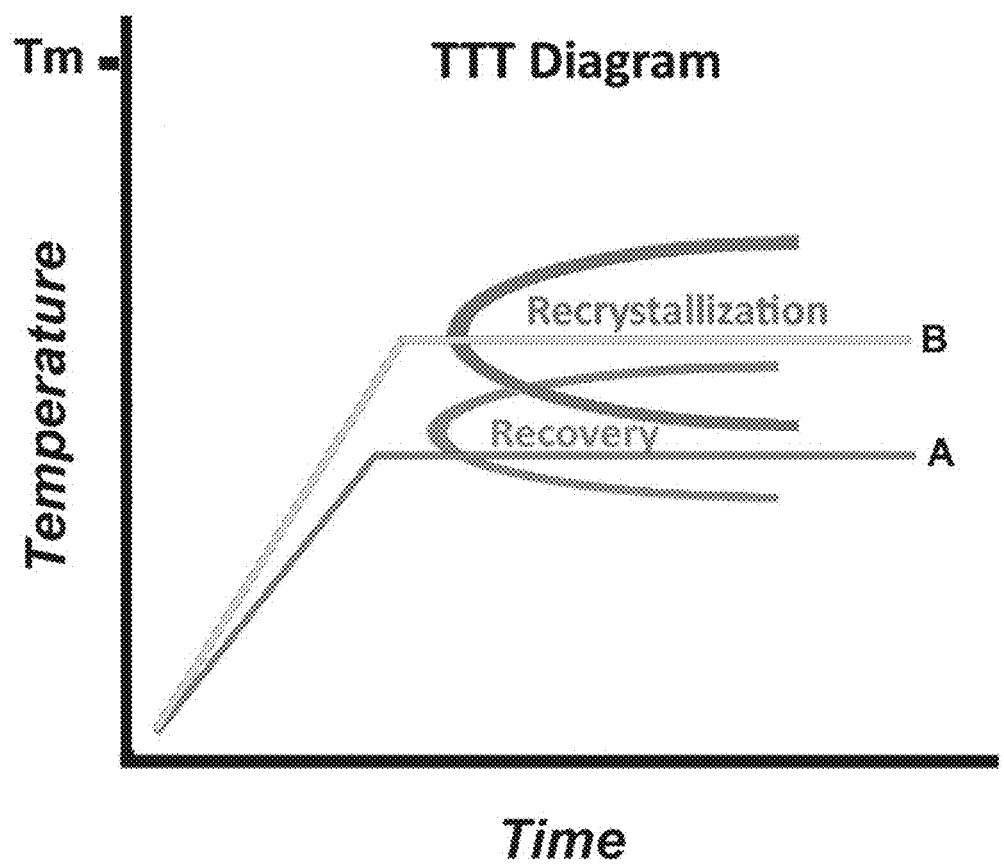
FIG. 46 Model Time Temperature Transformation Diagram representing response of the steel alloys herein to temperature at annealing. In the heating curve labeled A, recovery mechanisms are activated. In the heating curve labeled B, both recovery and recrystallization mechanisms are activated.

One reason behind the difference in recovery and transition in deformation behavior is illustrated by the model TTT diagram in FIG. 46. As described previously, the very fine/nanoscale grains of ferrite formed during cold working recrystallize into austenite during annealing and some fraction of the nanoprecipitates re-dissolve. Concurrently, the effect of the strain hardening is eliminated with dislocation networks and tangles, twin boundaries, and small angle boundaries being annihilated by various known mechanisms. As shown by the heating curve A of the model temperature, time transformation (TTT) diagram in FIG. 46, at low temperatures (particularly below 650° C. for Alloy 1), only recovery may occur without recrystallization (i.e. recovery being a reference to a reduction in dislocation density).

In other words, in the broad context of the present invention, the effect of shearing and formation of a sheared edge, and its associated negative influence on mechanical properties, can be at least partially recovered at temperatures of 450° C. up to 650° C. as shown in FIG. 46. In addition, at 650° C. and up to below Tm of the alloy, recrystallization can occur, which also contributes to restoring mechanical strength lost due to the formation of a sheared edge.

Accordingly, this Case Example demonstrates that upon deformation during cold rolling, concurrent processes occur involving dynamic strain hardening and phase transformation through unique Mechanisms #2 or #3 (FIG. 1A) along with dislocation based mechanisms. Upon heating, the microstructure can be reversed into a Recrystallized Modal Structure (Structure #4, FIG. 1B). However, at low temperatures, this reversing process may not occur when only dislocation recovery takes place. Thus, due to the unique mechanisms of the alloys in Table 2, various external heat treatments can be used to heal the edge damage from punching/stamping.

Case Example #9 Temperature Effect of Punched Edge Recovery

Slabs with thickness of 50 mm were laboratory cast from selected alloys listed in Table 33 according to the atomic ratios provided in Table 2 and laboratory processed by hot rolling, cold rolling and annealing at 850° C. for 10 min as described in Main Body section of current application. Resultant sheet from each alloy with final thickness of 1.2 mm and Recrystallized Modal Structure (Structure #4, FIG. 1B) was used to demonstrate punched edge damage recovery after annealing as a function of temperature.

Tensile specimens in the ASTM E8 geometry were prepared by punching. A part of punched tensile specimens from selected alloys was then put through a recovery anneal for 10 minutes at different temperatures in a range from 450 to 850° C., followed by an air cool. Tensile properties were measured on an Instron 5984 mechanical testing frame using Instron's Bluehill control software. All tests were conducted at room temperature, with the bottom grip fixed and the top grip set to travel upwards at a rate of 0.012 mm/s. Strain data was collected using Instron's Advanced Video Extensometer.

Figure 47:
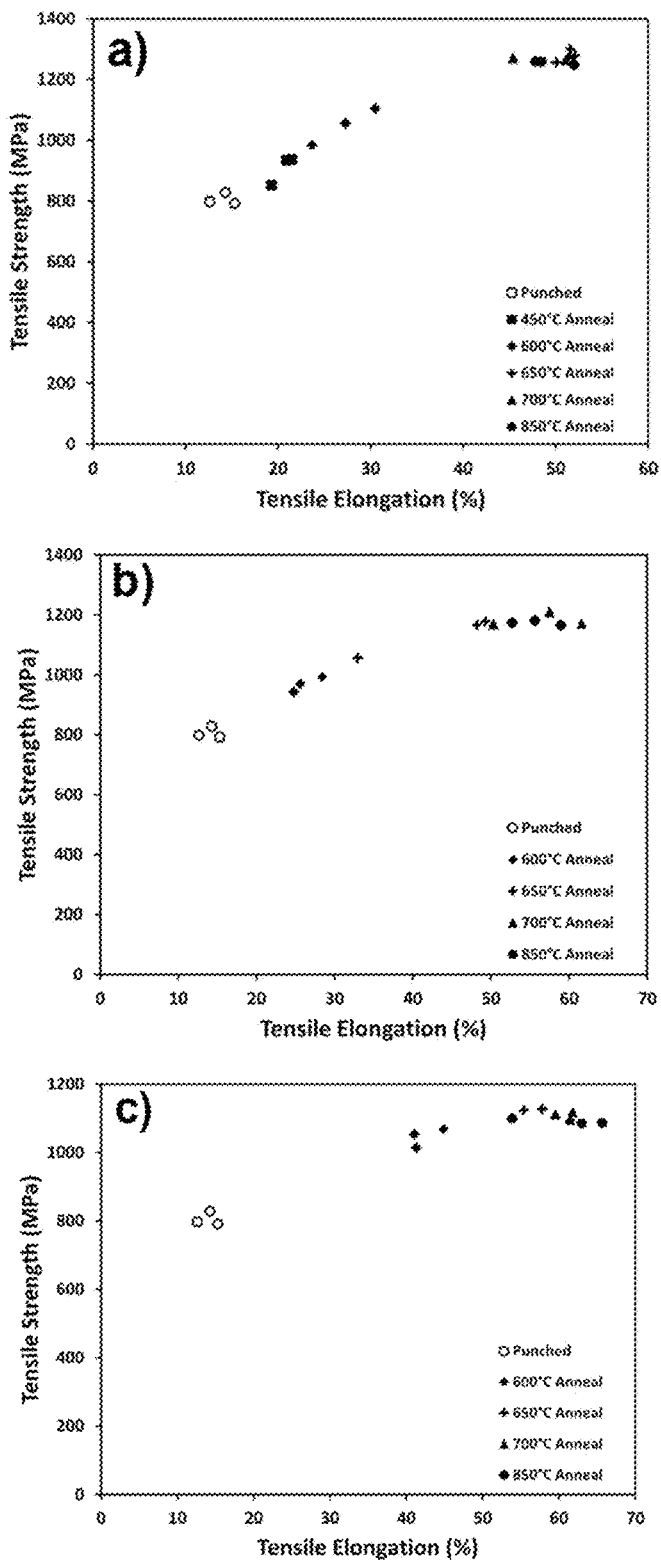
FIG. 47 Tensile properties of punched specimens before and after annealing at different temperatures: a) Alloy1, b) Alloy 9, and c) Alloy 12.

Tensile testing results are shown in Table 32 and in FIG. 47. As it can be seen, full or nearly full property recovery achieved after annealing at temperatures at 650° C. and higher, suggesting that the structure is fully or near fully recrystallized (i.e. change in structure from Structure #5 to Structure #4 in FIG. 1B) in the damaged edges after punching. For example, the level of recrystallization at the damaged edge is contemplated to be at a level of greater than or equal to 90% when annealing temperatures are in the range of 650° C. up to $T_m$. Lower annealing temperature (e.g. temperatures below 650° C. does not result in full recrystallization and leads to partial recovery (i.e. decrease in dislocation density) as described in Case Example #8 and illustrated in FIG. 6.

Figure 48:
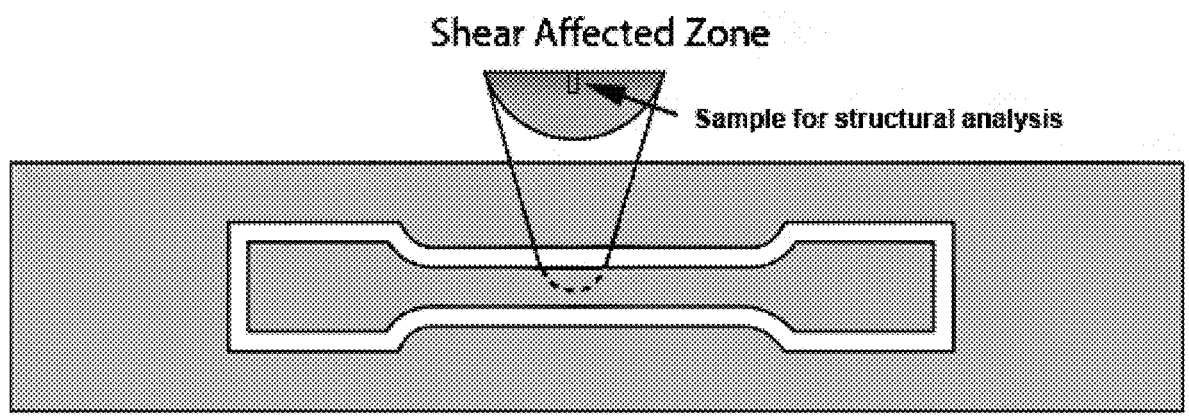
FIG. 48 Schematic illustration of the sample position for structural analysis.

Microstructural changes in Alloy 1 at the shear edge as a result of the punching and annealing at different temperatures were examined by SEM. Cross section samples were cut from ASTM E8 punched tensile specimens near the sheared edge in as-punched condition and after annealing at 650° C. and 700° C. as shown in FIG. 48.

For SEM study, the cross section samples were ground on SiC abrasive papers with reduced grit size, and then polished progressively with diamond media paste down to 1 μm. The final polishing was done with 0.02 μm grit SiO2 solution. Microstructures were examined by SEM using an EVO-MA10 scanning electron microscope manufactured by Carl Zeiss SMT Inc.

Figure 49:
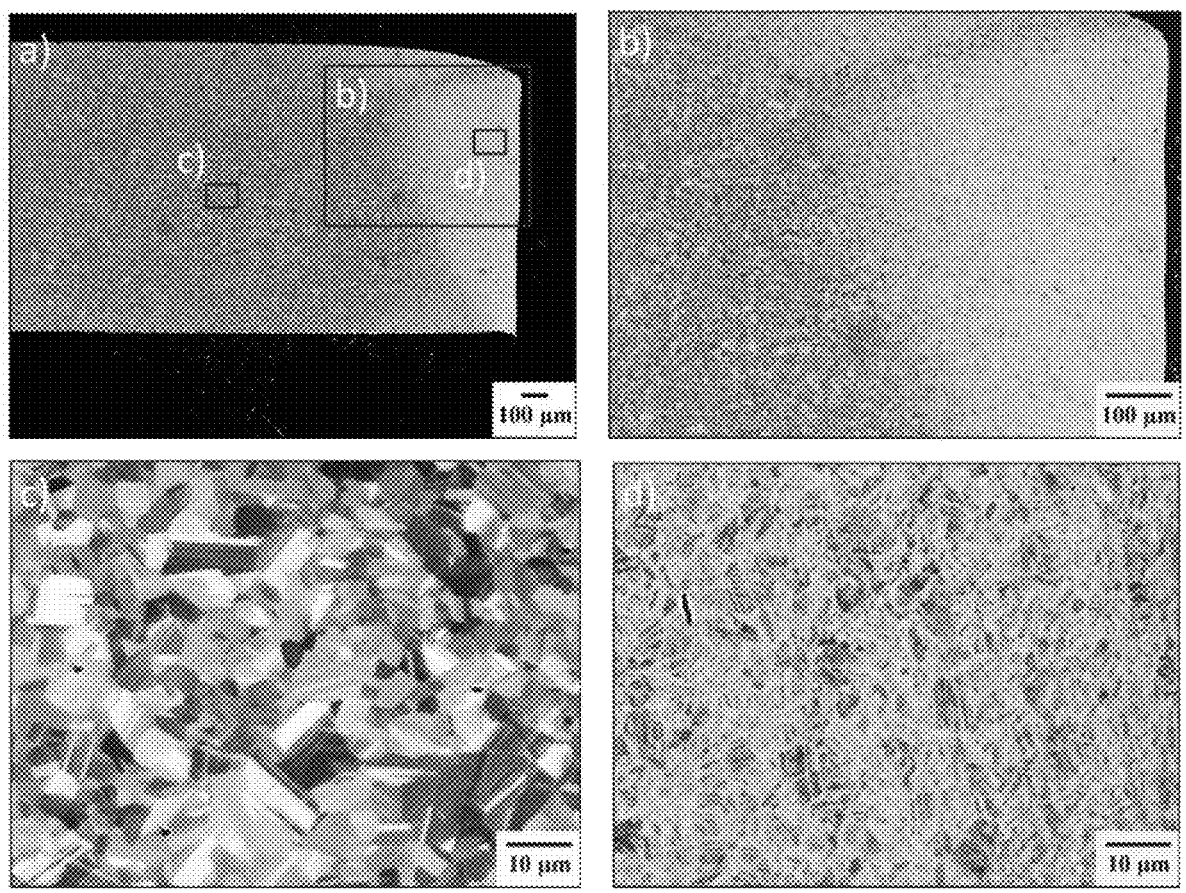
FIG. 49 Alloy 1 punched E8 samples in the as-punched condition: a) Low magnification image showing a triangular deformation zone at the punched edge which is located on the right side of the picture. Additionally close up areas for the subsequent micrographs are provided, b) Higher magnification image showing the deformation zone, c) Higher magnification image showing the recrystallized structure far away from the deformation zone, d) Higher magnification image showing the deformed structure in the deformation zone.
Figure 50:
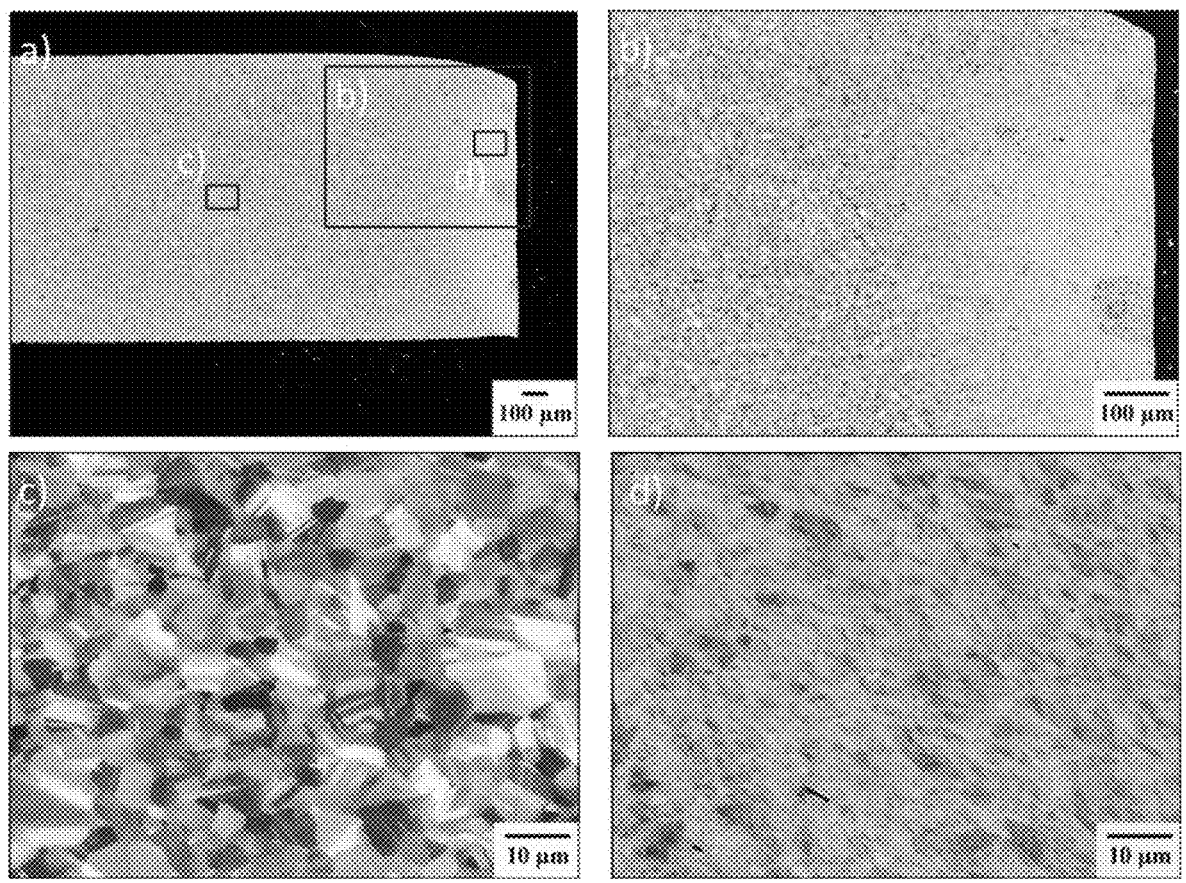
FIG. 50 Alloy 1 punched E8 samples after annealing at 650° C. for 10 min: a) Low magnification image showing the deformation zone at edge, punching in upright direction. Additionally, close up areas for the subsequent micrographs are provided: b) Higher magnification image showing the deformation zone, c) Higher magnification image showing the recrystallized structure far away from the deformation zone, d) Higher magnification image showing the recovered structure in the deformation zone.
Figure 51:
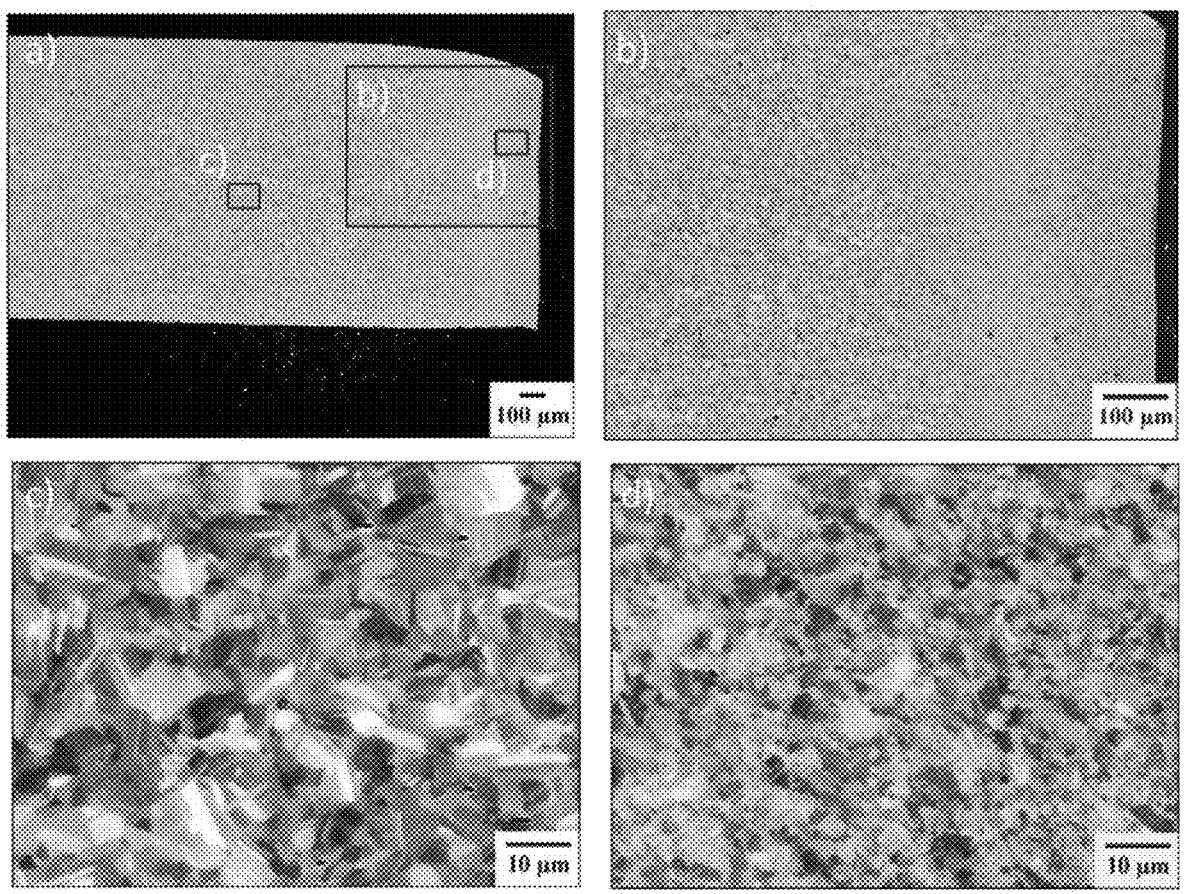
FIG. 51 Alloy 1 punched E8 samples after annealing at 700° C. for 10 min: a) Low magnification image showing the deformation zone at edge, punching in upright direction. Additionally, close up areas for the subsequent micrographs are provided, b) Higher magnification image showing the deformation zone, c) Higher magnification image showing the recrystallized structure far away from the deformation zone, d) Higher magnification image showing the recrystallized structure in the deformation zone.

FIG. 49 shows the backscattered SEM images of the microstructure at the edge in the as-punched condition. It can be seen that the microstructure is deformed and transformed in the shear affected zone (i.e., the triangle with white contrast close to the edge) in contrast to the recrystallized microstructure in the area away from the shear affected zone. Similar to tensile deformation, the deformation in the shear affected zone caused by punching creates Refined High Strength Nanomodal Structure (Structure #5, FIG. 1B) through Nanophase Refinement & Strengthening mechanism. However, annealing recovers the tensile properties of punched ASTM E8 specimens, which are related to the microstructure change in the shear affected zone during annealing. FIG. 50 shows the microstructure of the sample annealed at 650° C. for 10 minutes. Compared to the as-punched sample, the shear affected zone becomes smaller with less contrast suggesting that the microstructure in the shear affected zone evolves toward that in the center of the sample. A high magnification SEM image shows that some very small grains are nucleated, but recrystallization does not take place massively across the shear affected zone. It is likely that the recrystallization is in the early stage with most of the dislocations annihilated. Although the structure is not fully recrystallized, the tensile property is substantially recovered (Table 32 and FIG. 47a). Annealing at 700° C. for 10 minutes leads to full recrystallization of the shear affected zone. As shown in FIG. 51, the contrast in shear affected zone significantly decreased. High magnification image shows that equiaxed grains with clear grain boundaries are formed in the shear affected zone, indicating full recrystallization. The grain size is smaller than that in the center of sample. Note that the grains in the center are resulted from recrystallization after annealing at 850° C. for 10 minutes before punching of specimens. With the shear affected zone fully recrystallized, the tensile properties are fully recovered, as shown in Table 32 and FIG. 47a.

Punching of tensile specimens result in edge damage lowering the tensile properties of the material. Plastic deformation of the sheet alloys herein during punching leads to structural transformation to a Refined High Strength Nanomodal Structure (Structure #5, FIG. 1B) with reduced ductility leading to premature cracking at the edge. This Case Example demonstrates that this edge damage is partially/fully recoverable by different anneals over a wide range of industrial temperatures.

TABLE 33

Tensile Properties after Punching and Annealing at Different Temperatures

| Alloy | Anneal Temperature (° C.) | Yield Strength (MPa) | Ultimate Tensile Strength (MPa) | Tensile Elongation (%) |
|---|---|---|---|---|
| Alloy 1 | As Punched | 494 | 798 | 12.6 |
| | | 487 | 829 | 14.3 |
| | | 474 | 792 | 15.3 |
| | 450 | 481 | 937 | 21.5 |
| | | 469 | 934 | 20.9 |
| | | 485 | 852 | 19.3 |
| | 600 | 464 | 1055 | 27.3 |
| | | 472 | 1103 | 30.5 |
| | | 453 | 984 | 23.7 |
| | 650 | 442 | 1281 | 51.5 |
| | | 454 | 1270 | 45.4 |
| | | 445 | 1264 | 51.1 |
| | 700 | 436 | 1255 | 50.1 |
| | | 442 | 1277 | 52.1 |
| | | 462 | 1298 | 51.6 |
| | 850 | 407 | 1248 | 52.0 |
| | | 406 | 1260 | 47.8 |
| | | 412 | 1258 | 48.5 |
| Alloy 9 | As Punched | 508 | 1018 | 29.2 |
| | | 507 | 1007 | 28.6 |
| | | 490 | 945 | 23.3 |
| | 600 | 461 | 992 | 28.5 |
| | | 462 | 942 | 24.8 |
| | | 471 | 968 | 25.6 |
| | 650 | 460 | 1055 | 33.0 |
| | | 470 | 1166 | 48.3 |
| | | 473 | 1177 | 49.3 |
| | 700 | 457 | 1208 | 57.5 |
| | | 455 | 1169 | 50.3 |
| | | 454 | 1171 | 61.6 |
| | 850 | 411 | 1166 | 59.0 |
| | | 409 | 1174 | 52.7 |
| | | 418 | 1181 | 55.6 |
| Alloy 12 | As Punched | 521 | 954 | 27.1 |
| | | 468 | 978 | 30.7 |
| | | 506 | 975 | 31.2 |
| | 600 | 462 | 1067 | 44.9 |
| | | 446 | 1013 | 41.3 |
| | | 471 | 1053 | 41.1 |
| | 650 | 452 | 1093 | 61.5 |
| | | 449 | 1126 | 57.8 |
| | | 505 | 1123 | 55.4 |
| | 700 | 480 | 1112 | 59.6 |
| | | 460 | 1117 | 61.8 |
| | | 468 | 1096 | 61.5 |
| | 850 | 419 | 1086 | 65.7 |
| | | 423 | 1085 | 63.0 |
| | | 415 | 1100 | 53.8 |

Case Example #10 Effect of Punching Speed on Punched Edge Property Reversibility Slabs with thickness of 50 mm were laboratory cast from selected alloys listed in Table 34 according to the atomic ratios provided in Table 2 and laboratory processed by hot rolling, cold rolling and annealing at 850° C. for 10 min as described herein. Resultant sheet from each alloy with final thickness of 1.2 mm and Recrystallized Modal Structure (Structure #4, FIG. 1B) was used to demonstrate edge damage recovery as a function of punching speed.

Figure 52:
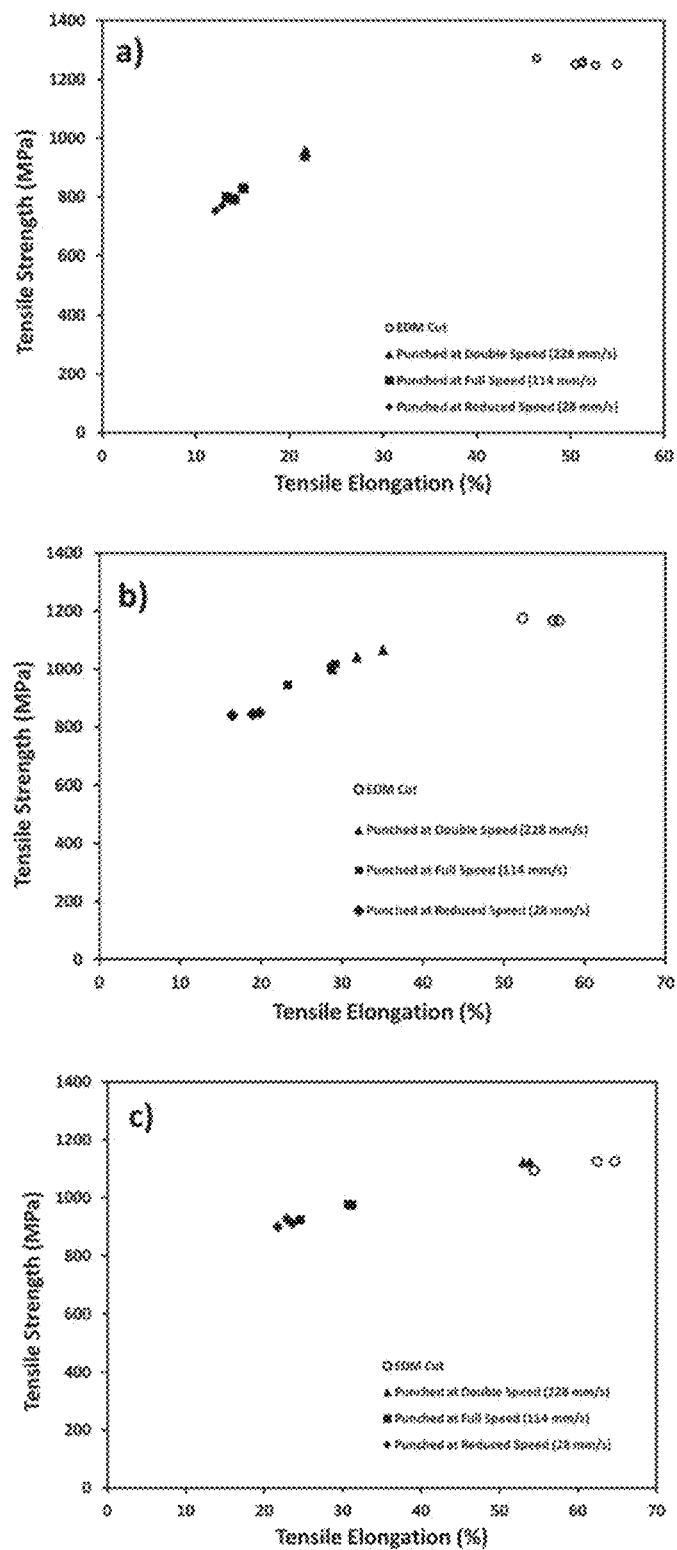
FIG. 52 Tensile properties for specimens punched at varied speeds from: a) Alloy 1, b) Alloy 9, c) Alloy 12.

Tensile specimens in the ASTM E8 geometry were prepared by punching at three different speeds of 28 mm/s, 114 mm/s, and 228 mm/s. Wire EDM cut specimens from the same materials were used for the reference. A part of punched tensile specimens from selected alloys was then put through a recovery anneal for 10 minutes at 850° C., followed by an air cool. Tensile properties were measured on an Instron 5984 mechanical testing frame using Instron's Bluehill control software. All tests were conducted at room temperature, with the bottom grip fixed and the top grip set to travel upwards at a rate of 0.012 mm/s. Strain data was collected using Instron's Advanced Video Extensometer. Tensile testing results are listed in Table 34 and tensile properties as a function of punching speed for selected alloys are illustrated in FIG. 52. It is seen that tensile properties drop significantly in the punched samples as compared to that for wire EDM cut. Punching speed increase from 28 mm/s to 228 mm/s leads to increase in properties of all three selected alloys. The localized heat generation during punching a hole or shearing an edge is known to increase with increasing punching velocity and might be a factor in edge damage recovery in specimens punched at higher speed. Note that heat alone will not cause edge damage recovery but will be enabled by the materials response to the heat generated. This difference in response for the alloys contained in Table 2 in this application to commercial steel samples is clearly illustrated in Case Examples 15 and 17.

TABLE 34

Tensile Properties of Specimens Punched at Different Speed vs EDM Cut

| Alloy | Sample Preparation Method | Yield Strength (MPa) | Tensile Strength (MPa) | Tensile Elongation (%) |
|---|---|---|---|---|
| Alloy 1 | EDM | 459 | 1255 | 51.2 |
| | | 443 | 1271 | 46.4 |
| | | 441 | 1248 | 52.7 |
| | | 453 | 1251 | 55.0 |
| | | 467 | 1259 | 51.3 |
| | 228 mm/s Punched | 474 | 952 | 21.8 |
| | | 498 | 941 | 21.6 |
| | | 493 | 956 | 21.6 |
| | 114 mm/s Punched | 494 | 798 | 13.4 |
| | | 487 | 829 | 15.1 |
| | | 474 | 792 | 14.1 |
| | 28 mm/s Punched | 464 | 770 | 12.8 |
| | | 479 | 797 | 13.7 |
| | | 465 | 755 | 12.1 |
| Alloy 9 | EDM | 468 | 1166 | 56.1 |
| | | 480 | 1177 | 52.4 |
| | | 475 | 1169 | 56.9 |
| | 228 mm/s Punched | 500 | 1067 | 35.1 |
| | | 493 | 999 | 28.8 |
| | | 470 | 1042 | 31.8 |
| | 114 mm/s Punched | 508 | 1018 | 29.2 |
| | | 507 | 1007 | 28.6 |
| | | 490 | 945 | 23.3 |
| | 28 mm/s Punched | 473 | 851 | 19.7 |
| | | 472 | 841 | 16.4 |
| | | 494 | 846 | 18.9 |
| Alloy 12 | EDM | 481 | 1094 | 54.4 |
| | | 479 | 1128 | 64.7 |
| | | 495 | 1126 | 62.4 |
| | 228 mm/s Punched | 495 | 1124 | 53.8 |
| | | 484 | 1123 | 53.0 |
| | 114 mm/s Punched | 521 | 954 | 27.1 |
| | | 468 | 978 | 30.7 |
| | | 506 | 975 | 31.2 |
| | 28 mm/s Punched | 488 | 912 | 23.6 |
| | | 472 | 900 | 21.7 |
| | | 507 | 928 | 22.9 |

This Case Example demonstrates that punching speed can have a significant effect on the resulting tensile properties in steel alloys herein. Localized heat generation at punching might be a factor in recovery of the structure near the edge leading to property improvement.

Case Example #11 Edge Structure Transformation
During Hole Punching and Expansion Slabs with thickness of 50 mm were laboratory cast from Alloy 1 and laboratory processed by hot rolling, cold rolling and annealing at 850° C. for 10 min as described herein. Resultant sheet with final thickness of 1.2 mm and Recrystallized Modal Structure (Structure #4, FIG. 1B) was used for hole expansion ratio (HER) tests.

Specimens for testing with a size of 89×89 mm were wire EDM cut from the sheet. The hole with 10 mm diameter was cut in the middle of specimens by utilizing two methods: punching and drilling with edge milling. The hole punching was done on an Instron Model 5985 Universal Testing System using a fixed speed of 0.25 mm/s with 16% clearance. Hole expansion ratio (HER) testing was performed on the SP-225 hydraulic press and consisted of slowly raising the conical punch that uniformly expanded the hole radially outward. A digital image camera system was focused on the conical punch and the edge of the hole was monitored for evidence of crack formation and propagation. The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

Figure 53:
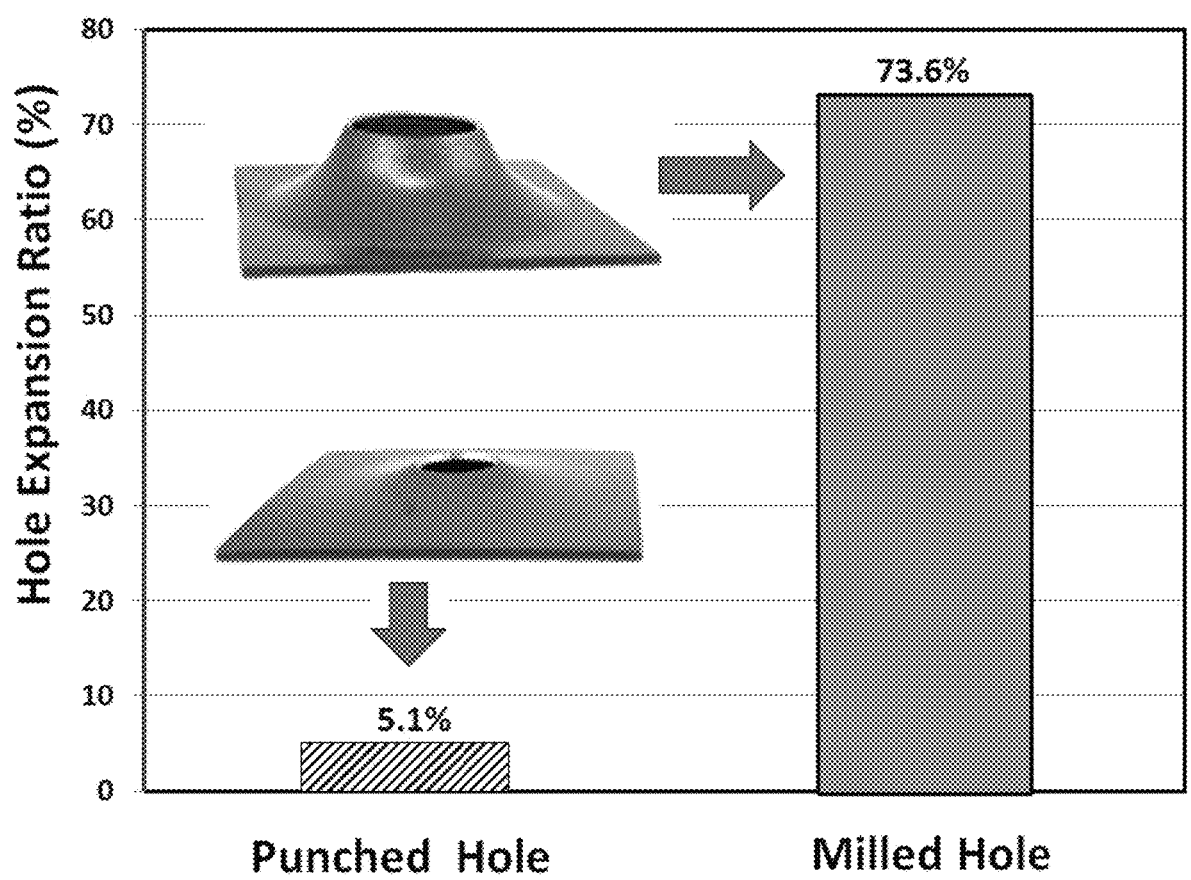
FIG. 53 HER results for Alloy 1 in a case of punched vs milled hole.
Figure 54:
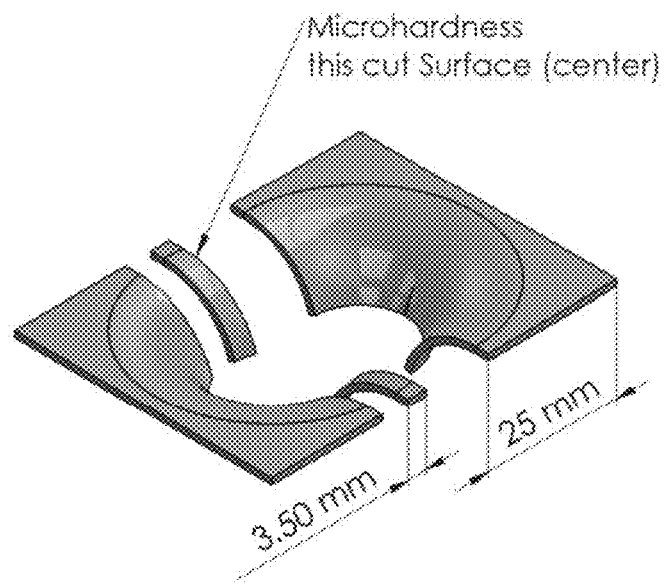
FIG. 54 Cutting plan for SEM microscopy and microhardness measurement samples from HER tested specimens.

Results of HER testing are shown in FIG. 53 demonstrating a significantly lower value for the sample when the hole was prepared by punching as compared to milling: 5.1% HER vs 73.6% HER, respectively. Samples were cut from both tested samples as shown in FIG. 54 for SEM analysis and microhardness measurements.

Figure 55:
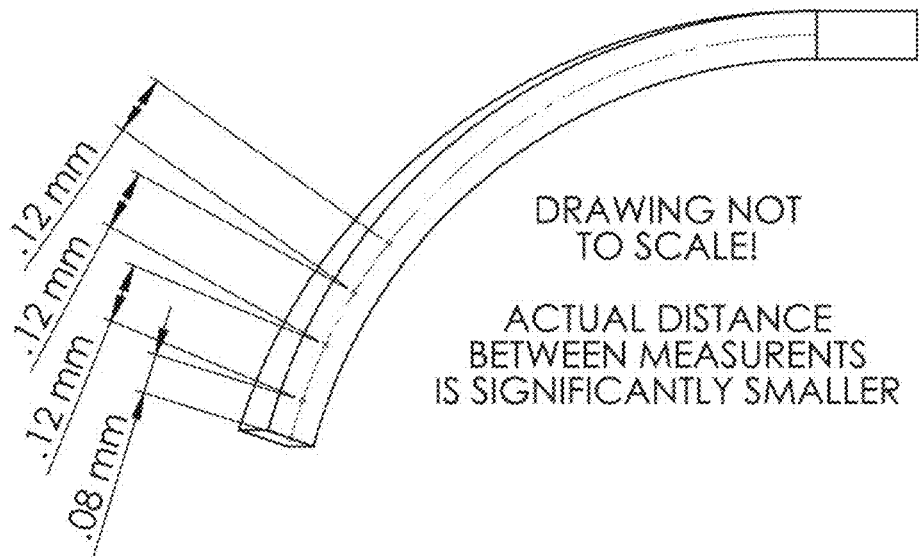
FIG. 55 A schematic illustration of microhardness measurement locations.
Figure 56:
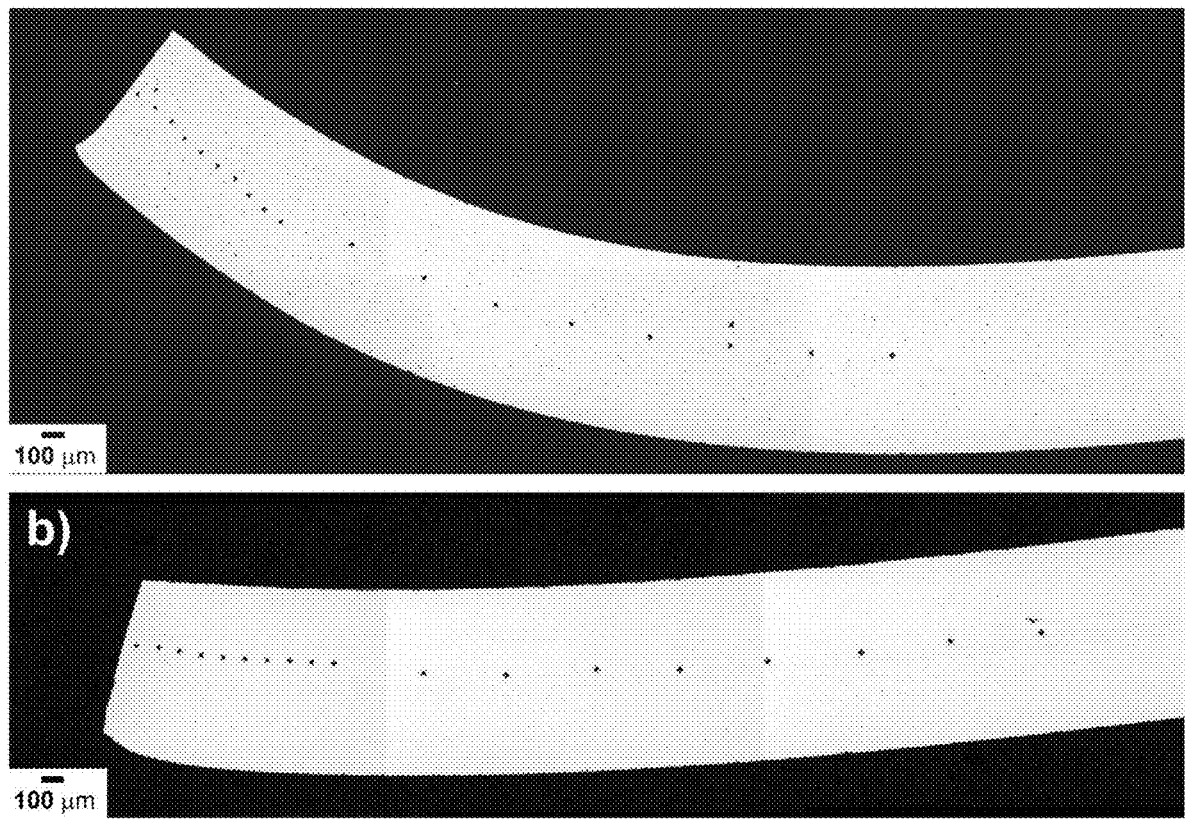
FIG. 56 Microhardness measurement profile in Alloy 1 HER tested samples with: a) EDM cut and b) Punched holes.

Microhardness was measured for Alloy 1 at all relevant stages of the hole expansion process. Microhardness measurements were taken along cross sections of sheet samples in the annealed (before punching and HER testing), as-punched, and HER tested conditions. Microhardness was also measured in cold rolled sheet from Alloy 1 for reference. Measurement profiles started at an 80 micron distance from the edge of the sample, with an additional measurement taken every 120 microns until 10 such measurements were taken. After that point, further measurements were taken every 500 microns, until at least 5 mm of total sample length had been measured. A schematic illustration of microhardness measurement locations in HER tested samples is shown in FIG. 55. SEM images of the punched and HER tested samples after microhardness measurements are shown in FIG. 56.

Figure 57:
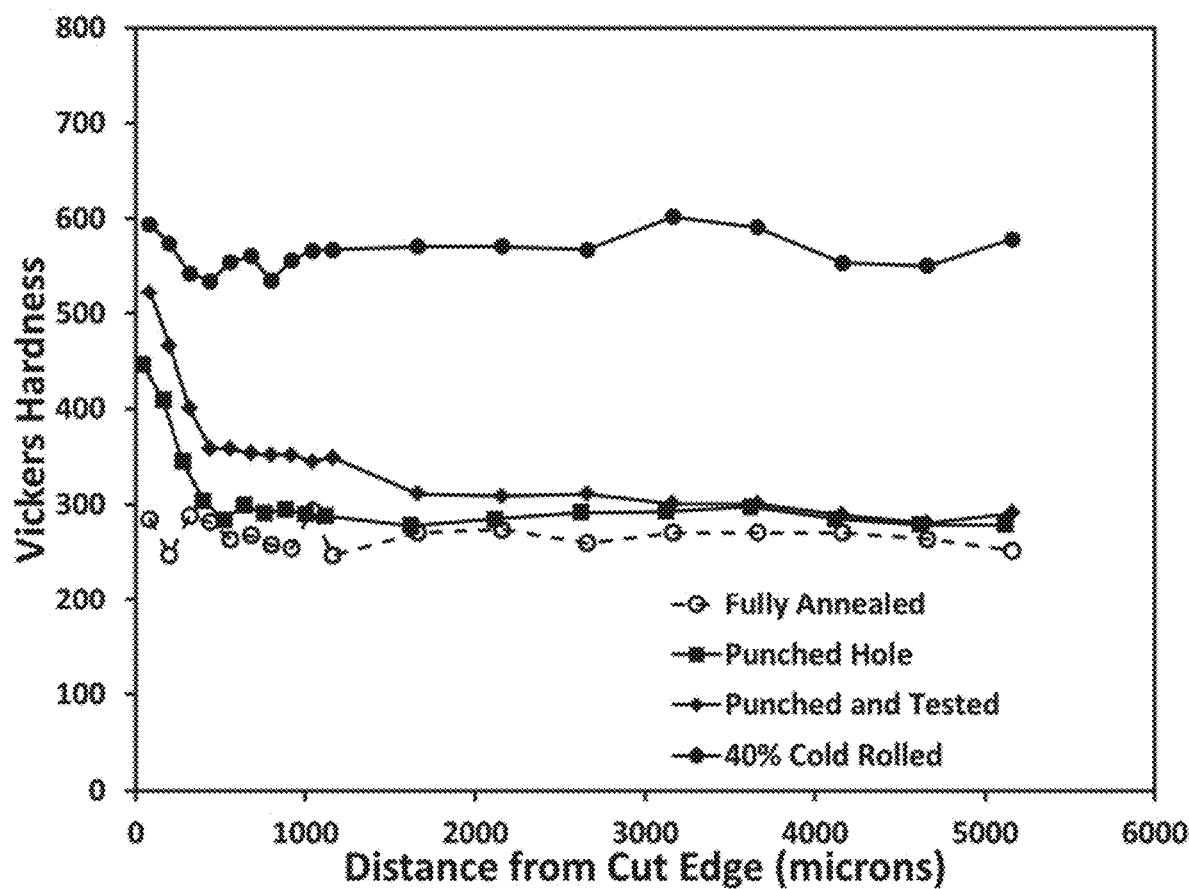
FIG. 57 Microhardness profiles for Alloy 1 in various stages of processing and forming, demonstrating the progression of edge structure transformation during hole punching and expansion.
Figure 58:
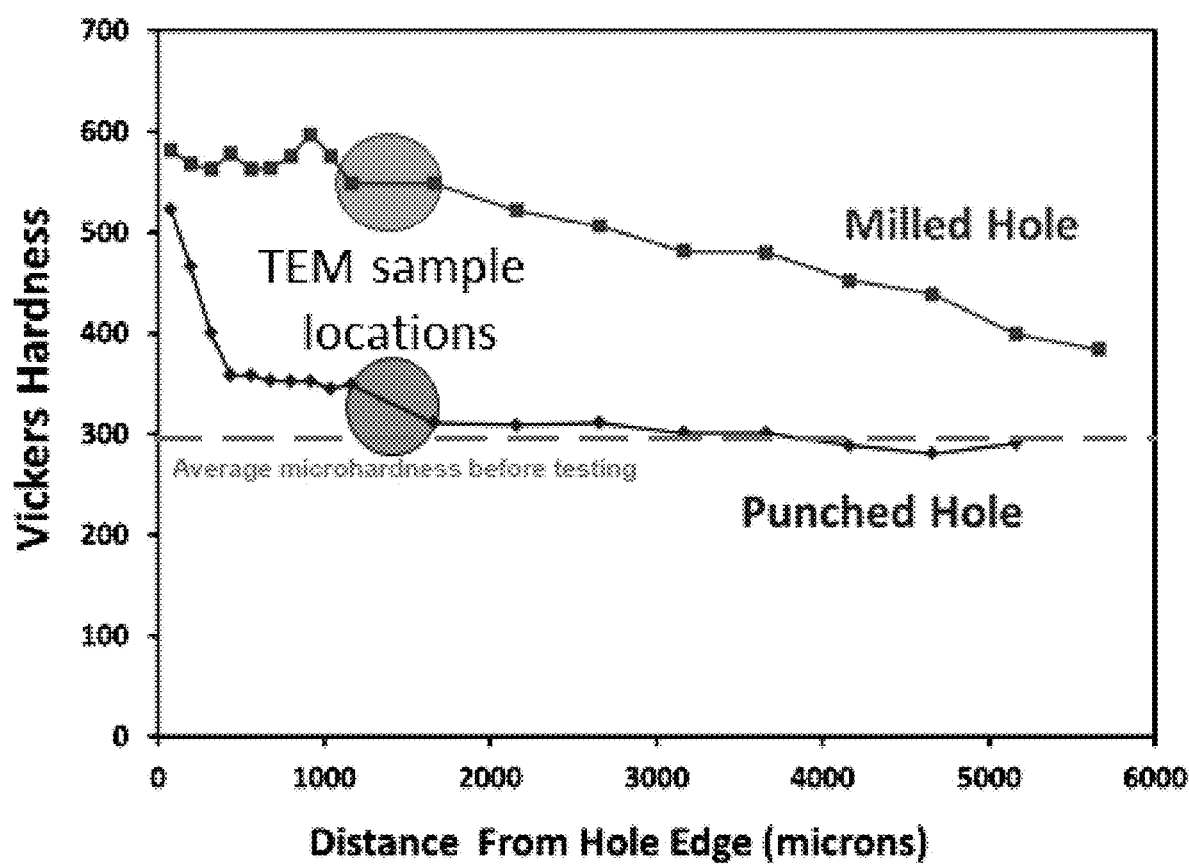
FIG. 58 Microhardness data for HER tested samples from Alloy 1 with punched and milled holes. Circles indicate a position of the TEM samples in respect to hole edge.

As shown in FIG. 57, the punching process creates a transformed zone of approximately 500 microns immediately adjacent to the punched edge, with the material closest to the punched edge either fully or near-fully transformed, as evidenced by the hardness approaching that observed in the fully-transformed, 40% cold rolled material immediately next to the punched edge. Microhardness profiles for each sample is presented in FIG. 58. As it can be seen, microhardness gradually increases towards a hole edge in the case of milled while in the case of punched hole microhardness increase was observed in a very narrow area close to the hole edge. TEM samples were cut at the same distance in both cases as indicated in FIG. 58.

To prepare the TEM specimens, the HER test samples were first sectioned by wire EDM, and a piece with a portion of hole edge was thinned by grinding with pads of reduced grit size. Further thinning to ~60 μm thickness is done by polishing with 9 μm, 3 μm, and 1 μm diamond suspension solution respectively. Discs of 3 mm in diameter were punched from the foils near the edge of the hole and the final polishing was completed by electropolishing using a twin-jet polisher. The chemical solution used was a 30% Nitric acid mixed in Methanol base. In case of insufficient thin area for TEM observation, the TEM specimens may be ion-milled using a Gatan Precision Ion Polishing System (PIPS). The ion-milling usually is done at 4.5 keV, and the inclination angle is reduced from 4° to 2° to open up the thin area. The TEM studies were done using a JEOL 2100 high-resolution microscope operated at 200 kV. Since the location for TEM study is at the center of the disc, the observed microstructure is approximately ~1.5 mm from the edge of hole.

Figure 59:
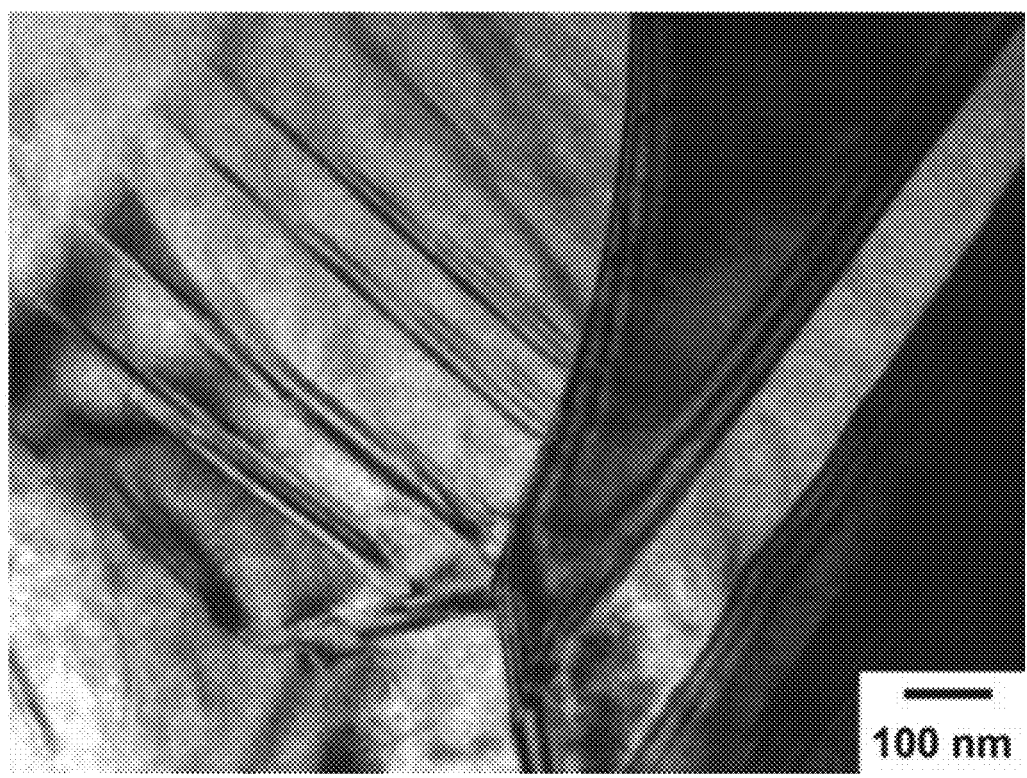
FIG. 59 Bright field TEM image of the microstructure in the Alloy 1 sheet sample before HER testing.
Figure 60:
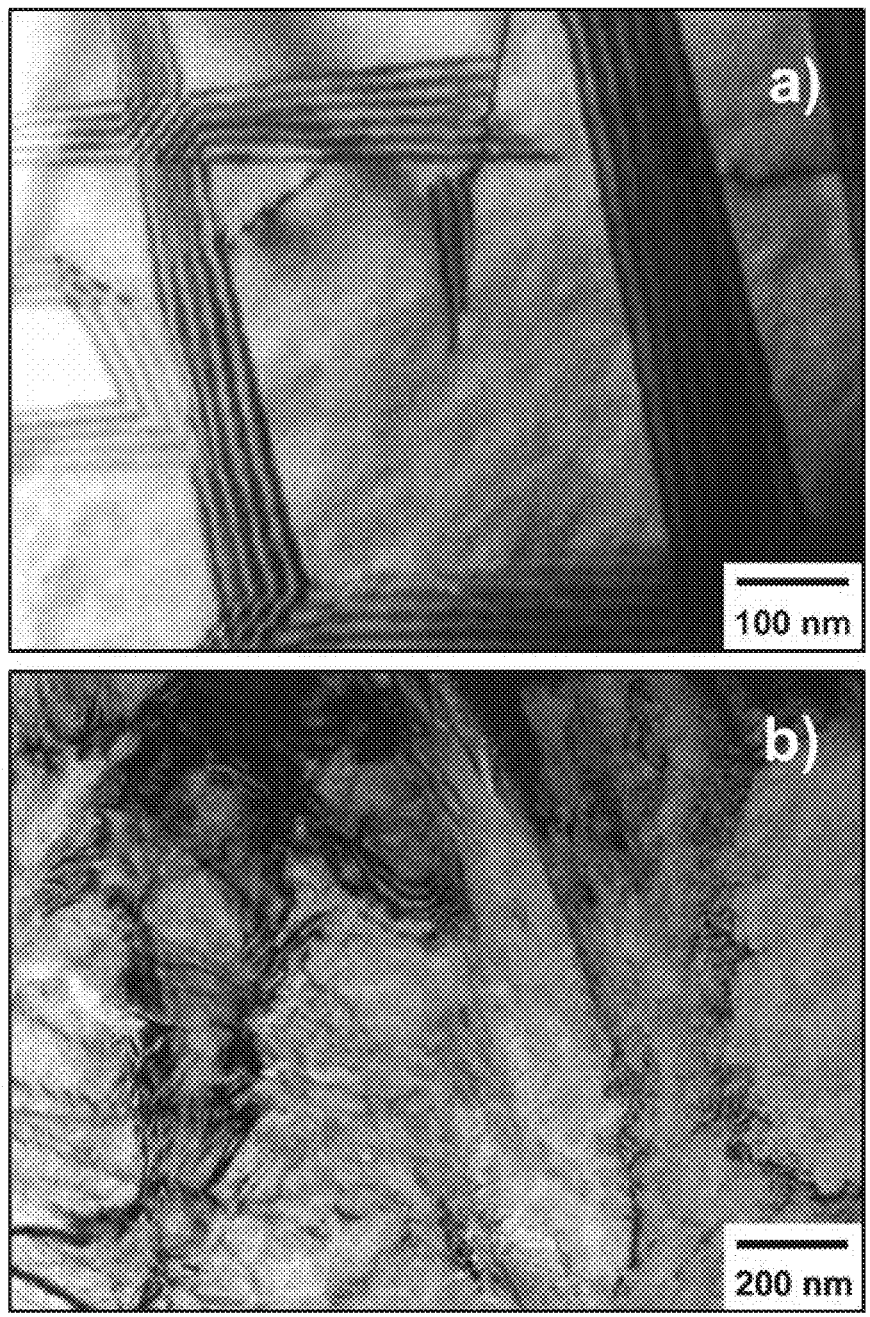
FIG. 60 Bright field TEM micrographs of microstructure in the HER test sample from Alloy 1 with punched hole (HER=5%) at a location of ~1.5 mm from the hole edge: a) main untransformed structure; b) "pocket" of partially transformed structure.
Figure 61:
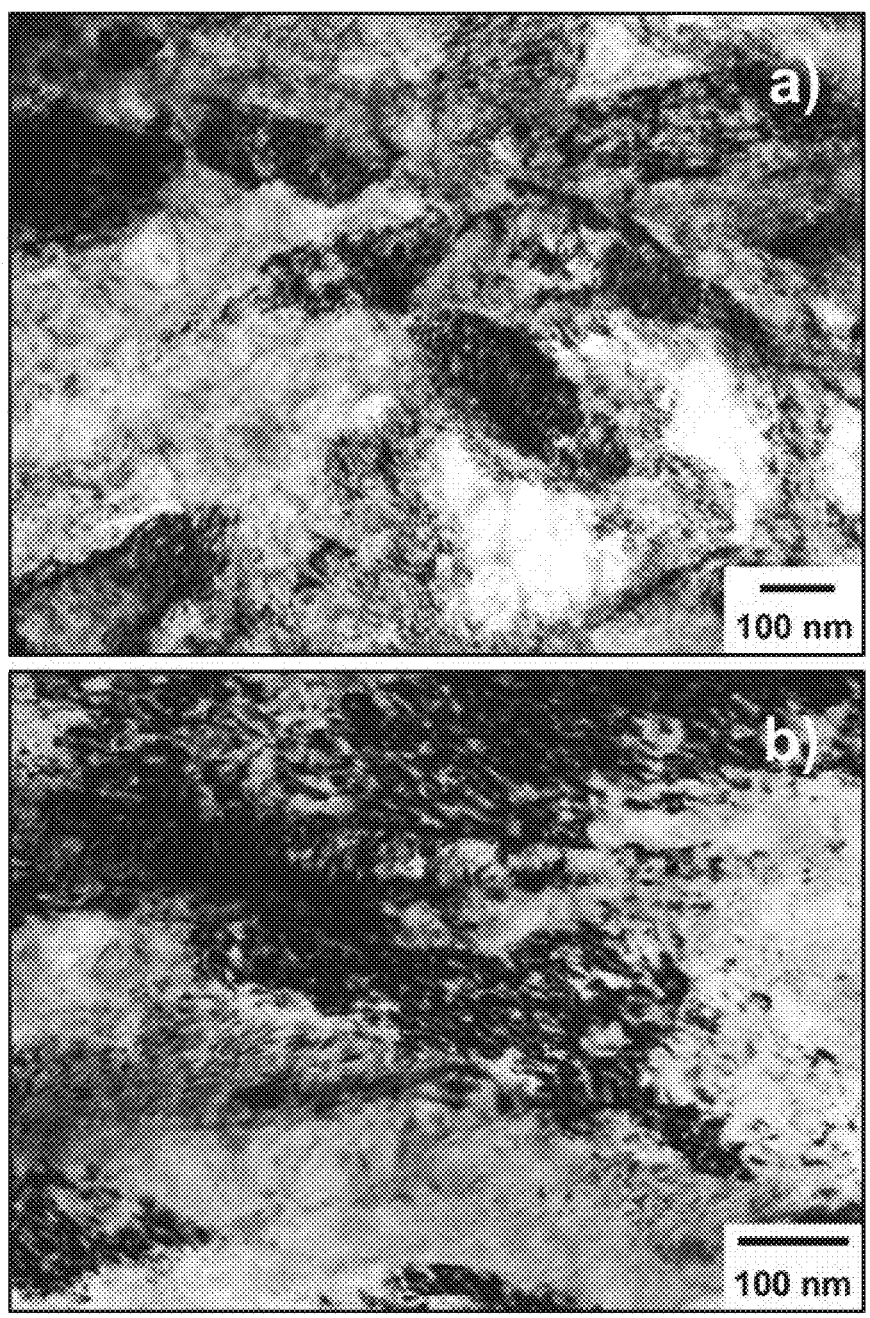
FIG. 61 Bright field TEM micrographs of microstructure in the HER test sample from Alloy 1 with milled hole (HER=73.6%) at a location of ~1.5 mm from the hole edge in different areas: a) & b).

The initial microstructure of the Alloy 1 sheet before testing is shown on FIG. 59 representing Recrystallized Modal Structure (Structure #4, FIG. 1B). FIG. 60*a* shows the TEM micrograph of the microstructure in the HER test sample with punched hole after testing (HER=5.1%) in different areas at the location of 1.5 mm from hole edge. It was found that mainly the recrystallized microstructure remains in the sample (FIG. 60*a*) with small amount of area with partially transformed "pockets" (FIG. 60*b*) indicating that limited volume (~1500 μm deep) of the sample was involved in deformation at HER testing. In the HER sample with milled hole (HER=73.6%), as shown in FIG. 61, there is a great amount of deformation in the sample as indicated by a large amount of transformed "pockets" and high density of dislocations ($10^8$ to $10^{10}$ mm$^{-2}$).

Figure 62:
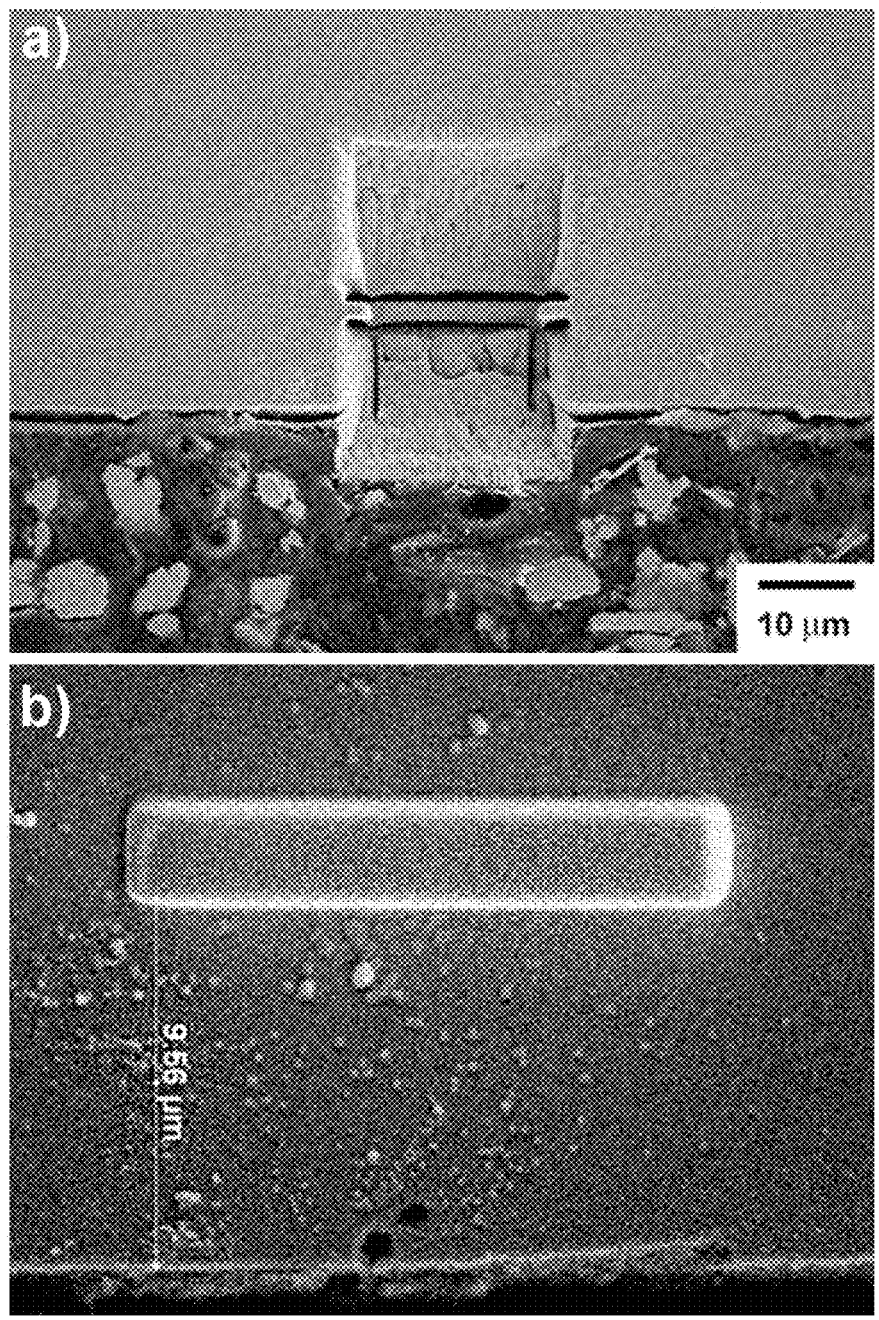
FIG. 62 Focused Ion Beam (FIB) technique used for precise sampling near the edge of the punched hole in the Alloy 1 sample: a) FIB technique showing the general sample location of the milled TEM sample, b) Close up view of the cut-out TEM sample with indicated location from the hole edge.
Figure 63:
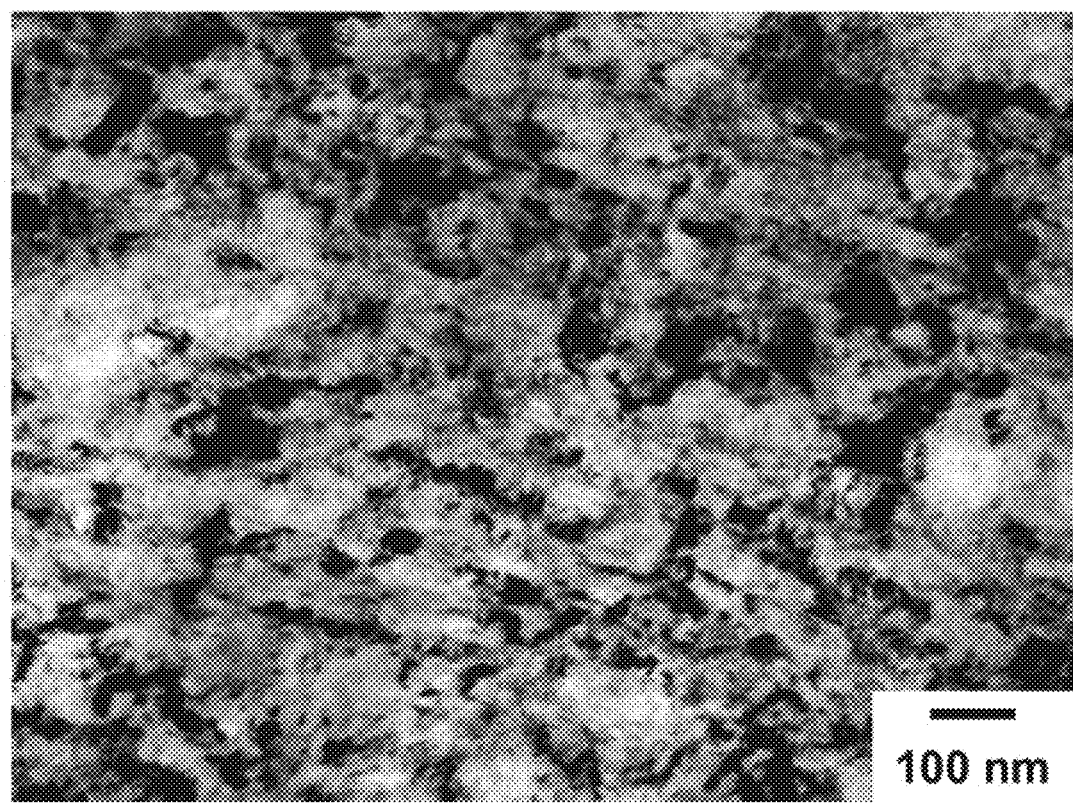
FIG. 63 Bright field TEM micrographs of microstructure in the sample from Alloy 1 with a punched hole at a location of ~10 micron from the hole edge.
Figure 64:
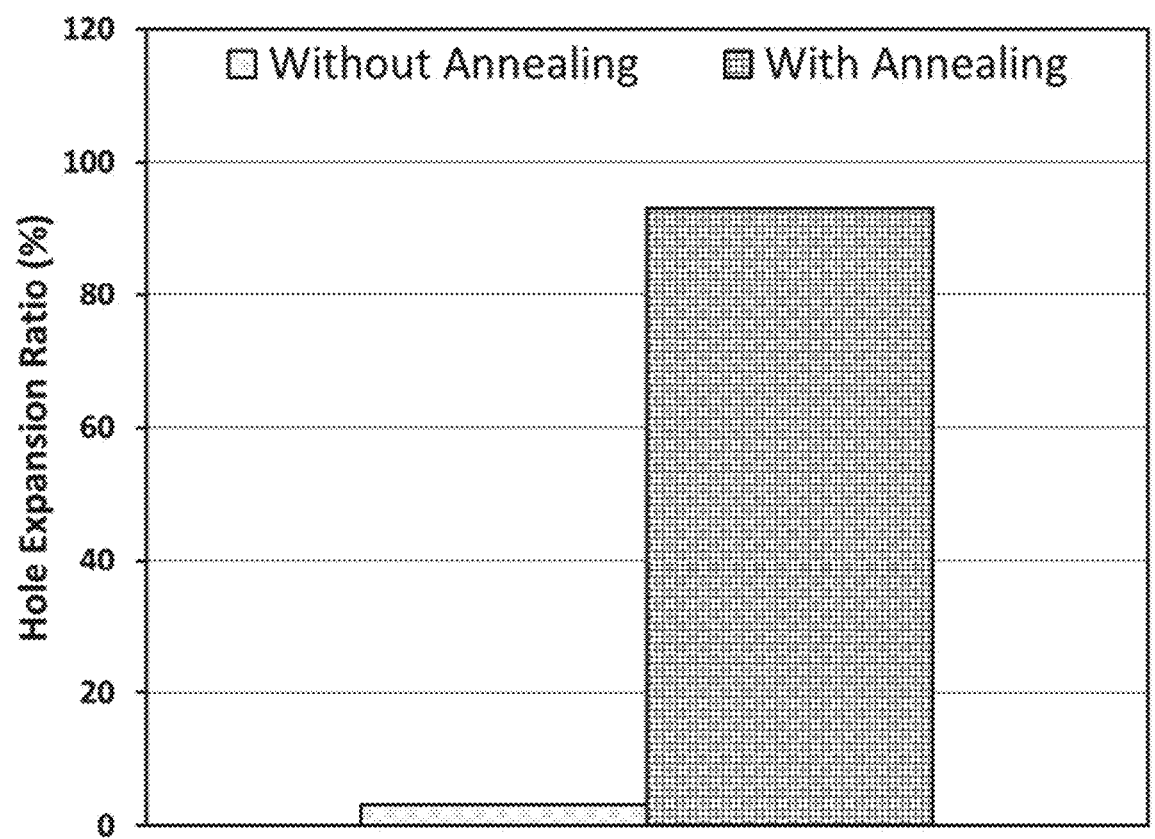
FIG. 64 Hole expansion ratio measurements for Alloy 1 with and without annealing of punched holes.
Figure 65:
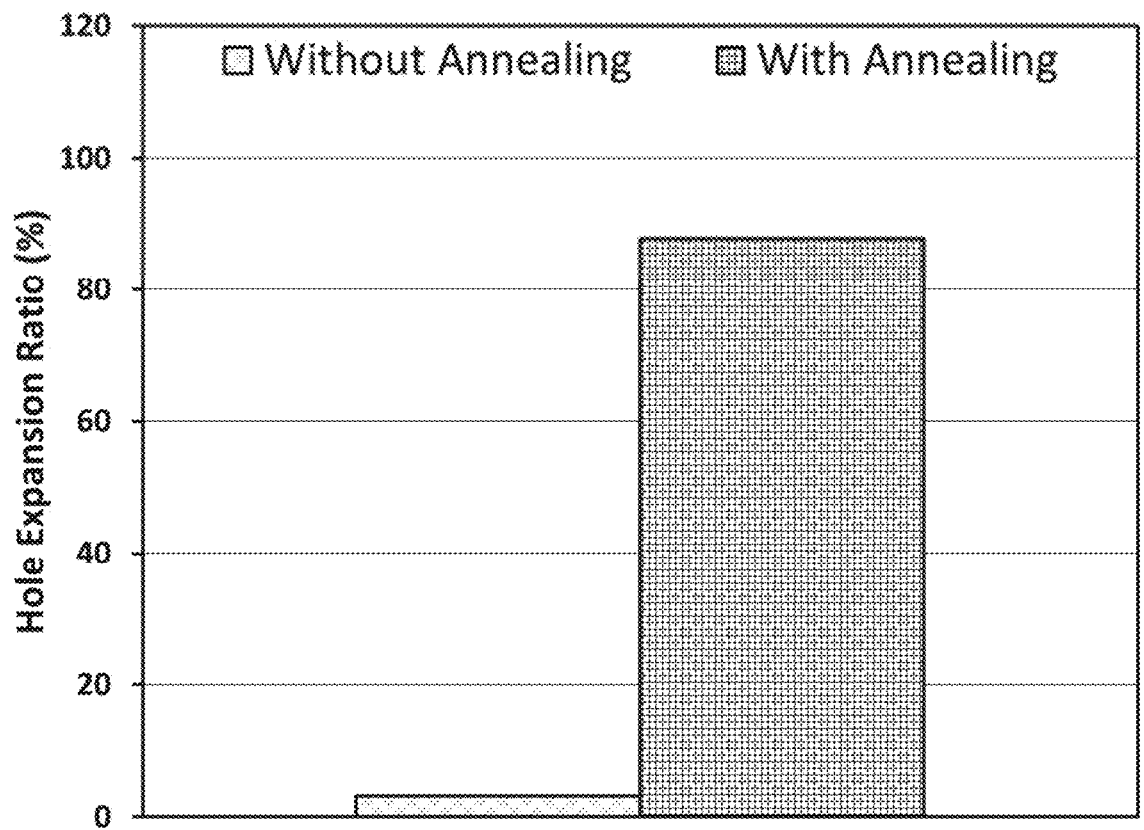
FIG. 65 Hole expansion ratio measurements for Alloy 9 with and without annealing of punched holes.
Figure 66:
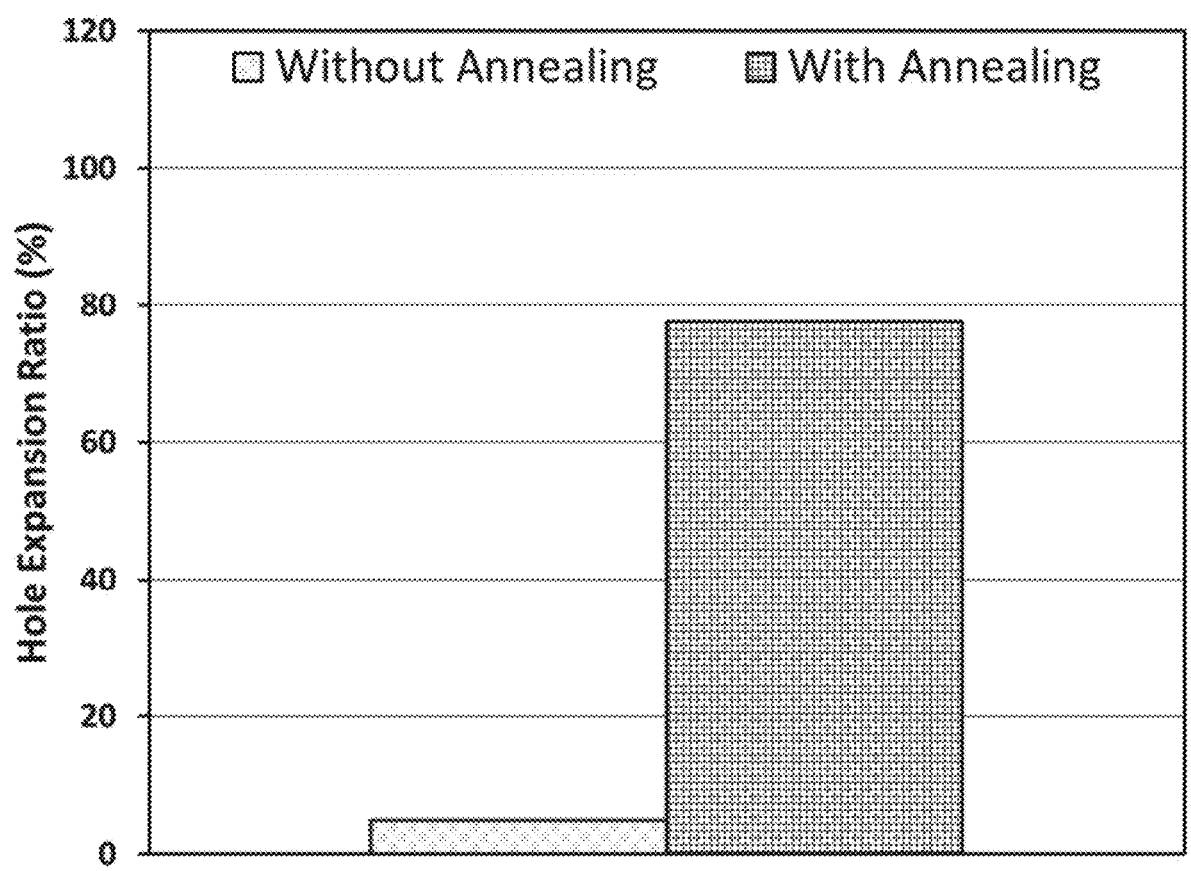
FIG. 66 Hole expansion ratio measurements for Alloy 12 with and without annealing of punched holes.
Figure 67:
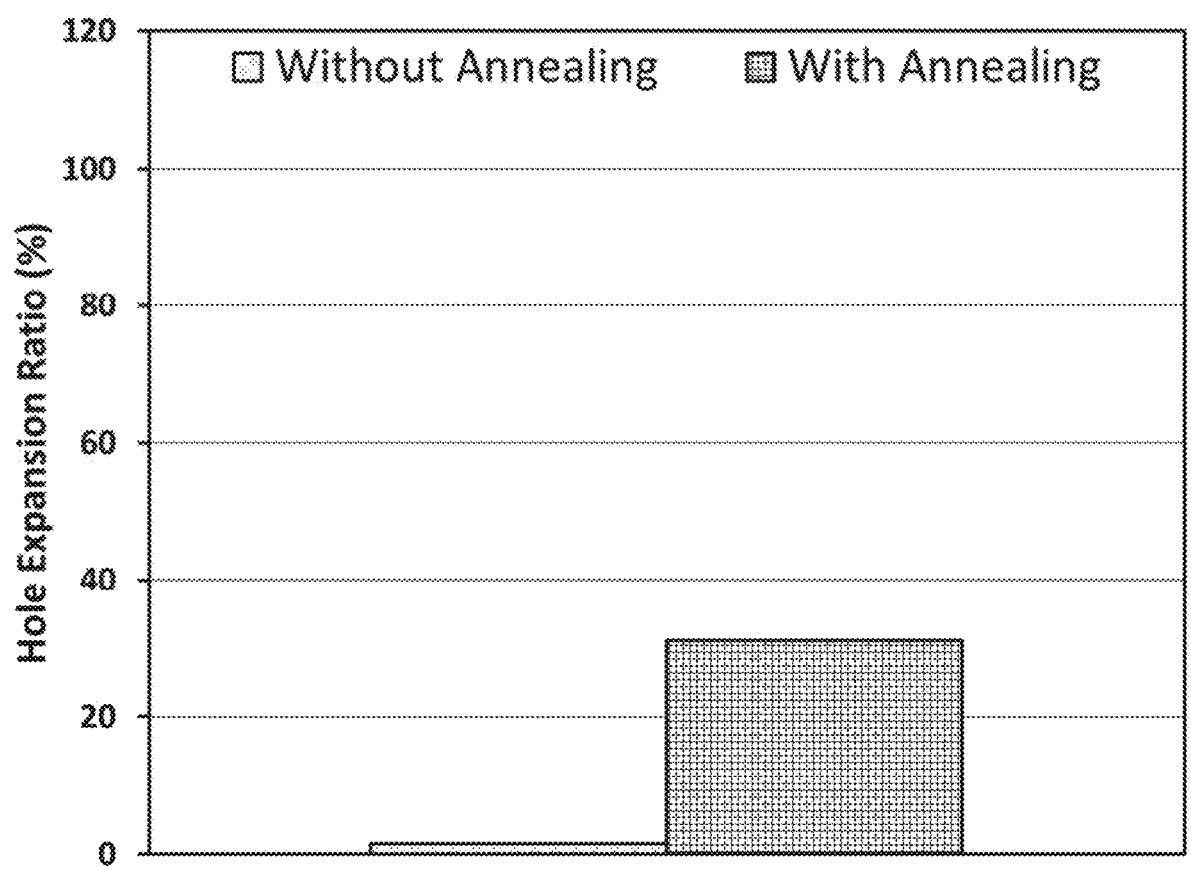
FIG. 67 Hole expansion ratio measurements for Alloy 13 with and without annealing of punched holes.
Figure 68:
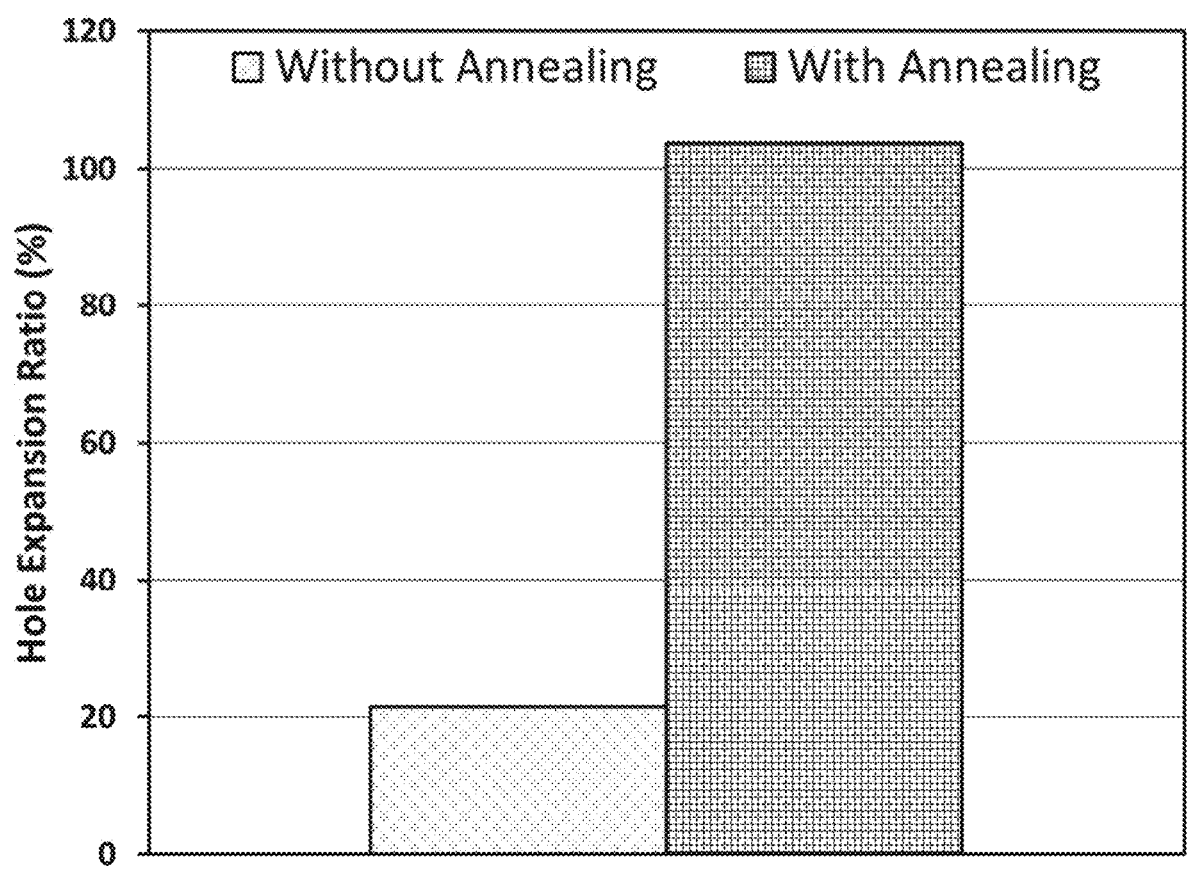
FIG. 68 Hole expansion ratio measurements for Alloy 17 with and without annealing of punched holes.

To analyze in more detail the reason causing the poor HER performance in samples with punched holes, Focused Ion Beam (FIB) technique was utilized to make TEM specimens at the very edge of the punched hole. As shown in FIG. 62, TEM specimen is cut at ~10 μm from the edge. To prepare TEM specimens by FIB, a thin layer of platinum is deposited on the area to protect the specimen to be cut. A wedge specimen is then cut out and lifted by a tungsten needle. Further ion milling is performed to thin the specimen. Finally the thinned specimen is transferred and welded to copper grid for TEM observation. FIG. 63 shows the microstructure of the Alloy 1 sheet at the distance of ~10 micron from the punched hole edge which is significantly refined and transformed as compared to the microstructure in the Alloy 1 sheet before punching. It suggests that punching caused severe deformation at the hole edge such that Nanophase Refinement & Strengthening (Mechanism #4, FIG. 1B) occurred leading to formation of Refined High Strength Nanomodal Structure (Structure #5, FIG. 1B) in the area close to the punched hole edge. This structure has relative lower ductility as compared to Recrystallized Modal Structure Table 1 resulting in premature cracking at the edge and low HER values. This Case Example demonstrates that the alloys in Table 2 exhibit the unique ability to transform from a Recrystallized Modal Structure (Structure #4, FIG. 1B) to a Refined High Strength Nanomodal Structure (Structure #5, FIG. 1B) through the identified Nanophase Refinement & Strengthening (Mechanism #4, FIG. 1B). The structural transformation occurring due to deformation at the hole edge at punching appears to be similar in nature to transformation occurring during cold rolling deformation and that observed during tensile testing deformation.

Case Example #12 HER Testing Results with and without Annealing

Slabs with thickness of 50 mm were laboratory cast from selected alloys listed in Table 35 according to the atomic ratios provided in Table 2 and laboratory processed by hot rolling, cold rolling and annealing at 850° C. for 10 min as described herein. Resultant sheet with final thickness of 1.2 mm and Recrystallized Modal Structure (Structure #4, FIG. 1B) was used for hole expansion ratio (HER) tests.

Test specimens of 89×89 mm were wire EDM cut from the sheet from larger sections. A 10 mm diameter hole was made in the center of specimens by punching on an Instron Model 5985 Universal Testing System using a fixed speed of 0.25 mm/s at 16% punch to die clearance. Half of the prepared specimens with punched holes were individually wrapped in stainless steel foil and annealed at 850° C. for 10 minutes before HER testing. Hole expansion ratio (HER) testing was performed on the SP-225 hydraulic press and consisted of slowly raising the conical punch that uniformly expanded the hole radially outward. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

The results of the hole expansion ratio measurements on the specimens with and without annealing after hole punching are shown in Table 35. As shown in FIG. 64, FIG. 65, FIG. 66, FIG. 67 and FIG. 68 for Alloy 1, Alloy 9, Alloy 12, Alloy 13, and Alloy 17, respectively, the hole expansion ratio measured with punched holes with annealing is generally greater than in punched holes without annealing. The increase in hole expansion ratio with annealing for the identified alloys herein therefore leads to an increase in the actual HER of about 25% to 90%.

TABLE 35

Hole Expansion Ratio Results for Select Alloys With and Without Annealing

| Material | Condition | Punch Clearance (%) | Measured Hole Expansion Ratio (%) | Average Hole Expansion Ratio (%) |
|---|---|---|---|---|
| Alloy 1 | Without Annealing | 16 | 3.00 3.90 2.70 | 3.20 |
| | With Annealing | 16 | 105.89 81.32 92.11 | 93.10 |
| Alloy 9 | Without Annealing | 16 | 3.09 3.19 3.29 | 3.19 |
| | With Annealing | 16 | 78.52 97.60 87.40 | 87.84 |
| Alloy 12 | Without Annealing | 16 | 4.61 5.21 | 4.91 |
| | With Annealing | 16 | 69.11 83.60 80.08 | 77.60 |
| Alloy 13 | Without Annealing | 16 | 1.70 1.40 1.50 | 1.53 |
| | With Annealing | 16 | 32.37 29.00 32.00 | 31.12 |
| Alloy 17 | Without Annealing | 16 | 12.89 28.70 22.80 | 21.46 |
| | With Annealing | 16 | 104.21 80.42 126.58 | 103.74 |

This Case Example demonstrates that edge formability demonstrated during HER testing can yield poor results due to edge damage during the punching operation as a result of the unique mechanisms in the alloys listed in Table 2. The fully post processed alloys exhibit very high tensile ductility as shown in Table 6 through Table 10 coupled with very high strain hardening and resistance to necking until near failure. Thus, the material resists catastrophic failure to a great extent but during punching, artificial catastrophic failure is forced to occur near the punched edge. Due to the unique reversibility of the identified mechanisms, this deleterious edge damage as a result of Nanophase Refinement & Strengthening (Mechanism #3, FIG. 1A) and structural transformation can be reversed by annealing resulting in high HER results. Thus, high hole expansion ratio values can be obtained in a case of punching hole with following annealing and retaining exceptional combinations of tensile properties and the associated bulk formability.

In addition, it can be appreciated that the alloys herein that have undergone the processing pathways to provide such alloys in the form of Structure #4 (Recrystallized Modal Structure) will indicate, for a hole that is formed by shearing, and including a sheared edge, a first hole expansion ratio ($HER_1$) and upon heating the alloy will have a second hole expansion ratio ($HER_2$), wherein $HER_2 > HER_1$.

More specifically, it can also be appreciated that the alloys herein that have undergone the processing pathways to provide such alloys with Structure #4 (Recrystallized Modal Structure) will indicate, for a hole that was placed in the alloy through methods (i.e. waterjet cutting, laser cutting, wire-edm, milling etc.) where the hole that is formed that does not rely primarily on shearing, compared to punching a hole, a first hole expansion ratio ($HER_1$) where such value may itself fall in the range of 30 to 130%. However, when the same alloy includes a hole formed by shearing, a second hole expansion ratio is observed ($HER_2$) wherein $HER_2 = (0.01$ to $0.30)(HER_1)$. However, if the alloy is then subject to heat treatment herein, it is observed that $HER_2$ is recovered to a $HER_3 = (0.60$ to $1.0) HER_1$.

Case Example #13 Edge Condition Effect on Alloy Properties

Slabs with thickness of 50 mm were laboratory cast from Alloy 1 according to the atomic ratios provided in Table 2 and laboratory processed by hot rolling, cold rolling and annealing at 850° C. for 10 min as described herein. Resultant sheet from Alloy 1 with final thickness of 1.2 mm and Recrystallized Modal Structure (Structure #4, FIG. 1B) was used to demonstrate the effect that edge condition has on Alloy 1 tensile and hole expansion properties.

Tensile specimens of ASTM E8 geometry were created using two methods: Punching and wire EDM cutting. Punched tensile specimens were created using a commercial press. A subset of punched tensile specimens was heat treated at 850° C. for 10 minutes to create samples with a punched then annealed edge condition.

Figure 69:
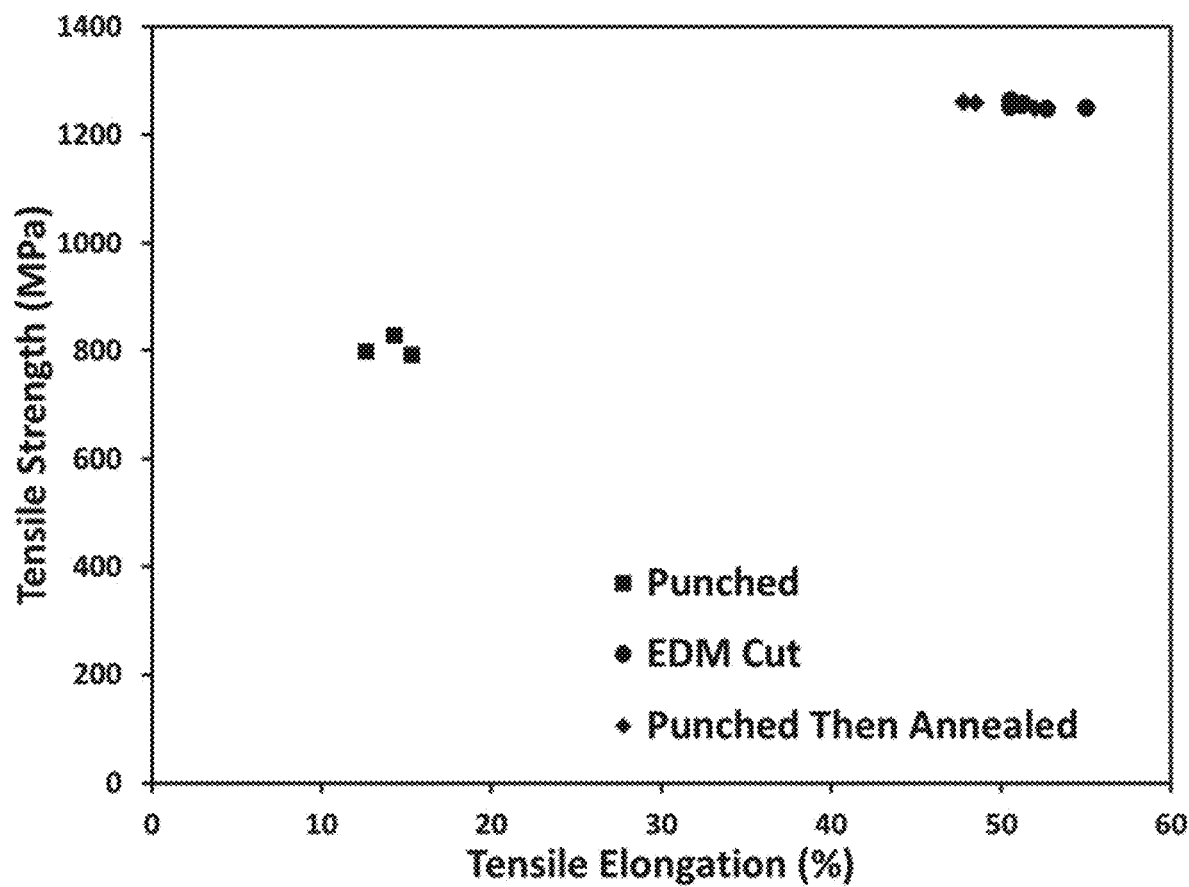
FIG. 69 Tensile performance of Alloy 1 tested with different edge conditions. Note that tensile samples with Punched edge condition have reduced tensile performance when compared to tensile samples with wire EDM cut and punched with subsequent annealing (850° C. for 10 minutes) edge conditions.

Tensile properties of ASTM E8 specimens were measured on an Instron 5984 mechanical testing frame using Instron's Bluehill 3 control software. All tests were conducted at room temperature, with the bottom grip fixed and the top grip set to travel upwards at a rate of 0.025 mm/s for the first 0.5% elongation, and at a rate of 0.125 mm/s after that point. Strain data was collected using Instron's Advanced Video Extensometer. Tensile properties of Alloy 1 with punched, EDM cut, and punched then annealed edge conditions are shown in Table 36. Tensile properties of Alloy 1 with different edge conditions are shown in FIG. 69.

TABLE 36

Tensile Properties of Alloy 1 with Different Edge Conditions

| Edge Condition | Tensile Elongation (%) | Ultimate Tensile Strength (MPa) |
|---|---|---|
| Punched | 12.6 | 798 |
|  | 14.3 | 829 |
|  | 15.3 | 792 |
| EDM Cut | 50.5 | 1252 |
|  | 51.2 | 1255 |
|  | 52.7 | 1248 |
|  | 55.0 | 1251 |
|  | 51.3 | 1259 |
|  | 50.5 | 1265 |
| Punched Then Annealed | 52.0 | 1248 |
|  | 47.8 | 1260 |
|  | 48.5 | 1258 |

Specimens for hole expansion ratio testing with a size of 89×89 mm were wire EDM cut from the sheet. The holes with 10 mm diameter were prepared by two methods: punching and cutting by wire EDM. The punched holes with 10 mm diameter were created by punching at 0.25 mm/s on an Instron 5985 Universal Testing System with a 16% punch clearance and with using the flat punch profile geometry. A subset of punched samples for hole expansion testing were annealed with an 850° C. for 10 minutes heat treatment after punching.

Hole expansion ratio (HER) testing was performed on the SP-225 hydraulic press and consisted of slowly raising the conical punch that uniformly expanded the hole radially outward. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

Figure 70:
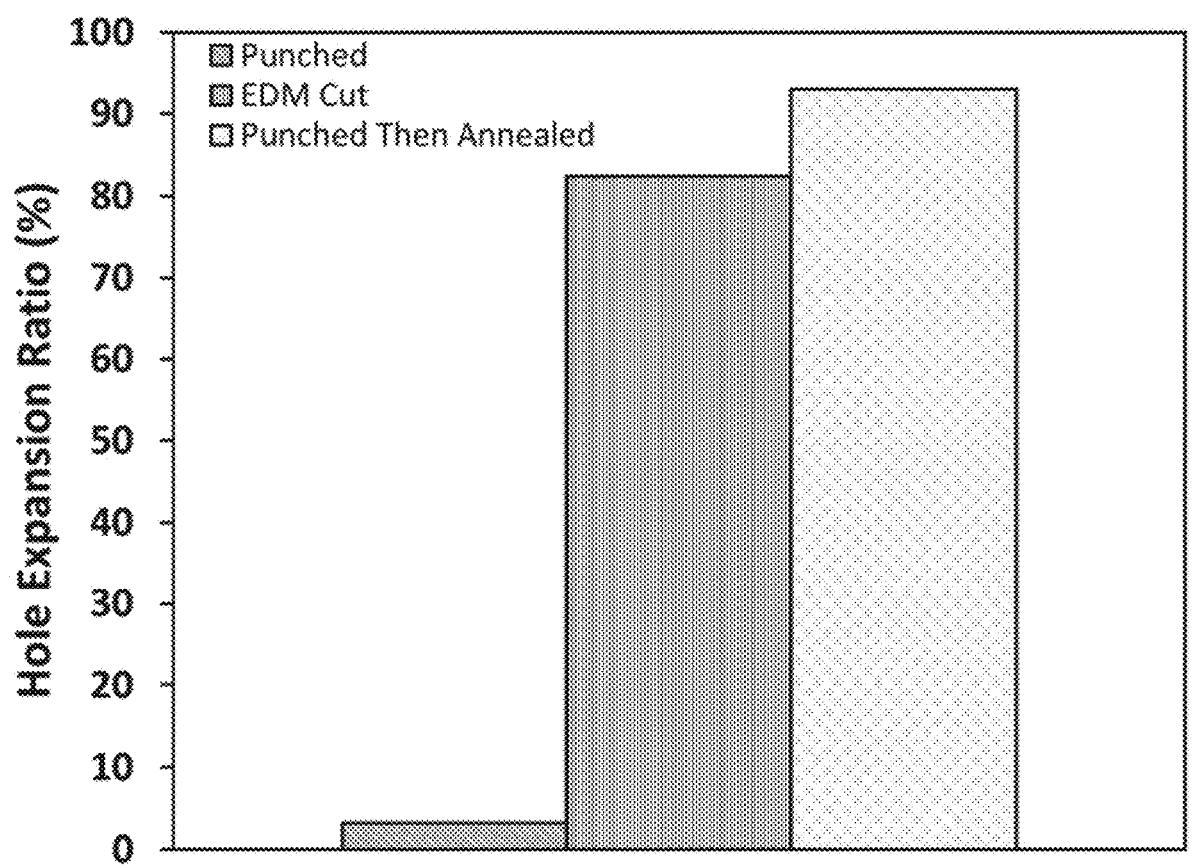
FIG. 70 Edge formability as measured by hole expansion ratio response of Alloy 1 as a function of edge condition. Note that holes in the Punched condition have lower edge formability than holes in the wire EDM cut and punched with subsequent annealing (850° C. for 10 minutes) conditions.

Hole expansion ratio testing results are shown in Table 37. An average hole expansion ratio value for each edge condition is also shown. The average hole expansion ratio for each edge condition is plotted in FIG. 70. It can be seen that for samples with EDM cut and punched then annealed edge conditions the edge formability (i.e. HER response) is excellent, whereas samples with holes in the punched edge condition have considerably lower edge formability.

TABLE 37

Hole Expansion Ratio of Alloy 1 with Different Edge Conditions

| Edge Condition | Measured Hole Expansion Ratio (%) | Average Hole Expansion Ratio (%) |
|---|---|---|
| Punched | 3.00 | 3.20 |
|  | 3.90 |  |
|  | 2.70 |  |
| EDM Cut | 92.88 | 82.43 |
|  | 67.94 |  |
|  | 86.47 |  |
| Punched Then Annealed | 105.90 | 93.10 |
|  | 81.30 |  |
|  | 92.10 |  |

This Case Example demonstrates that the edge condition of Alloy 1 has a distinct effect on the tensile properties and edge formability (i.e. HER response). Tensile samples tested with punched edge condition have diminished properties when compared to both wire EDM cut and punched after subsequent annealing. Samples having the punched edge condition have hole expansion ratios averaging 3.20%, whereas EDM cut and punched then annealed edge conditions have hole expansion ratios of 82.43% and 93.10%, respectively. Comparison of edge conditions also demonstrates that damage associated with edge creation (i.e. via punching) has a non-trivial effect on the edge formability of the alloys herein.

Case Example #14 HER Results as a Function of Hole Punching Speed

Slabs with thickness of 50 mm were laboratory cast from selected alloys listed in Table 38 according to the atomic ratios provided in Table 2 and laboratory processed by hot rolling, cold rolling and annealing at 850° C. for 10 min as described herein. Resultant sheet from each alloy with final thickness of 1.2 mm and Recrystallized Modal Structure (Structure #4, FIG. 1B) were used to demonstrate an effect of hole punching speed on HER results.

Specimens for testing with a size of 89×89 mm were wire EDM cut from the sheet. The holes with 10 mm diameter were punched at different speeds on two different machines but all of the specimens were punched with a 16% punch clearance and with the same punch profile geometry. The low speed punched holes (0.25 mm/s, 8 mm/s) were punched using an Instron 5985 Universal Testing System and the high speed punched holes (28 mm/s, 114 mm/s, 228 mm/s) were punched on a commercial punch press. All holes were punched using a flat punch geometry.

Hole expansion ratio (HER) testing was performed on the SP-225 hydraulic press and consisted of slowly raising the conical punch that uniformly expanded the hole radially outward. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

Figure 71:
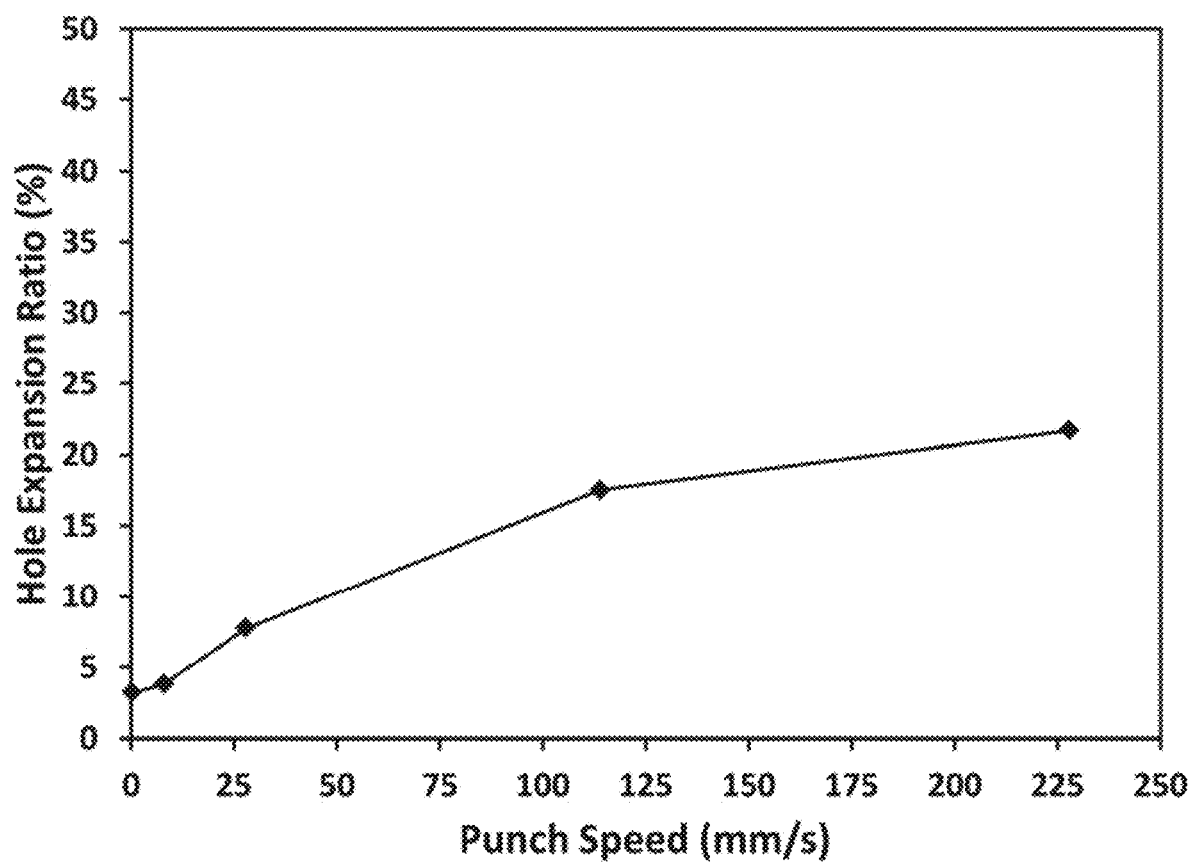
FIG. 71 Punch speed dependence of Alloy 1 edge formability as a function of punch speed, measured by hole expansion ratio. Note the consistent increase in hole expansion ratio with increasing punch speed.
Figure 72:
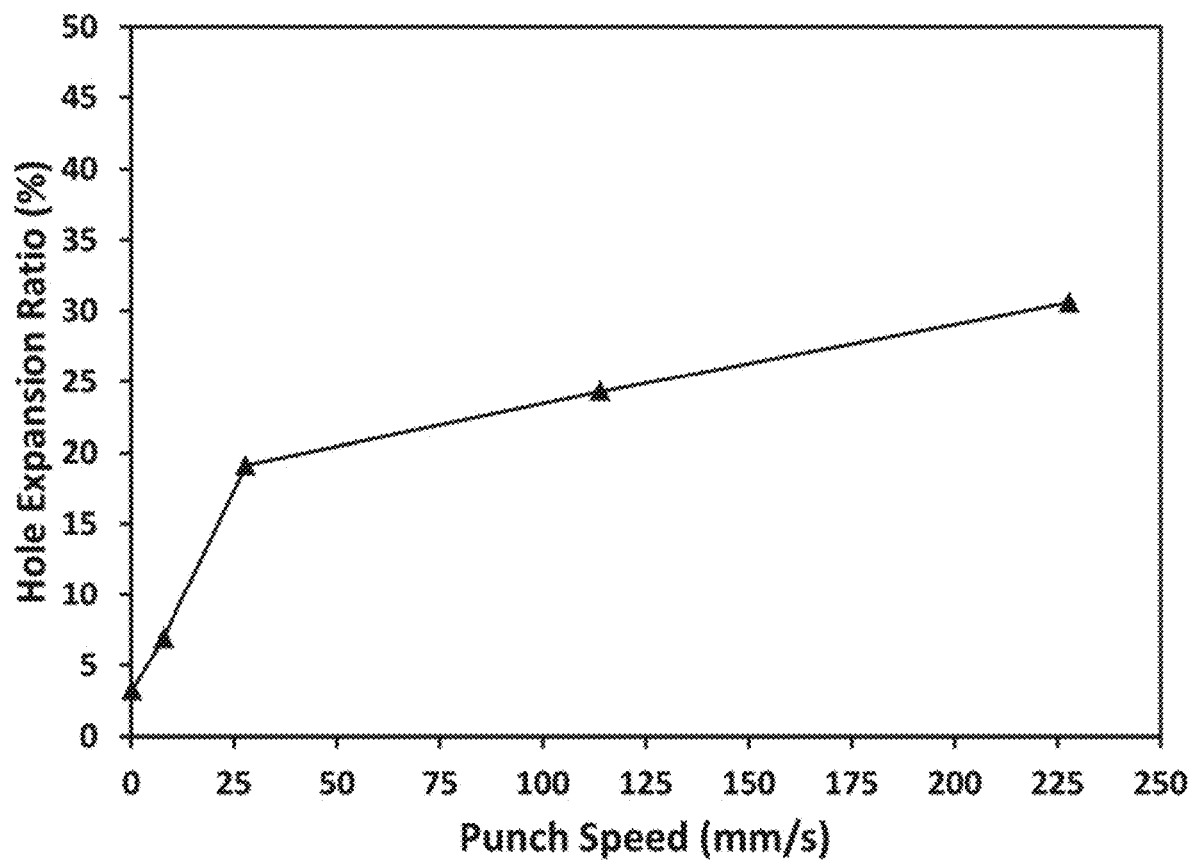
FIG. 72 Punch speed dependence of Alloy 9 edge formability as a function of punch speed, measured by hole expansion ratio. Note the rapid increase in hole expansion ratio up to approximately 25 mm/s punch speed followed by a gradual increase in hole expansion ratio.
Figure 73:
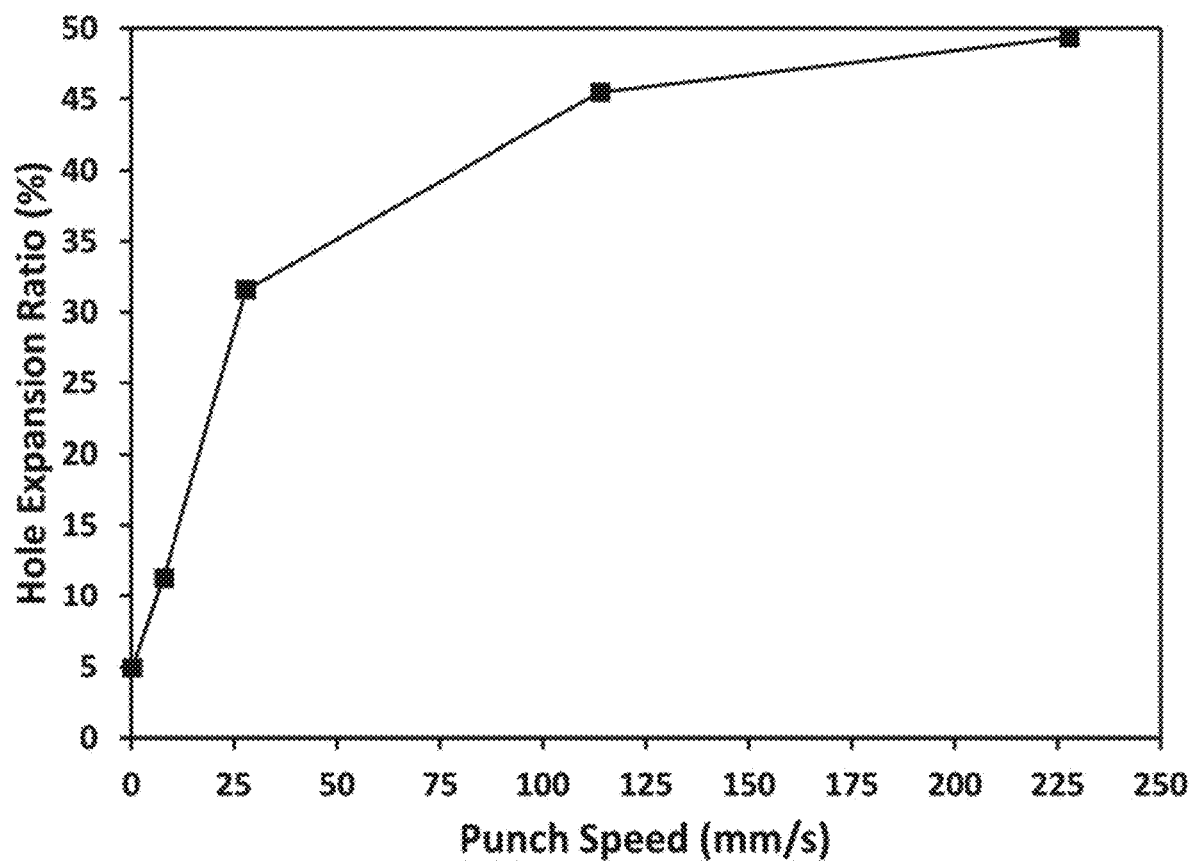
FIG. 73 Punch speed dependence of Alloy 12 edge formability as a function of punch speed, measured by hole expansion ratio. Note the rapid increase in hole expansion ratio up to approximately 25 mm/s punch speed followed by a continued increase in hole expansion ratio with punch speeds of >100 mm/s.

Hole expansion ratio values for tests are shown in Table 37. An average hole expansion value is shown for each speed and alloy tested at 16% punch clearance. The average hole expansion ratio as a function of punch speed is shown in FIG. 71, FIG. 72 and FIG. 73 for Alloy 1, Alloy 9, and Alloy 12, respectively. It can be seen that as punch speed increases, all alloys tested had a positive edge formability response, as demonstrated by an increase in hole expansion ratio. The reason for this increase is believed to be related to the following effects. With higher punch speed, the amount of heat generated at the sheared edge is expected to increase and the localized temperature spike may result in an annealing effect (i.e. in-situ annealing). Alternatively, with increasing punch speed, there may be a reduced amount of material transforming from the Recrystallized Modal Structure (i.e. Structure #4 in FIG. 1B) to the Refined High Strength Nanomodal Structure (i.e. Structure #5 in FIG. 1B). Concurrently, the amount of Refined High Strength Nanomodal Structure (i.e. Structure #5 in FIG. 1B) may be reduced due to the temperature spike enabling localized recrystallization (i.e. Mechanism #3 in FIG. 1B).

TABLE 38

Hole Expansion Ratio at Different Punch Speeds

| Material | Punch Speed (mm/s) | Measured Hole Expansion Ratio (%) | Average Hole Expansion Ratio (%) |
|---|---|---|---|
| Alloy 1 | 0.25 | 3.00 | 3.20 |
|  | 0.25 | 3.90 |  |
|  | 0.25 | 2.70 |  |
|  | 8 | 4.49 | 3.82 |
|  | 8 | 3.49 |  |
|  | 8 | 3.49 |  |
|  | 28 | 8.18 | 7.74 |
|  | 28 | 8.08 |  |
|  | 28 | 6.97 |  |
|  | 114 | 17.03 | 17.53 |
|  | 114 | 19.62 |  |
|  | 114 | 15.94 |  |
|  | 228 | 20.44 | 21.70 |
|  | 228 | 21.24 |  |
|  | 228 | 23.41 |  |
| Alloy 9 | 0.25 | 3.09 | 3.19 |
|  | 0.25 | 3.19 |  |
|  | 0.25 | 3.29 |  |
|  | 8 | 6.80 | 6.93 |
|  | 8 | 7.39 |  |
|  | 8 | 6.59 |  |
|  | 28 | 21.04 | 19.11 |
|  | 28 | 17.35 |  |
|  | 28 | 18.94 |  |
|  | 114 | 24.80 | 24.29 |
|  | 114 | 19.74 |  |
|  | 114 | 28.34 |  |

TABLE 38-continued

Hole Expansion Ratio at Different Punch Speeds

| Material | Punch Speed (mm/s) | Measured Hole Expansion Ratio (%) | Average Hole Expansion Ratio (%) |
|---|---|---|---|
|  | 228 | 26.00 | 30.57 |
|  | 228 | 35.16 |  |
|  | 228 | 30.55 |  |
| Alloy 12 | 0.25 | 4.61 | 4.91 |
|  | 0.25 | 5.21 |  |
|  | 8 | 7.62 | 11.28 |
|  | 8 | 14.61 |  |
|  | 8 | 11.62 |  |
|  | 28 | 29.38 | 31.59 |
|  | 28 | 33.70 |  |
|  | 28 | 31.70 |  |
|  | 114 | 40.08 | 45.50 |
|  | 114 | 48.11 |  |
|  | 114 | 48.31 |  |
|  | 228 | 50.00 | 49.36 |
|  | 228 | 40.56 |  |
|  | 228 | 57.51 |  |

This Case Example demonstrates a dependence of edge formability on punching speed as measured by the hole expansion ratio. As punch speed increases, the hole expansion ratio generally increases for the alloys tested. With increased punching speed, the nature of the edge is changed such that improved edge formability (i.e. HER response) is achieved. At punching speeds greater than those measured, edge formability is expected to continue improving towards even higher hole expansion ratio values.

Case Example #15 HER in DP980 as a Function of Hole Punching Speed

Commercially produced and processed Dual Phase 980 steel was purchased and hole expansion ratio testing was performed. All specimens were tested in the as received (commercially processed) condition.

Specimens for testing with a size of 89×89 mm were wire EDM cut from the sheet. The holes with 10 mm diameter were punched at different speeds on two different machines but all of the specimens were punched with a 16% punch clearance and with the same punch profile geometry using a commercial punch press. The low speed punched holes (0.25 mm/s) were punched using an Instron 5985 Universal Testing System and the high speed punched holes (28 mm/s, 114 mm/s, 228 mm/s) were punched on a commercial punch press. All holes were punched using a flat punch geometry.

Hole expansion ratio (HER) testing was performed on the SP-225 hydraulic press and consisted of slowly raising the conical punch that uniformly expanded the hole radially outward. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

Figure 74:
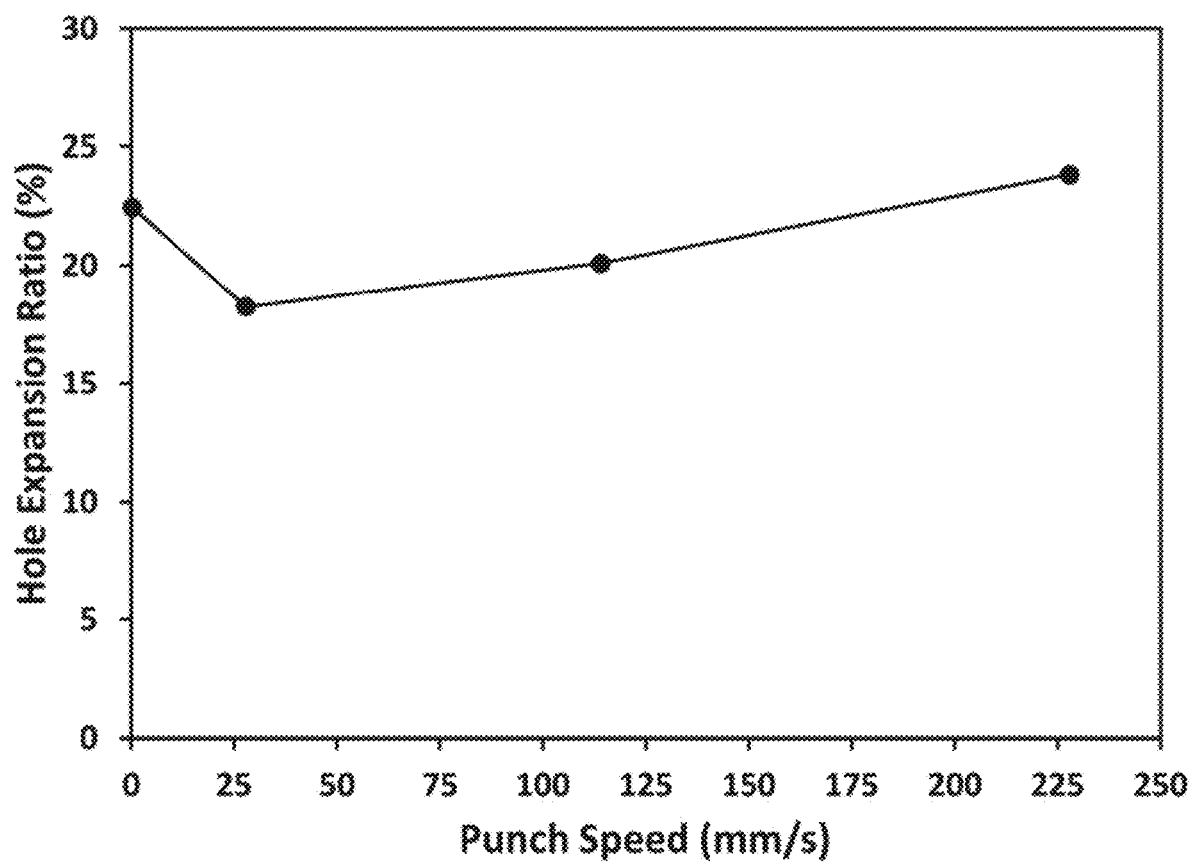
FIG. 74 Punch speed dependence of commercial Dual Phase 980 steel edge formability measured by hole expansion ratio. Note the hole expansion ratio is consistently 21% with ±3% variance for commercial Dual Phase 980 steel at all punch speeds tested.

Values for hole expansion tests are shown in Table 39. The average hole expansion value for each punching speed is also shown for commercial Dual Phase 980 material at 16% punch clearance. The average hole expansion value is plotted as a function of punching speed for commercial Dual Phase 980 steel in FIG. 74.

TABLE 39

Hole Expansion Ratio of Dual Phase 980 Steel at Different Punch Speeds

| Material | Punch Speed (mm/s) | Measured Hole Expansion Ratio (%) | Average Hole Expansion Ratio (%) |
|---|---|---|---|
| Commercial Dual Phase 980 | 0.25 | 23.55 | 22.45 |
| | 0.25 | 20.96 | |
| | 0.25 | 22.85 | |
| | 28 | 18.95 | 18.26 |
| | 28 | 17.63 | |
| | 28 | 18.21 | |
| | 114 | 17.40 | 20.09 |
| | 114 | 23.66 | |
| | 114 | 19.22 | |
| | 228 | 27.21 | 23.83 |
| | 228 | 24.30 | |
| | 228 | 19.98 | |

This Case Example demonstrates that no edge performance effect based on punch speed is measurable in Dual Phase 980 steel. For all punch speeds measured on Dual Phase 980 steel the edge performance (i.e. HER response) is consistently within the 21%±3% range, indicating that edge performance in conventional AHSS is not improved by punch speed as expected since the unique structures and mechanisms present in this application as for example in FIGS. 1a and 1b are not present.

Case Example #16: HER Results as a Function of Punch Design

Slabs with thickness of 50 mm were laboratory cast from Alloys 1, 9, and 12 according to the atomic ratios provided in Table 2 and laboratory processed by hot rolling, cold rolling and annealing at 850° C. for 10 min as described herein. Resultant sheet from each alloy with final thickness of 1.2 mm and Recrystallized Modal Structure (Structure #4, FIG. 1B) was used to demonstrate an effect of hole punching speed on HER results.

Figure 75:
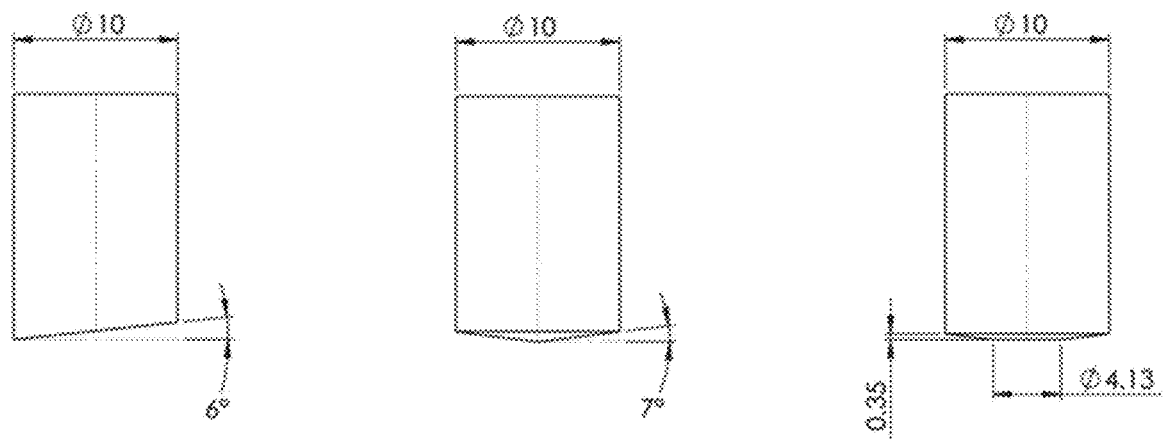
FIG. 75 Schematic drawings of non-flat punch geometries: 6° taper (left), 7° conical (center), and conical flat (right). All dimensions are in millimeters.

Tested specimens of 89×89 mm were wire EDM cut from larger sections. A 10 mm diameter hole was punched in the center of the specimen at three different speeds, 28 mm/s, 114 mm/s, and 228 mm/s at 16% punch clearance and with four punch profile geometries using a commercial punch press. These punch geometries used were flat, 6° tapered, 7° conical, and conical flat. Schematic drawings of the 6° tapered, 7° conical, and conical flat punch geometries are shown in FIG. 75.

Hole expansion ratio (HER) testing was performed on the SP-225 hydraulic press and consisted of slowly raising the conical punch that uniformly expanded the hole radially outward. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

Figure 76:
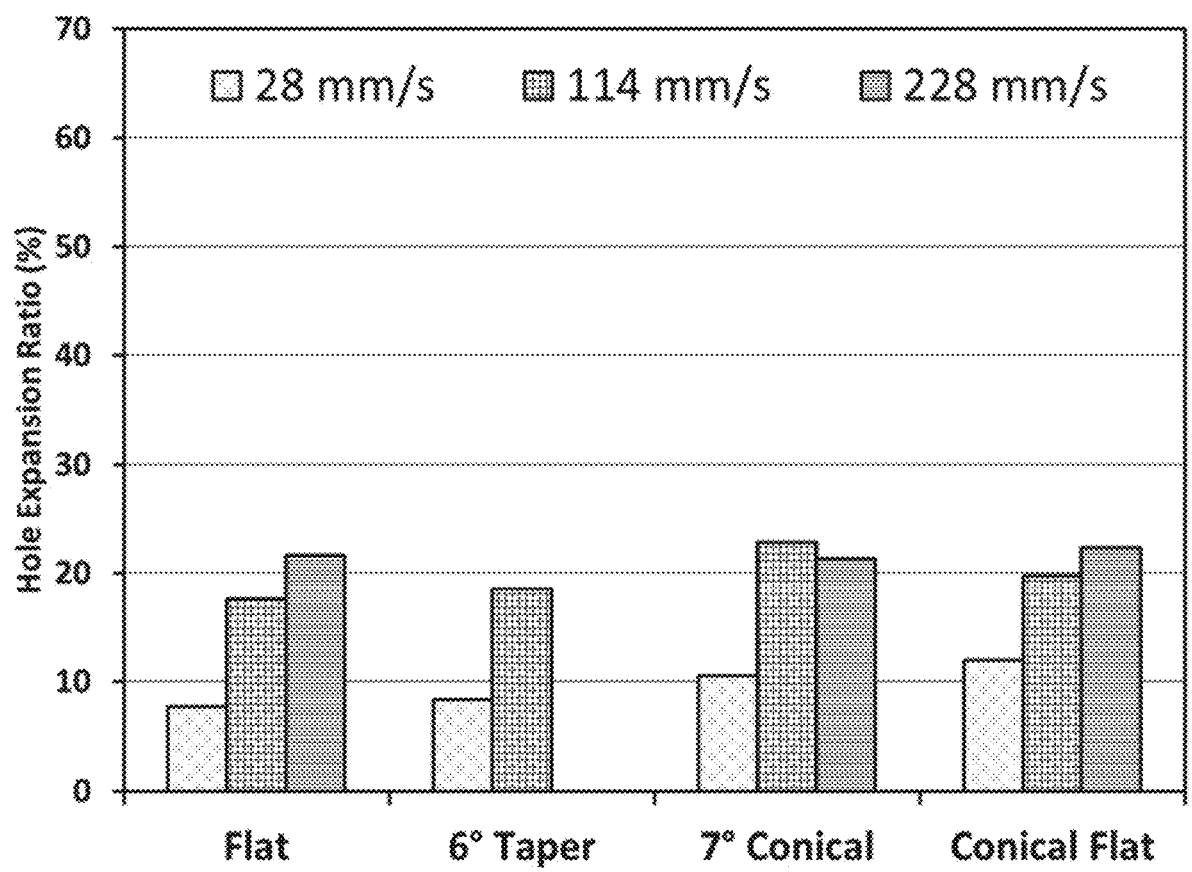
FIG. 76 Punch geometry effect on Alloy 1 at 28 mm/s, 114 mm/s, and 228 mm/s punch speed. Note that for the Alloy 1, the effect of punch geometry diminishes at 228 mm/s punch speed.
Figure 77:
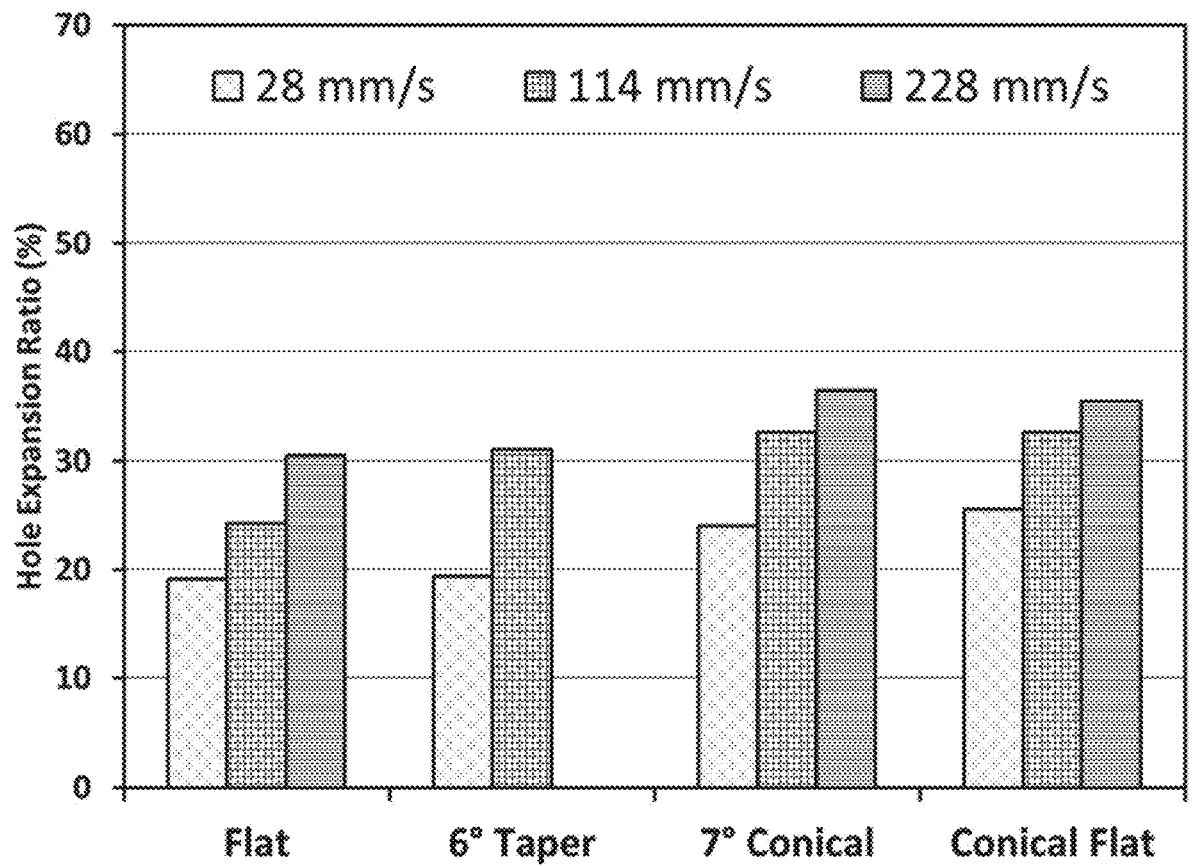
FIG. 77 Punch geometry effect on Alloy 9 at 28 mm/s, 114 mm/s, and 228 mm/s punch speeds. Note that the 7° conical punch and the conical flat punch result in the highest hole expansion ratio.
Figure 78:
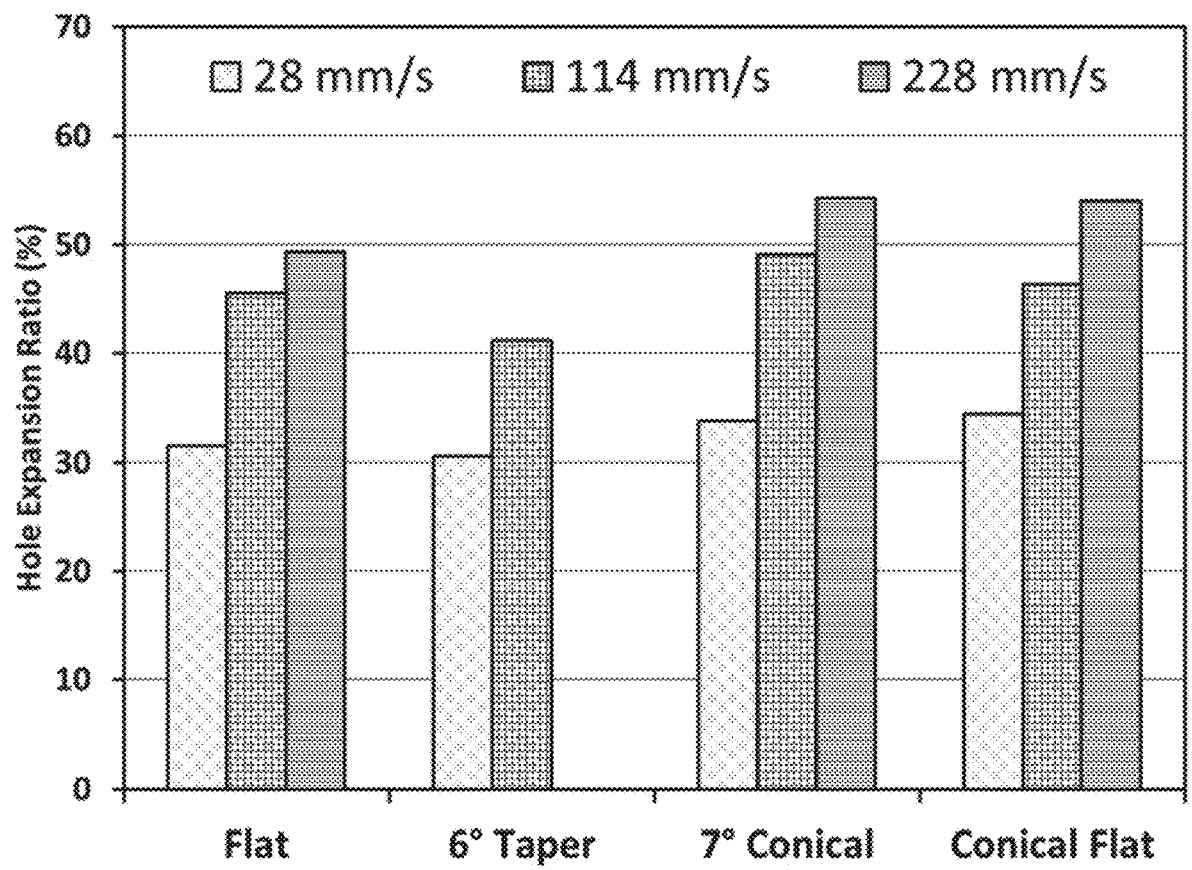
FIG. 78 Punch geometry effect on Alloy 12 at 28 mm/s, 114 mm/s, and 228 mm/s punch speed. Note that the 7° conical punch results at 228 mm/s punch speed in the highest hole expansion ratio measured for all alloys.

Hole expansion ratio data is included respectively in Table 40, Table 41, and Table 42 for Alloy 1, Alloy 9, and Alloy 12 at four punch geometries and at two different punch speeds. The average hole expansion values for Alloy 1, Alloy 9, and Alloy 12 are shown in FIG. 76, FIG. 77 and FIG. 78, respectively. For all alloys tested, the 7° conical punch geometry resulted in the largest or tied for the largest hole expansion ratio compared to all other punch geometries. Increased punch speed is also shown to improve the edge formability (i.e. HER response) for all punch geometries. At increased punching speed with different punch geometries, the alloys herein may be able to undergo some amount of Recrystallization (Mechanism #3) as it is contemplated that there could be localized heating at the edge at such higher relative punch speeds, triggering Mechanism #3 and formation of some amount of Structure #4.

TABLE 40

Hole Expansion Ratio of Alloy 1 with Different Punch Geometries

| Punch Geometry | Punch Speed (mm/s) | Measured Hole Expansion Ratio (%) | Average Hole Expansion Ratio (%) |
|---|---|---|---|
| Flat | 28 | 8.18 | 7.74 |
| Flat | 28 | 8.08 | |
| Flat | 28 | 6.97 | |
| Flat | 114 | 17.03 | 17.53 |
| Flat | 114 | 19.62 | |
| Flat | 114 | 15.94 | |
| Flat | 228 | 20.44 | 21.70 |
| Flat | 228 | 21.24 | |
| Flat | 228 | 23.41 | |
| 6° Taper | 28 | 7.87 | 8.32 |
| 6° Taper | 28 | 8.77 | |
| 6° Taper | 114 | 19.84 | 18.48 |
| 6° Taper | 114 | 16.55 | |
| 6° Taper | 114 | 19.04 | |
| 7° Conical | 28 | 8.37 | 10.56 |
| 7° Conical | 28 | 12.05 | |
| 7° Conical | 28 | 11.25 | |
| 7° Conical | 114 | 23.41 | 22.85 |
| 7° Conical | 114 | 21.14 | |
| 7° Conical | 114 | 24.00 | |
| 7° Conical | 228 | 21.71 | 21.37 |
| 7° Conical | 228 | 19.50 | |
| 7° Conical | 228 | 22.91 | |
| Conical Flat | 28 | 8.47 | 11.95 |
| Conical Flat | 28 | 13.25 | |
| Conical Flat | 28 | 14.14 | |
| Conical Flat | 114 | 20.42 | 19.75 |
| Conical Flat | 114 | 19.22 | |
| Conical Flat | 114 | 19.62 | |
| Conical Flat | 228 | 24.13 | 22.39 |
| Conical Flat | 228 | 23.31 | |
| Conical Flat | 228 | 19.72 | |

TABLE 41

Hole Expansion Ratio of Alloy 9 with Different Punch Geometries

| Punch Geometry | Punch Speed (mm/s) | Measured Hole Expansion Ratio (%) | Average Hole Expansion Ratio (%) |
|---|---|---|---|
| Flat | 28 | 21.04 | 19.11 |
| Flat | 28 | 17.35 | |
| Flat | 28 | 18.94 | |
| Flat | 114 | 24.80 | 24.29 |
| Flat | 114 | 19.74 | |
| Flat | 114 | 28.34 | |
| Flat | 228 | 26.00 | 30.57 |
| Flat | 228 | 35.16 | |
| Flat | 228 | 30.55 | |
| 6° Taper | 28 | 17.35 | 19.36 |
| 6° Taper | 28 | 19.06 | |
| 6° Taper | 28 | 21.66 | |
| 6° Taper | 114 | 29.64 | 31.14 |
| 6° Taper | 114 | 32.14 | |
| 6° Taper | 114 | 31.64 | |
| 7° Conical | 28 | 22.63 | 24.05 |
| 7° Conical | 28 | 23.61 | |
| 7° Conical | 28 | 25.92 | |
| 7° Conical | 114 | 34.36 | 32.60 |
| 7° Conical | 114 | 31.67 | |
| 7° Conical | 114 | 31.77 | |
| 7° Conical | 228 | 36.28 | 36.44 |
| 7° Conical | 228 | 38.87 | |
| 7° Conical | 228 | 34.16 | |
| Conical Flat | 28 | 27.72 | 25.59 |
| Conical Flat | 28 | 24.63 | |
| Conical Flat | 28 | 24.43 | |
| Conical Flat | 114 | 30.28 | 32.64 |
| Conical Flat | 114 | 32.87 | |
| Conical Flat | 114 | 34.76 | |
| Conical Flat | 228 | 32.90 | 35.45 |
| Conical Flat | 228 | 37.45 | |
| Conical Flat | 228 | 35.99 | |

TABLE 42

Hole Expansion Ratio of Alloy 12 with Different Punch Geometries

| Punch Geometry | Punch Speed (mm/s) | Measured Hole Expansion Ratio (%) | Average Hole Expansion Ratio (%) |
|---|---|---|---|
| Flat | 28 | 29.38 | 31.59 |
| Flat | 28 | 33.70 | |
| Flat | 28 | 31.70 | |
| Flat | 114 | 40.08 | 45.50 |
| Flat | 114 | 48.11 | |
| Flat | 114 | 48.31 | |
| Flat | 228 | 50.00 | 49.36 |
| Flat | 228 | 40.56 | |
| Flat | 228 | 57.51 | |
| 6° Taper | 28 | 29.91 | 30.67 |
| 6° Taper | 28 | 32.50 | |
| 6° Taper | 28 | 29.61 | |
| 6° Taper | 114 | 38.42 | 41.19 |
| 6° Taper | 114 | 44.37 | |
| 6° Taper | 114 | 40.78 | |
| 7° Conical | 28 | 34.90 | 33.76 |
| 7° Conical | 28 | 33.00 | |
| 7° Conical | 28 | 33.37 | |
| 7° Conical | 114 | 45.72 | 49.10 |
| 7° Conical | 114 | 49.30 | |
| 7° Conical | 114 | 52.29 | |
| 7° Conical | 228 | 58.90 | 54.36 |
| 7° Conical | 228 | 53.43 | |
| 7° Conical | 228 | 50.75 | |
| Conical Flat | 28 | 37.15 | 34.43 |
| Conical Flat | 28 | 31.47 | |
| Conical Flat | 28 | 34.66 | |
| Conical Flat | 114 | 45.76 | 46.36 |
| Conical Flat | 114 | 45.96 | |
| Conical Flat | 114 | 47.36 | |
| Conical Flat | 228 | 57.51 | 54.11 |
| Conical Flat | 228 | 53.48 | |
| Conical Flat | 228 | 51.34 | |

Figure 79:
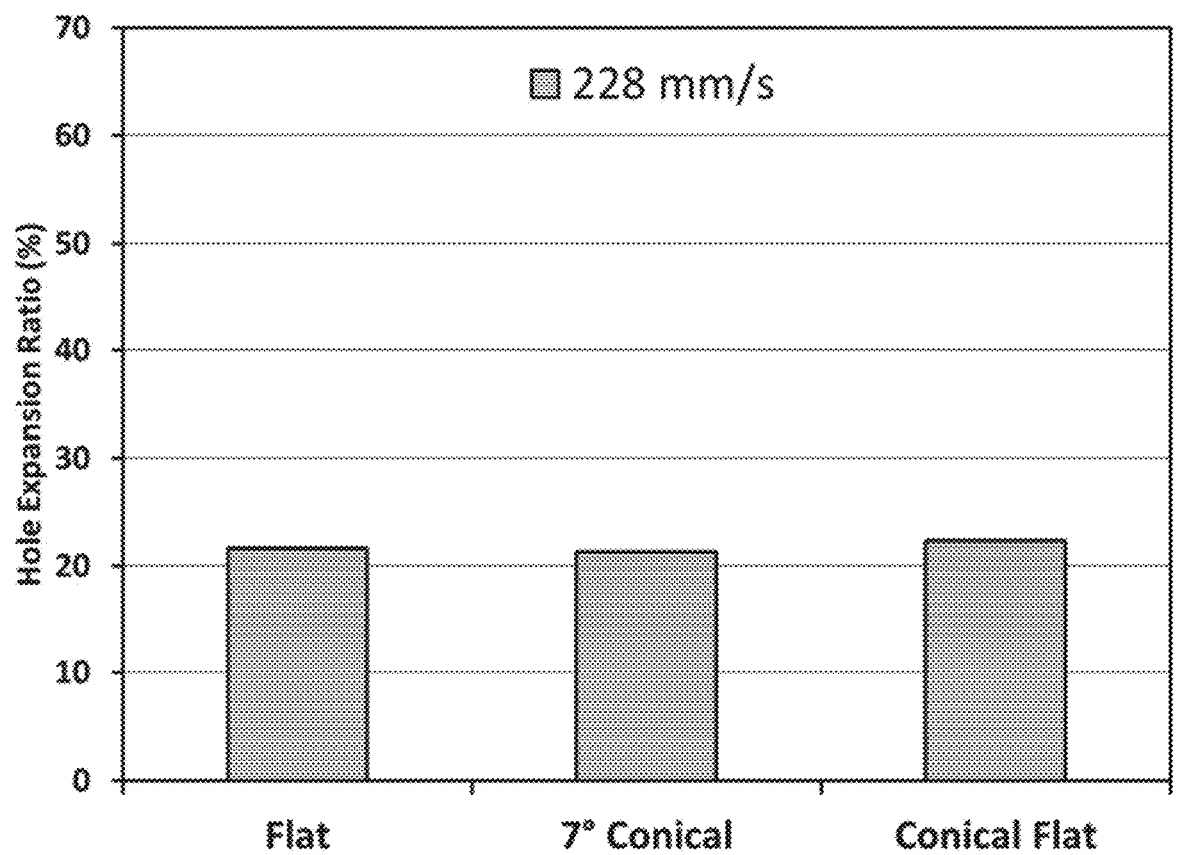
FIG. 79 Punch geometry effect on Alloy 1 at 228 mm/s punch speed. Note that all punch geometries result in nearly equal hole expansion ratios of approximately 21%.

This Case Example demonstrates that for all alloys tested, there is an effect of punch geometry on edge formability. For all alloys tested, the conical punch shapes resulted in the largest hole expansion ratios, thereby demonstrating that modifying the punch geometry from a flat punch to a conical punch shape reduces the damage within the material due to the punched edge and improves edge formability. The 7° conical punch geometry resulted in the greatest edge formability increase overall when compared to the flat punch geometry with the conical flat geometry producing slightly lower hole expansion ratios across the majority of alloys tested. For Alloy 1 the effect of punch geometry is diminished with increasing punching speed, with the three tested geometries resulting in nearly equal edge formability as measured by hole expansion ratio (FIG. 79). Punch geometry, coupled with increased punch speeds have been demonstrated to greatly reduce residual damage from punching within the edge of the material, thereby improving edge formability. With higher punch speed, the amount of heat generated at the sheared edge is expected to increase and the localized temperature spike may result in an annealing effect (i.e. in-situ annealing). Alternatively, with increasing punch speed, there may be a reduced amount of material transforming from the Recrystallized Modal Structure (i.e. Structure #4 in FIG. 1B) to the Refined High Strength Nanomodal Structure (i.e. Structure #5 in FIG. 1B). Concurrently, the amount of Refined High Strength Nanomodal Structure (i.e. Structure #5 in FIG. 1B) may be reduced due to the temperature spike enabling localized recrystallization (i.e. Mechanism #3 in FIG. 1B).

Case Example #17: HER in Commercial Steel Grades as a Function of Hole Punching Speed Hole expansion ratio testing was performed on commercial steel grades 780, 980 and 1180. All specimens were tested in the as received (commercially processed) sheet condition.

Specimens for testing with a size of 89×89 mm were wire EDM cut from the sheet of each grade. The holes with 10 mm diameter were punched at different speeds on two different machines with the same punch profile geometry using a commercial punch press. The low speed punched holes (0.25 mm/s) were punched using an Instron 5985 Universal Testing System at 12% clearance and the high speed punched holes (28 mm/s, 114 mm/s, 228 mm/s) were punched on a commercial punch press at 16% clearance. All holes were punched using a flat punch geometry.

Hole expansion ratio (HER) testing was performed on the SP-225 hydraulic press and consisted of slowly raising the conical punch that uniformly expanded the hole radially outward. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

Figure 80:
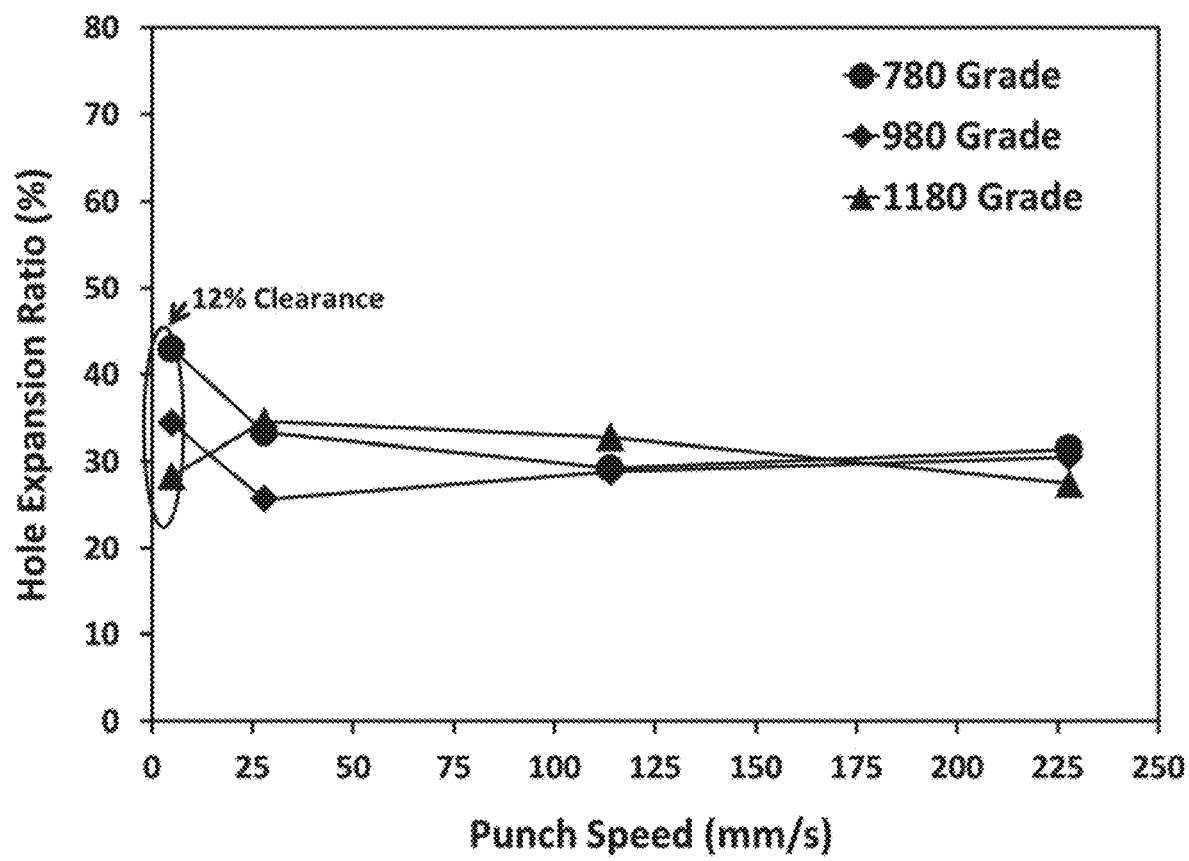
FIG. 80 Hole punch speed dependence of commercial steel grades edge formability measured by hole expansion ratio.

Results from hole expansion tests are shown in Table 43 through Table 45 and illustrated in FIG. 80. As it can be seen, the hole expansion ratio does not show improvement with increasing punching speed in all tested grades.

TABLE 43

Hole Expansion Ratio of 780 Steel Grade at Different Punch Speeds

| Sample # | Punch Speed (mm/s) | Punch to die clearance (%) | Punch Geometry | HER |
|---|---|---|---|---|
| 1 | 5 mm/s | 12% | Flat | 44.74 |
| 2 | | 12% | Flat | 39.42 |
| 3 | | 12% | Flat | 44.57 |
| 1 | 28 mm/s | 16% | Flat | 35.22 |
| 2 | | 16% | Flat | 28.4 |
| 3 | | 16% | Flat | 36.38 |
| 1 | 114 mm/s | 16% | Flat | 31.58 |
| 2 | | 16% | Flat | 33.9 |
| 3 | | 16% | Flat | 22.29 |
| 1 | 228 mm/s | 16% | Flat | 31.08 |
| 2 | | 16% | Flat | 31.85 |
| 3 | | 16% | Flat | 31.31 |

TABLE 44

Hole Expansion Ratio of 980 Steel Grade at Different Punch Speeds

| Sample # | Punch Speed (mm/s) | Punch to die clearance (%) | Punch Geometry | HER |
|---|---|---|---|---|
| 1 | 5 mm/s | 12% | Flat | 33.73 |
| 2 | | 12% | Flat | 35.02 |
| 1 | 28 mm/s | 16% | Flat | 26.88 |
| 2 | | 16% | Flat | 26.44 |
| 3 | | 16% | Flat | 23.83 |
| 1 | 114 mm/s | 16% | Flat | 26.81 |
| 2 | | 16% | Flat | 30.56 |
| 3 | | 16% | Flat | 29.24 |
| 1 | 228 mm/s | 16% | Flat | 30.06 |
| 2 | | 16% | Flat | 30.98 |
| 3 | | 16% | Flat | 30.62 |

TABLE 45

Hole Expansion Ratio of 1180 Steel Grade at Different Punch Speeds

| Sample # | Punch Speed (mm/s) | Punch to die clearance (%) | Punch Geometry | HER |
|---|---|---|---|---|
| 1 | 5 mm/s | 12% | Flat | 26.73 |
| 2 | | 12% | Flat | 32.9 |
| 3 | | 12% | Flat | 25.4 |
| 1 | 28 mm/s | 16% | Flat | 35.32 |
| 2 | | 16% | Flat | 32.11 |
| 3 | | 16% | Flat | 36.37 |
| 1 | 114 mm/s | 16% | Flat | 35.15 |
| 2 | | 16% | Flat | 30.92 |
| 3 | | 16% | Flat | 32.27 |
| 1 | 228 mm/s | 16% | Flat | 27.25 |
| 2 | | 16% | Flat | 23.98 |
| 3 | | 16% | Flat | 31.18 |

This Case Example demonstrates that no edge performance effect based on hole punch speed is measurable in tested commercial steel grades indicating that edge performance in conventional AHSS is not effected or improved by punch speed as expected since the unique structures and mechanisms present in this application as for example in FIG. 1A and FIG. 1B are not present.

Case Example #18: Relationship of Post Uniform Elongation to Hole Expansion Ratio Existing steel materials have been shown to exhibit a strong correlation of the measured hole expansion ratio and the material's post uniform elongation. The post uniform elongation of a material is defined as a difference between the total elongation of a sample during tensile testing and the uniform elongation, typically at the ultimate tensile strength during tensile testing. Uniaxial tensile testing and hole expansion ratio testing were completed on Alloy 1 and Alloy 9 on the sheet material at approximately 1.2 mm thickness for comparison to existing material correlations.

Slabs with thickness of 50 mm were laboratory cast of Alloy 1 and Alloy 9 according to the atomic ratios provided in Table 2 and laboratory processed by hot rolling, cold rolling annealing at 850° C. for 10 min as described in the Main Body section of this application.

Tensile specimens in the ASTM E8 geometry were prepared by wire EDM. All samples were tested in accordance with the standard testing procedure described in the Main Body of this document. An average of the uniform elongation and total elongation for each alloy were used to calculate the post uniform elongation. The average uniform elongation, average total elongation, and calculated post uniform elongation for Alloy 1 and Alloy 9 are provided in Table 46.

Specimens for hole expansion ratio testing with a size of 89×89 mm were wire EDM cut from the sheet of Alloy 1 and Alloy 9. Holes of 10 mm diameter were punched at 0.25 mm/s on an Instron 5985 Universal Testing System at 12% clearance. All holes were punched using a flat punch geometry. These test parameters were selected as they are commonly used by industry and academic professionals for hole expansion ratio testing.

Hole expansion ratio (HER) testing was performed on the SP-225 hydraulic press and consisted of slowly raising the conical punch that uniformly expanded the hole radially outward. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

The measured hole expansion ratio values for Alloy 1 and Alloy 9 are provided in Table 46.

TABLE 46

Uniaxial Tensile and Hole Expansion Data for Alloy 1 and Alloy 9

| Alloy | Average Uniform Elongation (%) | Average Total Elongation (%) | Post Uniform Elongation ($\varepsilon_{pul}$) (%) | Hole Expansion Ratio (%) |
|---|---|---|---|---|
| Alloy 1 | 47.19 | 49.29 | 2.10 | 2.30 |
| Alloy 9 | 50.83 | 56.99 | 6.16 | 2.83 |

Commercial reference data is shown for comparison in Table 47 from [Paul S. K., J Mater Eng Perform 2014; 23:3610.]. For commercial data, S. K. Paul's prediction states that the hole expansion ratio of a material is proportional to 7.5 times the post uniform elongation (See Equation 1).

$$HER = 7.5(\varepsilon_{pul}) \quad \text{Equation 1}$$

TABLE 47

Reference Data from [Paul S.K., J Mater Eng Perform 2014; 23:3610.]

| Commercial Steel Grade | Uniform Elongation (%) | Total Elongation (%) | Post Uniform Elongation ($\varepsilon_{pul}$) (%) | Hole Expansion Ratio (%) |
|---|---|---|---|---|
| IF-Rephos | 22 | 37.7 | 15.7 | 141.73 |
| IF-Rephos | 22.2 | 39.1 | 16.9 | 159.21 |
| BH210 | 19.3 | 37.8 | 18.5 | 151.96 |
| BH300 | 16.5 | 29 | 12.5 | 66.63 |
| DP 500 | 18.9 | 27.5 | 8.6 | 55.97 |
| DP600 | 16.01 | 23.51 | 7.5 | 38.03 |
| TRIP 590 | 22.933 | 31.533 | 8.6 | 68.4 |
| TRIP 600 | 19.3 | 27.3 | 8 | 39.98 |
| TWIP940 | 64 | 66.4 | 2.4 | 39.1 |
| HSLA 350 | 19.1 | 30 | 10.9 | 86.58 |
| 340 R | 22.57 | 36.3 | 13.73 | 97.5 |

Figure 81:
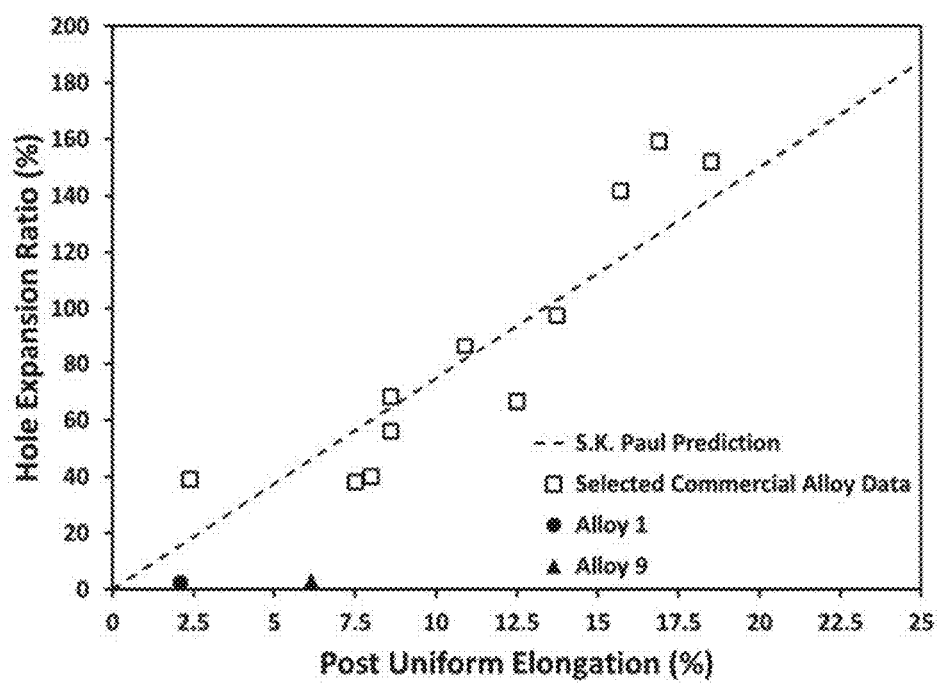
FIG. 81 The post uniform elongation and hole expansion ratio correlation as predicted by [Paul S. K., J Mater Eng Perform 2014; 23:3610.] with data for selected commercial steel grades from the same paper along with Alloy 1 and Alloy 9 data.

The Alloy 1 and Alloy 9 post uniform elongation and hole expansion ratio are plotted in FIG. 81 with the commercial alloy data and S. K. Paul's predicted correlation. Note that the data for Alloy 1 and Alloy 9 do not follow the predicted correlation line.

This Case Example demonstrates that for the steel alloys herein, the correlation between post uniform elongation and the hole expansion ratio does not follow that for commercial steel grades. The measured hole expansion ratio for Alloy 1 and Alloy 9 is much smaller than the predicted values based on correlation for existing commercial steel grades indicating an effect of the unique structures and mechanisms are present in the steel alloys herein as for example shown in FIG. 1a and FIG. 1b.

Case Example #19 HER Performance as a Function of Hole Expansion Speed

Slabs with thickness of 50 mm were laboratory cast from three selected alloys according to the atomic ratios provided in Table 2 and laboratory processed by hot rolling, cold rolling and annealing at 850° C. for 10 min as described herein. Sheet from each alloy possessing the Recrystallized Modal Structure with final thickness of 1.2 mm were used to demonstrate the effect of hole expansion speed on HER performance.

Specimens for testing with a size of 89×89 mm were cut via wire EDM from the sheet. Holes of 10 mm diameter were punched at a constant speed of 228 mm/s on a commercial punch press. All holes were punched with a flat punch geometry, and with approximately 16% punch to die clearance.

Hole expansion ratio (HER) testing was performed on an Interlaken Technologies SP-225 hydraulic press and consisted of raising the conical punch that uniformly expanded the hole radially outward. Four hole expansion speeds, synonymous with the conical ram travel speed, were used; 5, 25, 50, and 100 mm/min. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

Figure 82:
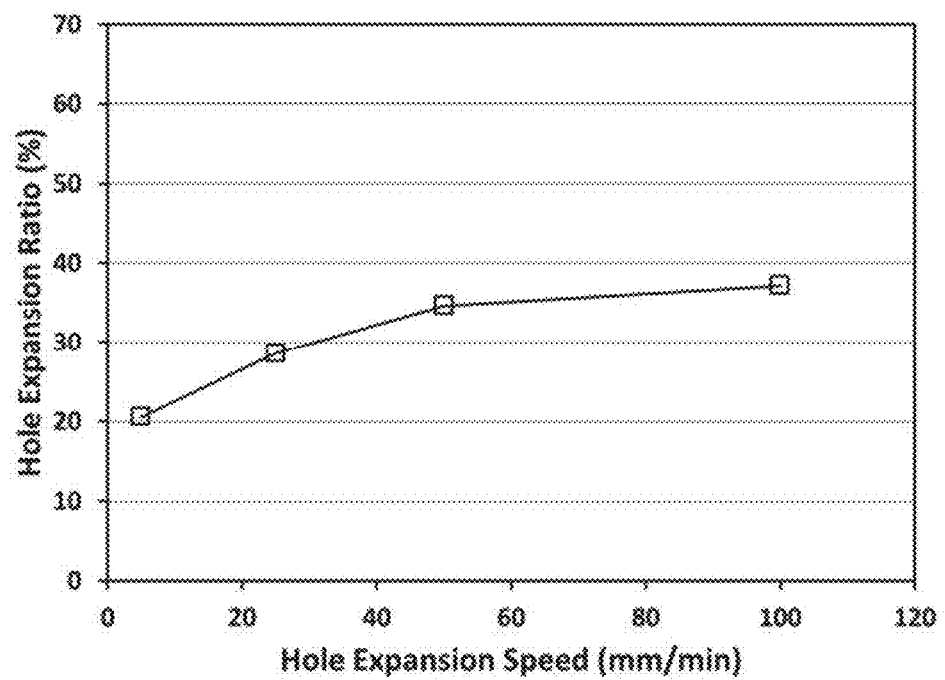
FIG. 82 The measured hole expansion ratio in samples from Alloy 1 as a function of hole expansion speed.
Figure 83:
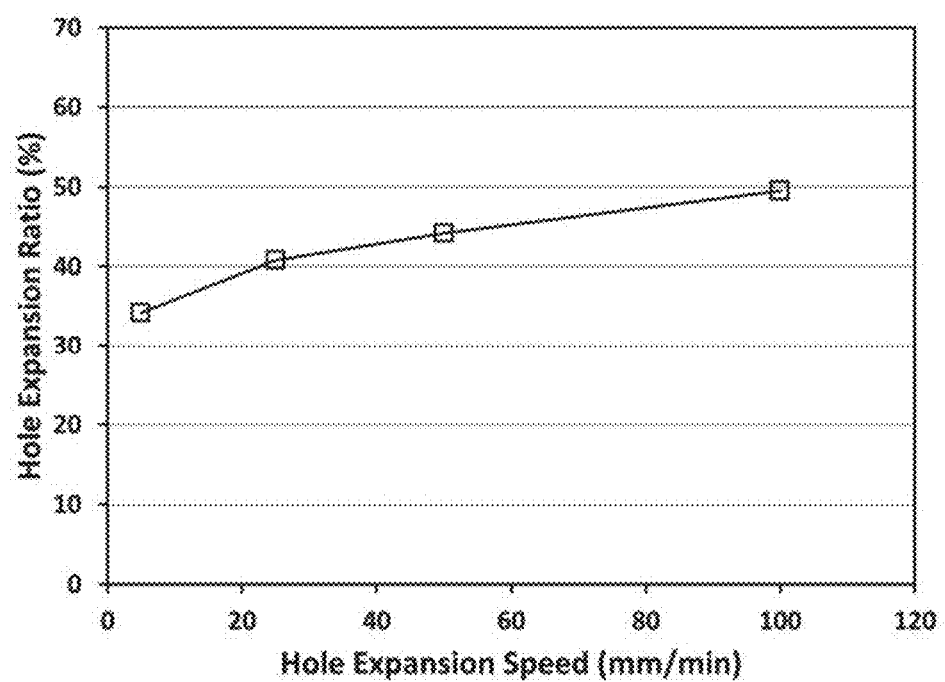
FIG. 83 The measured hole expansion ratio in samples from Alloy 9 as a function of hole expansion speed.
Figure 84:
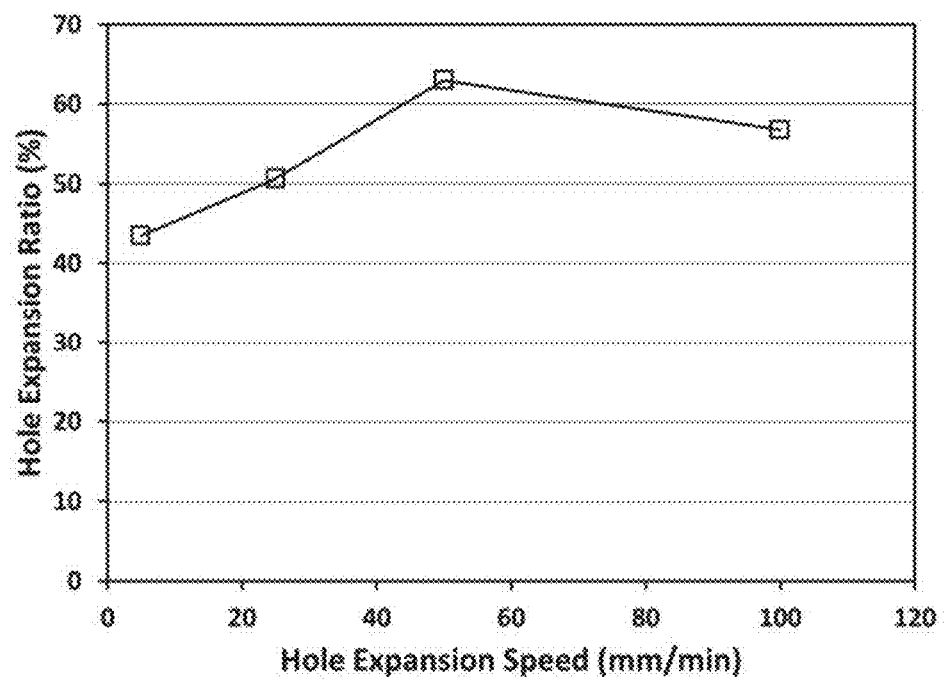
FIG. 84 The measured hole expansion ratio in samples from Alloy 12 as a function of hole expansion speed.

Hole expansion ratio values for the tests are shown in Table 48. The average hole expansion ratio value is shown for each speed and alloy tested showing an increase in HER values with increasing hole expansion speed in all three alloys. The effect of hole expansion speed is also demonstrated in FIG. 82, FIG. 83, and FIG. 84 for Alloy 1, Alloy 9, and Alloy 12, respectively.

TABLE 48

Hole Expansion Ratio in Selected Alloys at Different Expansion Speeds

| Material | Punch Speed (mm/s) | Hole Expansion Speed (mm/min) | Measured Hole Expansion Ratio (%) | Average Hole Expansion Ratio (%) |
|---|---|---|---|---|
| Alloy 1 | 228 | 5 | 19.09 | 20.55 |
| | | | 22.54 | |
| | | | 20.02 | |
| | | 25 | 30.70 | 28.58 |
| | | | 29.14 | |
| | | | 25.91 | |
| | | 50 | 34.05 | 34.63 |
| | | | 36.43 | |
| | | | 33.42 | |

TABLE 48-continued

Hole Expansion Ratio in Selected Alloys at Different Expansion Speeds

| Material | Punch Speed (mm/s) | Hole Expansion Speed (mm/min) | Measured Hole Expansion Ratio (%) | Average Hole Expansion Ratio (%) |
|---|---|---|---|---|
| | | 100 | 37.11 | 37.19 |
| | | | 38.52 | |
| | | | 35.93 | |
| Alloy 9 | 228 | 5 | 34.06 | 34.15 |
| | | | 34.07 | |
| | | | 34.31 | |
| | | 25 | 32.87 | 40.77 |
| | | | 45.46 | |
| | | | 43.98 | |
| | | 50 | 38.39 | 44.17 |
| | | | 39.71 | |
| | | | 54.42 | |
| | | 100 | 48.01 | 49.50 |
| | | | 55.27 | |
| | | | 45.23 | |
| Alloy 12 | 228 | 5 | 48.61 | 43.51 |
| | | | 34.79 | |
| | | | 47.14 | |
| | | 25 | 42.13 | 50.64 |
| | | | 57.82 | |
| | | | 51.96 | |
| | | 50 | 63.77 | 62.97 |
| | | | 68.46 | |
| | | | 56.68 | |
| | | 100 | 57.79 | 56.73 |
| | | | 49.28 | |
| | | | 63.11 | |

This Case Example demonstrates that formability of the edge, i.e. its ability to be deformed with relatively reduced cracking, as measured by HER testing, can be affected by the speed of deformation of the hole edge (i.e. hole expansion speed). The alloys tested in this Case Example demonstrated a positive correlation between hole expansion ratio and the hole expansion speed, with increasing hole expansion speed resulting in relatively higher measured hole expansion ratios.

Accordingly, in the broad context of the present disclosure, it has been established that once an edge is formed, of any geometry by any edge formation method which causes deformation of the metal alloy when forming the edge (e.g. by punching, shearing, piercing, perforating, cutting, cropping, stamping), by increasing the speed at which that edge once formed is then expanded, one observes that the edge itself is then capable of more expansion with a relatively reduced tendency to crack. The edge herein can therefore include an edge that defines an internal hole in a metal sheet of the alloys described herein, or an external edge on such metal sheet. In addition, the edge herein may be formed in a progressive die stamping operation which is reference to metal working operation that typically includes punching, shearing, coining and bending. The edge herein may be present in a vehicle, or more specifically, part of a vehicular frame, vehicular chassis, or vehicle panel.

Figure 91:
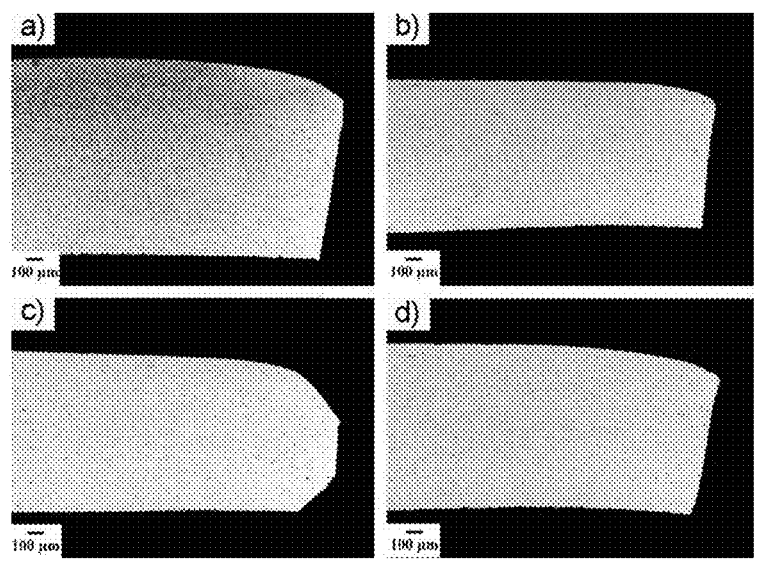
FIG. 91 SEM images at low magnification of the cross section near the hole edge in the Alloy 1 samples with holes prepared by different methods after expansion during HER testing; a) Punched hole, b) EDM cut hole, c) Milled hole, and d) Laser cut hole.

Reference to edge expansion herein is understood as increasing the length of such edge with a corresponding change in the thickness of the edge. That is confirmed by the above data in Table 48, which shows that with respect to an edge that is present in a hole, when such edge in the hole is expanded at a speed of greater than or equal to 5 mm/min, one observes an increase in the hole expansion ratio (i.e. the edge in the hole is capable of expansion to higher percentages over the original diameter) and the edge getting thinner as shown for example in the cross sections of the expanded edges in FIG. 91.

Figure 85:
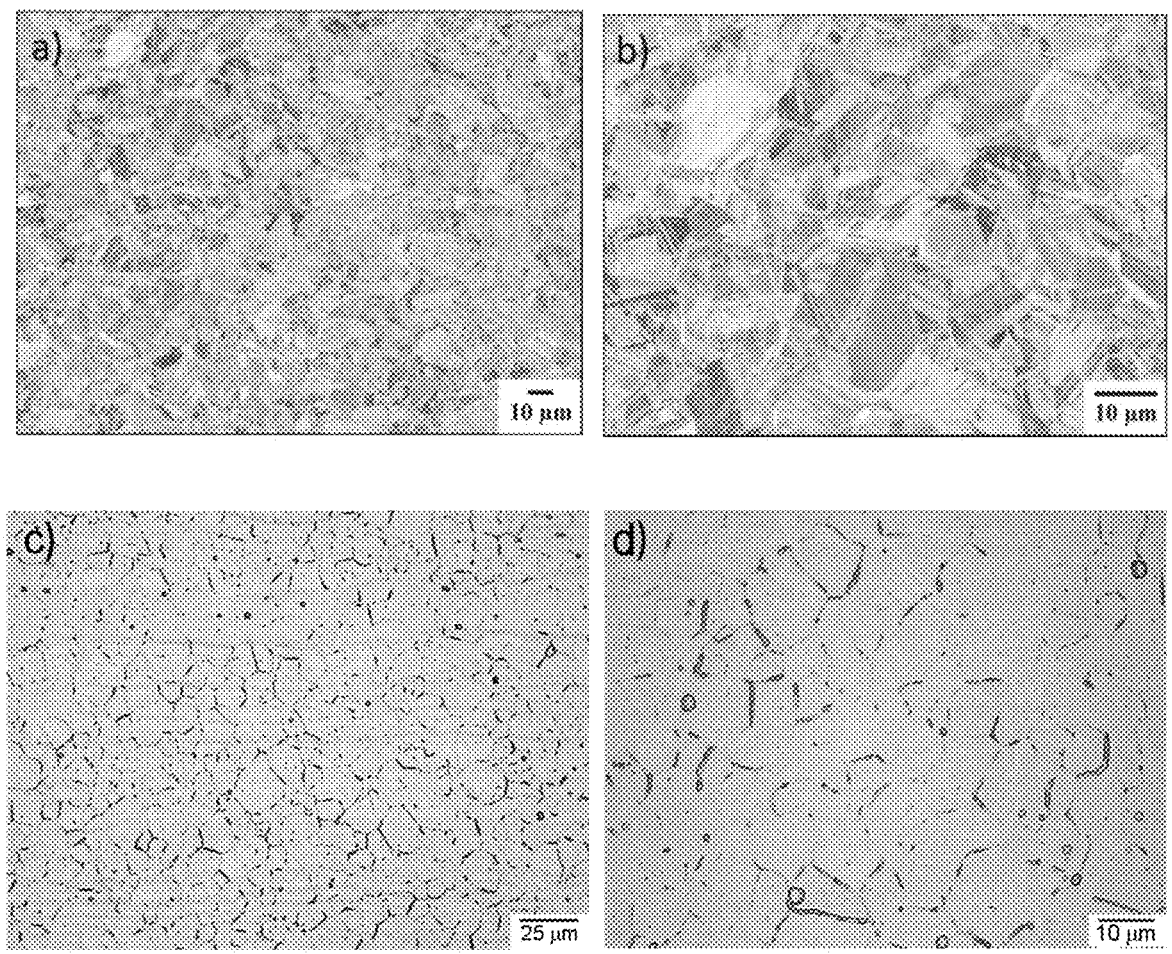
FIG. 85 Images of the microstructure in the sheet from Alloy 9; a) SEM image of the microstructure, b) Higher magnification SEM image of the microstructure, c) Optical image of the etched surface, and d) Higher magnification optical image of the etched surface.

Case Example 20 HER Performance as a Function of Punch Speed and Hole Expansion Speed Sheet from Alloy 9 was produced according to the atomic ratios provided in Table 2. Slabs produced by continuous casting were hot rolled into hot band which was subsequently processed into sheet with thickness of approximately 1.4 mm by cold rolling and annealing cycles. The microstructure of the produced sheet using both SEM and etched optical microscopy is demonstrated in FIG. 85 showing typical Recrystallized Modal Structure.

In FIG. 85A and FIG. 85B, the SEM micrographs shows the micron scale nature of the austenitic grains which contain some annealing twins and stacking faults. In FIG. 85C and FIG. 85D, etched samples were examined using optical microscopy. It can be seen that the grain boundaries are preferentially etched and the microstructure showing the grain boundaries. The grain size was measured with the line intercept method and is found to range from 6 μm to 22 μm with a mean value of 15 μm.

The sheet with Recrystallized Modal Structure was used for HER testing. Specimens for testing with a size of 89×89 mm were cut via wire EDM from the sheet. Holes of 10 mm diameter were punched at two different speeds of 5 mm/s using an Instron mechanical test frame and at 228 mm/s using a commercial punch press with a flat punch geometry and with punch to die clearances of approximately 12.5% and 16%, respectively.

Hole expansion ratio (HER) testing was performed on an Interlaken Technologies SP-225 hydraulic press and consisted of raising the conical punch that uniformly expanded the hole radially outward. Two hole expansion speeds of 3 mm/min and 50 mm/min, synonymous with the conical ram travel speed, were used. A digital image camera system was focused on the conical punch and the edge of the hole was monitored for evidence of crack formation and propagation.

The initial diameter of the hole was measured twice with calipers, measurements were taken at 90° increments and averaged to get the initial hole diameter. The conical punch was raised continuously until a crack was observed propagating through the specimen thickness. At that point the test was stopped and the hole expansion ratio was calculated as a percentage of the initial hole diameter measured before the start of the test. After expansion four diameter measurements were taken using calipers every 45° and averaged to account for any asymmetry of the hole due to cracking.

Figure 86:
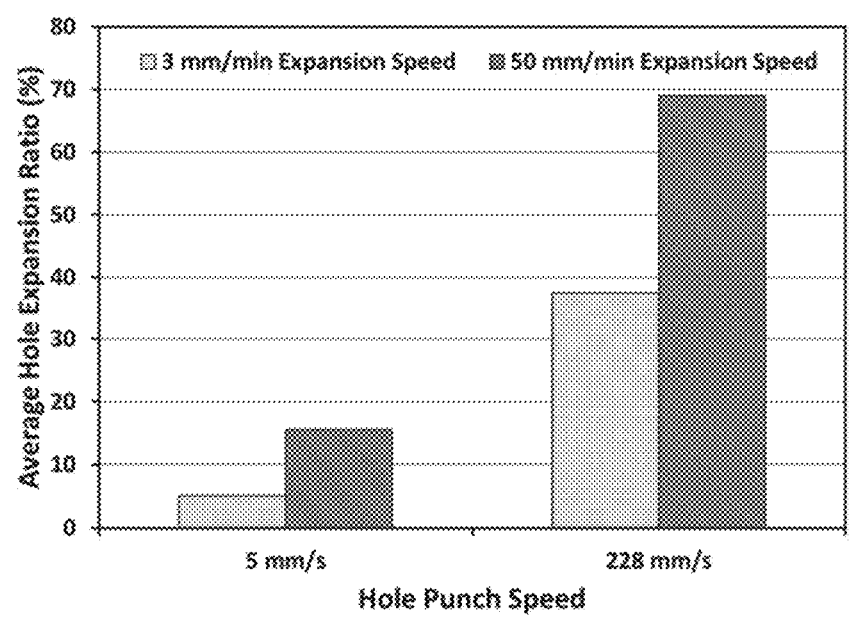
FIG. 86 The measured hole expansion ratio as a function of hole punching speed and hole expansion speed for sheet of Alloy 9.

Hole expansion ratio values for tests are listed in Table 49. HER values vary from 2.4 to 18.5% in the samples with holes punched at 5 mm/s. In the case of 228 mm/s hole punching speed, HER values are significantly higher in a range from 33.8 to 75.0%. The effect of expansion speed is illustrated in FIG. 86. Increase in expansion speed results in higher HER values independent of utilized punching speeds (i.e. 5 mm/s and 228 mm/s).

TABLE 49

Hole Expansion Ratio in Alloy 9 Sheet at Different Punching and Expansion Speeds

| Punch Clearance (%) | Hole Punch Speed (mm/s) | Hole Expansion Speed (mm/min) | HER (%) |
|---|---|---|---|
| 16 | 228 | 3 | 33.8 |
| 16 | 228 | 3 | 41.3 |
| 16 | 228 | 50 | 63.1 |
| 16 | 228 | 50 | 75.0 |
| 12.5 | 5 | 3 | 2.4 |
| 12.5 | 5 | 3 | 7.9 |
| 12.5 | 5 | 50 | 12.7 |
| 12.5 | 5 | 50 | 18.5 |

Figure 87:
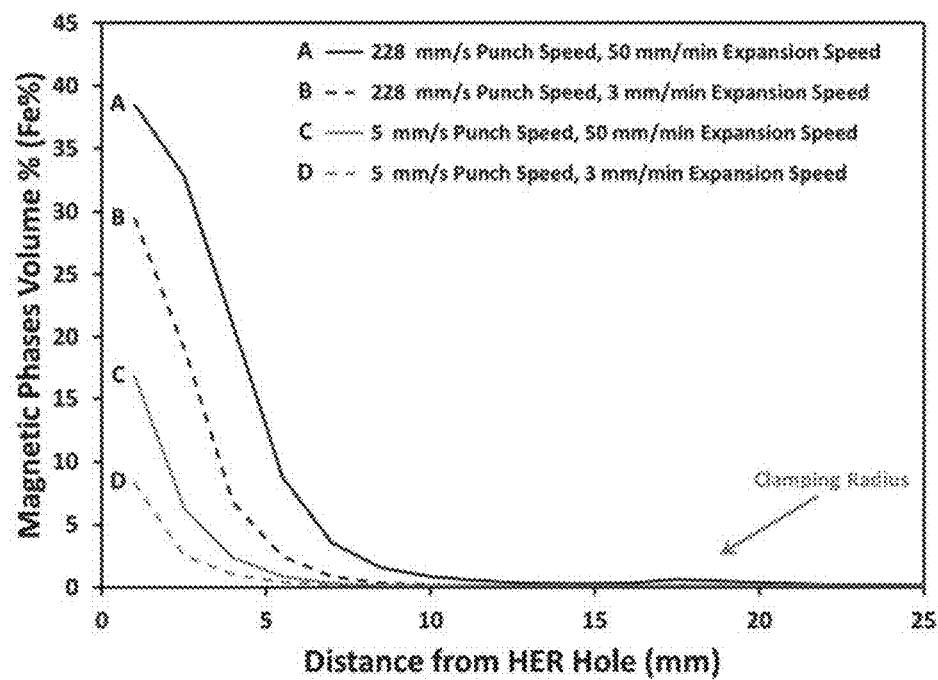
FIG. 87 The average magnetic phases volume percent (Fe %) in the HER tested samples with different hole punching speed and hole expansion speed as a function of the distance from the hole edge.

The magnetic phases volume percent (Fe %) was measured in the HER tested samples with different hole punching speed and hole expansion speed using a Fischer Feritscope FMP30. The results are listed in Table 50. FIG. 87 illustrates the effect of on the magnetic phases volume percent in the tested samples as a function of the distance from the hole edge. As can be seen with higher punch speed and/or higher expansion speed, after testing is completed, the magnetic phase volume % increases near the hole edge and also away from the hole edge into the material. As the increase in magnetic phase volume (Fe %) is consistent with increases in the amount of Structure #5 in Table 1 which is formed during deformation, due to the formation of magnetic nanoscale alpha-iron from the starting non-magnetic austenite present in Structure #4.

TABLE 50

Magnetic Phases Volume (Fe %) in Alloy 9 at Different Hole Punching Speeds and Hole Expansion Speeds as a Function of Distance from Hole Edge After Expansion

| | Hole Creation and Expansion Parameters | | | | | | | |
|---|---|---|---|---|---|---|---|---|
| Hole Punching Speed (mm/s) | 228 | 228 | 228 | 228 | 5 | 5 | 5 | 5 |
| Punch Clearance (%) | 16 | 16 | 16 | 16 | 12.5 | 12.5 | 12.5 | 12.5 |
| Hole Expansion Speed (mm/min) | 3 | 3 | 50 | 50 | 3 | 3 | 50 | 50 |
| HER (%) | 33.8 | 41.3 | 63.1 | 75.0 | 2.4 | 7.9 | 12.7 | 18.5 |
| Distance from hole (mm) | Magnetic Phases Volume % (Fe %) | | | | | | | |
| 1 | 27.3 | 31.6 | 37.9 | 39.1 | 7.1 | 9.5 | 13.5 | 20.1 |
| 2.5 | 17 | 21.1 | 29.6 | 36 | 2.4 | 2.7 | 6.5 | 6.2 |
| 4 | 6 | 7.5 | 17.4 | 24.6 | 0.94 | 1.1 | 2.4 | 2.4 |
| 5.5 | 2.2 | 2.8 | 6.3 | 11.3 | 0.47 | 0.45 | 0.96 | 0.75 |
| 7 | 0.82 | 0.89 | 2.8 | 4.4 | 0.21 | 0.29 | 0.38 | 0.28 |
| 8.5 | 0.33 | 0.35 | 1.3 | 1.9 | 0.23 | 0.22 | 0.24 | 0.16 |
| 10 | 0.21 | 0.21 | 0.66 | 1.1 | 0.21 | 0.2 | 0.2 | 0.13 |
| 11.5 | 0.15 | 0.16 | 0.42 | 0.67 | 0.2 | 0.18 | 0.21 | 0.12 |
| 13 | 0.13 | 0.14 | 0.26 | 0.37 | 0.18 | 0.18 | 0.22 | 0.11 |
| 14.5 | 0.12 | 0.13 | 0.25 | 0.31 | 0.19 | 0.18 | 0.23 | 0.11 |
| 16 | 0.13 | 0.14 | 0.31 | 0.38 | 0.19 | 0.19 | 0.22 | 0.13 |
| 17.5 | 0.2 | 0.22 | 0.53 | 0.84 | 0.19 | 0.2 | 0.24 | 0.14 |
| 19 | 0.16 | 0.25 | 0.37 | 0.61 | 0.2 | 0.22 | 0.22 | 0.12 |
| 22 | 0.11 | 0.13 | 0.21 | 0.24 | 0.19 | 0.21 | 0.22 | 0.1 |
| 25 | 0.12 | 0.12 | 0.19 | 0.23 | 0.19 | 0.2 | 0.2 | 0.11 |

This Case Example illustrates that the relative resistance to cracking of an edge as confirmed by HER testing can be increased by, in the exemplary case of forming an edge within a hole, by either increasing hole punching speeds, hole expansion speeds or both. The sheet from Alloy 9, tested in this Case Example, demonstrated an increase in hole expansion ratio with increasing hole punching speed (i.e. 5 to 228 mm/s) and/or the hole expansion speed (i.e. 3 to 50 mm/min). Accordingly, preferably herein for the subject alloys, one forms an edge in the alloy and expands the edge at a speed of greater than or equal to 5 mm/min, The magnetic phases volume percent (Fe %) in tested samples increases with increasing hole punching speed and/or the hole expansion speed over the ranges studied. With this relatively greater amount of deformation available in and adjacent to the hole edge during the now disclosed increased hole punching speed or hole expansion speed, the higher local formability and resistance to cracking of the edge is achieved in the material as measured by the HER.

Case Example #21 HER Performance as a Function of Hole Preparation Method

Slabs with thickness of 50 mm were laboratory cast from three selected alloys according to the atomic ratios provided in Table 2 and laboratory processed by hot rolling, cold rolling and annealing at 850° C. for 10 min as described herein. Sheet from each alloy possessing the Recrystallized Modal Structure with final thickness of 1.2 mm were used to demonstrate an effect of hole expansion speed on HER performance.

Specimens for testing with a size of 89×89 mm were cut via wire EDM from the sheet. A 10 mm diameter hole was prepared by various methods including punching, EDM cutting, milling, and laser cutting. Hole punching was done at a low quasistatic punching speed of 0.25 mm/s at 16% punch to die clearance using a Komatsu OBS80-3 press. EDM cut holes were first rough cut then the final cut was made at parameters to yield a visually smooth surface. During hole milling, holes were pilot drilled, reamed to size, and then deburred. Laser cut samples were cut on a 4 kW fiber optic Mazak Optiplex 4020 Fiber II machine.

Figure 88:
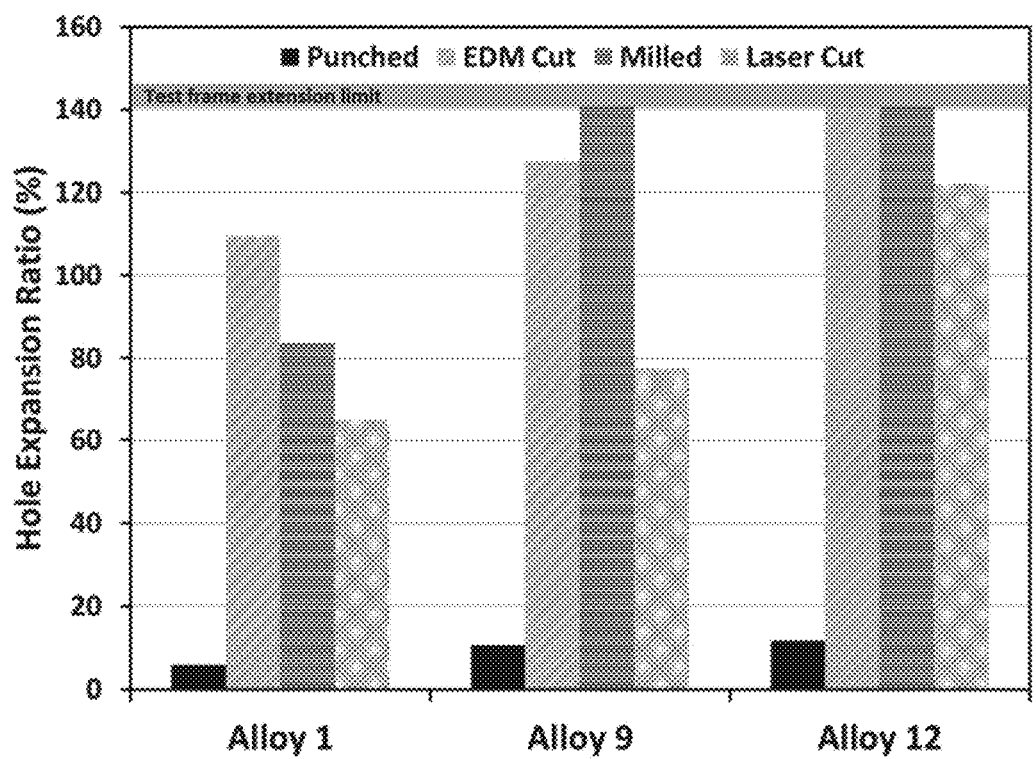
FIG. 88 The measured hole expansion ratio in samples from Alloy 1, Alloy 9, and Alloy 12 as a function of hole preparation method.

Hole expansion ratio (HER) testing was performed on an Interlaken Technologies SP-225 hydraulic press and consisted of raising the conical punch that uniformly expanded the hole radially outward. In FIG. 88, the results of HER testing is provided for each alloy as a function of the hole preparation method. As shown, in the case of punched holes, HER values are the lowest for all three alloys in a range from 6 to 12%. Samples with EDM cut, milled and laser cut holes exhibit high HER values from 65 to 140%+. Note that the ~140% expansion represented the maximum extension limit of the press crosshead during testing so, in the samples with EDM cut holes from Alloy 12, and with milled holes from Alloy 9 and Alloy 12, the expansion limit was not reached during HER testing (i.e. actual value>140%).

Figure 89:
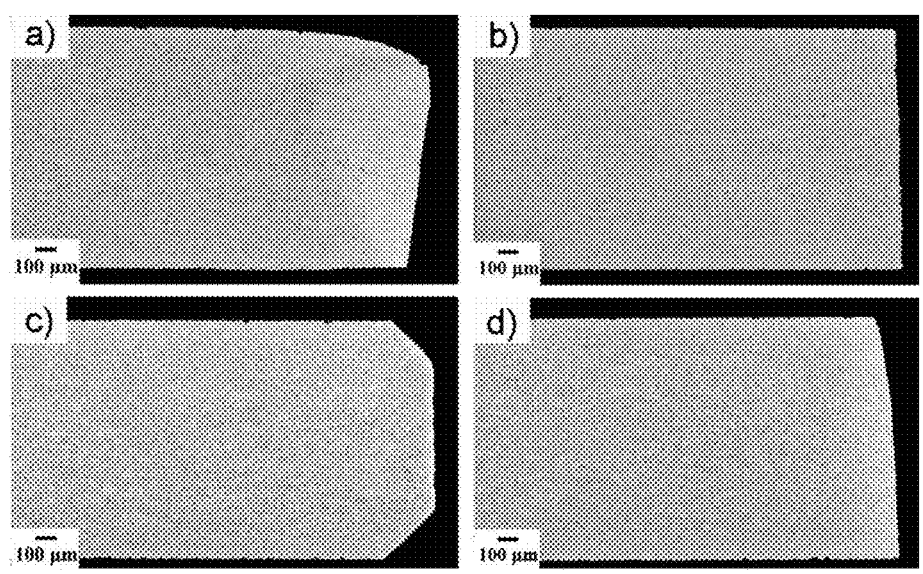
FIG. 89 SEM images at low magnification of the cross section near the hole edge in the Alloy 1 samples with holes prepared by different methods prior to expansion; a) Punched hole, b) EDM cut hole, c) Milled hole, and d) Laser cut hole.
Figure 90:
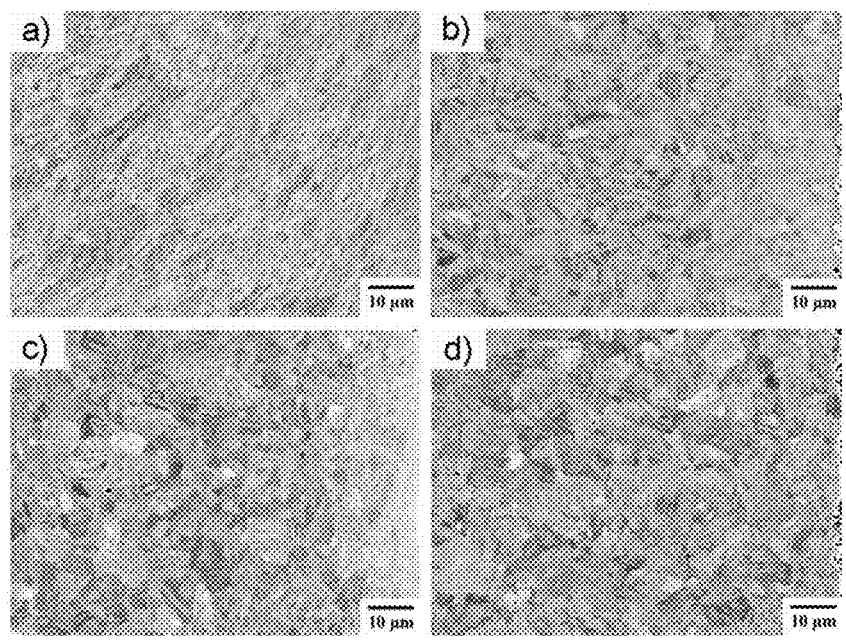
FIG. 90 SEM images at high magnification of the cross section near the hole edge in the Alloy 1 samples with holes prepared by different methods prior to expanding at high magnification; a) Punched hole, b) EDM cut hole, c) Milled hole, and d) Laser cut hole.

In FIG. 89, SEM images of the sample cross section near the hole edge prior to expansion are provided at low magnification for samples from Alloy 1 with holes prepared by different methods. In the punched sample (FIG. 89A), the typical rollover zone at the top and burr zone at the bottom can be seen. Additionally, a hemispherical shear affected zone is visible at the edge of the hole with penetration of ~0.5 mm at the deepest point. A similarly shear affected zone was observed in punched samples from the other two alloys as well but not in any of the samples with holes produced by the non-punching methods. Note that every method utilized for hole preparation introduced some kind of defects at the hole edge. In the EDM cut hole (FIG. 89B), the edge is perpendicular on a cross section image but small micron scaled cutting defects can be seen at the surface; in the milled samples (FIG. 89C) the edge of the holes is trapezoidal in shape; and in the laser cut holes (FIG. 89D), the edge wandered in a sideways fashion as the laser penetrated the sample. In FIG. 90, SEM images of the cross sections near the hole edge (i.e. at the edge and up to 0.7 mm away from the edge) prior to expansion are provided at higher magnification for samples from Alloy 1 with holes prepared by different methods including punching at a hole punching speed of 0.25 mm/s, EDM cut hole, milled hole, and laser cut hole. The microstructure near the hole edges are illustrated in FIGS. 90A, 90B, 90C and 90D respectively. As can be seen, the edge of the hole punched at 0.25 mm/s (FIG. 90a) is relatively highly deformed thereby leading to the observed low HER values. This structure near the edge of the punched sample is representative of Structure #5 Refined High Strength Nanomodal Structure in Table 1 whereby the structures near the hole edge of the EDM cut, milled, and laser cut holes, is representative of Structure #4 Recrystallized Modal Structure in Table 1. However, in examples where holes were prepared by non-punching methods (FIGS. 90B, 90C, 90D), the resulting alloys experienced excellent local formability with high HER values from 65 to 140%+ consistent with the ductile nature of Structure #4 near the hole edges. In FIG. 91A (punched hole), 91B (EDM cut hole), 92C (milled hole), and 91D (laser cut hole), SEM images of the cross section near the hole edge after HER testing are provided at low magnification for samples from Alloy 1. Note that the thickness of samples near the hole is smaller in the expanded samples with higher HER values since the expansion of the holes results in sample thinning near the hole edge.

Figure 92:
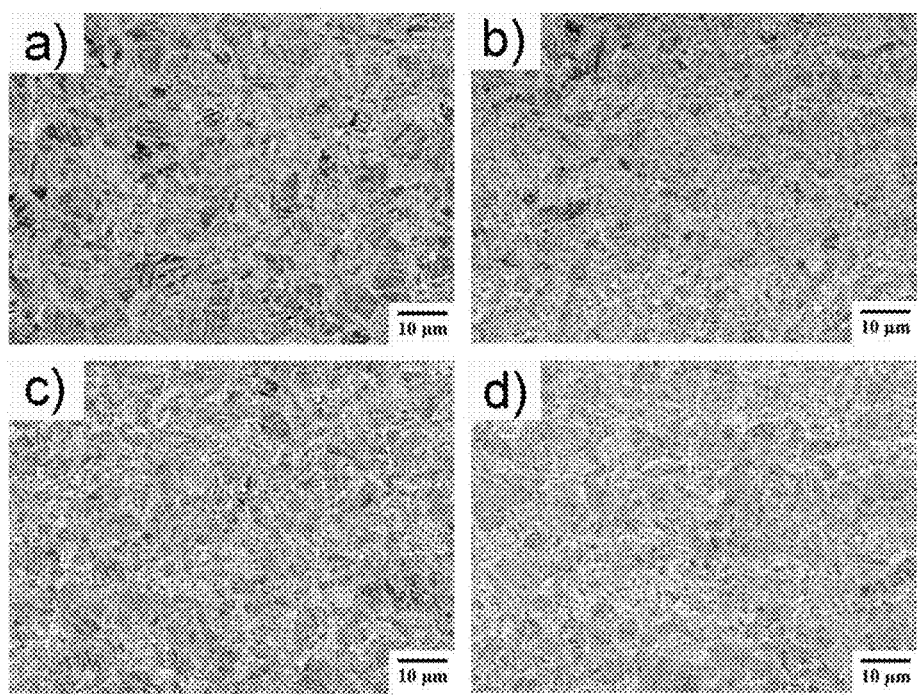
FIG. 92 SEM images of sample cross sections near the hole edge after HER testing (i.e. after expansion until failure by cracking) are provided at higher magnification for samples from Alloy 1 with holes prepared by different methods; a) Punched hole, b) EDM cut hole, c) Milled hole, and d) Laser cut hole.

In FIG. 92, images of sample cross sections near the hole edge after HER testing (i.e. after expansion until failure by cracking) are provided at higher magnification for samples from Alloy 1 with holes prepared by different methods showing similar deformed structure in all cases. Since hole expansion and deformation of the edge is complete, the microstructure near all of the hole edges are similar and representative of Structure #5 Refined High Strength Nanomodal Structure in Table 1. This Case Example demonstrates the effect of edge preparation on the resulting local formability in alloys herein. Punching at a low speeds of 0.25 mm/s is causing structural changes near the hole edge consistent with previous case examples resulting in limited local formability of the edges and low HER values. However, in examples where holes were prepared by non-punching methods, the resulting alloys experienced excellent local formability with high HER values from 65 to 140%+ consistent with the ductile nature of the microstructure in the samples and at the hole edges.

What is claimed is:

1. A method for expanding the edge of an alloy comprising:
   a. supplying a metal alloy comprising at least 50 atomic % iron and at least four elements selected from Si, Mn, B, Cr, Ni, Cu or and melting said alloy and cooling at a rate of <250 K/s or solidifying to a thickness of >2.0 mm up to 500 mm and forming an alloy having a Tm;
   b. heating said alloy to a temperature in a range of 700° C. to below said Tm and reducing said thickness of said alloy at a strain rate of $10^{-6}$ to $10^4$ to provide a first resulting alloy having an ultimate tensile strength of 921 MPa to 1413 MPa and an elongation of 12.0% to 77.7%;
   c. stressing said first resulting alloy and providing a second resulting alloy having an ultimate tensile strength of 1356 MPa to 1831 MPa and an elongation of 1.6% to 32.8%;
   d. heating said second resulting alloy to a temperature below said Tm and forming a third resulting alloy having an elongation of 6.6% to 86.7%;
   e. forming an edge in said third resulting alloy and expanding said edge at a speed of greater than or equal to 5 mm/min to form an expanded edge.

2. The method of claim 1 wherein said edge is expanded at a rate in the range of greater than or equal to 5 mm/min to 100 mm/min.

3. The method of claim 1 wherein said alloy comprises Fe and at least five elements selected from Si, Mn, B, Cr, Bi, Cu or C.

4. The method of claim 1 wherein said alloy comprises Fe and at least six elements selected from Si, Mn, B, Cr, Ni, Cu or C.

5. The method of claim 1 wherein said alloy comprises Fe, Si, Mn, B, Cr, Ni, Cu and C.

6. The method of claim 1 wherein said third resulting alloy has a yield strength ranging from 197 to 1372 MPa.

7. The method of claim 1 wherein said third resulting alloy has an ultimate tensile strength ranging from 799 to 1683 MPa.

8. The method of claim 1 wherein before step (e) the edge in said alloy is exposed to a temperature in a range of of 400° C. to below said Tm.

9. The method of claim 1 wherein in step (e), the edge defines either an internal hole and/or an external edge.

10. The method of claim 1 wherein in step (e), the edge is formed by punching, piercing, perforating, cutting, cropping, EDM cutting, waterjet cutting, laser cutting, or milling.

11. The method of claim 1, wherein said edge is formed in a progressive die stamping operation.

12. The method of claim 1, wherein said expanded edge is positioned in a vehicle.

13. The method of claim 1, wherein said expanded edge is part of a vehicular frame, vehicular chassis, or vehicular panel.

* * * * *

UNITED STATES PATENT AND TRADEMARK OFFICE
CERTIFICATE OF CORRECTION

PATENT NO.        : 10,465,260 B2
APPLICATION NO.   : 15/438313
DATED             : November 5, 2019
INVENTOR(S)       : Daniel James Branagan et al.

It is certified that error appears in the above-identified patent and that said Letters Patent is hereby corrected as shown below:

In the Claims

On Column 76, Line 15 (approx), In Claim 1, after "Cu or" insert -- C, --.

Signed and Sealed this
Twenty-fourth Day of December, 2019

Andrei Iancu
*Director of the United States Patent and Trademark Office*